US012098020B2

(12) United States Patent
West et al.

(10) Patent No.: US 12,098,020 B2
(45) Date of Patent: Sep. 24, 2024

(54) SAFETY GRAIN BIN DOOR LATCH SYSTEM

(71) Applicant: Sukup Manufacturing Co., Sheffield, IA (US)

(72) Inventors: Connor Lee West, Thornton, IA (US); Andrew Joseph Sauerbrei, Clear Lake, IA (US); Bradley Allan Poppen, Sheffield, IA (US); David Jay Brownmiller, Mason City, IA (US); John Arthur Hanig, Sheffield, IA (US); Steve Sukup, Sheffield, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 66 days.

(21) Appl. No.: 17/391,606

(22) Filed: Aug. 2, 2021

(65) Prior Publication Data

US 2021/0371193 A1 Dec. 2, 2021

Related U.S. Application Data

(63) Continuation-in-part of application No. 16/935,938, filed on Jul. 22, 2020, now Pat. No. 11,111,074.

(60) Provisional application No. 62/879,897, filed on Jul. 29, 2019, provisional application No. 62/989,339, filed on Mar. 13, 2020, provisional application No. 63/167,998, filed on Mar. 30, 2021.

(51) Int. Cl.
*B65D 90/22* (2006.01)
*A01F 25/16* (2006.01)
*B65D 88/08* (2006.01)
*B65D 90/00* (2006.01)

(52) U.S. Cl.
CPC ............ *B65D 90/008* (2013.01); *A01F 25/16* (2013.01); *B65D 88/08* (2013.01); *B65D 90/22* (2013.01)

(58) Field of Classification Search
CPC ...... B65D 90/008; B65D 90/22; B65D 88/08; B65D 90/54; B65D 90/66; B65D 90/623; A01F 25/16; A01F 25/163; E05C 7/02
See application file for complete search history.

(56) References Cited

U.S. PATENT DOCUMENTS 4,913,478 A * 4/1990 Grossman ................ E05C 9/08
292/259 R
5,474,345 A * 12/1995 Clark ....................... E05C 7/02
49/67

(Continued)

*Primary Examiner* — Stephen J Castellano
(74) *Attorney, Agent, or Firm* — BrownWinick Law Firm; Christopher A. Proskey

(57) ABSTRACT

A safety door latch system is presented for a grain bin having a door frame. An inner door is connected to the door frame that is configured to move between an open position and a closed position. An outer door is connected to the door frame and is configured to move between an open position and a closed position. A safety mechanism is connected to the door frame and is configured to move between an open position and a closed position. When the inner door frame is moved to a closed position, a portion of the inner door engages the safety mechanism thereby causing the safety mechanism to move to the closed position. When the safety mechanism is in the closed position, the outer door may be latched to the safety mechanism. When the safety mechanism is in the open position, the outer door cannot latch to the safety mechanism.

32 Claims, 86 Drawing Sheets

(56) References Cited

U.S. PATENT DOCUMENTS

2002/0148259 A1* 10/2002 Finkelstein ......... E05B 65/0053
70/92
2004/0226141 A1* 11/2004 Yates ................... F25D 23/028
16/412

* cited by examiner

A

CLOSE WITH DOOR SKIN

CLOSE WITH DOOR SKIN

CLOSE WITH DOOR SKIN

CLOSE WITHOUT DOOR SKIN

CLOSE WITHOUT DOOR SKIN

CLOSE WITHOUT DOOR SKIN

OPEN WITHOUT DOOR SKIN

OPEN WITHOUT DOOR SKIN

OPEN WITHOUT DOOR SKIN

DISENGAGED

DETAIL B

ENGAGED

DETAIL D

ENGAGED

SAFETY GRAIN BIN DOOR LATCH SYSTEM

CROSS REFERENCE TO RELATED APPLICATIONS

This application is a continuation-in-part of and claims priority to U.S. application Ser. No. 16/935,938 filed Jul. 22, 2020 and titled SAFETY GRAIN BIN DOOR LATCH SYSTEM, now U.S. Pat. No. 11,111,074, which claims priority to U.S. Provisional Application No. 62/879,897 filed Jul. 29, 2019 and titled SAFETY GRAIN BIN DOOR LATCH SYSTEM and which claims priority to U.S. Provisional Application No. 62/989,339 filed Mar. 13, 2020 and titled SAFETY GRAIN BIN DOOR LATCH SYSTEM; each of which is hereby incorporated herein fully by reference in its entirety.

This application also claims priority to Provisional Application No. 63/167,998 filed Mar. 30, 2021 and titled SAFETY GRAIN BIN DOOR LATCH SYSTEM, which is hereby incorporated herein fully by reference in its entirety.

FIELD OF THE DISCLOSURE

This disclosure relates to grain storage devices used in agriculture. More specifically and without limitation, this disclosure relates to grain bins having a door in their sidewall.

OVERVIEW OF THE DISCLOSURE

Grain bins are massive structures used to store bulk flowable grain products such as corn, soybeans, wheat, rice, or any other grain products or other material. Conventional grain bins are generally formed in a cylindrical shape with a corrugated sidewall covered by a peaked roof. Grain bins vary in height (ranging from twenty feet high to over a hundred and fifty feet high), and diameter, (ranging from eighteen feet in diameter to over a hundred and fifty feet in diameter). The storage capacity of modern grain bins can range anywhere from a few thousand bushels to well over a million bushels.

Many grain bins include a door in the sidewall. This door positioned in the sidewall allows a user to enter the grain bin without having to climb all the way up to the top of the grain bin so as to enter through a door in the peaked roof, which is a dangerous and undesirable process.

Due to the hoop stresses that grain bins experience when they are filled, placing a door in the sidewall of a grain bin is a complex and delicate matter. To function properly, the door in the sidewall of the grain bin must transfer the hoop stresses from one side of the door to the other. If the door is not strong enough, or if the door is not installed properly, the door and/or the entire grain bin may fail.

Many grain bins that include a door in the sidewall of the grain bin also include an outer door skin that covers the inner door. In these arrangements, the outside door skin is largely cosmetic in nature and is only intended to protect the inner door from the elements. The outer door skin is not intended to transfer hoop stresses across the opening formed by the door.

In these arrangements, with an outer door skin that covers an inner door, when the outer door skin is closed it cannot be seen whether the inner door is properly closed. If the grain bin is filled when the inner door is not closed but the outer door is closed, this can lead to failure of the grain bin and/or injury or death to a user or bystander.

Therefore, for all the reasons stated above, and the reasons stated below, there is a need in the art for an improved safety grain bin door latch system prevents the failure of grain bins and prevents injury or death to users and bystanders.

Thus, it is a primary object of the disclosure to provide a safety grain bin door latch system that improves upon the state of the art.

Another object of the disclosure is to provide a safety grain bin door latch system that improves safety.

Yet another object of the disclosure to provide a safety grain bin door latch system that reduces injury or death.

Another object of the disclosure is to provide a safety grain bin door latch system that prevents the closing of an outer door skin when the inner door is not closed.

Yet another object of the disclosure to provide a safety grain bin door latch system that prevents the closing of an outer door skin when the inner door is not latched.

Another object of the disclosure is to provide a safety grain bin door latch system that is relatively inexpensive.

Yet another object of the disclosure is to provide a safety grain bin door latch system that is easy to install.

Another object of the disclosure is to provide a safety grain bin door latch system that can be used with practically any grain bin.

Yet another object of the disclosure is to provide a safety grain bin door latch system that can be used with practically any grain bin door Another object of the disclosure is to provide a safety grain bin door latch system that has a long useful life.

Yet another object of the disclosure is to provide a safety grain bin door latch system that is durable.

Another object of the disclosure is to provide a safety grain bin door latch system that has a robust design.

Yet another object of the disclosure is to provide a safety grain bin door latch system that is high quality.

Another object of the disclosure is to provide a safety grain bin door latch system that can be installed using conventional equipment and tools.

Yet another object of the disclosure is to provide a safety grain bin door latch system that can be installed as OEM (original Equipment Manufacturer).

Another object of the disclosure is to provide a safety grain bin door latch system that can be retroactively installed.

Yet another object of the disclosure is to provide a safety grain bin door latch system that is easy to use.

Another object of the disclosure is to provide a safety grain bin door latch system that does not require additional steps to open the grain bin door.

Yet another object of the disclosure is to provide a safety grain bin door latch system that does not require additional steps to close the grain bin door.

Another object of the disclosure is to provide a safety grain bin door latch system that is a passive safety mechanism.

Yet another object of the disclosure is to provide a safety grain bin door latch system that saves grain from being spilled.

Another object of the disclosure is to provide a safety grain bin door latch system that saves grain bins from being damaged.

Yet another object of the disclosure is to provide a safety grain bin door latch system that provides a safety check mechanism for grain bin doors.

Another object of the disclosure is to provide a safety grain bin door latch system that reduces risks.

Yet another object of the disclosure is to provide a safety grain bin door latch system that eliminates potentially dangerous conditions.

These and other objects, features, or advantages of the disclosure will become apparent from the specification, figures, and claims.

SUMMARY OF THE DISCLOSURE

A safety door latch system is presented for a grain bin having a door frame. An inner door is connected to the door frame that is configured to move between an open position and a closed position. An outer door is connected to the door frame and is configured to move between an open position and a closed position. A safety mechanism is connected to the door frame and is configured to move between an open position and a closed position. When the inner door frame is moved to a closed position, a portion of the inner door engages the safety mechanism thereby causing the safety mechanism to move to the closed position. When the safety mechanism is in the closed position, the outer door may be latched to the safety mechanism. When the safety mechanism is in the open position, the outer door cannot latch to the safety mechanism.

BRIEF DESCRIPTION OF THE DRAWINGS

The figures show at least one example of the system described herein.

DETAILED DESCRIPTION OF THE DISCLOSURE

Figure 1:
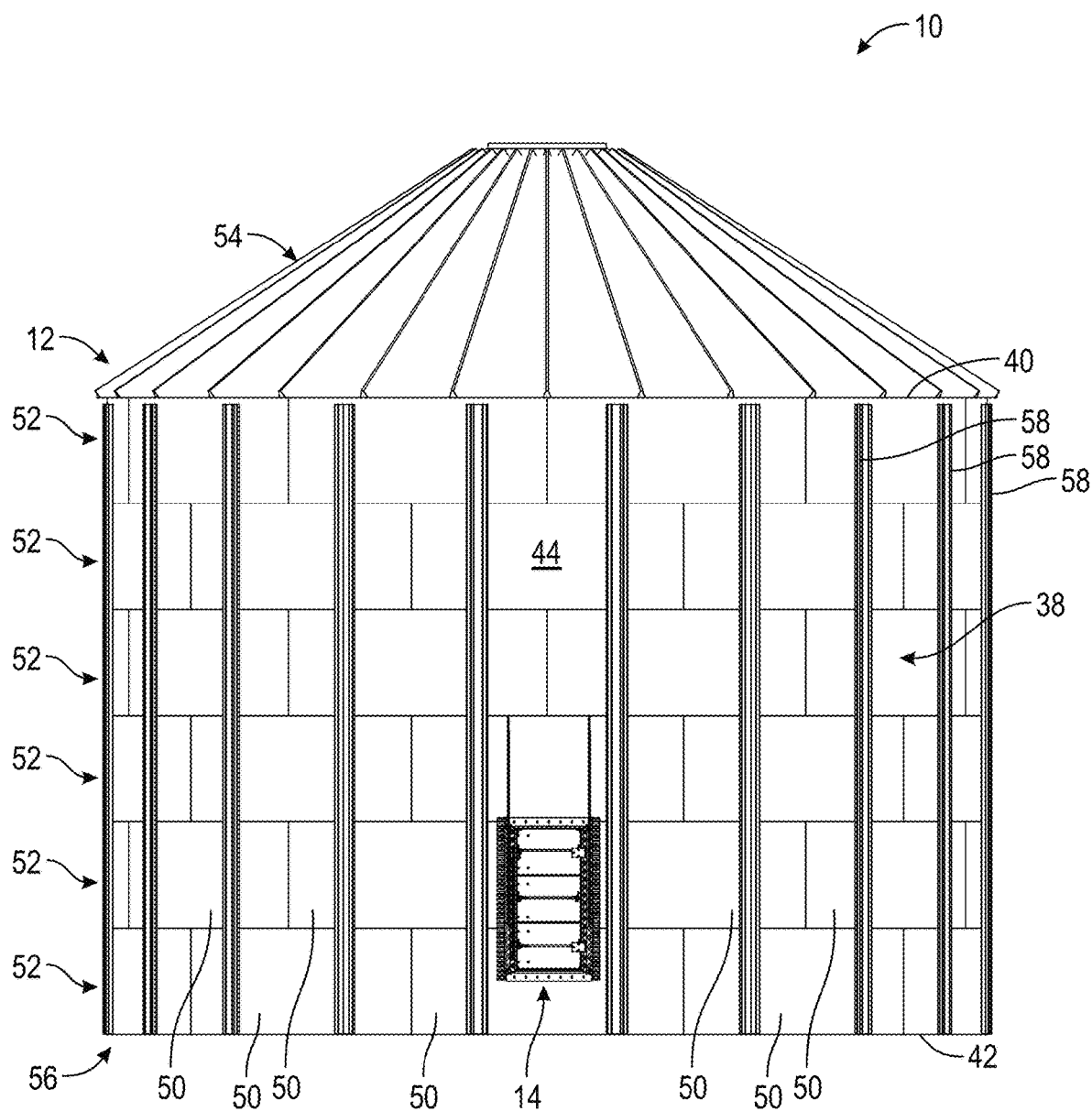
FIG. 1 is an elevation view of a grain bin having a safety door latch system, consistent with one or more embodiments; the view showing the grain bin having a sidewall formed of a plurality of sheets that are connected to one another at seams that form a plurality of vertically stacked rings; the view showing a roof formed of a plurality of panels; the view showing safety door latch system installed in the sidewall.
Figure 2:
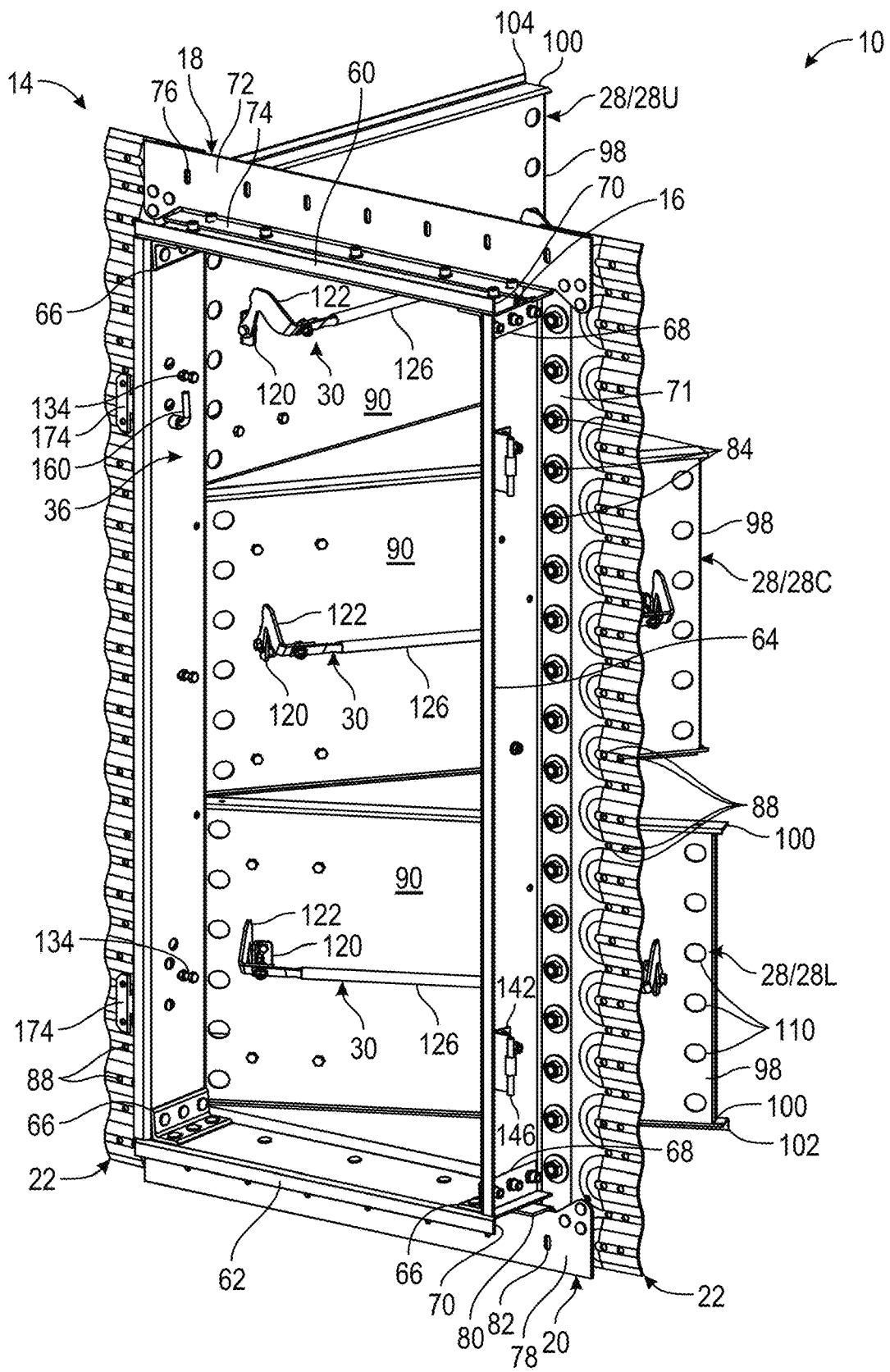
FIG. 2 is a front right perspective view of a safety door latch system, consistent with one or more embodiments; the view showing panels of an inner door in an open position.
Figure 3:
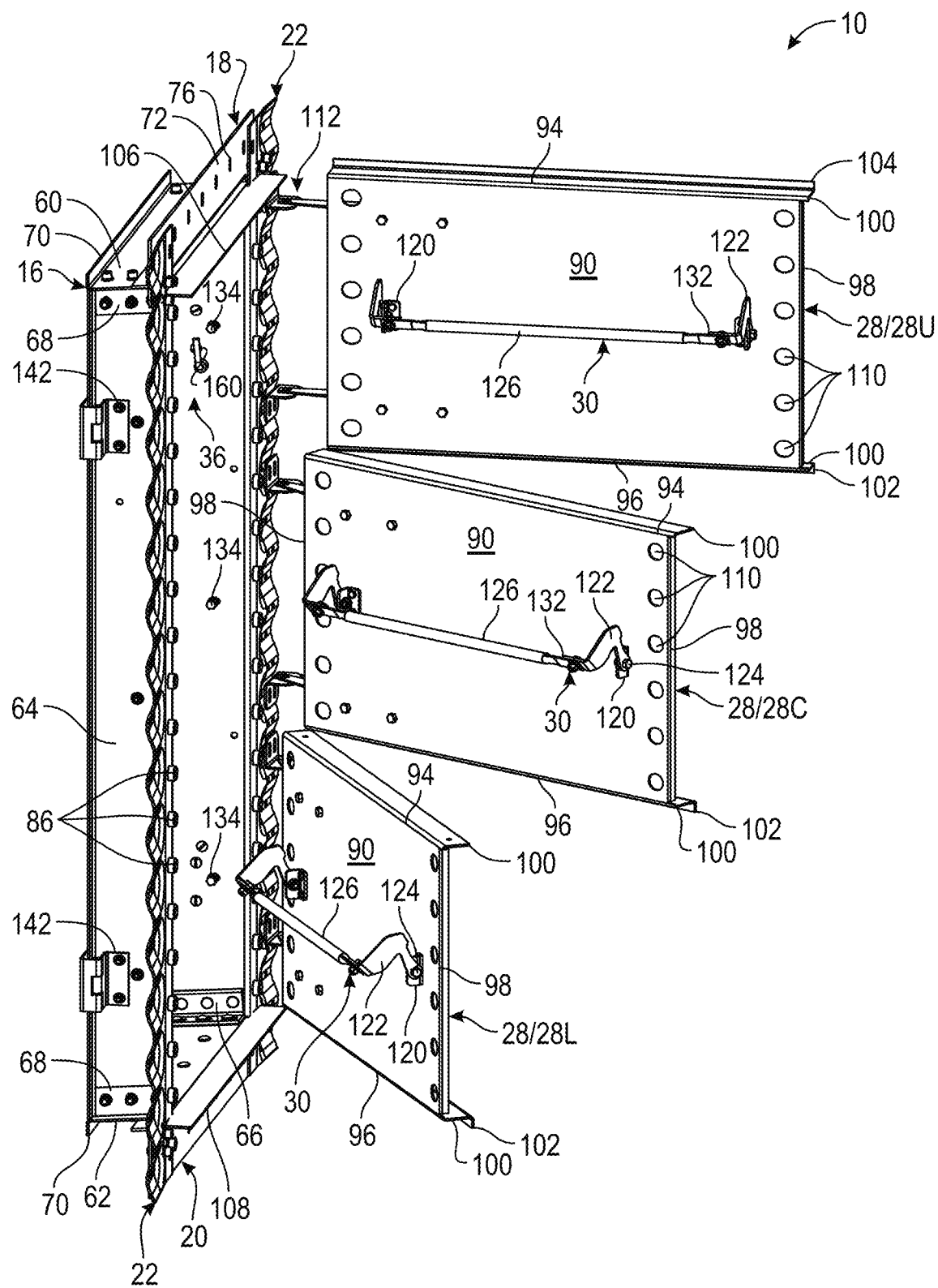
FIG. 3 is a rear right perspective view of a safety door latch system, consistent with one or more embodiments; the view showing panels of an inner door in an open position.
Figure 4:
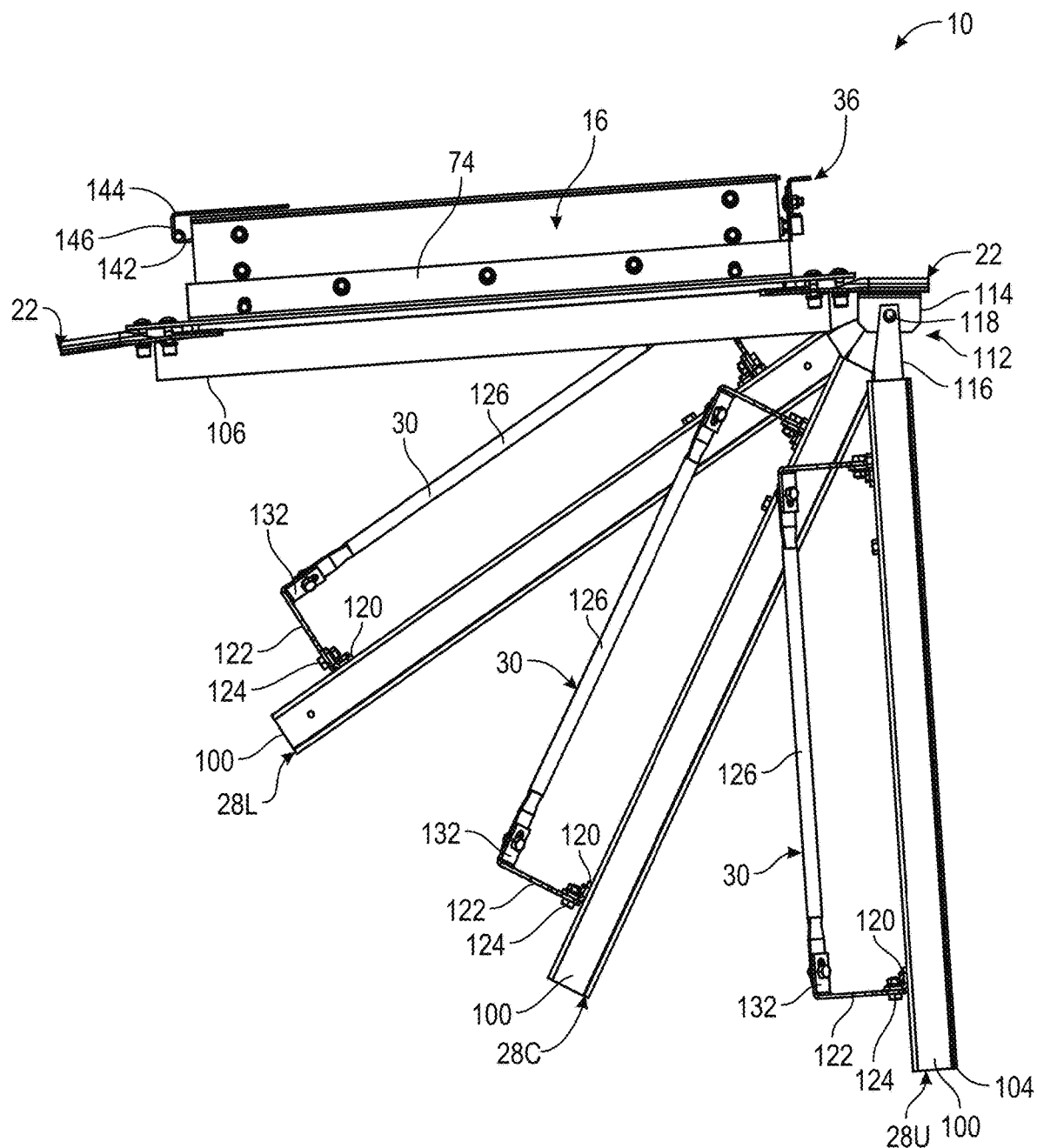
FIG. 4 is a top view of a safety door latch system, consistent with one or more embodiments; the view showing panels of an inner door in an open position.
Figure 5:
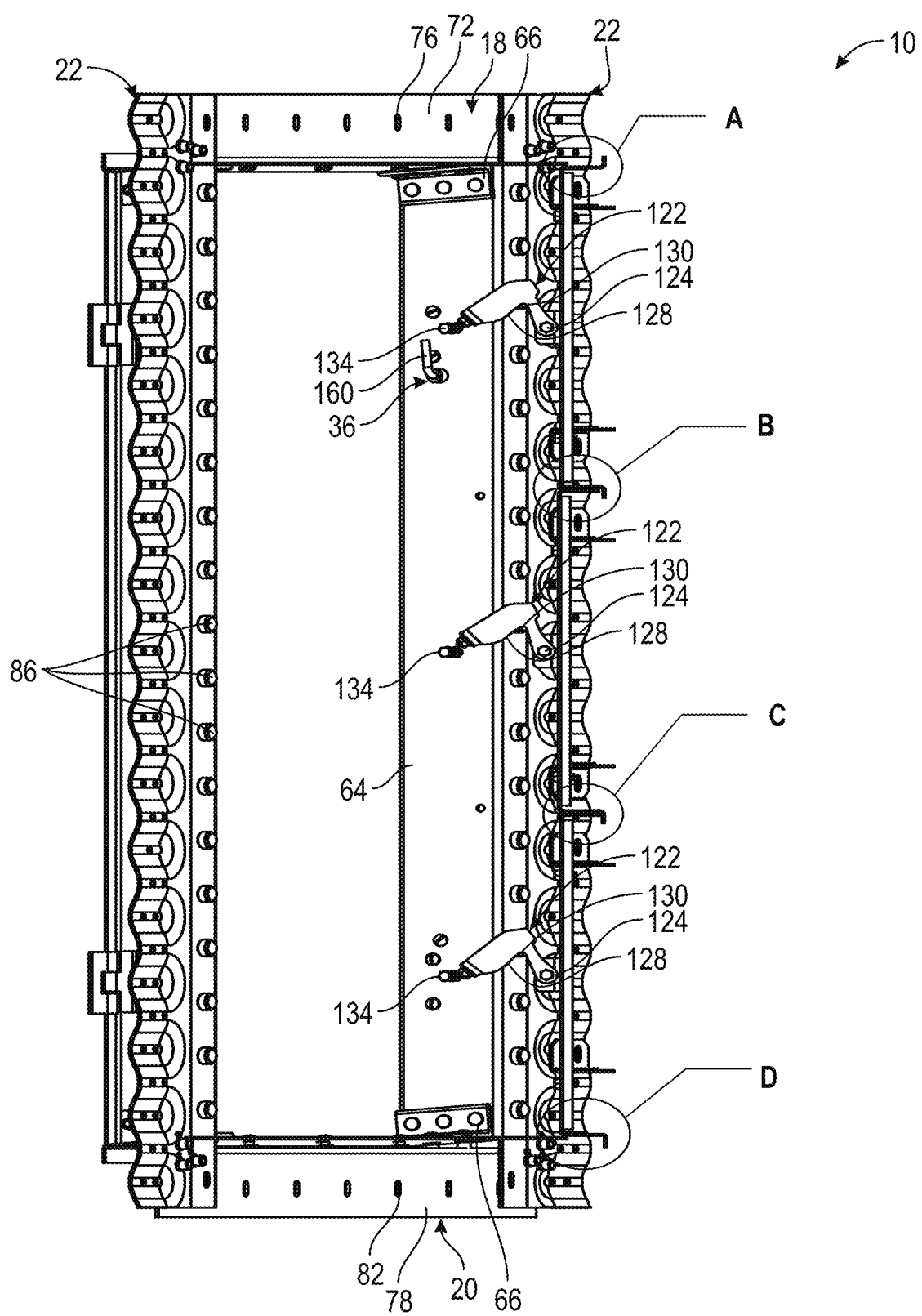
FIG. 5 is a rear right perspective view of a safety door latch system, consistent with one or more embodiments; the view a rear right perspective view of door frame; the view showing a right side view of panels of an inner door in an open position.
Figure 6:
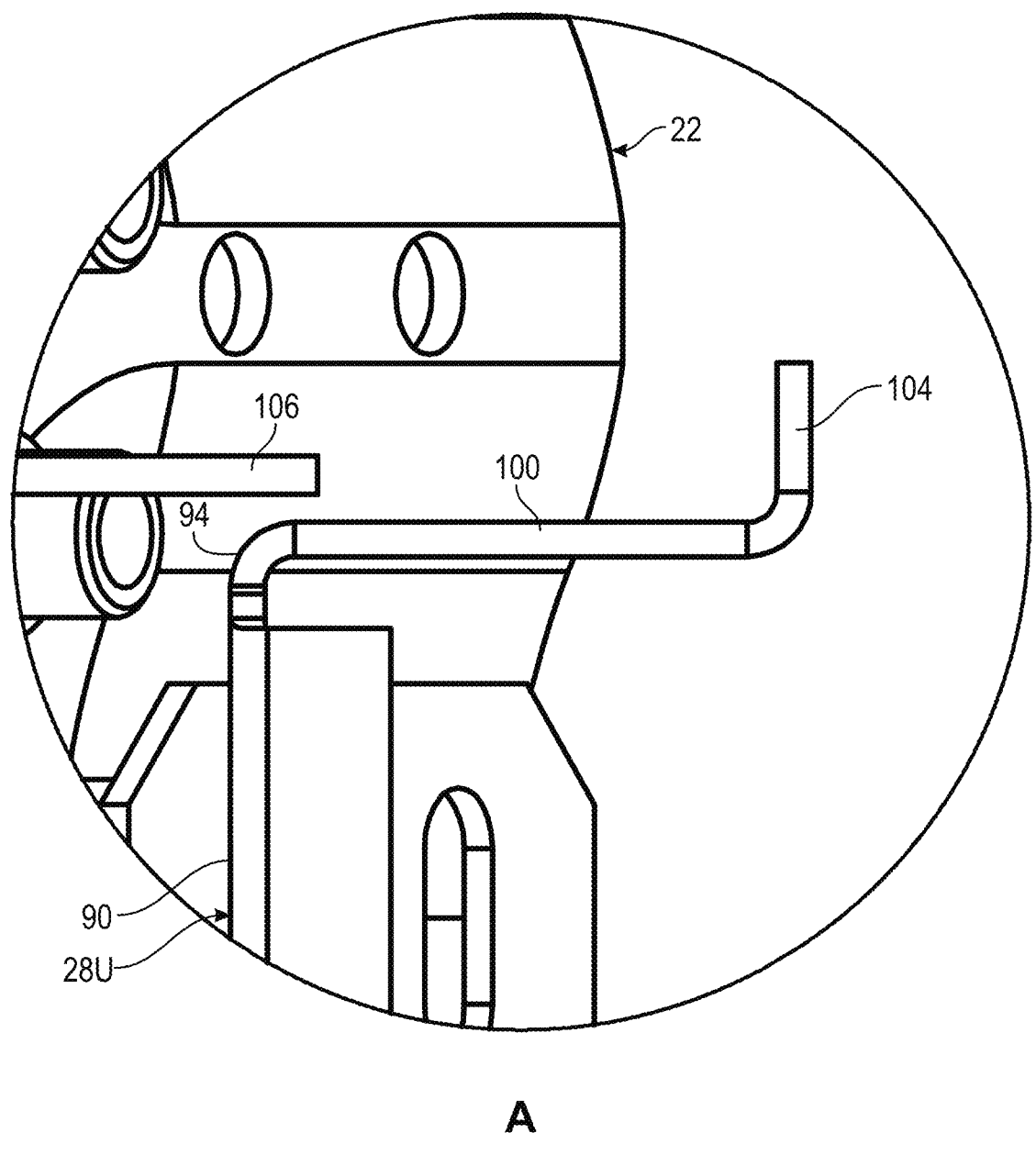
FIG. 6 is a close up view of section A shown in FIG. 5.
Figure 7:
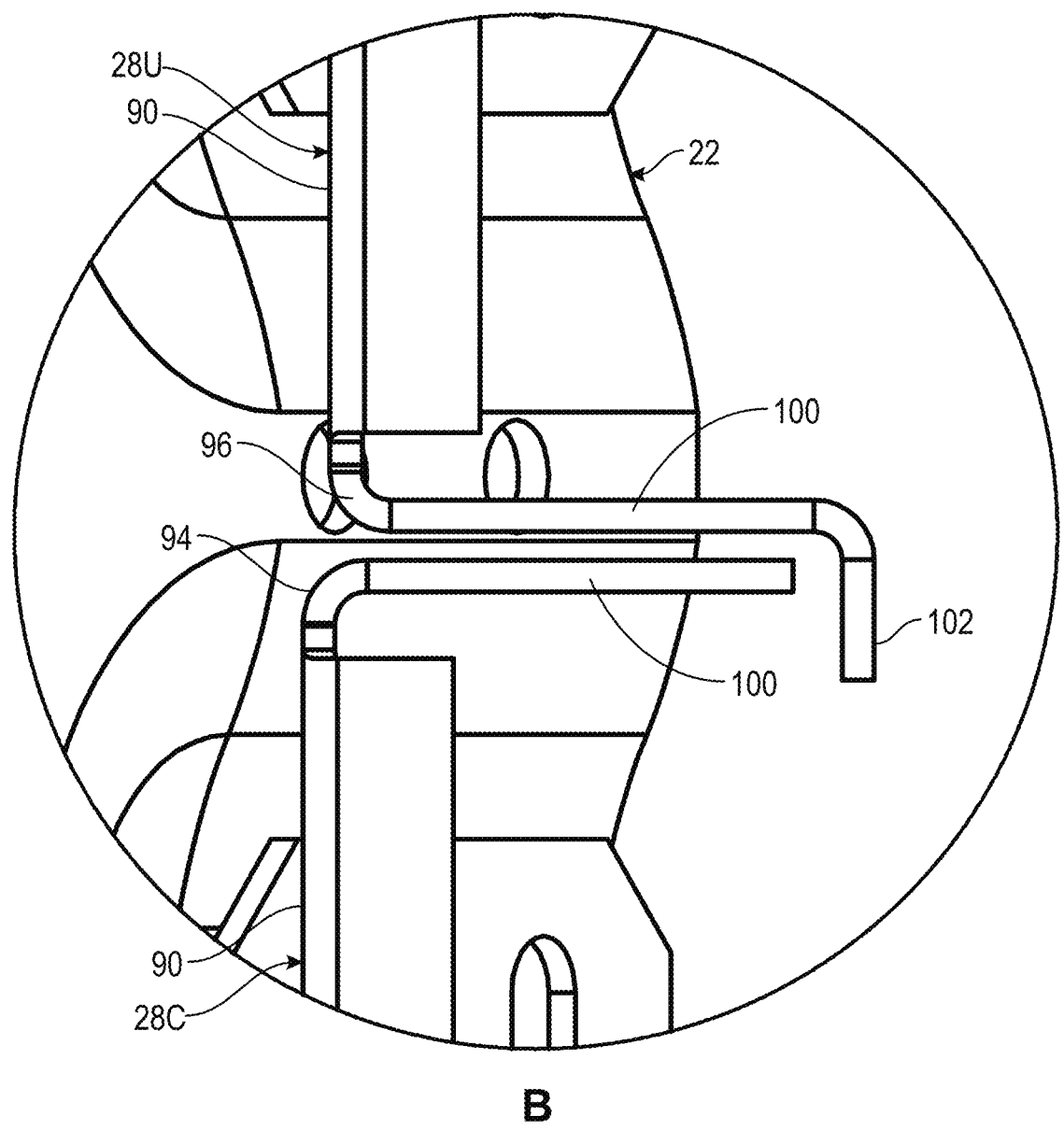
FIG. 7 is a close up view of section B shown in FIG. 5.
Figure 8:
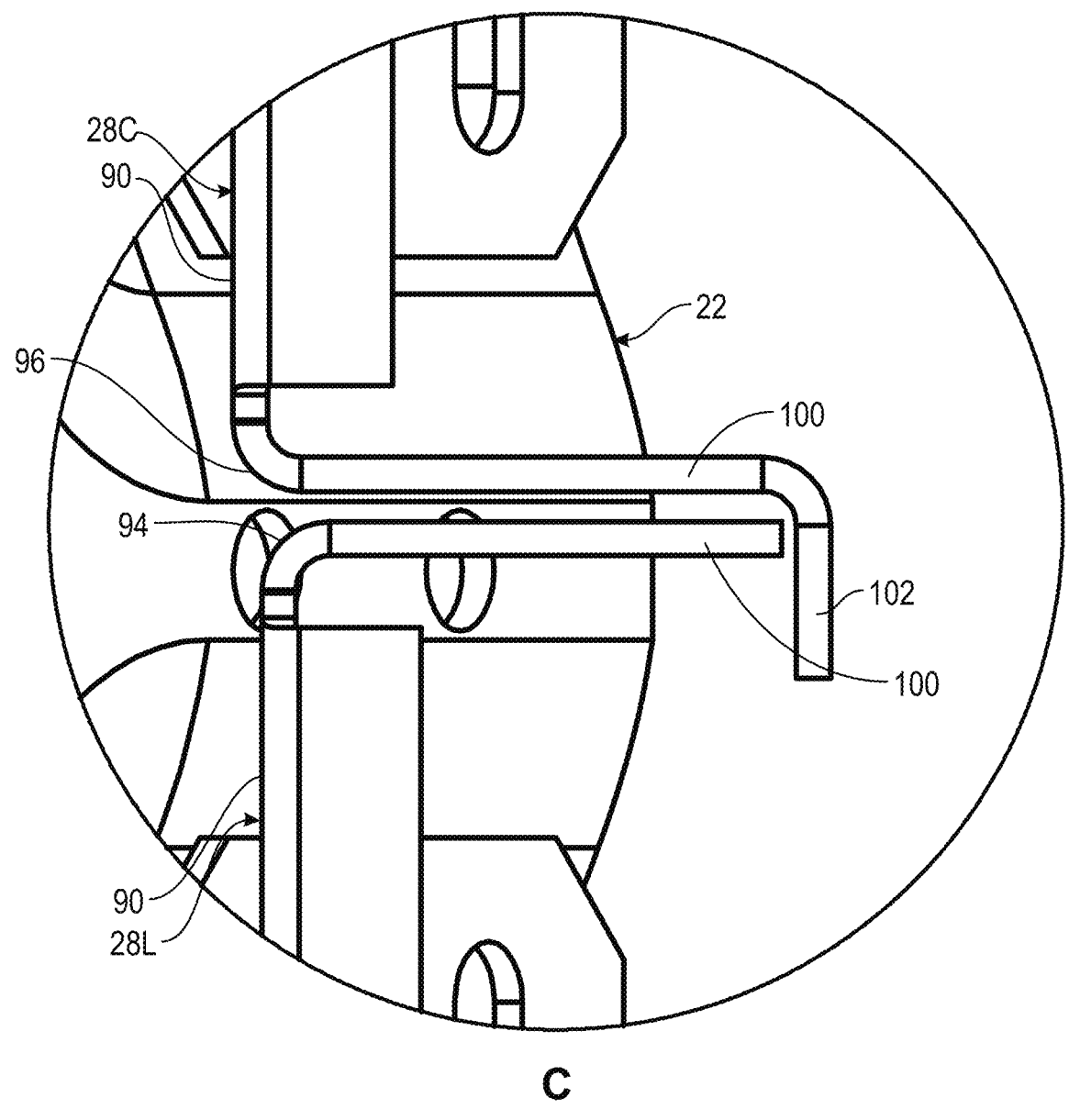
FIG. 8 is a close up view of section C shown in FIG. 5.
Figure 9:
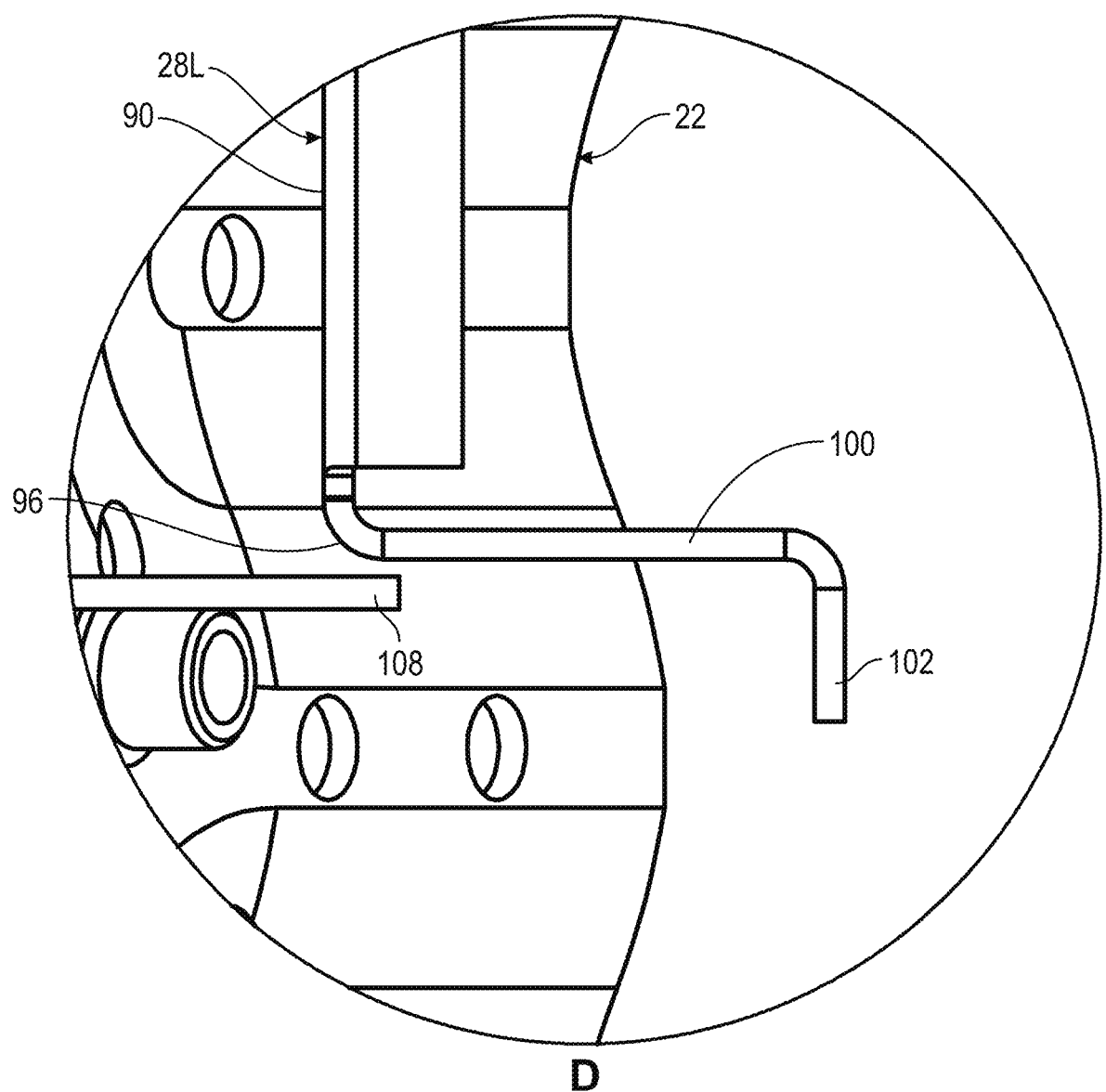
FIG. 9 is a close up view of section D shown in FIG. 5.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation to encompass all such modifications and similar arrangements and procedures. For instance, although aspects and features may be illustrated in and/or described with reference to certain figures and/or embodiments, it will be appreciated that features from one figure and/or embodiment may be combined with features of another figure and/or embodiment even though the combination is not explicitly shown and/or explicitly described as a combination. In the depicted embodiments, like reference numbers refer to like elements throughout the various drawings.

Any advantages and/or improvements discussed herein may not be provided by various disclosed embodiments, and/or implementations thereof. The contemplated embodiments are not so limited and should not be interpreted as being restricted to embodiments which provide such advantages and/or improvements. Similarly, it should be understood that various embodiments may not address all or any objects of the disclosure and/or objects of the invention that may be described herein. The contemplated embodiments are not so limited and should not be interpreted as being restricted to embodiments which address such objects of the disclosure and/or invention. Furthermore, although some disclosed embodiments may be described relative to specific materials, embodiments are not limited to the specific materials and/or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation and/or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of such articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected and/or engaged, respectively, in any manner that facilitates operation, which may include being directly connected, indirectly connected, electronically connected, wirelessly connected and/or connected by any other manner, method and/or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments and/or methods.

Similarly, the structures and operations discussed herein may occur out of the order described and/or noted in the figures. For example, two operations and/or figures shown in succession may in fact be executed concurrently and/or may sometimes be executed in the reverse order, depending upon the functionality/acts involved. Similarly, individual operations within example methods described below may be executed repetitively, individually, and/or sequentially, to provide looping and/or other series of operations aside from single operations described below. It should be presumed that any embodiment and/or method having features and functionality described below, in any workable combination, falls within the scope of example embodiments.

As used herein, various disclosed embodiments may be primarily described in the context of grain bins. However, the embodiments are not so limited. In is appreciated that the embodiments may be adapted for use in other applications which may be improved by the disclosed structures, arrangements and/or methods. The system is merely shown and described as being used in in the context of grain bins for ease of description and as one of countless examples.

System:

With reference to the figures, a safety grain bin door latch system 10 (or door latch system 10 or simply system 10) is presented that is used in association with a grain bin 12. In the arrangement shown, as one example, the safety door latch system 10 includes a door assembly 14 having a door frame 16, an upper connector 18, a lower connector 20, side connectors 22, an inner door 26 having at least one panel 28 having a handle assembly 30, an outer door 32 having a handle assembly 34, and a safety mechanism 36, among other components, features, systems and configurations as is shown, claimed and/or described herein.

Grain Bin:

In the arrangement shown, as one example, safety grain bin door latch system 10 is used in association with a grain bin 12. Grain bin 12 may be formed of any suitable size, shape and design and is configured to hold a bulk amount of flowable material such as grain or the like materials.

In the arrangement shown, as one example, grain bin 12 is a large, generally cylindrical structure that has a generally cylindrical sidewall 38 that extends from an upper edge 40 to a lower edge 42 and includes an exterior surface 44 and an opposing interior surface 46 (not shown, but opposite exterior surface 44) and forms a hollow interior 48 (not shown in particular detail, but positioned within sidewall 38 and below peaked roof 54). In the arrangement shown, as one example, sidewall 38 is formed of a plurality of sheets 50 that are connected to one another in end-to-end alignment to form rings 52. These rings 52 are stacked on top of one another to form the height of grain bin 12. In the arrangement shown, as one example, the planar sheets 50 are formed into a sinusoidal or corrugated shape which provides the sheets 50 with additional strength and rigidity.

In the arrangement shown, as one example, a peaked roof 54 is connected to the upper edge 40 of sidewall 38 that covers and encloses the upper end of grain bin 12. In the arrangement shown, as one example, the lower edge 42 of sidewall 38 is placed on a foundation 56 that encloses the lower end of grain bin 12. In the arrangement shown, as one example, stiffeners 58 are attached to the exterior surface 44 of sidewall 38 thereby providing additional strength and rigidity to grain bin 12.

As used herein, grain bin 12 serves only as one of countless examples of use for door assembly 14. As such, grain bin 12 may be formed of any other size, shape, and design. In addition, door assembly 14 is hereby contemplated for use with any other building, structure, system, or device, without limitation.

Door Assembly:

In the arrangement shown, as one example, safety grain bin door latch system 10 includes door assembly 14. Door assembly 14 may be formed of any suitable size, shape and design and is configured to connect to sidewall 38 of grain bin 12 and facilitate entry into the hollow interior 48 of grain bin 12.

In the arrangement shown, as one example, door assembly 14 includes a door frame 16, an upper connector 18, a lower connector 20, side connectors 22, an inner door 26 having at least one panel 28 having a handle assembly 30, an outer door 32 having a handle assembly 34, and a safety mechanism 36, among other components, features, systems and configurations as is shown, claimed and/or described herein.

Door Frame:

In the arrangement shown, as one example, safety grain bin door latch system 10 includes door frame 16. Door frame 16 may be formed of any suitable size, shape and design and is configured fit within the opening through sidewall 38 of grain bin 12 as well as facilitate attachment of various components of the door assembly 14 as is described herein.

In the arrangement shown, as one example, door frame 16 is formed of an upper frame member 60, a lower frame member 62, and opposing side frame members 64. In the arrangement shown, as one example, upper frame member 60 and lower frame member 62 are generally planar shaped members that extend in approximate parallel spaced relation to one another with the upper frame member 60 positioned at the upper end of door frame 16 opposite lower frame member 62 positioned at the lower end of door frame 16. In the arrangement shown, as one example, side frame members 64 are generally planar shaped members which are similar to if not identical to upper frame member 60 and lower frame member 62, that extend in approximate parallel spaced relation to one another along the sides of door frame 16 opposite one another. In the arrangement shown, as one example, upper frame member 60 connects at its outward ends to the upper ends of opposing side frame members 64. Similarly, lower frame member 62 connects at its outward ends to the lower ends of opposing side frame members 64. In the arrangement shown, as one example, upper frame member 60 and lower frame member 62 extend in approximate perpendicular alignment to side frame members 64. In this way, in the arrangement shown, as one example, the connection of upper frame member 60, lower frame member 62 and opposing side frame members 64 form a generally square or rectangular opening. In the arrangement shown, as one example, door frame 16 is rectangular in shape with its height being greater than its width.

In the arrangement shown, as one example, side frame members 64 are positioned inward a slight distance to the outward ends of upper frame member 60 and lower frame member 62 such that side frame members 64 are positioned between upper frame member 60 and lower frame member 62. In the arrangement shown, as one example, corner supports 66 are positioned at the corners of door frame 16, at the intersection of side frame members 64 and upper frame member 60 as well at the intersection of side frame members 64 and lower frame member 62. In the arrangement shown, as one example, corner supports 66 are formed of ninety degree components that are configured to engage the interior surface of side frame member 64 as well as the upper frame member 60 or lower frame member 62. In the arrangement shown, as one example, a support bracket 68 is positioned on the exterior surface of the side frame member 64 and/or upper frame member 60 or lower frame member 62 opposite a side of the corner support 66. In this way, as fasteners extend through a side of corner support 66, through the upper frame member 60, lower frame member 62 and/or side frame member 64, and then through the support bracket 68. In this way, the addition of corner supports 66 as well as support brackets 68 facilitate a strong, rigid, durable, and secure connection of side frame members 64 to upper frame member 60 and lower frame member 62 which strengthens door frame 16. Any other way, manner and/or configuration of attaching upper frame member 60, lower frame member 62 and/or side frame member 64 is hereby contemplated for use such as screwing, bolting, fastening, welding, pressing, crimping, bending etc., with and/or without the use of additional brackets or connecting members, as is forming the components of upper frame member 60, lower frame member 62 and/or side frame member 64 or any combination thereof out of a single solid and unitary piece of material thereby reducing the amount of parts that need to be connected to one another.

In the arrangement shown, as one example, upper frame member 60, lower frame member 62, and side frame members 64 are generally flat and planar in shape. In the arrangement shown, as one example, the exterior edge of upper frame member 60, lower frame member 62 and opposing side frame members 64 include an outwardly extending flange 70. Or, said another way, the outward edge of upper frame member 60, lower frame member 62 and opposing side frame members 64 is bent at an approximate perpendicular alignment to the plane of the upper frame member 60, lower frame member 62 or side frame members 64 in a direction opposite the hollow interior formed by door frame 16 thereby forming flange 70. This flange 70 is positioned at the outward end of door frame 16 increases the surface area for connection and engagement of outer door 32. This flange 70 positioned at the outward end of door frame 16 also helps to prevent water, dirt, and debris from entering the hollow interior of door frame 16.

In the arrangement shown, as one example, side frame members 64 include a flange 71 positioned at their inward end.

In the arrangement shown, as one example, side frame members 64 are generally flat and planar in shape. In the arrangement shown, as one example, the interior edge of side frame members 64 include an outwardly extending flange 71. Or, said another way, the interior edge of side frame members 64 is bent at an approximate perpendicular alignment to the plane of the side frame members 64 in a direction opposite the hollow interior formed by door frame 16 thereby forming flange 71. This flange 71 is positioned at the interior end of side frame members 64 and facilitates attachment of side frame members 64 to side connectors 22 in a strong, rigid, durable, and secure manner. This connection of side frame members 64 to side connectors 22 is accomplished by passing fasteners through the overlapping portions of flange 71 of side frame members 64 as well as the interior edge of side connectors 22.

In the arrangement shown, as one example, door frame 16 connects to the sidewall 38 of grain bin 12 by way of connection to upper connector 18, lower connector 20 and side connectors 22.

Upper Connector:

In the arrangement shown, as one example, safety grain bin door latch system 10 includes upper connector 18. Upper connector 18 may be formed of any suitable size, shape and design and is configured to connect to the upper end of door frame 16 and facilitate connection of door frame 16 to the sidewall 38 of grain bin 12.

In the arrangement shown, as one example, upper connector 18 has a generally planar shaped rear member 72 and a generally planar shaped forward member 74 that extend in approximate perpendicular alignment to one another and connect to one another at a corner. In the arrangement shown, as one example, forward member 74 is configured to engage the upper surface of upper frame member 60 in a generally flat and planar engagement and is configured to be attached by passing one or more fasteners through forward member 74 of upper connector 18 and through upper frame member 60 thereby affixing upper connector 18 to upper frame member 60.

In the arrangement shown, as one example, rear member 72 includes a plurality of slots 76 therein. Slots 76 have a length that extends vertically. Slots 76 are configured to receive a fastener therein that also extends through a portion of sidewall 38 of grain bin 12 and thereby facilitates attachment of upper connector 18 to the sidewall 38 of grain bin 12 while also facilitating limited of vertical adjustment due to the vertical length of slots 76.

In the arrangement shown, as one example, the outward ends of rear member 72 of upper connector 18 extend past the outward end of forward member 74 a distance. This outwardly extending portion of rear member 72 overlaps with the inward upper end of side connectors 22. In the arrangement shown, as one example, the outward end of rear member 72 is affixed to the inward upper end of side connectors 22 by passing fasteners through the overlapping portion of rear member 72 and side connectors 22. In this way, a strong, rigid, durable, and secure connection is formed between the rear member 72 of upper connector 18 and the upper inward end of side connector 22.

Lower Connector:

In the arrangement shown, as one example, safety grain bin door latch system 10 includes lower connector 20. Lower connector 20 may be formed of any suitable size, shape and design and is configured to connect to the lower end of door frame 16 and facilitate connection of door frame 16 to the sidewall 38 of grain bin 12.

In the arrangement shown, as one example, lower connector 20 has a generally planar shaped rear member 78 and a generally planar shaped forward member 80 that extend in approximate perpendicular alignment to one another and connect to one another at a corner. In the arrangement shown, as one example, forward member 80 is configured to engage the lower surface of lower frame member 62 in a generally flat and planar engagement and is configured to be attached by passing one or more fasteners through forward member 80 of lower connector 20 and through lower frame member 62 thereby affixing lower connector 20 to lower frame member 62.

In the arrangement shown, as one example, rear member 78 includes a plurality of slots 82 therein. Slots 82 have a length that extends vertically. Slots 82 are configured to receive a fastener therein that also extends through a portion of sidewall 38 of grain bin 12 and thereby facilitates attachment of lower connector 20 to the sidewall 38 of grain bin 12 while also facilitating limited of vertical adjustment due to the vertical length of slots 82.

In the arrangement shown, as one example, the outward ends of rear member 78 of lower connector 20 extend past the outward end of forward member 80 a distance. This outwardly extending portion of rear member 78 overlaps with the inward lower end of side connectors 22. In the arrangement shown, as one example, the outward end of rear member 78 is affixed to the inward lower end of side connectors 22 by passing fasteners through the overlapping portion of rear member 78 and side connectors 22. In this way, a strong, rigid, durable, and secure connection is formed between the rear member 78 of lower connector 20 and the lower inward end of side connector 22.

Side Connectors:

In the arrangement shown, as one example, safety grain bin door latch system 10 includes side connectors 22. Side connectors 22 may be formed of any suitable size, shape and design and are configured to facilitate connection of the sides of door assembly 14 to sidewall 38 of grain bin 12

In the arrangement shown, as one example, side connectors 22 when viewed from a front side or rear side are formed of an elongated rectangular shape that extends slightly longer than the height of door frame 16 and slightly longer than the length of side frame members 64. In the arrangement shown, as one example, the height of side connectors 22 is substantially greater than the width of side connectors 22, however any other size, shape and design is hereby contemplated for use.

In the arrangement shown, as one example the interior edge of side connectors is generally flat and planar, whereas the exterior edge of side connectors 22 has a sinusoidal or corrugated shape that is configured to match the shape of the exterior surface 44 and/or interior surface 46 of sidewall 38 such that the two components may in overlapping condition with one another. Side connectors 22 transition from a flat member to a sinusoidal-shaped or corrugated member between the interior edge of side connector 22 and the exterior edge of side connector 22.

In the arrangement shown, as one example, the interior edge of side connectors 22 is placed in flat and flush overlapping engagement with the outwardly extending flange 71 of side frame members 64. In the arrangement shown, as one example, a plurality of fasteners 84 extend through the overlapping portions of flange 71 and side connectors 22. In the arrangement shown, as one example, these fasteners 84 extend in a vertical line along each side of door frame 16 with each fastener 84 positioned in approximate equal spaced relation to one another. In the arrangement shown, as one example, the interior end of fasteners 84 include an oversized cylindrical post 86 which is positioned in flat and flush engagement with the interior side of the overlapped side connectors 22 and flange 71. These cylindrical posts 86 are configured to be received by panels 28 of inner door 26 when the panels 28 of inner door 26 are in a closed position. In this way, posts 86 facilitate the transfer of hoop stress across panels 28 from side frame member 64 to side frame member 64. In the arrangement shown, as one example, the exterior end of fasteners 84 receive a nut and washer which is positioned in flat and flush engagement with the exterior side of the overlapped side connectors 22 and flange 71 which is used to tighten the overlapped side connectors 22 and flange 71 together.

In the arrangement shown, as one example, the exterior edge of side connectors 22 is placed in flush overlapping engagement with the interior edge of sidewall 38 of grain bin 12 with the contours and shape of the exterior edge of side connectors 22 approximately matching the contours and shape of the interior edge of sidewall 38 of grain bin 12. In the arrangement shown, as one example, a plurality of holes 88 are positioned in the approximate center of the peaks and the approximate center of the valleys of the overlapping portion of side connectors 22 and sidewall 38. These holes 88 receive fasteners therein that extend through the overlapping portions of side connectors 22 and sidewall 38 of grain bin 12. In the arrangement shown, as one example, a pair of holes is aligned in lateral side-by-side alignment in each peak and in each valley of the overlapping portions of side connectors 22 and sidewall 38 of grain bin 12. In this way, the fasteners passing through the overlapping portions of side connectors 22 and sidewall 38 of grain bin 12 facilitate tightening of side connectors 22 to sidewall 38 of grain bin 12. In this way, a strong, rigid, durable, and secure connection is formed between the side connectors 22 and sidewall 38 of grain bin 12 which transmits hoop stress across the door assembly 14.

Inner Door:

In the arrangement shown, as one example, safety grain bin door latch system 10 includes inner door 26. Inner door 26 may be formed of any suitable size, shape and design and is configured to close the opening formed by door frame 16 as well as transmit hoop stress across the opening formed by door frame 16 while being selectively opened and closed.

Door Panel: In the arrangement shown, as one example, inner door 26 is formed of three panels 28, an upper panel 28U, a center panel 28C and a lower panel 28L, however any other number of door panels 28 are hereby contemplated for use including one, two, three, four, five, six, seven, eight, nine, ten or more door panels 28. In the arrangement shown, as one example, upper panel 28U, a center panel 28C and a lower panel 28L are similar if not identical to one another in size, shape, configuration, features, and design.

In the arrangement shown, as one example, door panels 28 are generally flat and planar members that are generally square or rectangular in shape when viewed from the front side or rear side and include an exterior surface 90 and interior surface 92. In the arrangement shown, as one example, door panels 28 extend a vertical height from top edge 94 to bottom edge 96. In the arrangement shown, as one example, door panels 28 extend a lateral width between opposing side edge 98.

Flanges:

In the arrangement shown, as one example, a flange 100 extends rearward from the top edge 94 and bottom edge 96 of door panels 28. In the arrangement shown, as one example, these flanges 100 extend in approximate perpendicular alignment to the generally planar interior surface 92 of door panel 28. In the arrangement shown, as one example, these flanges 100 extend in approximate parallel spaced relation to one another.

Lip: In the arrangement shown, as one example, a lower lip 102 is connected to the outward end of the flanges 100 positioned at the bottom edge 96 of door panels 28. In the arrangement shown, as one example, these lower lips 102 extend in approximate perpendicular alignment to the generally planar shape of flange 100 and extend downward in approximate parallel alignment to the generally planar interior surface 92 of door panel 28. The presence of lower lip 102 ensures that each lower-positioned panel 28 must be closed before the upper-positioned panel 28 may be closed.

In the arrangement shown, as one example, an upper lip 104 is connected to the outward end of the flange 100 positioned at the top edge 94 of the upper door panel 28. In the arrangement shown, as one example, this upper lip 104 extends in approximate perpendicular alignment to the generally planar shape of flange 100 and extends upward in approximate parallel alignment to the generally planar interior surface 92 of door panel 28.

In the arrangement shown, as one example, upper lip 104 of upper door panel 28U upon being fully closed is configured to engage an inward end 106 of upper frame member 60 of door frame 16 which extends a distance inward past the interior surface 46 of sidewall 38 and side connectors 22. Similarly, in the arrangement shown, as one example, lower lip 102 of lower door panel 28L upon being fully closed is configured to engage an inward end 108 of lower frame member 62 of door frame 16 which extends a distance inward past the interior surface 46 of sidewall 38 and side connectors 22.

This arrangement of door panels 28 ensures that the door panels 28 are properly secured and that the door panels 28 must be closed in the proper order. Said another way, this arrangement of door panels 28 prevents the door panels 28 from being closed improperly.

Holes:

In the arrangement shown, as one example, door panels 28 include a plurality of holes 110 that extend in a vertical line positioned inward a distance along each side edge 98 of door panels 28 with each hole 110 positioned in approximate equal spaced relation to one another. In the arrangement shown, as one example, when door panels 28 are fully closed, these holes 110 fit around the oversized cylindrical posts 86 interior end of fasteners 84 positioned in the interior side of the overlapped side connectors 22 and flange 71 of side frame members 64.

Figure 10:
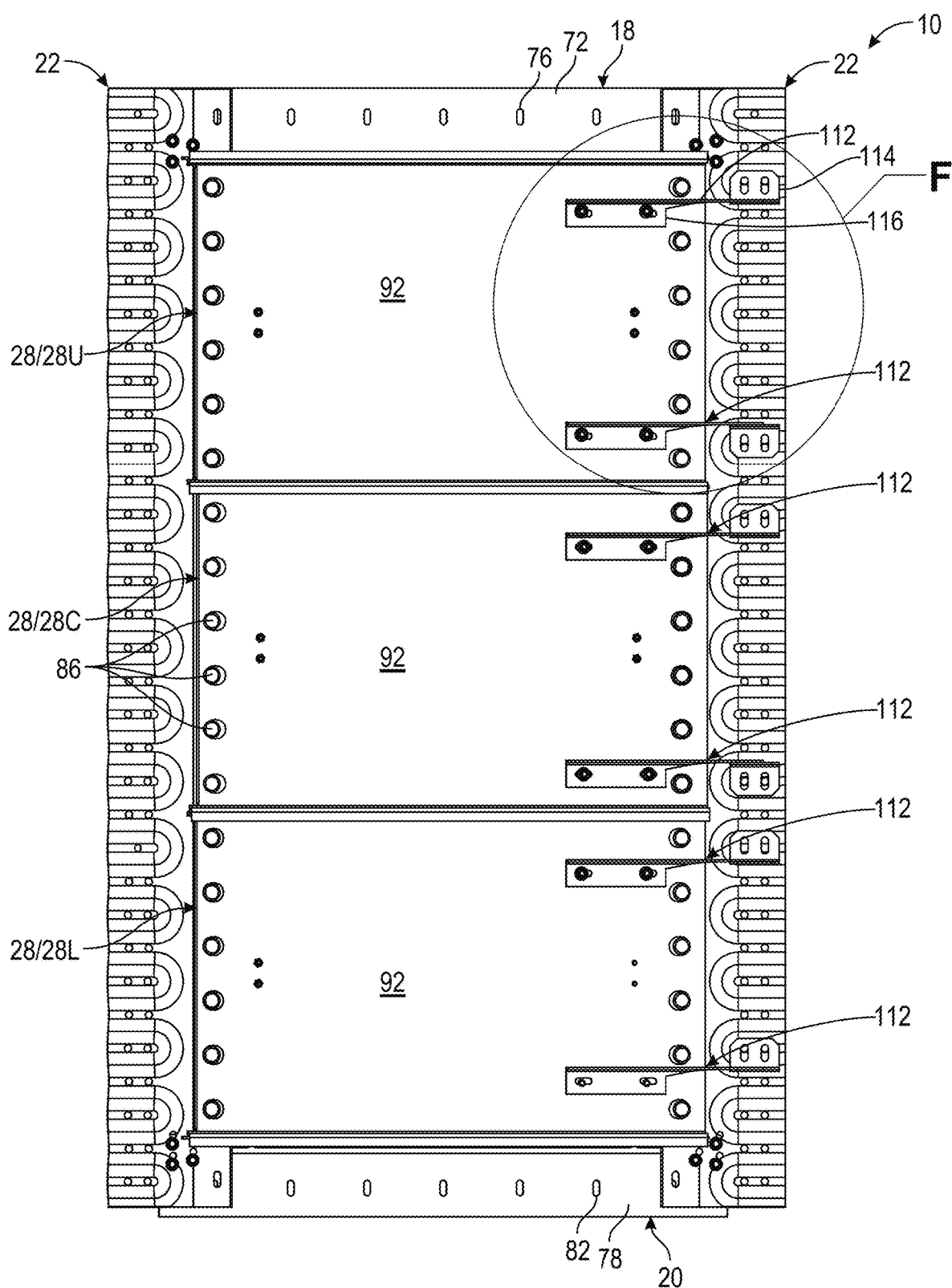
FIG. 10 is a rear view of a safety door latch system, consistent with one or more embodiments.
Figure 11:
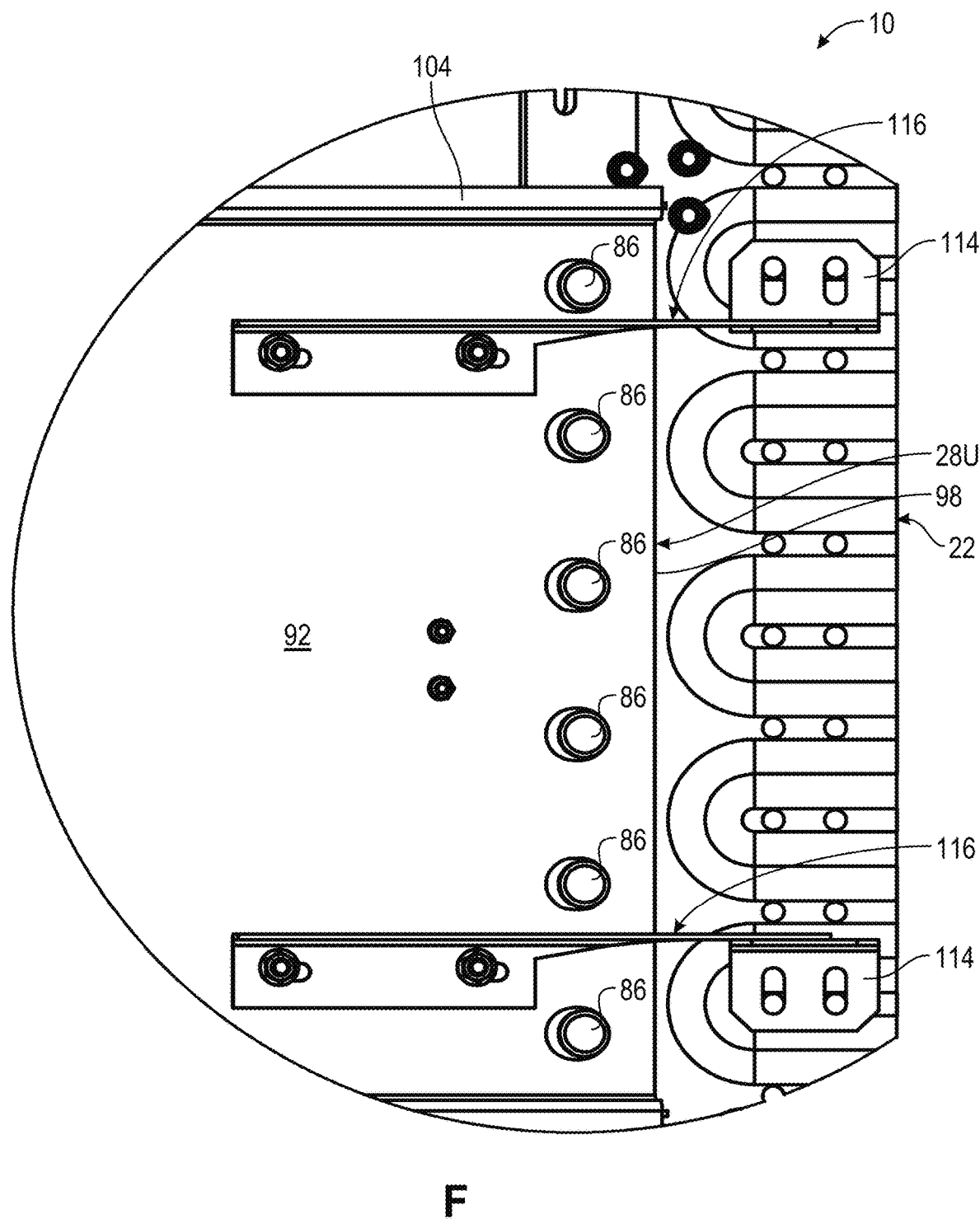
FIG. 11 is a close up view of section F shown in FIG. 10, consistent with one or more embodiments.
Figure 12:
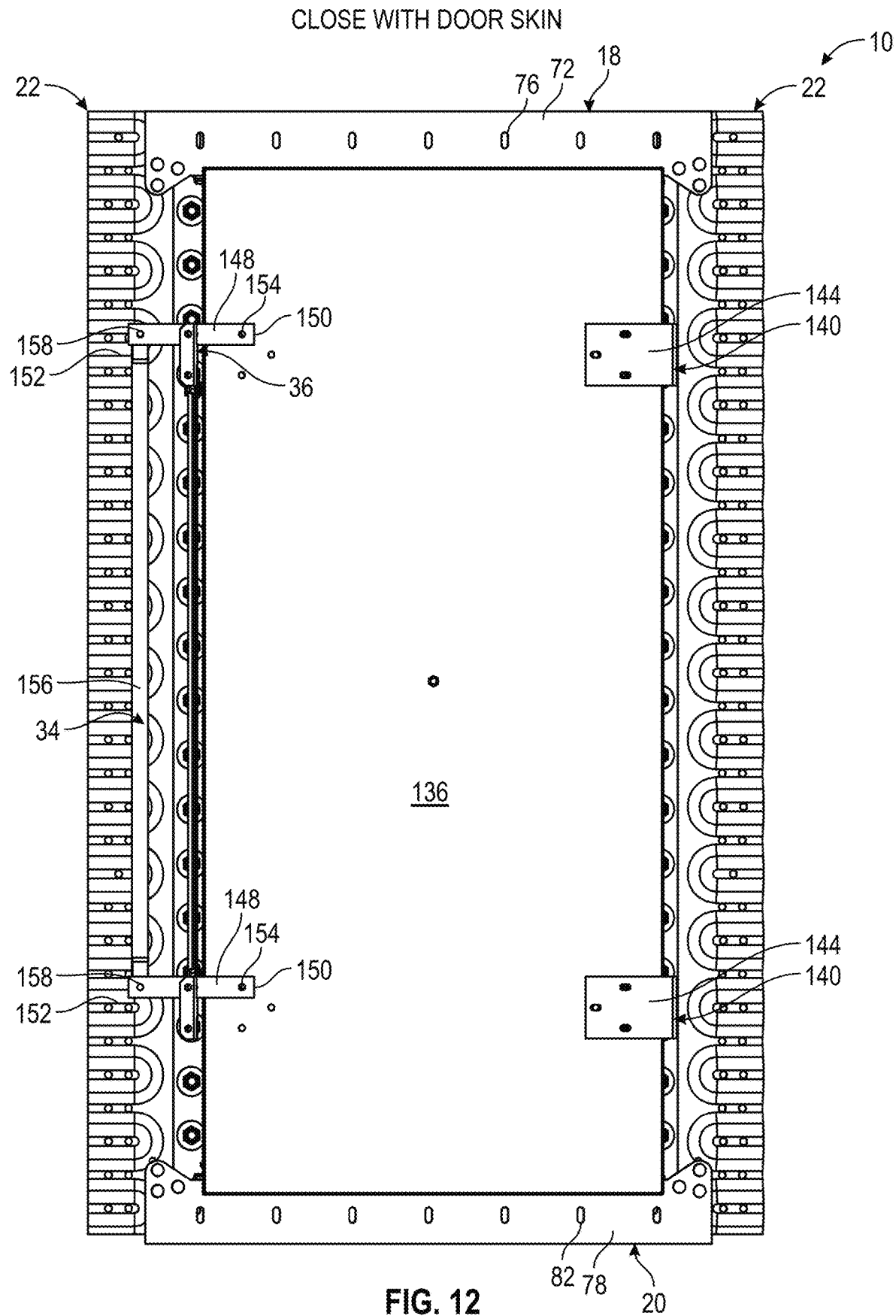
FIG. 12 is a front view of a safety door latch system, consistent with one or more embodiments; the view showing an outer door in a closed position.
Figure 13:
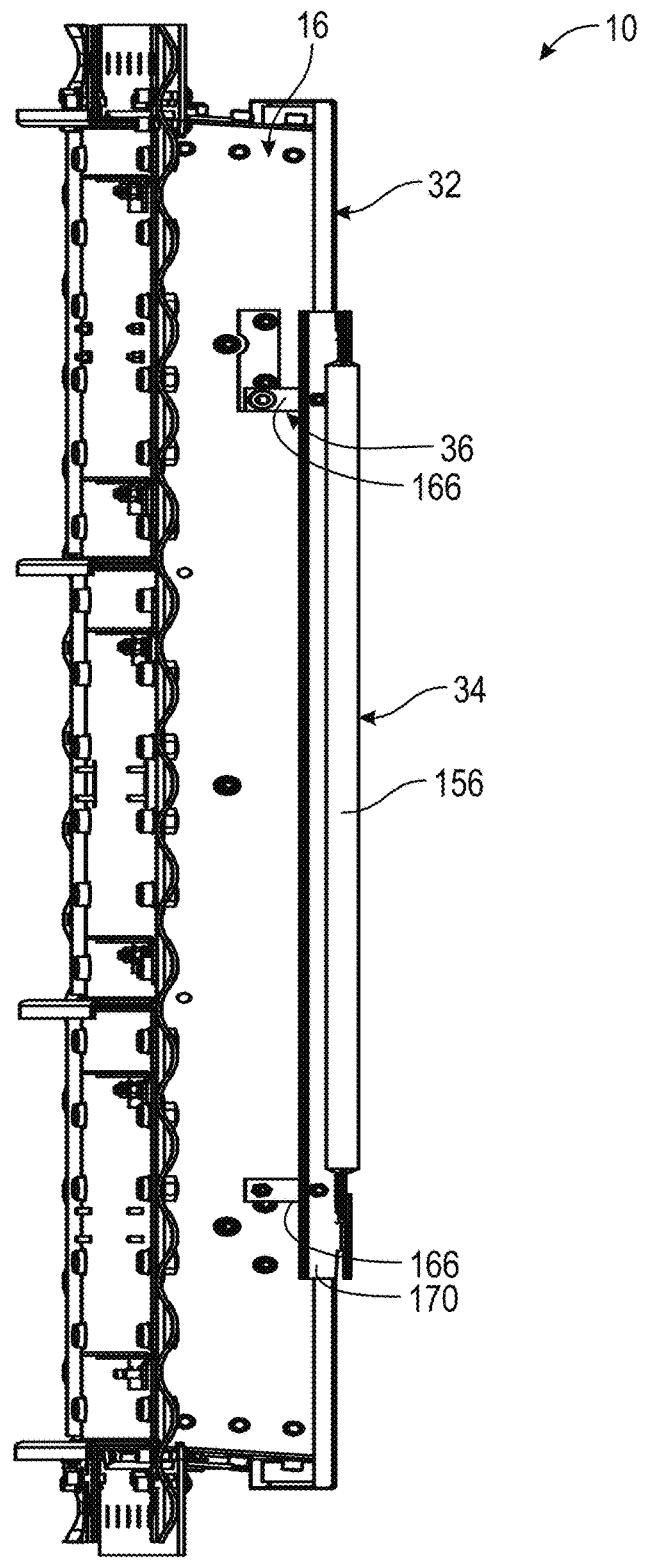
FIG. 13 is a left side view of a safety door latch system, consistent with one or more embodiments; the view showing an outer door in a partially opened position; the view showing panels of an inner door in a closed position.
Figure 14:
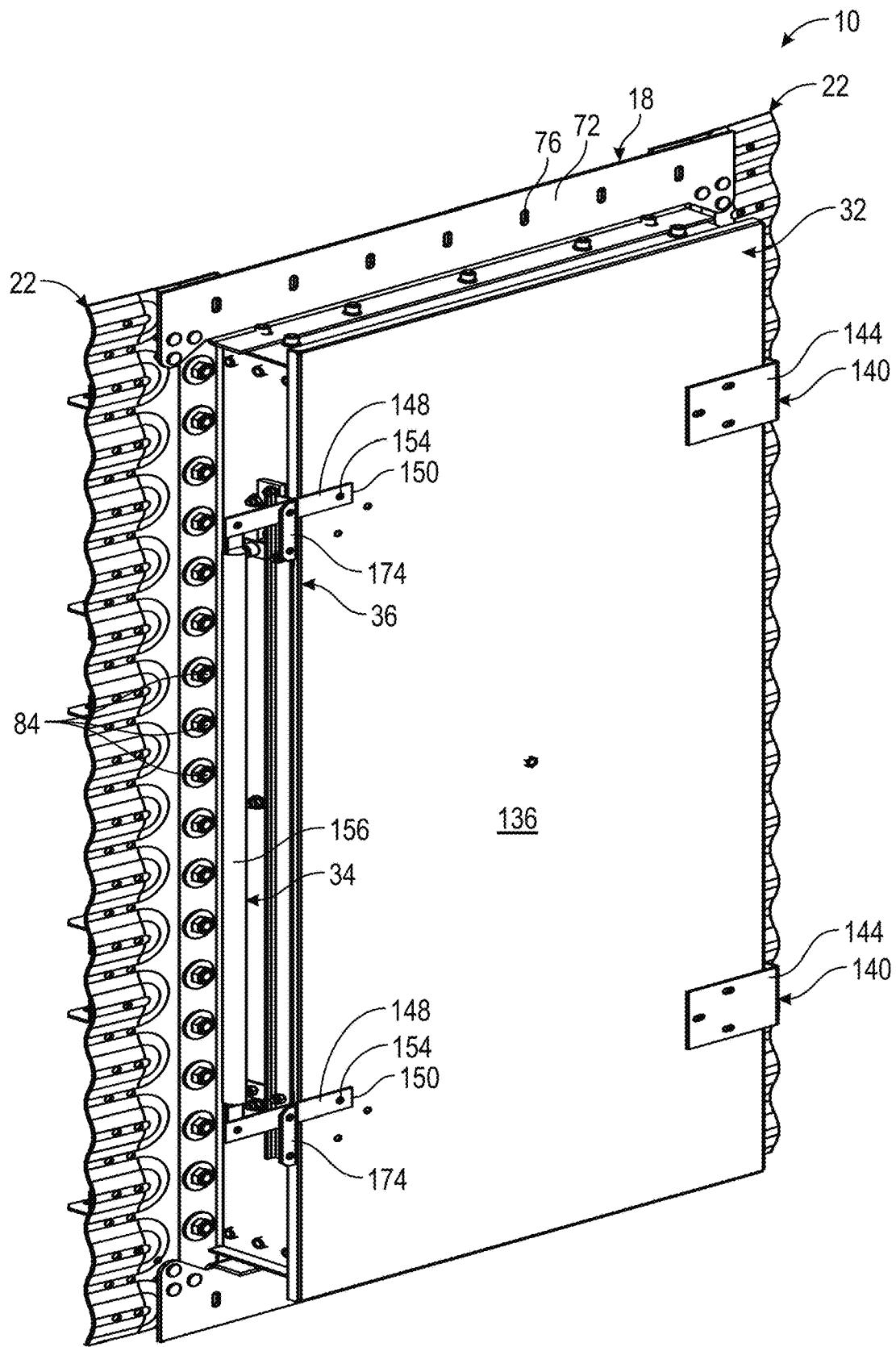
FIG. 14 is an elevated front left perspective view of a safety door latch system, consistent with one or more embodiments; the view showing an outer door in a closed and latched position.
Figure 15:
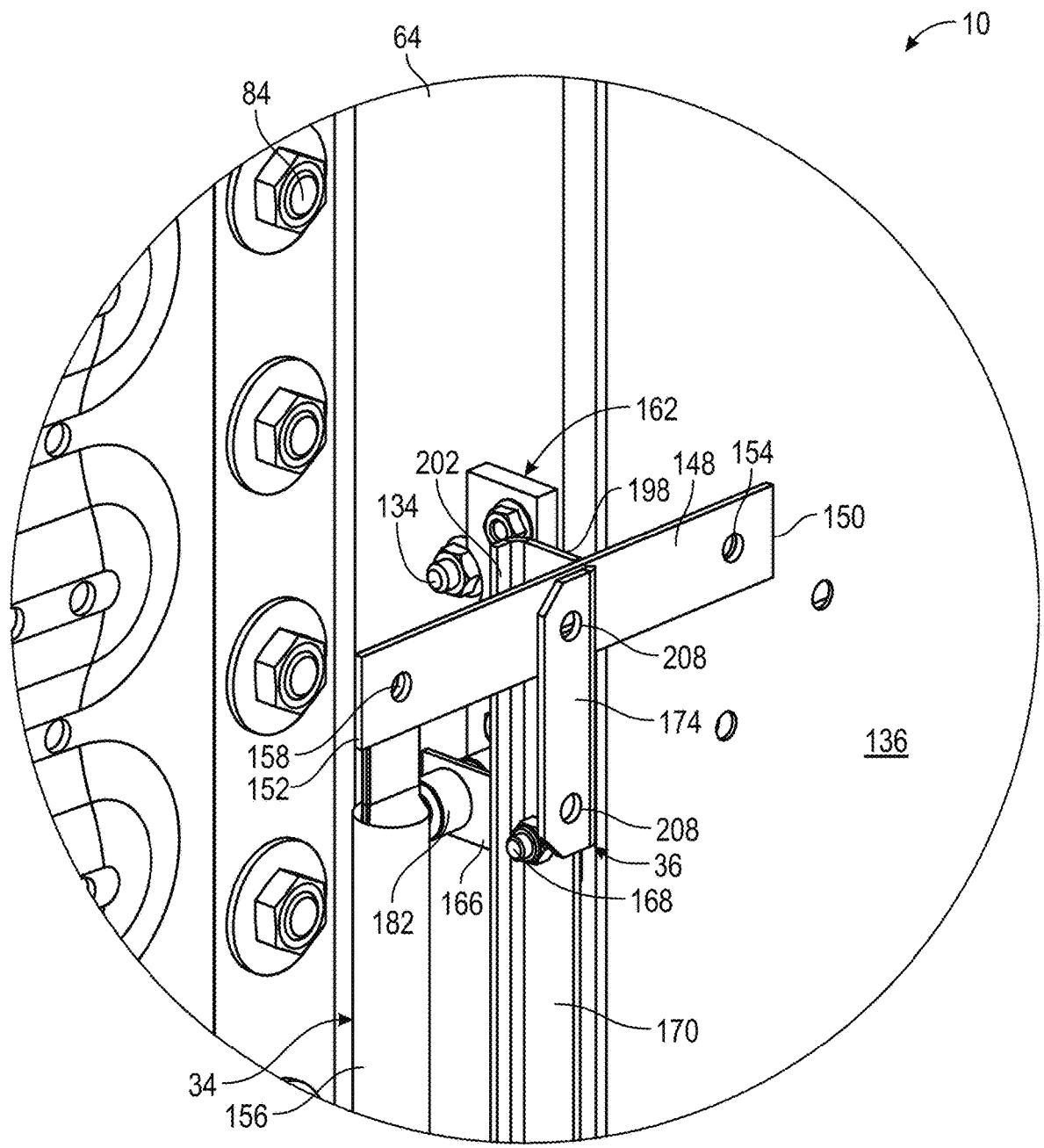
FIG. 15 is a close up front upper left perspective view of a latch of the safety door system shown in FIG. 14, consistent with one or more embodiments; the view showing the outer door in a closed position.
Figure 16:
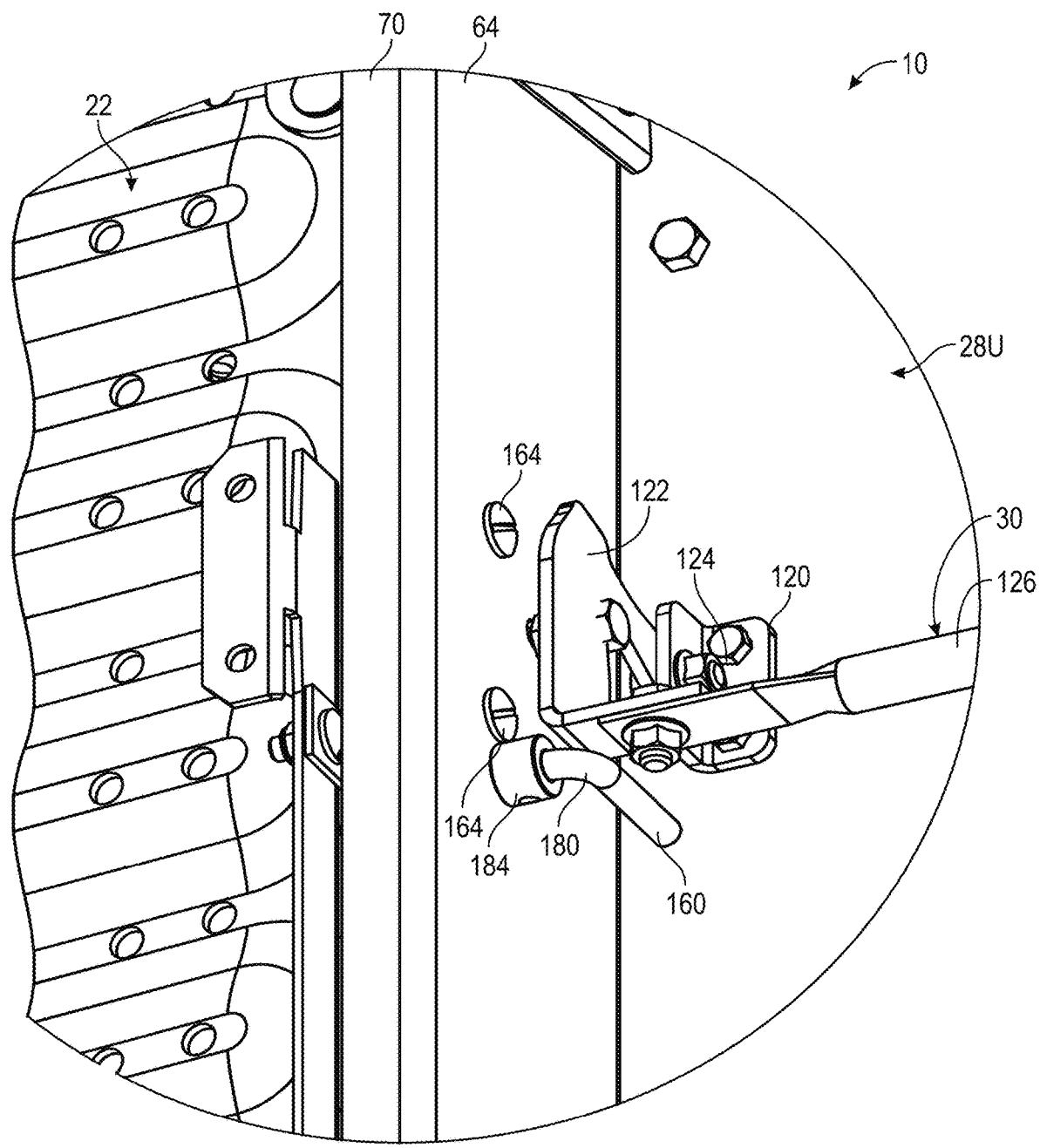
FIG. 16 is a close up front lower right perspective view of a latch of the safety door system shown in FIG. 14, consistent with one or more embodiments; the view showing the system without the outer door.
Figure 17:
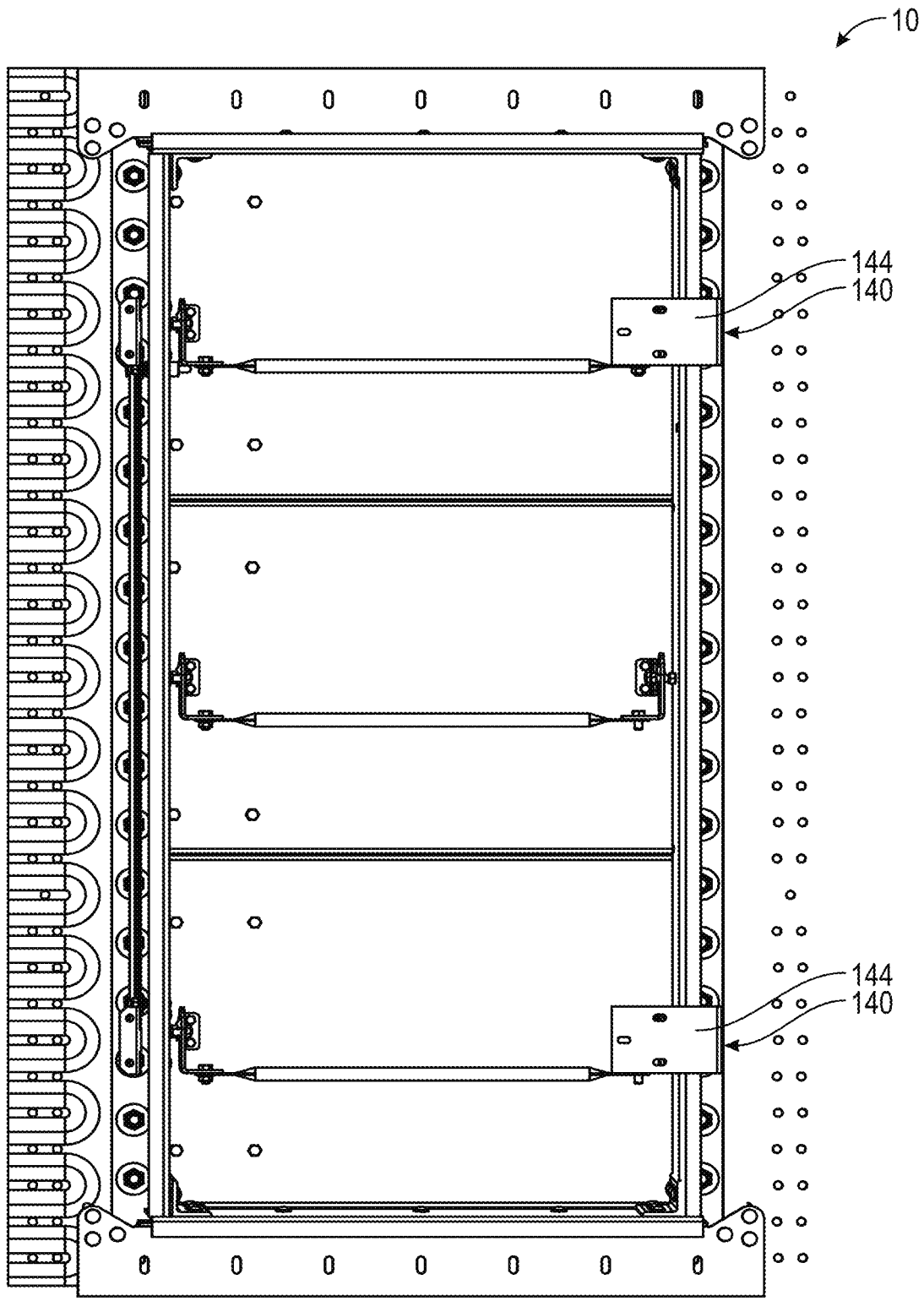
FIG. 17 is a front view of a safety door latch system, consistent with one or more embodiments; the view showing panels of the inner door in a closed position; the view showing the system without an outer door.
Figure 18:
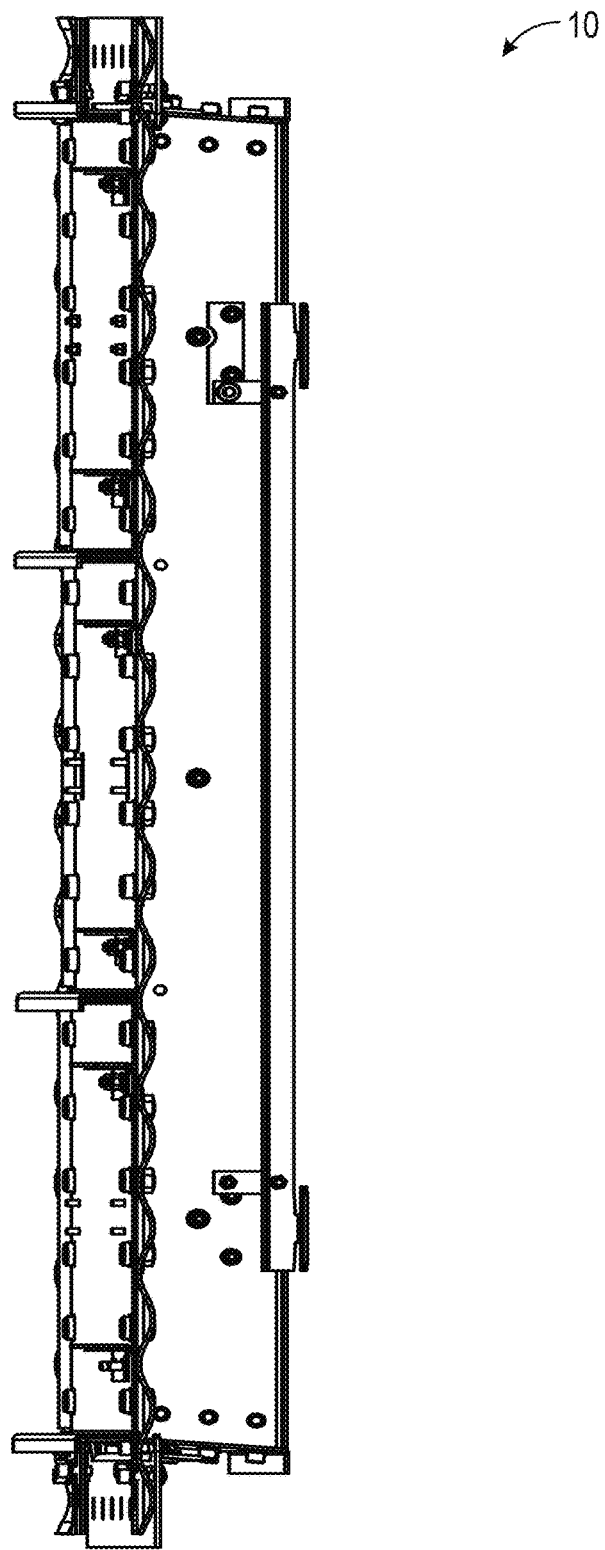
FIG. 18 is a left side view of a safety door latch system, consistent with one or more embodiments; the view showing an outer door in a partially opened position; the view showing panels of an inner door in a closed position.
Figure 19:
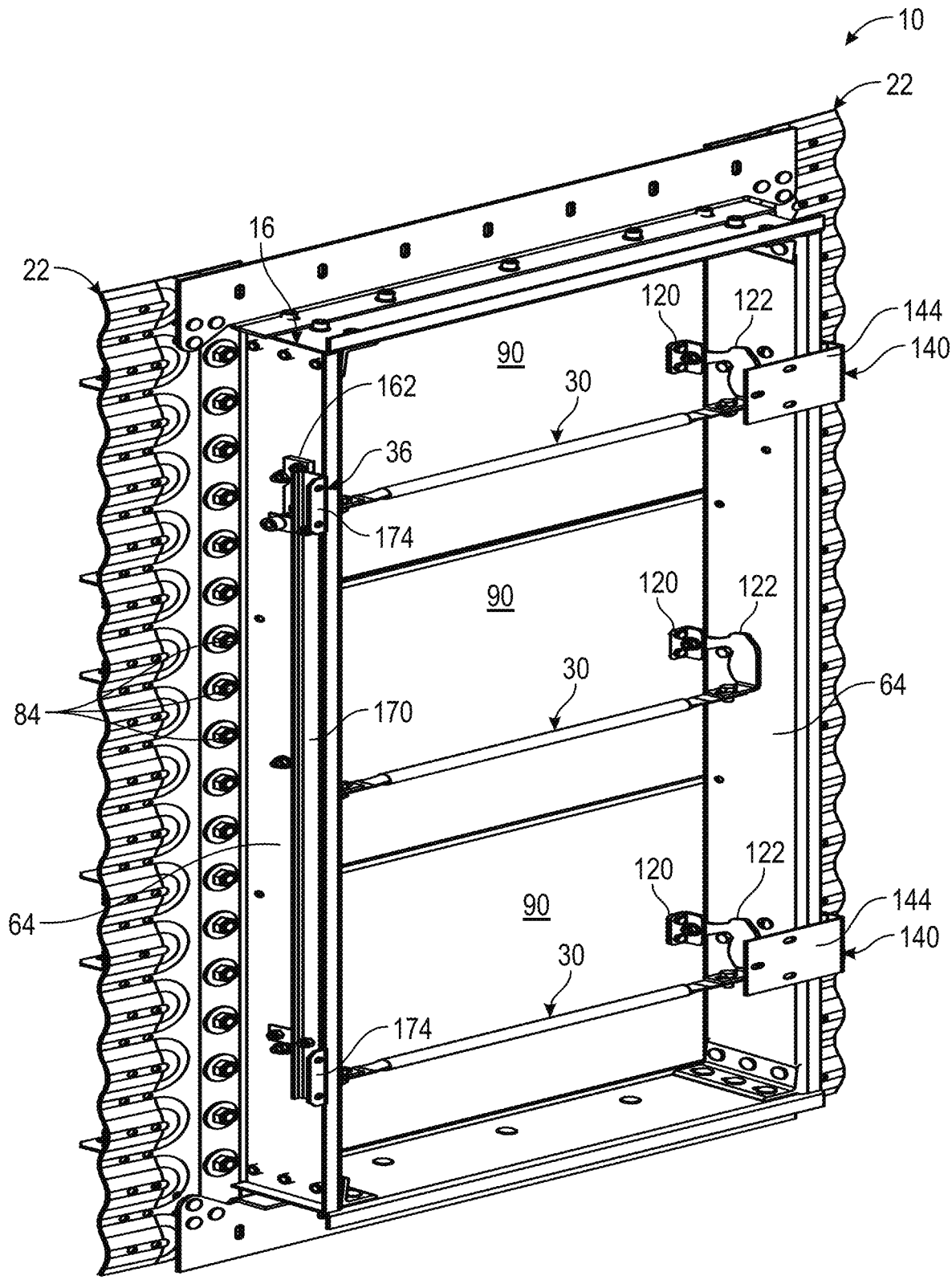
FIG. 19 shows a rear left perspective view of a safety door latch system, consistent with one or more embodiments; the view showing panels of an inner door in a closed position; the view showing the system without an outer door.
Figure 20:
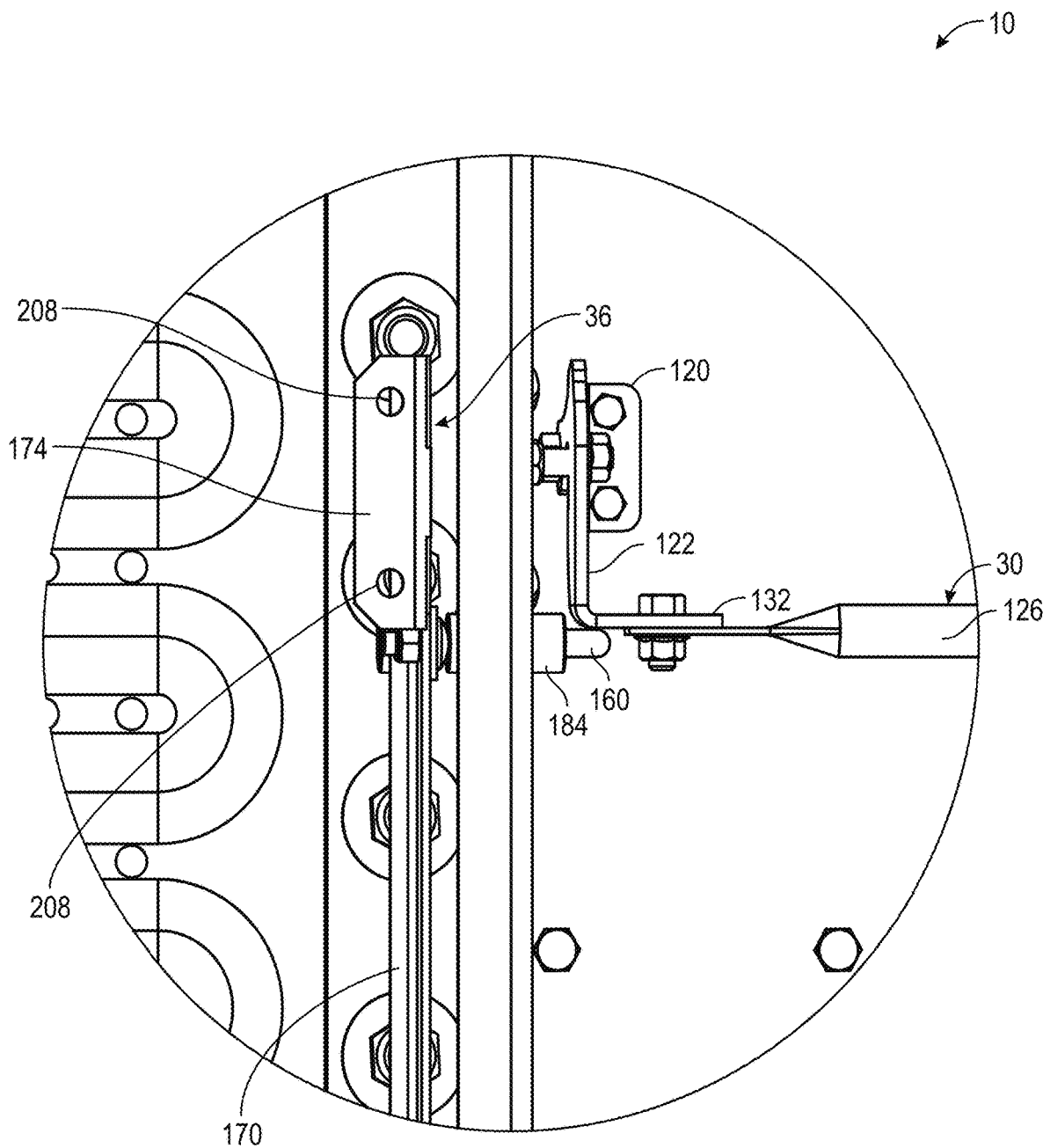
FIG. 20 is a close up front view of a safety mechanism of a safety door latch system, consistent with one or more embodiments.
Figure 21:
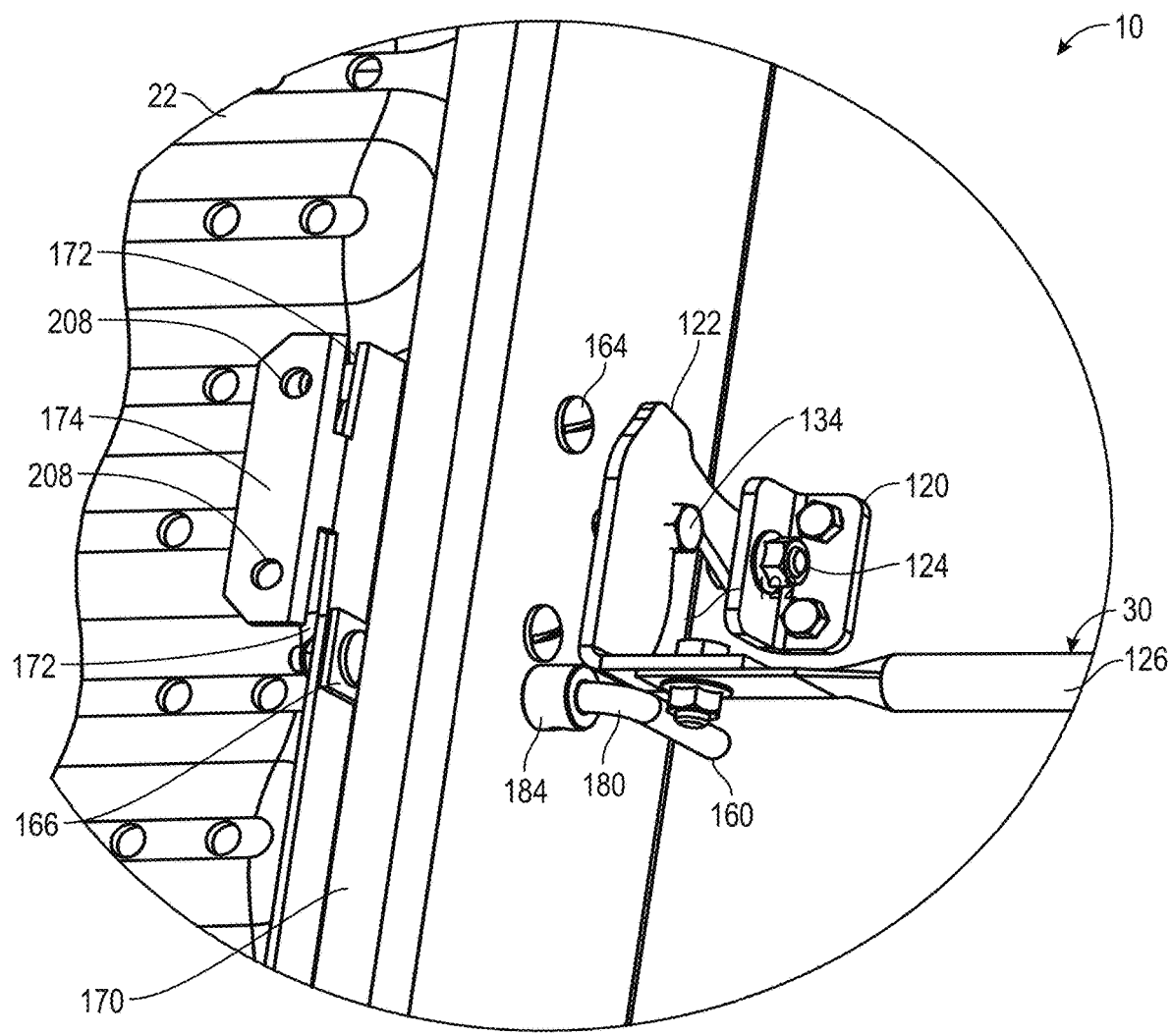
FIG. 21 is a close up rear view of a safety mechanism of a safety door latch system, consistent with one or more embodiments.
Figure 22:
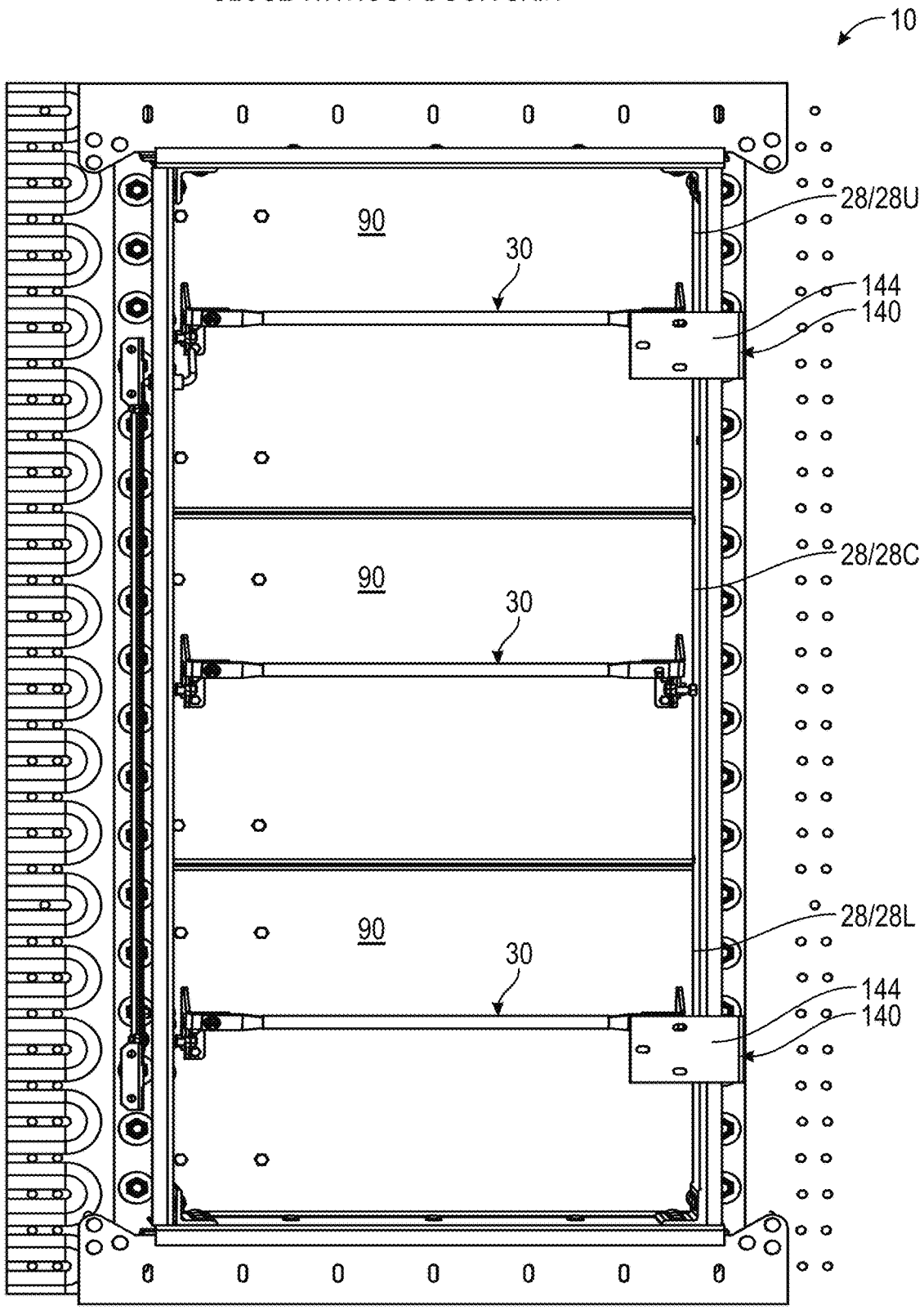
FIG. 22 is a front view of a safety door latch system, consistent with one or more embodiments; the view showing the system without an outer door.
Figure 23:
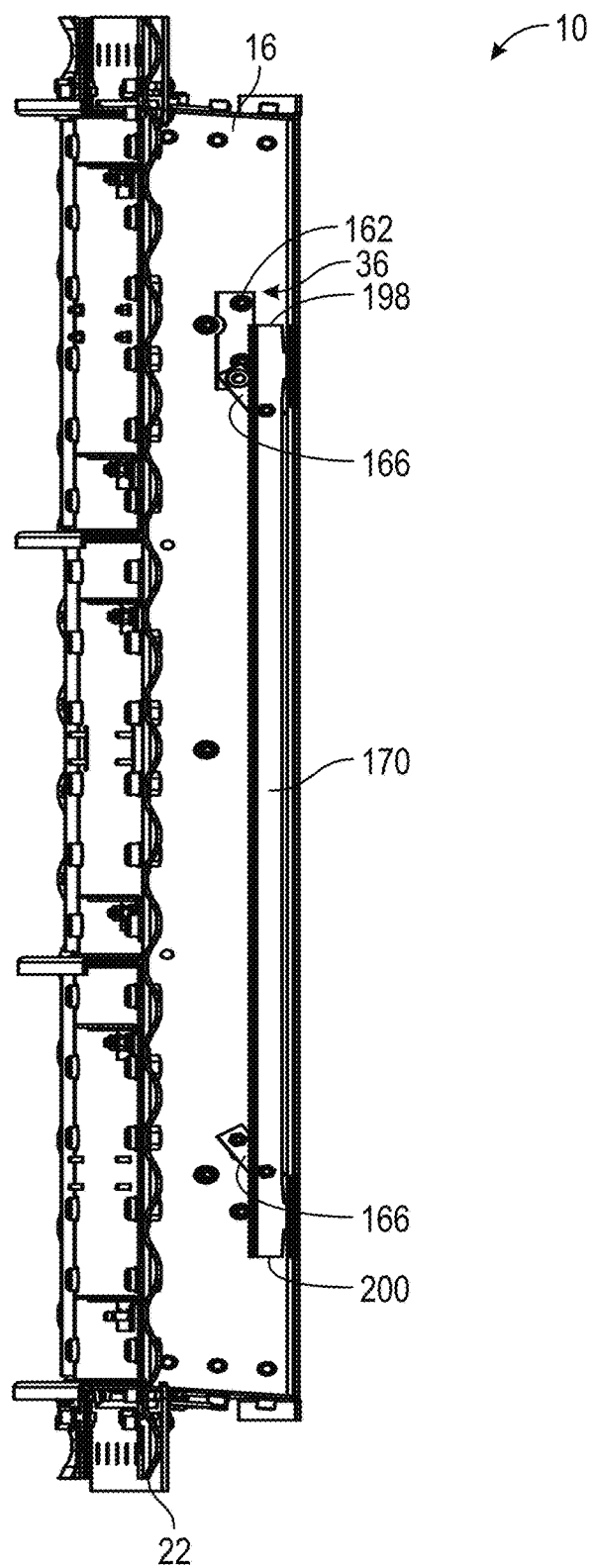
FIG. 23 is a left side view of a safety door latch system, consistent with one or more embodiments; the view showing an outer door in a partially opened position; the view showing panels of an inner door in a closed position.
Figure 24:
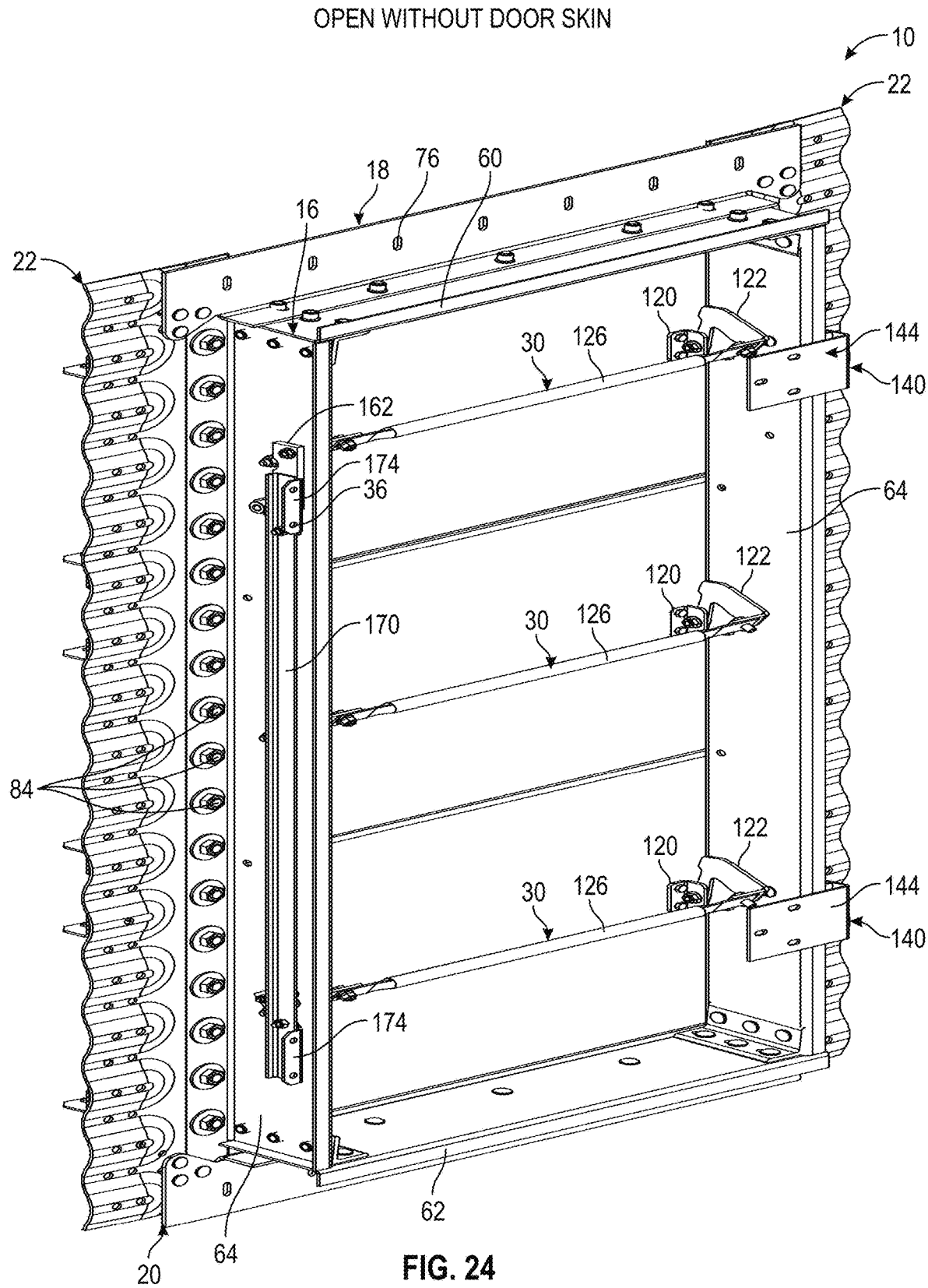
FIG. 24 is an upper front left perspective view of a safety door latch system, consistent with one or more embodiments; the view showing panels of an inner door in a closed position; the view showing the system without an outer door.
Figure 25:
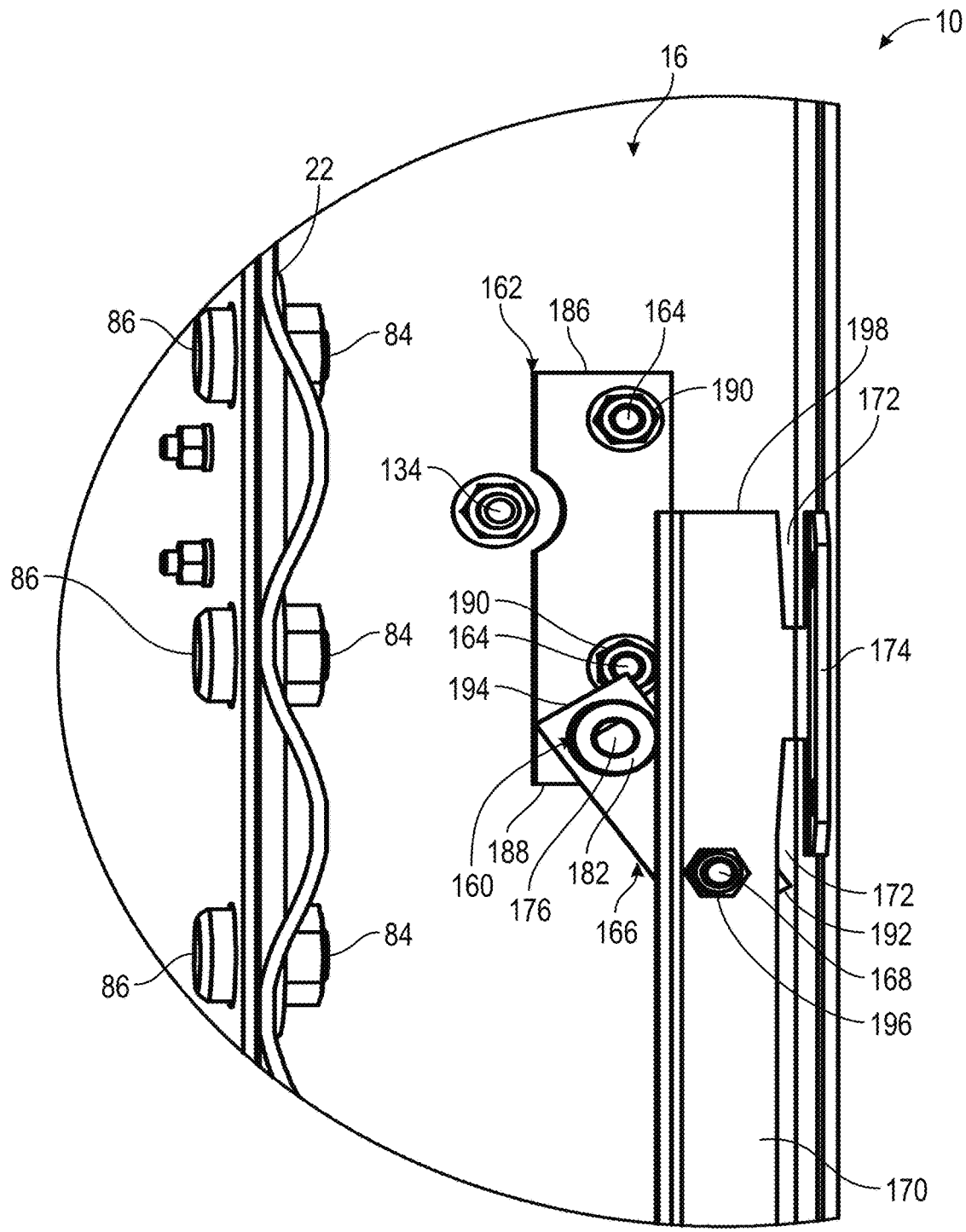
FIG. 25 is a left side view of a safety door latch system, consistent with one or more embodiments; the view showing an outer door in a partially opened position; the view showing panels of an inner door in a closed position.
Figure 26:
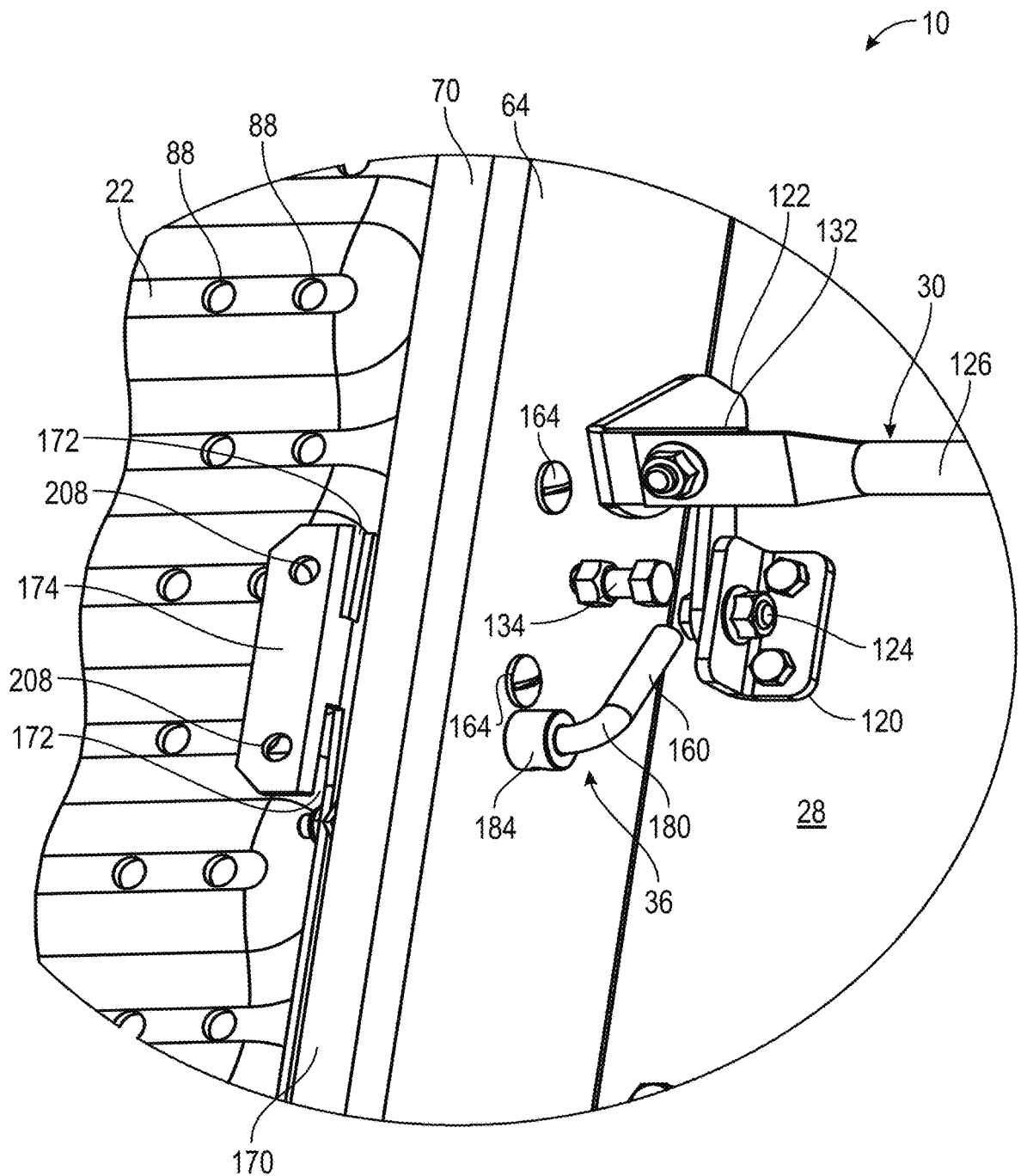
FIG. 26 is a close up front right perspective view of a safety door latch system, consistent with one or more embodiments; the view showing an inner door in a closed position and outer door omitted.
Figure 27:
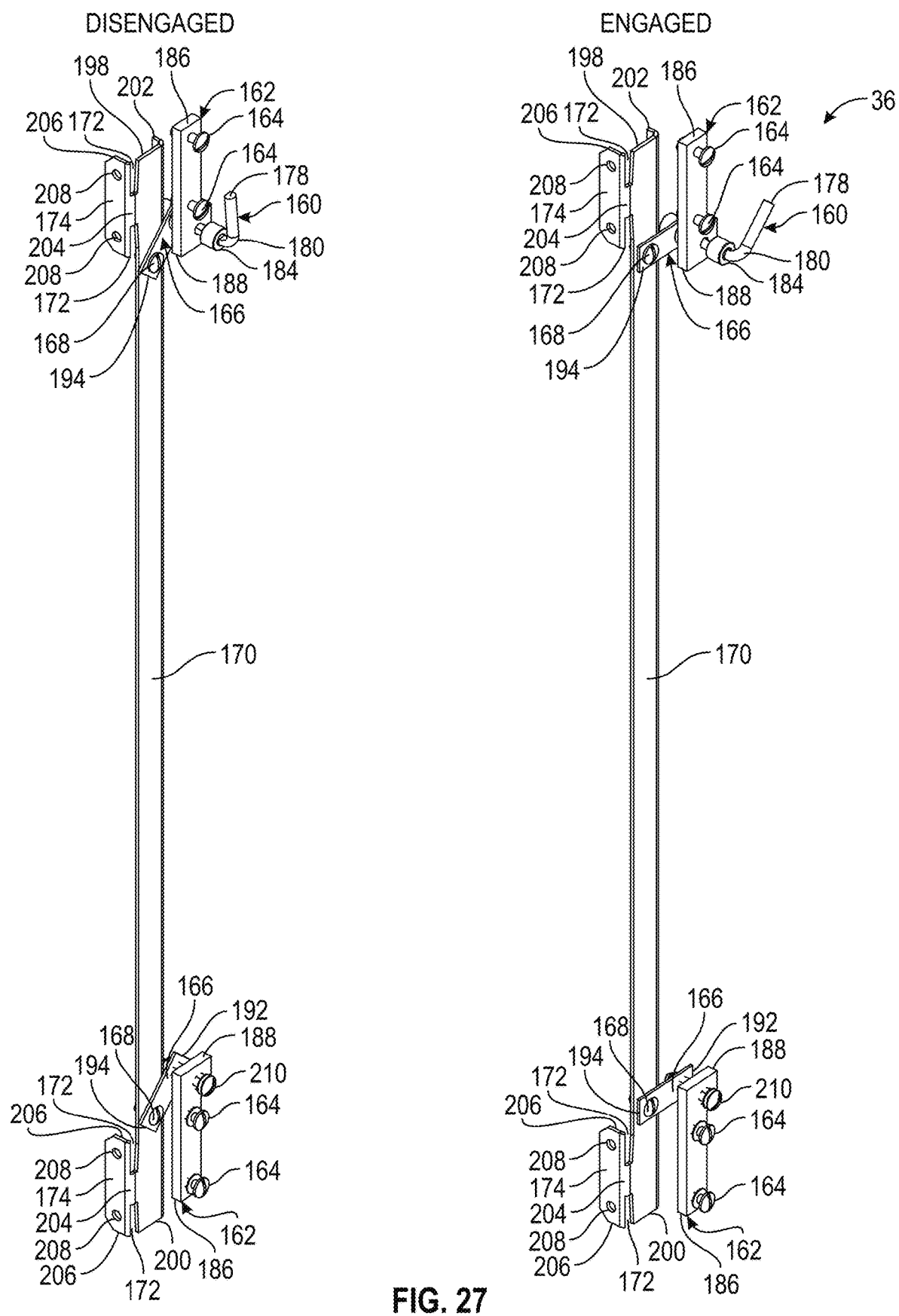
FIG. 27 is a front left perspective view of a safety mechanism, consistent with one or more embodiments; the view showing the safety mechanism in disengaged and engaged positions.
Figure 28:
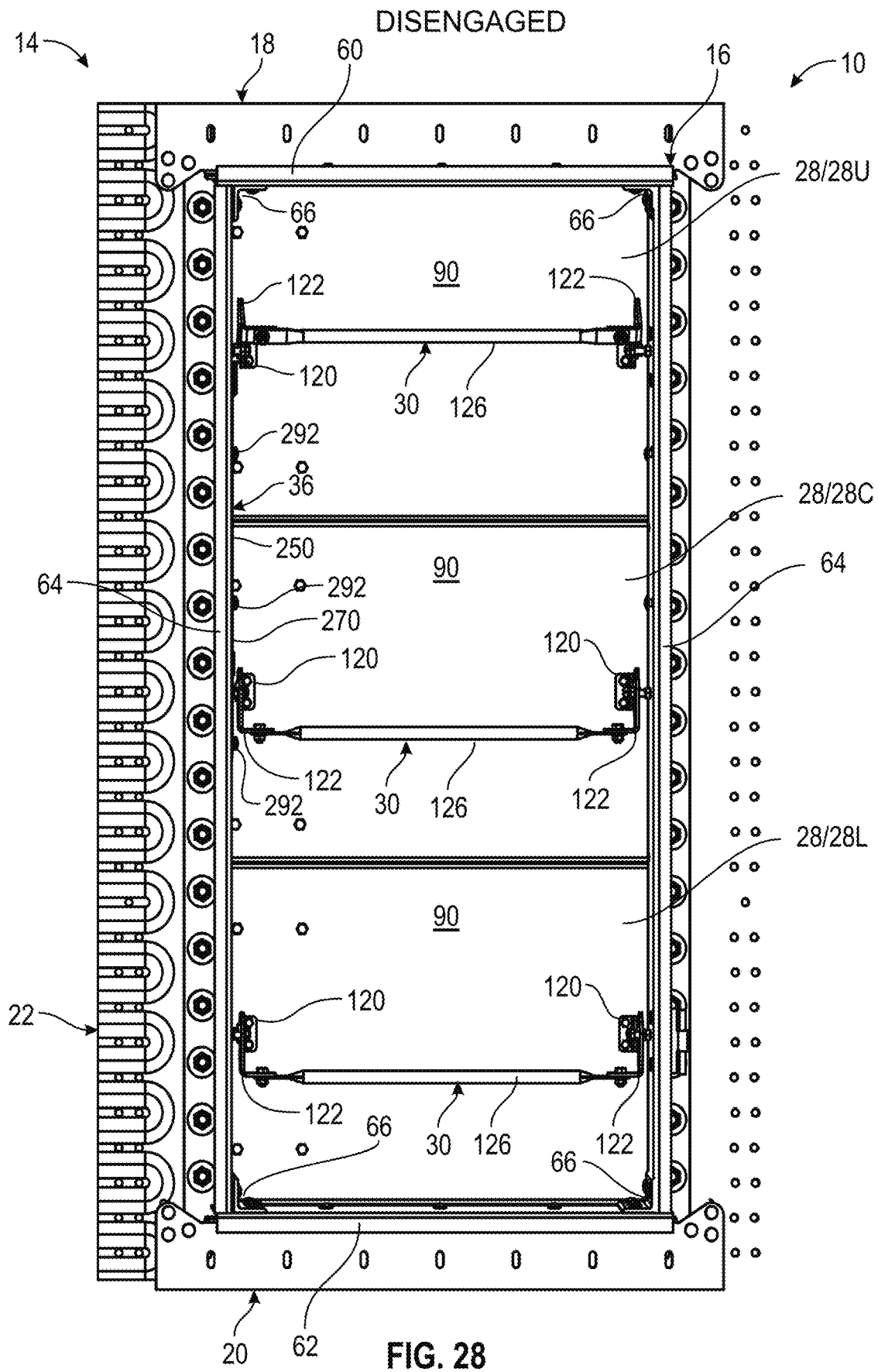
FIG. 28 is a front view of a safety door latch system, consistent with one or more embodiments; the view showing panels of an inner door in a closed position and outer door omitted; the view showing safety mechanism of the system in a disengaged position.
Figure 29:
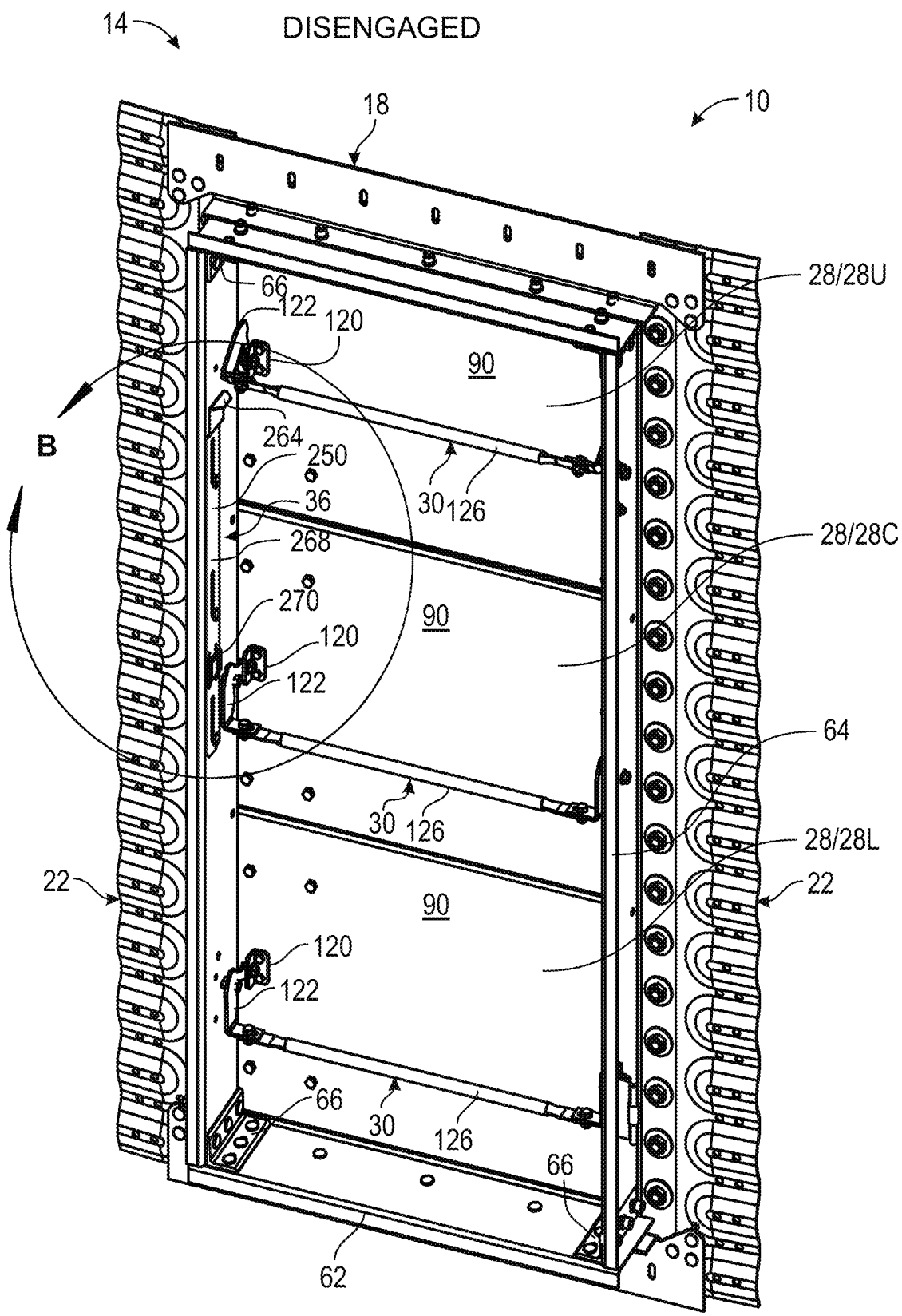
FIG. 29 is a front right perspective view of a safety door latch system, consistent with one or more embodiments; the view showing panels of an inner door in a closed position and outer door omitted; the view showing safety mechanism of the system in a disengaged position.
Figure 30:
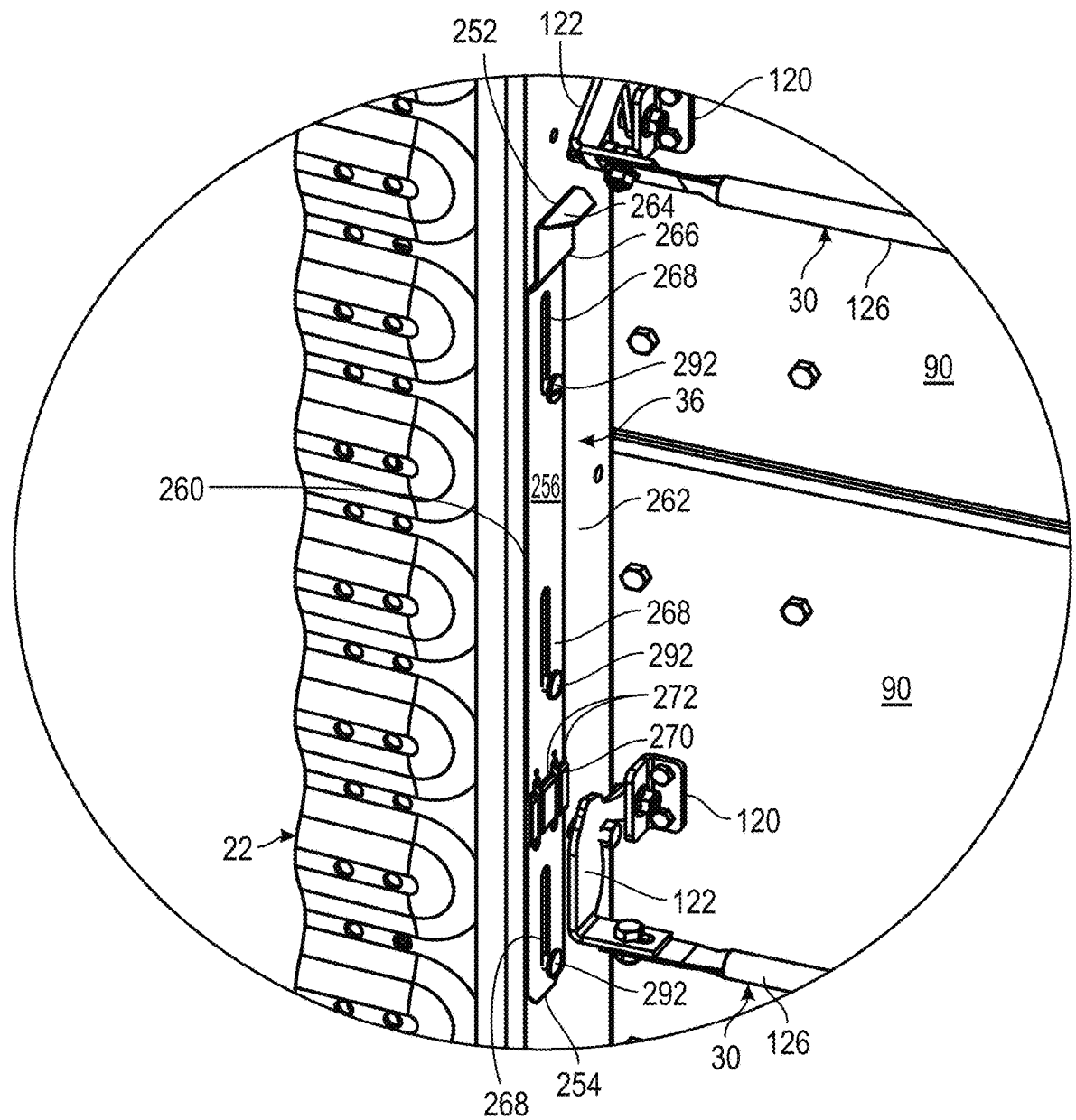
FIG. 30 is a close up front right perspective view of the safety mechanism shown in FIG. 29, consistent with one or more embodiments.
Figure 31:
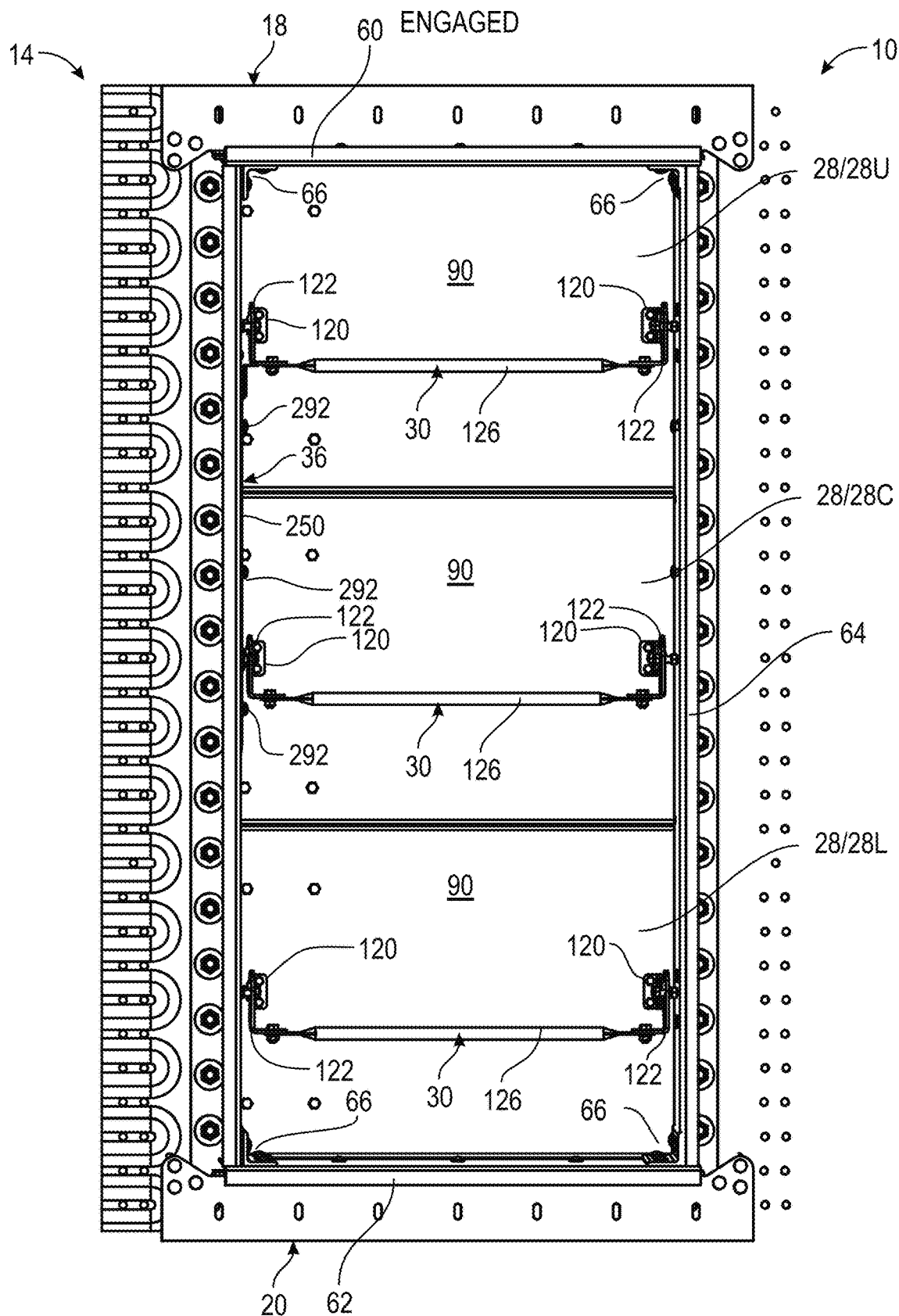
FIG. 31 is a front view of a safety door latch system, consistent with one or more embodiments; the view showing panels of an inner door in a closed position and outer door omitted; the view showing safety mechanism of the system in an engaged position.
Figure 32:
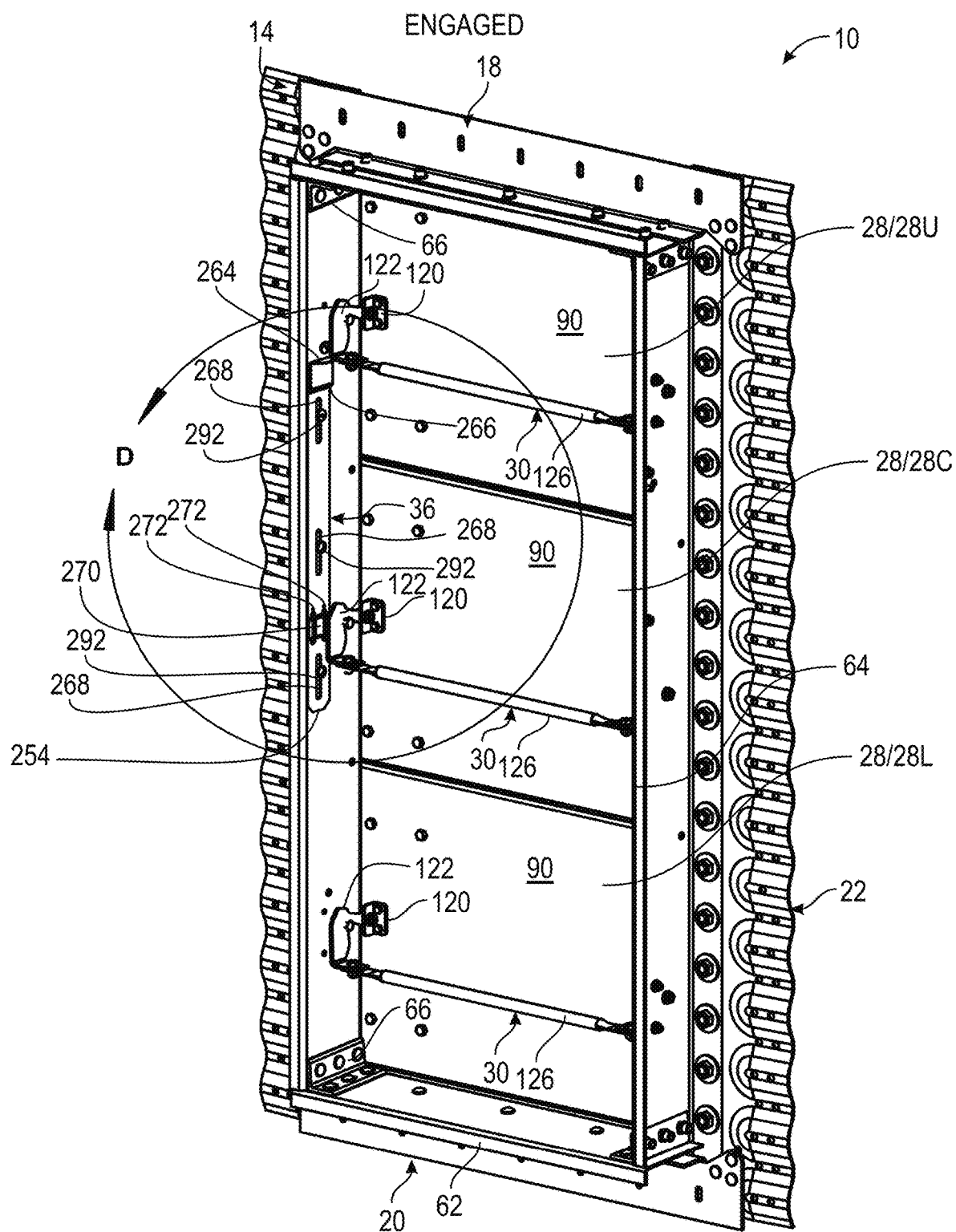
FIG. 32 is a front right perspective view of a safety door latch system, consistent with one or more embodiments; the view showing panels of an inner door in a closed position and outer door omitted; the view showing safety mechanism of the system in an engaged position.
Figure 33:
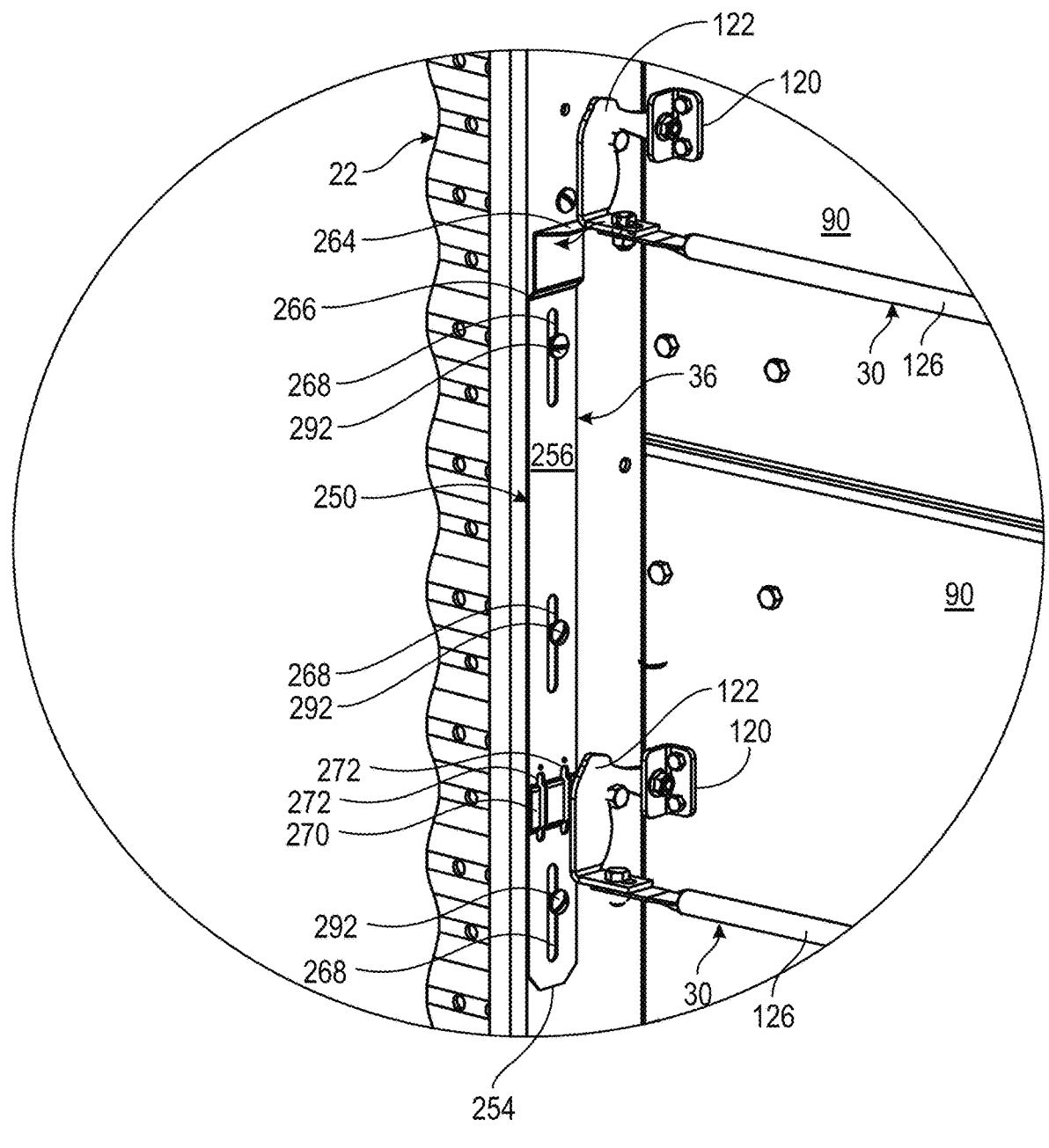
FIG. 33 is a close up front right perspective view of the safety mechanism shown in FIG. 32, consistent with one or more embodiments; the view showing safety mechanism of the system in an engaged position.
Figure 34:
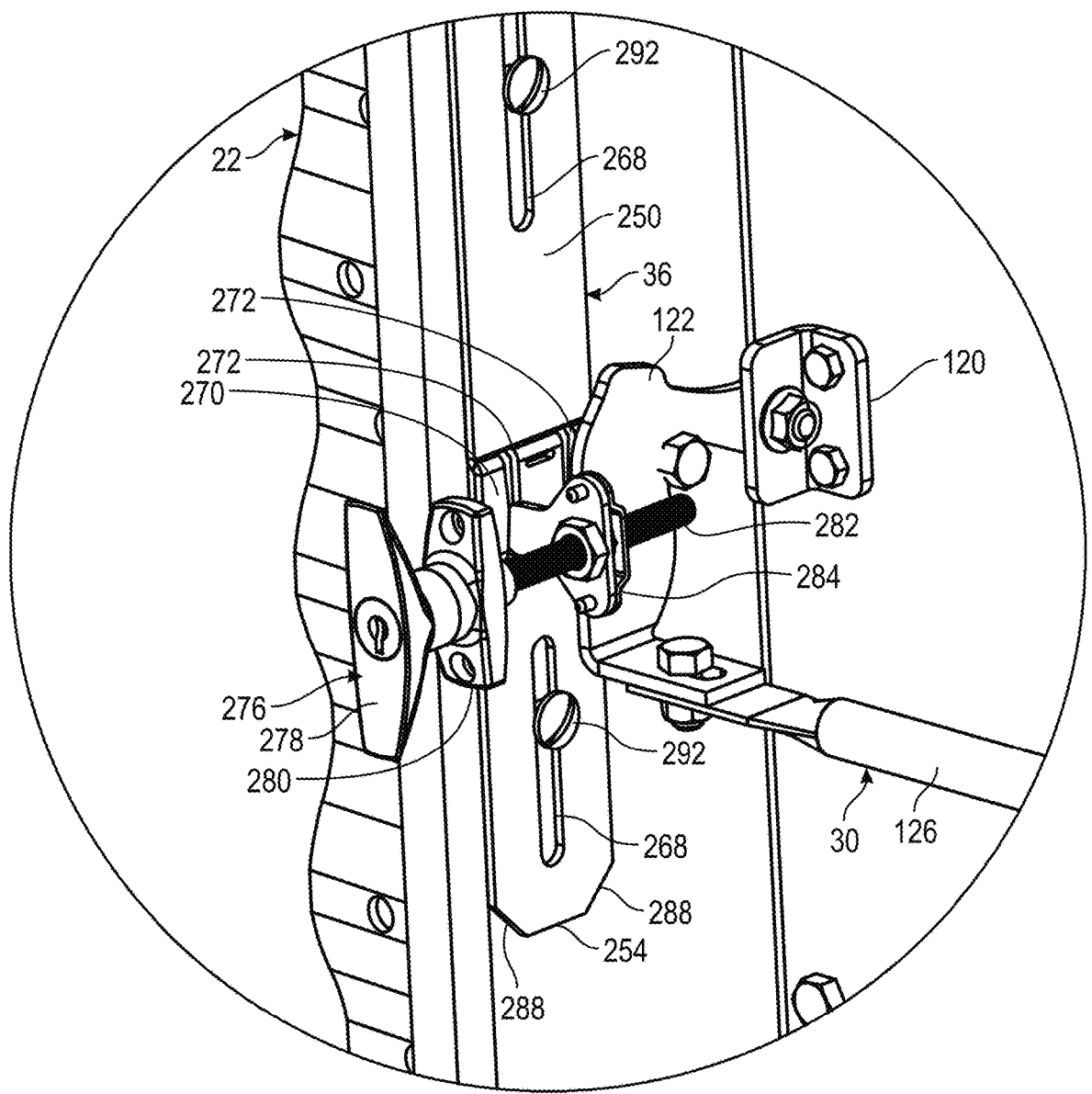
FIG. 34 is a close up front right perspective view of a safety mechanism of a safety door latch system, consistent with one or more embodiments; the view showing safety mechanism of the system in an engaged position.
Figure 35:
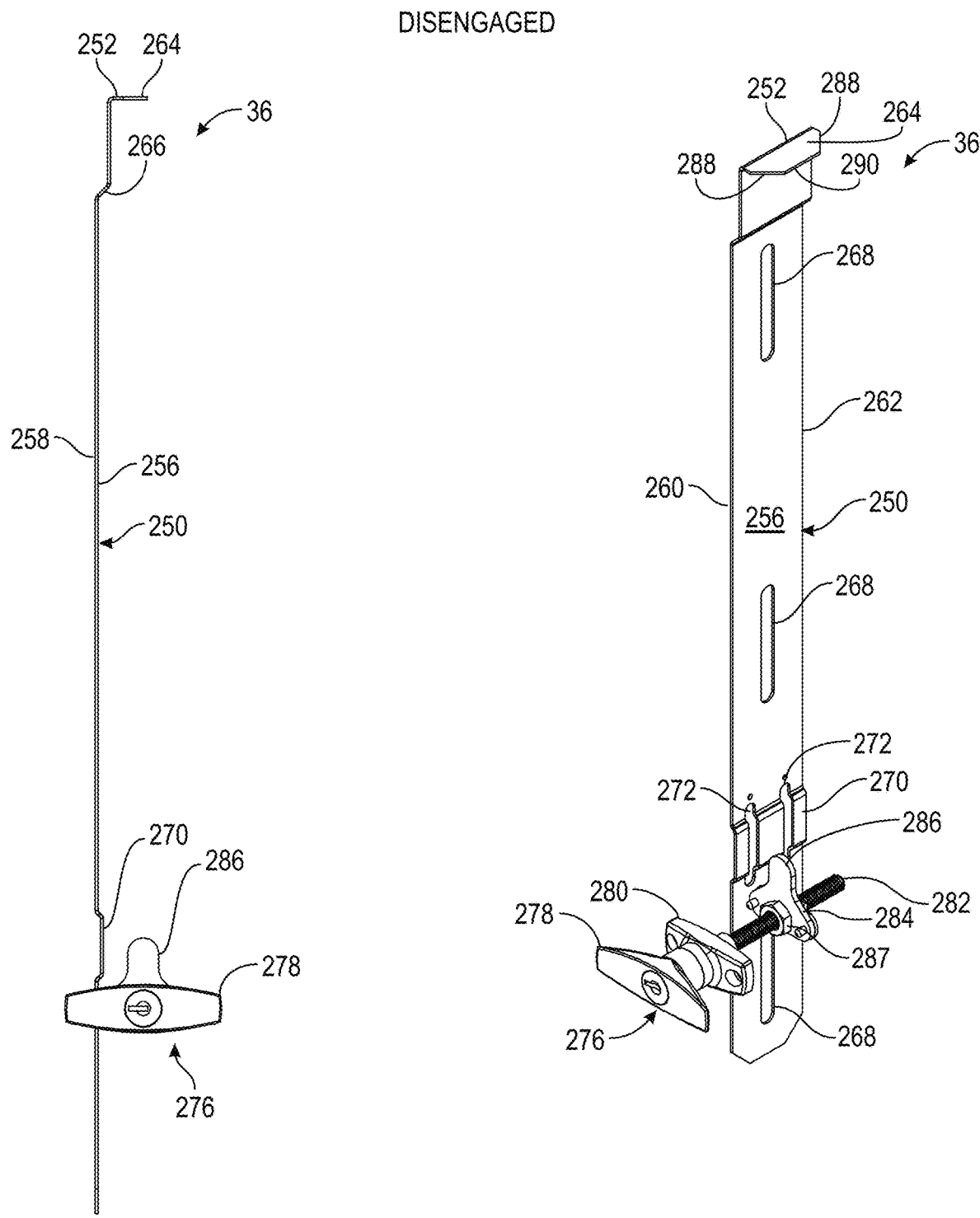
FIG. 35 shows front and front right perspective views of the safety mechanism, consistent with one or more embodiments; the views showing safety mechanism in a disengaged position.

When grain bin 12 is not filled with grain, the door panels 28 may be easily closed as the holes 110 are slightly larger than the posts 86. When the grain bin 12 is filled, and the grain bin slightly stretches, which is also known as hoop stress, causes the outward side of holes 110 to engage the outward side of posts 86. This arrangement is shown in FIG. 10, wherein the posts 86 are positioned toward the outward sides of holes 110. This engagement facilitates the transfer of hoop stress across the width of door assembly 14. Or, said another way, this engagement facilitates the transfer of hoop stress across the door panels 28 from the row of posts 86 adjacent one side edge 98 to the row of posts 86 adjacent the other side edge 98.

Hinges:

In the arrangement shown, as one example, door panels 28 are connected to the interior side of side connectors 22 by hinges 112. Hinges 112 may be formed of any suitable size, shape and design and are configured to facilitate the rotational opening and closing of door panels 28. In the arrangement shown, as one example, a pair of hinges 112 are connected adjacent one side edge 98 of panels 28, one adjacent the top edge 94 of door panel 28, and one adjacent the bottom edge 96 of door panel 28. In the arrangement shown, as one example, hinges 112 are formed of a first section 114 that is rigidly connected to the interior surface of side connectors 22 and a second section 116 that is rigidly connected to the interior surface of door panels 28. In this arrangement, the first section 114 and second section 116 connect to one another and rotate with respect to one another upon an axis of rotation 118 that extends through the first section 114 and second section 116. However, any other configuration is hereby contemplated for use as hinges 112.

Handle Assembly (of Inner Door):

In the arrangement shown, as one example, door panels 28 include a handle assembly 30. Handle assembly 30 may be formed of any suitable size, shape and design and is configured to facilitate the closing and locking of door panels 28.

In the arrangement shown, as one example, each door panel 28 includes its own handle assembly 30. In the arrangement shown, as one example, handle assembly 30 is formed of a pair of opposing connecting brackets 120, a pair of end brackets 122 that are connected to the connecting brackets 120 by an axle 124 that serves as an axis of rotation, and a crossbar 126 that is connected to the end brackets, among other components and features described herein.

In the arrangement shown, as one example, connecting bracket 120 is formed of an L-shaped member that is screwed, bolted, welded, or otherwise attached to the exterior surface 90 of door panels 28 approximately at the vertical middle of the door panels 28. In the arrangement shown, as one example, the portion of connecting bracket 120 that extends outward from the exterior surface 90 of door panel 28 includes a hole therein that receives axle 124 that facilitates connection of the inward end of end bracket 122 to connecting bracket 120.

In the arrangement shown, as one example, when viewed from the side, end bracket 122 also has a generally L-shaped profile. In the arrangement shown, as one example, end bracket 122 includes a hole positioned at its rearward end that is configured to receive axle 124 therein that also extends through the outward end of connecting end bracket 122 thereby connecting the two components together while also allowing the inward end of end bracket 122 to rotate upon the stationary outward end of connecting bracket 120.

In the arrangement shown, as one example, a cam surface 128 is positioned on the inward surface of end bracket 122 that leads into the interior corner 130 of this L-shaped member of end bracket 122. The exterior end of this L-shaped member of end bracket 122 includes an inwardly extending tab 132 that facilitates connection of the outward end of crossbar 126 to end bracket 122. In the arrangement shown, as one example, crossbar 126 is an elongated generally cylindrical member that extends a length between opposing end brackets 122 and connects at its outward ends to tabs 132 of end brackets 122. In the arrangement shown, as one example, end bracket 122, and more specifically, the cam surface 128 and interior corner 130 of end bracket 122 are configured to engage and lock onto a latching post 134 connected to and extending inward from the interior surface of side frame members 64 of door frame 16.

In the arrangement shown, as one example, a latching post 134 extends inward from each side frame member 64 of door frame 16 adjacent the position of each handle assembly 30. Latching post 134 is formed of any suitable size shape and design and is configured to serve as an anchor for handle assembly 30 to grab onto as the handle assembly 30 uses mechanical advantage to pull panel 28 into a closed position where the holes 110 fully receive posts 86 of fasteners. In the arrangement shown, as one example, latching posts 134 are formed of a cylindrical member that extends outward of side frame member 64. In the arrangement shown, latching posts 134 are formed of a fastener, such as a screw or bolt, having a cylindrical shaft at the point where end bracket 122 engages the latching post 134. This fastener is tightened to or against side frame member 64 in the appropriate position for handle assembly 30 to engage and pull itself onto the latching post.

In the arrangement shown, as one example, panel 28 is pulled toward door frame 16 until the panel 28 engages the rearward side of door frame 16 as the posts 86 are received in holes 110 along the side edges 98 of panel 28. Due to the close and tight tolerances as well as frictional engagement between components of the system 10, to ensure panel 28 is fully closed in a tight and locked manner, at the point where panel 28 has been pulled shut the handle assembly 30 is lowered. As the handle assembly 30 is lowered, the cam surface 128 on the lower side of the outward arm of end brackets 122 engage the latching posts 134 that extend inward from side frame members 64. After engagement, between cam surface 128 of end bracket 122 and latching posts 134, as the handle assembly 30 continues to be lowered the cam surface 128 and configuration of end brackets 122 causes the handle assembly 30 to pull the door panel toward door frame 16. In addition, the configuration of handle assembly 30 provides leverage and mechanical advantage that assists with pulling panel 28 into a fully closed position. When in a fully closed position, handle assembly 30 is fully lowered and latching posts 134 are fully received within the interior corner 130 of end bracket 122. In this position, posts 86 are fully received within holes 110 of panel 28 which facilitates the transfer of hoop stress across door frame 16 and across door panels 28.

To open door panel 28, handle assembly 30 is raised thereby releasing latching post 134 and door panel 28 is forced inward thereby releasing posts 86 from holes 110 in door panel 28 at which point panel 28 may be swung open upon hinges 112.

Outer Door:

In the arrangement shown, as one example, safety grain bin door latch system 10 includes an outer door 32. Outer door 32 may be formed of any suitable size, shape and design and is configured to selectively close and cover inner door 26 as well as selectively open and expose inner door 26.

In the arrangement shown, as one example, outer door 32 is formed of a single monolithic continuous member that moves between an open position and a closed position. In the arrangement shown, as one example, outer door 32 has a generally flat and planar exterior surface 136 that connects at its outward edges to a rearwardly extending flange 138. In the arrangement shown, as one example, when outer door 32 is in a closed position, the rearwardly extending flange 138 of outer door 32 fits just over and around the outer peripheral edge of door frame 16 that is formed of outer edge of upper frame member 60, lower frame member 62 and side frame members 64. In a closed position, the rearwardly extending flange 138 of outer door 32 overlaps with and covers the flange 70 of upper frame member 60, lower frame member 62 and side frame members 64. In this way, in a closed position, outer door 32 seals the corridor formed by door frame 16 from water, dirt and debris.

In the arrangement shown, as one example, outer door 32 is connected to door frame 16 by a pair of hinges 140. Hinges 140 may be formed of any suitable size shape and design and are configured to facilitate the rotational opening and closing of outer door 32. In the arrangement shown, as one example, a pair of hinges 140 are connected adjacent one side of outer door 32, one adjacent the upper end of outer door 32, and one adjacent the lower end of outer door 32. In the arrangement shown, as one example, hinges 140 are formed of a first section 142 that is rigidly connected to the exterior surface of a side frame member 64 of door frame 16 and a second section 144 that is rigidly connected to the exterior surface of outer door 32. In this arrangement, the first section 142 and second section 144 connect to one another and rotate with respect to one another upon an axis of rotation 146 that extends through the first section 142 and second section 144. However, any other configuration is hereby contemplated for use as hinges 140.

In the arrangement shown, as one example, a handle assembly 34 is connected to the opposite side of outer door 32 as hinges 140.

Handle Assembly (of Outer Door):

In the arrangement shown, as one example, outer door 32 includes a handle assembly 34. Handle assembly 34 may be formed of any suitable size, shape and design and is configured to facilitate the closing and locking of outer door 32.

In the arrangement shown, as one example, handle assembly 34 is connected on a side of outer door 32 opposite hinges 140 and includes a pair of brackets 148 that are connected to the exterior surface 136 of outer door 32, with one bracket 148 positioned adjacent the upper end of outer door 32 and one bracket 148 positioned adjacent the lower end of outer door 32. In the arrangement shown, as one example, brackets 148 are formed of a generally flat and planar rectangular bar-shaped member that extends a length from an inward end 150 to an outward end 152. The inward end 150 of brackets 148 is connected to outer door 32 by a pivot point 154 that facilitates rotational movement of bracket 148. In the arrangement shown, as one example, pivot point 154 is formed of a fastener that extends through the inward end 150 of bracket 148 as well as through the outer door 32. Pivot point 154 affixes the inward end 150 of bracket 148 to outer door 32 while also allowing for rotational movement around the axis of rotation formed by pivot point 154.

In the arrangement shown, as one example, the outward end 152 of bracket 148 is connected to an upper or lower end of crossbar 156. Crossbar 156 is formed of any suitable size, shape and design and is configured to connect the outward end 152 of opposing brackets 148 such that when one bracket 148 is raised or lowered, the other bracket 148 is similarly raised or lowered. Crossbar 156 also provides easy grasping of handle assembly 34 to facilitate opening and closing of outer door 32 as well as locking and unlocking of outer door 32. In the arrangement shown, as one example, pivot point 158 is formed of a fastener that extends through the outward end 152 of bracket 148 as well as through the end of crossbar 156. Pivot point 158 affixes the outward end 152 of bracket 148 to crossbar 156 while also allowing for rotational movement around the axis of rotation formed by pivot point 158 to allow crossbar 156 to move vertically while brackets 148 rotate upon pivot point 154 positioned at the inward end 150 of brackets 148.

Raising and lowering of handle assembly 34 facilitates locking and unlocking of handle assembly 34 to safety mechanism 36.

Safety Mechanism:

In the arrangement shown, in FIGS. 2-27, as one example, safety grain bin door latch system 10 includes a safety mechanism 36. Safety mechanism 36 may be formed of any suitable size, shape and design and is configured to allow outer door 32 to be locked in a closed position on door frame 16 when the inner door 26 is in a closed and locked position, and, similarly, safety mechanism 36 is configured to prevent outer door 32 from being locked in a closed position on door frame 16 when the inner door 26 is in an open and unlocked position.

In the arrangement shown, as one example, safety mechanism 36 includes a lever 160, a first bracket 162, fasteners 164, a second bracket 166, a pivot point 168, a crossbar 170 having a slot 172 and an outer flange 174 that serves as a locking mechanism, among other components and features as is described herein.

Lever:

In the arrangement shown, as one example, safety mechanism 36 includes a lever 160. Lever 160 may be formed of any suitable size, shape and design and is configured to facilitate the movement of the safety mechanism 36 from an open, unlocked and/or disengaged position to a closed, locked and/or engaged position.

In the arrangement shown, as one example, lever 160 extends inward from the interior side of side frame member 64 just below the position where handle assembly 30 of the upper door panel 28U resides when handle assembly 30 is in a fully closed and locked position. In this way, when handle assembly 30 of upper door panel 28U is closed, the handle assembly 30 engages the safety mechanism 36, or more specifically the lever 160, thereby moving the safety mechanism 36 from an open, unlocked and/or disengaged position that does not allow for the locking or latching of outer door 32 in a closed position, to a closed, locked and/or engaged position that allows for the locking or latching of outer door 32 in a closed position. In this way, safety mechanism 36 prevents a user from closing the outer door 32 when the inner door 26 is open and filling the grain bin 12 thereby causing a dangerous condition that can cause damage to the grain bin 12 and/or injury.

In the arrangement shown, as one example, lever 160 is a generally cylindrical member that extends a length from an exterior end 176 to an interior end 178. In the arrangement shown, as one example, some or all of the length of lever 160 includes a flat-section, land, key, groove, protrusion or other feature that facilitates non-rotational attachment of components to lever 160 so that as lever 160 rotates this rotation is imparted upon other components of the safety mechanism 36.

In the arrangement shown, as one example, lever 160 extends from its exterior end 176 which is positioned on the exterior side of side frame member 64, through a hole in side frame member 64 before terminating at its interior end 178 which is positioned on the interior side of side frame member 64. In the arrangement shown, as one example, lever 160 includes a corner section 180 that bends the generally straight lever 160 at an approximate ninety-degree corner on the inward side of side frame member 64.

In the arrangement shown, as one example, an exterior collar 182 is connected adjacent the exterior end 176 of lever 160 outward of second bracket 166 which is outward of first bracket 162 which is outward of the exterior surface of side frame member 64. Exterior collar 182 serves to hold the first bracket 162 and second bracket 166 onto the exterior end 176 of lever 160. In the arrangement shown, as one example, an interior collar 184 is connected to lever 160 between the interior surface of side frame member 64 and the corner section 180 of lever. Interior collar 184 serves to hold the position of the interior end 178 of lever 160 on the interior side of side frame member 64.

In the arrangement shown, as one example, in an open, unlocked and/or disengaged position, the portion of lever 160 between corner section 180 and interior end 178 extends upward, either vertically or at an angle between vertical and horizontal. In contrast, in the arrangement shown, as one example, in a closed, locked and/or engaged position, the portion of lever 160 between corner section 180 and interior end 178 extends rearward, either horizontally or at an angle between horizontal and vertical. As the handle assembly 30 of upper door panel 28U is moved from an open position to a closed position, handle assembly 30 engages the portion of lever 160 between corner section 180 and interior end 178, thereby causing lever 160 to rotate from an open, unlocked and/or disengaged position to a closed, locked and/or engaged position. That is, as the handle assembly 30 of upper door panel 28U is lowered into a locked or engaged position, the handle assembly 30 engages the upwardly extending interior end 178 of lever 160. As the handle assembly 30 is lowered, the interior end 178 of lever 160 is lowered which causes the components connected to the exterior end 176 of lever 160, such as second bracket 166 and crossbar 170 to be simultaneously raised.

First Bracket:

In the arrangement shown, as one example, safety mechanism 36 includes a first bracket 162. First bracket 162 may be formed of any suitable size, shape and design and is configured to facilitate the connection of safety mechanism 36 to side frame member 64.

In the arrangement shown, as one example, first bracket 162 is connected to the exterior surface of side frame member 64. In the arrangement shown, as one example, first bracket 162 is a generally flat and square or rectangular bar-shaped member that extends a length from an exterior end 186 to an interior end 188. In the arrangement shown, as one example, the interior surface of first bracket 162 engages the exterior surface of side frame member 64 in flat and flush engagement.

In the arrangement shown, as one example, a pair of fasteners 164 extend from the interior side of side frame member 64, through side frame member 64 and into first bracket 162 thereby affixing first bracket 162 to side frame member 64 in a strong and secure arrangement. In the arrangement shown, as one example, fasteners 164 are screws or bolts having a head positioned in contact with the interior surface of side frame member 64 and a threaded shaft that extends through holes in first bracket 162 and connect to a nut 190 in contact with the exterior side of first bracket 162. In the arrangement shown, as one example, two fasteners 164 are used, one fastener 164 positioned a distance inward from exterior end 186 and another fastener 164 positioned a distance outward from where lever 160 extends through first bracket 162.

In the arrangement shown, first bracket 162 includes a hole adjacent its inward end that allows the passage of lever 160 there through. In this way, first bracket 162 facilitates the attachment of lever 160 to side frame member 64. In the arrangement shown, as one example, second bracket 166 is connected to lever 160 just outward from first bracket 162.

Second Bracket:

In the arrangement shown, as one example, safety mechanism 36 includes a second bracket 166. Second bracket 166 may be formed of any suitable size, shape and design and is configured to facilitate the connection of lever 160 to crossbar 170 as well as to facilitate the movement of crossbar 170 from an open, unlocked and/or disengaged position to a closed, locked and/or engaged position upon rotation of lever 160.

In the arrangement shown, as one example, second bracket 166 is connected to the exterior end 176 of lever 160 just outward of first bracket 162. In the arrangement shown, as one example, second bracket 166 is a generally flat and square or rectangular bar-shaped member that extends a length from an interior end 192 to an exterior end 194.

In the arrangement shown, as one example, interior end 192 of second bracket 166 includes a hole therein that is configured to receive the exterior end 176 of lever 160 therein. In the arrangement shown, as one example, the size and shape of this hole is configured to receive the exterior end 176 of lever 160 with close and tight tolerances so that rotational movement of lever 160 imparts rotational movement of second bracket 166. That is, in the arrangement shown, wherein the exterior end 176 of lever 160 is cylindrical with a flat section, the hole in the interior end of second bracket 166 has a similar round profile with a matching flat section. In this way, with the non-round shape of the exterior end 176 of lever 160 engaging the non-round hole of second bracket 166 as lever 160 rotates so rotates second bracket 166. Any other size, shape or design is hereby contemplated for use as the connection between lever 160 and second bracket 166.

In the arrangement shown, second bracket 166 includes a hole adjacent its exterior end 194 that receives and allows the passage of pivot point 168 there through. Pivot point 168 connects the exterior end 194 of second bracket 166 to crossbar 170.

In the arrangement shown, as one example, pivot point 168 is a screw or bolt having a head positioned adjacent the interior surface of the exterior end 194 of second bracket 166 and a threaded shaft that extends through a hole in second bracket 166 as well as through a hole in crossbar 170. Pivot point 168 connects to a nut 196 adjacent the exterior side of crossbar 170. In the arrangement shown, as one example, the shaft of pivot point 168 forms an axis of rotation that facilitates the relative rotation of second bracket 166 with respect to crossbar 170.

In this way, as lever 160 is rotated, the exterior end 176 of lever 160 imparts rotation upon the interior end 192 of second bracket 166 which causes the exterior end 194 of second bracket 166 to rotate. As the exterior end 194 of second bracket 166 rotates, the connection of second bracket 166 to crossbar 170 causes crossbar 170 to move as pivot point 168 facilitates relative rotation of the exterior end 194 of second bracket 166 relative to crossbar 170.

Crossbar, Slot, Outer Flange:

In the arrangement shown, as one example, safety mechanism 36 includes a crossbar 170 having a slot 172 and outer flange 174 that serves as a locking mechanism. Crossbar 170, slot 172 and outer flange 174 may be formed of any suitable size, shape and design and is configured to facilitate the locking or latching of the outer door 32 in a closed position when inner door 26 is in a closed and latched position, and crossbar 170, slot 172 and outer flange 174 are configured to prevent locking or latching of outer door 32 in a closed position when inner door 26 is not closed and in a latched position.

In the arrangement shown, as one example, crossbar 170 is an elongated member that extends from an upper end 198 to a lower end 200. In the arrangement shown, as one example, crossbar 170 extends in a generally straight manner from upper end 198 to lower end 200 and is formed of a generally bar-shaped main body that includes a rear flange 202 positioned at the interior side of the bar-shaped main body. In the arrangement shown, as one example, rear flange 202 extends outward at an approximate perpendicular alignment to the bar-shaped main body at the interior end of the bar-shaped main body. In the arrangement shown, as one example, an outer flange 174 is connected to the forward end of the bar-shaped main body of crossbar 170 adjacent the upper end 198 and lower end 200 of crossbar 170.

In the arrangement shown, as one example, crossbar 170 includes an outer flange 174 at its upper end 198 and lower end 200. Outer flange 174 is formed of any suitable size, shape and design and is configured to facilitate latching and locking of outer door 32 to door frame 16 in a closed position.

In the arrangement shown, as one example, outer flange 174 is a generally planar shaped member that extends outward from the exterior side of the upper end 198 of crossbar 170 as well as from the exterior side of the lower end 200 of crossbar 170. In the arrangement shown, as one example, outer flanges 174 extend in approximate perpendicular alignment to the plane formed by the bar-shaped main body of crossbar 170. In the arrangement shown, as one example, outer flanges 174 extend in approximate parallel spaced relation and alignment to the plane formed by rear flange 202. In the arrangement shown, as one example, outer flange 174 is connected to the bar-shaped main body of crossbar 170 by a corner section 204 at which point outer flange 174 is bent at an approximate ninety-degree angle to the plane formed by the bar-shaped main body of crossbar 170.

In the arrangement shown, as one example a slot 172 is positioned at the upper and lower ends 206 of outer flange 174 and between outer flange 174 and the main body of crossbar 170. In the arrangement shown, as one example, these slots 172 are generally rectangular in shape and narrow slightly as they extend inward toward corner section 204. Slots 172 are configured to receive a portion of bracket 148 of handle assembly 34 of outer door 32 thereby locking or latching outer door 32 in a closed position when inner door 26 is in a fully closed and latched position.

In the arrangement shown, as one example, outer flange 174 includes a hole 208 adjacent each slot 172. These holes 208 are configured to overlap with a hole in bracket 148 of handle assembly 34 of outer door 32 when bracket 148 is fully inserted into slot 172. Once in this position, a screw, bolt, lock, or other device may be inserted through the overlapping hole 208 in outer flange 174 and the hole in bracket 148 so as to prevent tampering and opening of outer door 32 and/or inner door 26 by unauthorized persons.

Lower End of Safety Mechanism:

Safety mechanism 36 includes a lower end that is similar if not identical to the upper end described above with the difference being that in the arrangement shown, as one example, the lower end of safety mechanism 36 does not include a lever 160 that engages the handle assembly 30 of inner door 26. Instead, a fastener 210 replaces lever 160 and serves as an axis of rotation for second bracket 166 when lever 160 of the upper end of safety mechanism 36 causes movement of crossbar 170.

The lower end of safety mechanism 36 does not require a lever 160 because in the arrangement shown, as one example, door panels 28 of inner door 26 require the lower door panel 28L to be closed first, followed by the center door panel 28C followed by the upper door panel 28U. As such, the inner door 26 cannot be fully closed unless and until the upper door panel 28U is closed. For this reason, only a single lever 160 is used that is associated with safety mechanism 36 that is associated with the upper door panel 28U. In an alternative arrangement, a lever 160 may be associated with both the upper door panel 28U and the lower door panel 28U. In yet another alternative arrangement, a lever 160 may be associated with the upper door panel 28U, the lower door panel 28U and the center door panel 28C. Any other arrangement or combination is hereby contemplated for use.

Any other arrangement or configuration is hereby contemplated for use as safety mechanism 36 and the arrangement described herein is only one of countless examples of the configuration and design of safety mechanism 36 that ensures the outer door 32 cannot be locked or latched closed until the inner door 26 is fully closed and latched.

In Operation:

In operation, the system 10 prevents the user from latching the outer door 32 in a closed position when the inner door 26 is in an open and unlatched position.

If the user attempts to close and latch the outer door 32 in a closed position, the user will find that the safety mechanism 36 is in a lowered, opened or disengaged position that is out of the reach of the bracket 148 of handle assembly 34 of outer door 32. Therefore, the outer door 32 cannot be latched or locked in a closed position until the inner door 26 is fully closed and latched. This prevents a user from closing and latching the outer door 32, forgetting the inner door 26 is open and then filling the grain bin 12, which can damage or destroy the grain bin 12 and/or cause injury or death.

If the user attempts to close and latch the outer door 32, the user is reminded that they must first close and latch the inner door 26 in order to move the safety mechanism to a raised, engaged, or latching position before the outer door 32 can be latched or locked in a closed position.

To close and latch the inner door 26 the user must close the inner door 26 in the appropriate manner. In the arrangement shown, as one example, the user closes inner door 26 by first closing lower door panel 28L. This is accomplished by grasping crossbar 126 of handle assembly 30 connected to lower door panel 28L and pulling the lower door panel 28L toward door frame 16. As the lower door panel 28L is pulled toward door frame 16 lower door panel 28L rotates upon hinges 112. As the lower door panel 28L nears the fully closed position, the holes 110 in side edges 98 of lower door panel 28 begin to receive the oversized circular posts 86 connected to the interior surface of the overlapped side connectors 22 and flanges 71 of side frame members 64.

Once the lower door panel 28L is near the fully closed position, the crossbar 126 is forced downward. This downward force applied to crossbar 126 causes end brackets 122 to rotate upon the axis of rotation that is formed by axle 124 that extends through the interior end of end brackets 122 and the exterior end of connecting brackets 120.

As the crossbar 126 is lowered, the cam surface 128 of the lower forward side of end brackets 122 engages latching posts 134 positioned on each side frame member 64 of door frame 16. As the crossbar 126 is forced downward, the curved shape of cam surface 128 upon the cylindrical surface of latching posts 134 causes handle assembly 30 to pull lower door panel 28L toward door frame 16. As the crossbar 126 is lowered, latching posts 134 slide along the cam surface 128 of the lower side of end brackets 122 thereby moving from the outward end of the cam surface 128 toward the interior corner 130.

At the point where latching posts 134 are received within interior corner 130, the crossbar 126 of handle assembly 30 is in a fully lowered and fully closed position. At the point where latching posts 134 are received within interior corner 130, lower door panel 28L is fully closed and latched in a closed position.

When lower door panel 28L is in a fully closed position, the exterior facing side of lower lip 102 connected to the interior end of flange 100 connected to the bottom edge 96 of lower door panel 28L is in overlapping condition with the inward end 108 of lower frame member 62. When lower door panel 28L is in a fully closed position, the downward facing side flange 100 connected to the bottom edge 96 of lower door panel 28L is in overlapping condition with the upward facing surface of the interior end of lower frame member 62. When lower door panel 28L is in a fully closed position, the forward facing sides of side edges 98 are in overlapping condition with the rearward facing side of the overlapping portion of flange 71 of side frame members 64 and the interior end of side connectors 22. When lower door panel 28L is in a fully closed position, the holes 110 in side edges 98 of lower door panel 28L fully receive the oversized circular posts 86 connected to the interior surface of the overlapped side connectors 22 and flanges 71 of side frame members 64.

In this position, lower door panel 28L is fully closed and latched in place. In this position, lower door panel 28L transfers hoop stress across the opposing side frame members 64 by way of engagement of holes 110 of lower door panel 28L with posts 86.

Center door panel 28C cannot be closed until lower door panel 28L is closed due to the downward extending lower lip 102 which overlaps with the interior end of flange 100 connected to the top edge 94 of lower door panel 28L.

Once lower door panel 28L is closed, center door panel 28C may be closed in the same manner described herein with respect to lower door panel 28L. When center door panel 28C is in a fully closed position, the exterior facing side of lower lip 102 connected to the interior end of flange 100 connected to the bottom edge 96 of center door panel 28C is in overlapping condition with the interior end of flange 100 connected to the top edge 94 of lower door panel 28L. When center door panel 28C is in a fully closed position, the downward facing side flange 100 connected to the bottom edge 96 of center door panel 28C is in overlapping condition with the upward facing surface of the flange 100 connected to the top edge 94 of lower door panel 28L. When center door panel 28C is in a fully closed position, the forward facing sides of side edges 98 are in overlapping condition with the rearward facing side of the overlapping portion of flange 71 of side frame members 64 and the interior end of side connectors 22. When center door panel 28C is in a fully closed position, the holes 110 in side edges 98 of center door panel 28C fully receive the oversized circular posts 86 connected to the interior surface of the overlapped side connectors 22 and flanges 71 of side frame members 64.

In this position, center door panel 28C is fully closed and latched in place. In this position, center door panel 28C transfers hoop stress across the opposing side frame members 64 by way of engagement of holes 110 of center door panel 28C with posts 86.

Upper door panel 28U cannot be closed until the center door panel 28C is closed due to the downward extending lower lip 102 which overlaps with the interior end of flange 100 connected to the top edge 94 of center door panel 28C.

Once center door panel 28C is closed, upper door panel 28U may be closed in the same manner described herein with respect to lower door panel 28L and center door panel 28C. When upper door panel 28U is in a fully closed position, the exterior facing side of lower lip 102 connected to the interior end of flange 100 connected to the bottom edge 96 of upper door panel 28U is in overlapping condition with the interior end of flange 100 connected to the top edge 94 of center door panel 28C. When upper door panel 28U is in a fully closed position, the downward facing side flange 100 connected to the bottom edge 96 of upper door panel 28U is in overlapping condition with the upward facing surface of the flange 100 connected to the top edge 94 of center door panel 28C. When upper door panel 28U is in a fully closed position, the forward facing sides of side edges 98 are in overlapping condition with the rearward facing side of the overlapping portion of flange 71 of side frame members 64 and the interior end of side connectors 22. When upper door panel 28U is in a fully closed position, the holes 110 in side edges 98 of upper door panel 28U fully receive the oversized circular posts 86 connected to the interior surface of the overlapped side connectors 22 and flanges 71 of side frame members 64.

In addition, when upper door panel 28U is in a fully closed position, the exterior facing side of the upwardly extending upper lip 104 connected to the interior end of flange 100 connected to the top edge 94 of upper door panel 28U is in overlapping condition with the inward end 106 of upper frame member 60.

In this position, upper door panel 28U is fully closed and latched in place. In this position, upper door panel 28U transfers hoop stress across the opposing side frame members 64 by way of engagement of holes 110 of upper door panel 28U with posts 86.

When the handle assembly 30 of upper door panel 28U is lowered and latched, safety mechanism 36 is moved from a lowered, disengaged or open position to a raised, engaged or closed position. More specifically, when the handle assembly 30 of upper door panel 28U is lowered and latched, the lower end of end brackets 122 engages the upward and/or rearward pointing end of lever 160. As the lower end of end brackets 122 engages the upward pointing end of lever 160 this engagement causes the upper and/or rearward end of lever 160 to rotated downward. As the upper and/or rearward end of lever 160 rotates downward, this rotation is transmitted through side frame member 64 and through first bracket 162 to second bracket 166. As the upper and/or rearward end of lever 160 rotates downward, this rotation causes second bracket 166 to rotate such that the exterior end 194 of second bracket 166 rotates upward and/or forward. As the exterior end 194 of second bracket 166 rotates upward and/or forward, this causes crossbar 170 to move from a lowered, disengaged or open position, to a raised, engaged or closed position as the second bracket 166 and crossbar 170 rotate relative to one another upon pivot point 168.

As the upper end of crossbar 170 is pulled upward by the rotation of second bracket 166 attached to the lever 160, the crossbar 170 acts to pull the second bracket 166 of the lower end of safety mechanism 36 upward as well. This rotation and movement occurs in a similar manner to that described herein with respect to the upper end of safety mechanism 36, albeit with the movement being caused by crossbar 170 being pulled upward instead of lever 160 rotating. The result is that the outer flange 174 and slots 172 of the lower end of safety mechanism move upward from a lowered, disengaged or open position to a raised, engaged or closed position at which point the bracket 148 at the lower end of handle assembly 34 of outer door 32 may be latched in a closed position. In this way, safety mechanism 36 provides two points of contact for latching of outer door 32 in a closed position. One point of contact at the upper end of inner door 26 and outer door 32, and one point of contact at the lower end of inner door 26 and outer door 32. Safety mechanism 36 serves to move both points of contact simultaneously between a lowered, disengaged or open position and a raised, engaged or closed position.

It is worthwhile to note that this movement of the safety mechanism 36 from a lowered, disengaged or open position, to a raised, engaged or closed position is passive, automatic, or said another way, does not require the user to do anything other than fully close and latch the inner door 26. In addition, safety mechanism 36 simultaneously moves all points of contact, or more specifically both the upper and lower connection points between safety mechanism 36 and the handle assembly 34 of outer door 32.

Once the safety mechanism 36 is moved to a raised, engaged or closed position, the handle assembly 34 of the outer door 32 may be latched or locked in a closed position. That is, once the crossbar 170 is moved to a raised, engaged or closed position, outer door 32 may be moved from an open position to a closed position upon hinges 140. Once outer door 32 is in a closed position, the interior surface of outer door 32 just inward of the rearward extending flange that extends around the periphery of outer door 32 engages the forward edge of door frame 16.

Once outer door 32 is in this fully closed position, the user lowers the crossbar 156 of handle assembly 34. Pulling down on crossbar 156 of handle assembly 34 of outer door 32 causes brackets 148 to rotate downward upon the pivot points that extend through the outward ends of crossbar 156 and through the outward end of brackets 148 as well as through the inward end of brackets 148 and through the exterior surface 136 of outer door 32. As the crossbar 156 of handle assembly 34 is lowered, the lower end of brackets 148 are received within the slots 172 between outer flange 174 and the main body of crossbar 170. As the slots 172 between outer flange 174 and the main body of crossbar 170 narrow slightly as they extend toward the middle of outer flange 174, this narrowing helps to guide bracket 148 into slot 172 as well as provide a tight and secure connection between bracket 148 of handle assembly 34 and slot 172 of safety mechanism 36 when brackets 148 are fully inserted with slots 172. Notably, brackets 148 at both the upper end and lower end of handle assembly 34 automatically line up with the slots 172 in the upper end and lower end of safety mechanism 36 when the outer door 32 is fully closed when the safety mechanism 36 is in a closed, raised or engaged position. Also, notably, while lowering of door handle assembly 34 is described herein a slot 172 is also positioned at the lower side of outer flanges 174 and therefore outer door 32 may be latched in place by raising crossbar 156 as well in the same manner described herein.

Once brackets 148 are fully inserted within slots 172 in the upper end and lower end of safety mechanism 36, the holes 208 in outer flanges 174 align with holes in brackets 148 which allow a user to insert a screw, bolt or lock through the two components thereby actively locking outer door 32 in a closed position upon safety mechanism 36 until this screw, bolt or lock is removed.

To open the outer door 32 once it is locked and latched in a closed position the opposite process is performed. That is, the screw, bolt or lock that extends through the brackets 148 of handle assembly 34 and outer flange 174 of safety mechanism 36 is removed. Next, the crossbar 156 of handle assembly 34 of outer door 32 is raise, or lowered, thereby removing the brackets 148 from the slots 172 of safety mechanism 36 thereby freeing the outer door 32 from the safety mechanism 36. Once outer door 32 is free from safety mechanism 36 outer door 32 may be opened upon hinges 140. Once outer door 32 is opened, inner door 26 is exposed.

The user opens the inner door 26 by opening the upper door panel 28U followed by the center door panel 28C followed by the lower door panel 28L. To open the upper door panel 28U the user raises the crossbar 126 of handle assembly 30 of upper door panel 28U and forces the upper door panel 28U inward thereby opening the upper door panel 28U. In doing so, as the handle assembly 30 of upper door panel 28U is rotated upward from a lowered, closed, latched or engaged position to a raised, opened, unlatched or disengaged position end bracket 122 of handle assembly 30 of upper door panel 28U disengages from lever 160 of safety mechanism 36. As handle assembly 30 disengages from lever 160 of safety mechanism 36, safety mechanism 36 naturally or automatically moves from an engaged or closed or latching position to a disengaged or open or unlatched position. That is, the interior or rearward end of lever 160 naturally rotates upward as the exterior ends 194 of second brackets 166 naturally or automatically rotate downward as the crossbar 170 naturally or automatically moves downward and out of the reach of handle assembly 34 of outer door 32.

Notably, safety mechanism 36 naturally or automatically moves under the weight of gravity. To ensure this occurs, even when parts age and get dirty, in one arrangement, additional weight may be added to safety mechanism 36, such as attaching an additional weight to crossbar 170 or by forming crossbar 170 such that it is relatively heavy, such as by using a thick piece of material. In another arrangement, a bias member or spring bias member or any other bias imparting member or force imparting member may be added to and used in association with safety mechanism 36 so as to ensure that the safety mechanism 36 returns to a lowered, disengaged or opened position once handle assembly 30 of upper door panel 28U is opened.

Safety Mechanism—Alternative Arrangement:

With reference to FIGS. 28-36 an alternative arrangement of a safety grain bin door latch system 10 is presented. This alternative arrangement presented in FIGS. 28-36 is similar to the safety grain bin door latch system 10 presented in FIGS. 1-27 and therefore unless specifically stated otherwise herein, the prior teaching and disclosure shown in FIGS. 1-27 applies equally to the alternative arrangement shown in FIGS. 28-36. That is, the arrangement shown in FIGS. 28-36 is configured to be used with the same or similar grain bin 12, door assembly 14, door frame 16 and the like with the difference being changes to safety mechanism 36 as is described herein.

In the arrangement shown, as one example, safety grain bin door latch system 10 includes a safety mechanism 36. Safety mechanism 36 may be formed of any suitable size, shape and design and is configured to allow outer door 32 to be locked in a closed position on door frame 16 when the inner door 26 is in a closed and locked position, and, similarly, safety mechanism 36 is configured to prevent outer door 32 from being locked in a closed position on door frame 16 when the inner door 26 is in an open and unlocked position.

In the arrangement shown, as one example, safety mechanism 36 includes a crossbar 250 having an upper end 252, a lower end 254, an interior surface 256, an exterior surface 258, a forward side 260, a rearward side 262, a lever 264, a step 266, a plurality of slots 268, a protrusion 270 having a plurality of slots 272, and a bias member 274 (not shown in the figures), among other components and features as is further described herein. In the arrangement shown, as one example, safety mechanism 36 operates in association with a handle assembly 276 having a knob 278, a base 280, a shaft 282 and a latch 284 having arm 286, among other components and features as is described herein.

Crossbar:

In the arrangement shown, as one example, safety mechanism 36 includes a crossbar 250. Crossbar 250 may be formed of any suitable size, shape and design and is configured to allow outer door 32 to be locked in a closed position on door frame 16 when the inner door 26 is in a closed and locked position, and, similarly, to prevent outer door 32 from being locked in a closed position on door frame 16 when the inner door 26 is in an open and unlocked position.

In the arrangement shown, as one example, crossbar 250 is a generally flat and elongated generally rectangular bar or member that extends an elongated length between an upper end 252 and a lower end 254, and extends a width between an interior surface 256 and an exterior surface 258, and extends a depth between a forward side 260 and a rearward side 262, among other features. However, any other shape is hereby contemplated for use. In the arrangement shown, as one example, when viewed from the forward side 260 or rearward side 262, crossbar 250 is a generally flat and straight and planar member other than the deviations out of plane formed by lever 264, step 266 and protrusion 270. In the arrangement shown, as one example, when viewed from the interior side 256 or exterior side 258, the forward edge and rearward edge of crossbar 250 extend in a straight and flat manner and extend in approximate parallel spaced relation to one another.

In one arrangement, crossbar 250 is formed of a single planar piece of material that is bent to form the features of lever 264, step 266 and protrusion 270 and is cut or punched to form the features of slots 268 and slots 272. However, any other configuration and manufacturing method is hereby contemplated for use.

In the arrangement shown, as one example, crossbar 250 extends a length from upper end 252 to lower end 254 in a generally flat, straight, and planar manner. In the arrangement shown, as one example, crossbar 250 extends from forward side 260 to rearward side 262 in a generally flat, straight, and planar manner. That is, the forward edge formed by forward side 260 and the rearward edge formed by rearward side 262 of crossbar 250 are generally straight and extend in approximate parallel spaced relation to one another.

Lever:

In the arrangement shown, as one example, crossbar 250 includes a lever 264. Lever 264 is formed of any suitable size, shape and design and is configured to be engaged by a handle assembly 30 of a panel 28 (or more specifically in the arrangement shown, as one example, upper door panel 28U) of inner door 26 as the inner door 26 is closed and locked. This engagement between lever 264 and handle assembly 30 of inner door 26 causes the crossbar 250 to move from a disengaged position to an engaged position.

In the arrangement shown, as one example, lever 264 is positioned at the upper end 252 of crossbar 250 and extends inward from the interior surface 256 of crossbar 250 a distance. In the arrangement shown, as one example, lever 264 is itself generally flat and planar in shape. In the arrangement shown, as one example the plane formed by lever 264 extends at an approximate perpendicular alignment to the plane formed the length of the main body of crossbar 250 between the upper end 252 and lower end 254.

In the arrangement shown, as one example, the upper surface of lever 264 is generally planar in shape and provides an extended surface area for a portion of handle assembly 30, such as end bracket 122, to engage lever 264 thereby moving lever 264 and the entire crossbar 250 between a disengaged position and an engaged position.

In the arrangement shown, as one example, the forward side and rearward side corners 288 of lever 264 are cut or chamfered so as to remove any sharp corners that could cause a safety issue.

In the arrangement shown, as one example, lever 264 connects at its exterior end to the upper end 252 of crossbar 250. In the arrangement shown, as one example, lever 264 extends inward a distance from the upper end 252 of crossbar 250 before terminating at its interior end 290, which in the arrangement shown, is a free and unconnected end. In the arrangement shown, interior end 290 of lever 264 extends away from the side frame member 64 that lever 264 is attached to and extends towards the opposite side frame member 64 in a generally perpendicular manner. However, any other configuration is hereby contemplated for use.

In the arrangement shown, as one example, lever 264 is formed out of the material that forms crossbar 250 by bending. However, lever 264 may be formed by any other manner, method or means, such as by welding lever 264 on top of crossbar 250, screwing or bolting or fastening or otherwise affixing lever 264 on top of crossbar 250, by machining, by casting, by molding, or by any other manner, method or means.

Step:

In the arrangement shown, as one example, crossbar 250 includes a step 266. Step 266 is formed of any suitable size, shape and design and is configured to step the upper end 252 of crossbar 250 inward a distance so as to ensure proper placement of lever 264 and engagement between crossbar 250 and lever 264 with handle assembly 30 when handle assembly 30 is closed.

In the arrangement shown, as one example, step 266 is positioned a distance below upper end 252 and lever 264 and is positioned a distance above the upper end of the uppermost slot 268. In the arrangement shown, as one example, step 266 is an angled section that angles inward a distance, away from exterior surface 258 and toward interior surface 256, as it angles upward a distance, away from lower end 254 and toward upper end 252. However, any other configuration is hereby contemplated for use such as a 90-degree step, a curved step, or the like. In this way, the area of crossbar 250 below step 266 is positioned outward a distance from the area of crossbar 250 positioned above step 266. In the arrangement shown, as one example, the area of crossbar 250 below step 266 and the area of crossbar 250 positioned above step 266 extend in approximate parallel planar spaced alignment to one another.

In the arrangement shown, as one example, step 266 is formed out of the material that forms crossbar 250 by bending. However, step 266 may be formed by any other manner, method or means, such as by welding step 266 into crossbar 250, screwing or bolting or fastening or otherwise affixing step 266 into crossbar 250, by machining, by casting, by molding, or by any other manner, method or means.

Slots:

In the arrangement shown, as one example, crossbar 250 includes a plurality of slots 268. Slots 268 are formed of any suitable size, shape and design and are configured to facilitate connection of crossbar 250 to the inward facing surface of a side frame member 64 of door frame 16 while allowing for functional vertical movement of safety mechanism 36. That is, in the arrangement shown, as one example, slots 268 facilitate the attachment of crossbar 250 to door frame 16, provide alignment of crossbar 250 to door frame 16 and facilitate sliding vertical movement of crossbar 250 relative to door frame 16.

In the arrangement shown, as one example, slots 268 are generally elongated openings with straight sides and rounded upper and lower ends that are positioned in the approximate forward side 260-to-rearward side 262 middle of crossbar 250. In the arrangement shown, as one example, the vertical length of slots 268 extend in approximate alignment to the vertical length of crossbar 250.

In the arrangement shown, as one example, three slots 268 are shown in use with crossbar 250, one slot 268 positioned adjacent the upper end 252 of crossbar 250, one slot 268 positioned adjacent the lower end 254 of crossbar 250 and one slot 268 positioned at the approximate middle of crossbar 250. However, any other number of slots is hereby contemplated for use such as one, two, three, four, five, six, seven, eight, nine or ten or more.

In the arrangement shown, as one example, slots 268 receive a fastener 292 therein. Fasteners 292 are formed of any size, shape and design and are configured to attach crossbar 250 to door frame 16 while facilitating vertical sliding movement of crossbar 250. Said another way, fasteners 292 are formed of any member that fastens safety mechanism 36 to side frame member 64 of door frame 16 while allowing for vertical movement of safety mechanism 36 between the disengaged position and the engaged position. Fasteners 292 may be formed of one or more screws, bolts, shafts, brackets, pins, protrusions, rails, groves or any other feature or any other member, or combination thereof.

In the arrangement shown, as one example, a single fastener 292 is used for each slot 268. In the arrangement shown, as one example, fastener 292 is a screw, bolt, pin or shaft that includes a wider head positioned on the interior surface 256 side of crossbar 250 and includes a narrower shaft that extends through slot 268 before connecting to side frame member 64 on the exterior surface 258 side of crossbar 250. In the arrangement shown, as one example, fastener 292 is a screw or bolt having a head on the interior surface 256 side of crossbar 250 with the shaft extending through the slot 268 that is threaded into the side frame member 64 or into a threaded nut or other threaded member adjacent side frame member 64.

In the arrangement shown, as one example, when fasteners 292 engage the upper edge of slots 268, crossbar 250 of safety mechanism 36 is in a fully lowered or fully depressed position. In the arrangement shown, as one example, when fasteners 292 engage the lower edge of slots 268, crossbar 250 of safety mechanism 36 is in a fully raised position.

Protrusion and Slots:

In the arrangement shown, as one example, crossbar 250 includes a protrusion 270. Protrusion 270 is formed of any suitable size, shape and design and is configured to provide a place for handle assembly 276 to connect to when safety mechanism 36 is in a fully engaged position when inner door 26 is fully closed so as to facilitate latching outer 32 in a closed position.

In the arrangement shown, as one example, protrusion 270 is positioned below the middle slot 268 and above the lower slot 268 at about the approximate middle of door assembly 14, however any other placement is hereby contemplated for use. In the arrangement shown, as one example, protrusion 270 is positioned inward a distance from the plane formed by the immediately above and below portions crossbar 250. In the arrangement shown, protrusion 270 includes an angled section at its lower end that angles inward a distance as it angles upward a distance as well as an angled section at its upper end that angles inward a distance as it angles downward a distance. In this way, the area of protrusion between these upper and lower steps is positioned inward a distance from the area of crossbar 250 positioned above and below protrusion 270. In the arrangement shown, as one example, the area of protrusion 270 between these angled steps extends in approximate parallel planar spaced alignment with the planes formed by the interior surface 256 and exterior surface 258 of the portions of crossbar 250 immediately above and below protrusion 270. However, any other shape or configuration of protrusion 270 is hereby contemplated for use such as curved, rounded, angled or the like In this way, protrusion 270 steps inward a distance from the plane formed by the main body of crossbar 250.

In the arrangement shown, as one example, protrusion 270 is formed out of the material that forms crossbar 250 by bending. However, protrusion may be formed by any other manner, method or means, such as by welding protrusion 270 onto crossbar 250, screwing or bolting or fastening or otherwise affixing protrusion 270 onto crossbar 250, by machining, by casting, by molding, or by any other manner, method or means.

In the arrangement shown, as one example, protrusion 270 includes a pair of slots 272 therein. While two slots 272 are shown in use, any number of slots are hereby contemplated for use such as one, two, three, four, five or more.

Slots 272 are formed of any suitable size, shape and design and are configured to facilitate selective connection of arm 286 of latch 284 of handle assembly 276 to crossbar 250 thereby selectively locking the outer door 32 in place when the inner door 26 is fully closed.

In the arrangement shown, as one example, slots 272 are generally elongated openings approximately equally spaced within the approximate forward side 260-to-rearward side 262 width of crossbar 250/protrusion 270. Or, said another way, the forward-most slot 272 is positioned approximately one-third of the way into the material of crossbar 250, and the rearward-most slot 272 is positioned approximately two thirds of the way into the material of crossbar 250. However, any placement, spacing and alignment is hereby contemplated for use.

In the arrangement shown, as one example, the vertical length of slots 272 extend in approximate parallel spaced alignment to one another and extend in approximate parallel alignment to the vertical length of crossbar 250. In the arrangement shown, as one example, the vertical length of slots 272 extends above and below protrusion 270 a slight distance. This vertical extension of slots 272 above and below protrusion 270 a distance allows arm 286 of latch 284 of handle assembly 276 to more-easily enter and exit the slots 272 by reducing the potential for interference with the material of crossbar 250 by providing clearance at the upper and lower ends of protrusion 270. This additional clearance helps to accommodate for any misalignment of parts or slop in the system 10. However, any other configuration is hereby contemplated for use.

Bias Member:

In the arrangement shown, as one example, safety mechanism 36 is shown in a disengaged position when safety mechanism 36 is in a raised position. In the arrangement shown, as one example, safety mechanism 36 is shown, in an engaged position when safety mechanism 36 is in a lowered position.

To facilitate safety mechanism 36 to naturally move to a raised position when safety mechanism 36 is not engaged by handle assembly 30 of inner door 26, which is opposite the natural pull of gravity, bias member 274 is used. Bias member 274 is formed of any suitable size, shape and design and is configured to provide a bias or force that naturally moves safety mechanism 36 toward the disengaged position. That is, in the arrangement shown, as one example, bias member 274 is configured force safety mechanism 36 upward and toward the disengaged position when crossbar 250 is not engaged by handle assembly 30 of inner door 26. In addition, in the arrangement shown, as one example, bias member 274 is also configured to allow crossbar 250 to move downward, against the force or bias provided by bias member 274, when crossbar 250 is engaged by handle assembly 30 of inner door 26 and sufficient force is applied that is greater than the force provided by bias member 274.

Bias member 274 may be formed of a spring member which pushes or pulls or applies a force to the safety mechanism 36 to move it to the disengaged position. Bias member 274 may be a weighted system that pushes or pulls safety mechanism 36 upward, such as through a pulley system or lever system or weighted arrangement or the like. Any other form of a bias member is hereby contemplated for use which pushes or pulls or applies a force to the safety mechanism 36 to move it to the disengaged position.

It is to be noted, that while in the arrangement shown, the safety mechanism 36 naturally moves upward to the disengaged position then it is forced downward to the engaged position by engagement of handle assembly 30 of inner door 26. However, it is to be understood that the opposite arrangement is hereby contemplated for use wherein the safety mechanism 36 naturally moves downward to the disengaged position then it is forced upward to the engaged position when it is engaged by handle assembly 30 of inner door 26. This opposite arrangement harnesses the natural pull of gravity and may eliminate the need for a bias member 274 and therefor may be more efficient as it may eliminate a part (bias member 274). However, in either arrangement, the use of bias member 274 may be used to help facilitate proper functioning.

Handle Assembly:

In the arrangement shown, as one example, safety mechanism 36 is shown in use with a handle assembly 276 which is connected to outer door 32. Handle assembly 276 may be formed of any suitable size, shape and design and is configured to facilitate user operated opening and closing and locking and unlocking of outer door 32 to safety mechanism 36. Handle assembly 276 may be similar to or identical to handle assembly 34 as is described herein in form and/or function.

In the arrangement shown, as one example, handle assembly 276 is connected to outer door 32 adjacent the side where safety mechanism 36 is located, which is opposite the side where hinges 140 are connected to outer door 32. In the arrangement shown, as one example, handle assembly 276 is positioned at approximately the middle of the vertical height of outer door 32, however any other placement is hereby contemplated for use.

In the arrangement shown, as one example, handle assembly 276 includes a knob 278, a base 280, a shaft 282, and a latch 284 having an arm 286, however any other configuration or arrangement is hereby contemplated for use.

Knob:

In the arrangement shown, as one example, handle assembly 276 includes a knob 278. Knob 278 may be formed of any suitable size, shape and design and is configured to facilitate the user operated opening and closing and locking and unlocking of outer door 32 to safety mechanism 36.

In the arrangement shown, as one example, knob 278 is a T-shaped member that is configured to be easily grasped by a user and rotated between a locked position and an unlocked position. In the arrangement shown, as one example, knob 278 includes a locking mechanism, such as a conventional key-operated lock so as to facilitate locking of the outer door 32 in a closed position once latched. However, any other size, shape, design, or configuration is hereby contemplated for use.

In the arrangement shown, as one example, the interior side of knob 278 connects to base 280 as well as shaft 282.

Base:

In the arrangement shown, as one example, handle assembly 276 includes a base 280. Base 280 may be formed of any suitable size, shape and design and is configured to facilitate the connection of handle assembly 276 to outer door 32 thereby affixing handle assembly 276 to outer door 32 while facilitating functional operation of handle assembly 276. That is, base 280 affixes handle assembly 276 to outer door 32 while facilitating relative rotational movement of knob 278, shaft 282 and latch 284.

In the arrangement shown, as one example, base 280 is, like knob 278, is a T-shaped member. In the arrangement shown, as one example, base 280 extends outward from the centrally positioned shaft 282 a distance, like knob 278. The interior side of base 280 is configured to engage the exterior surface of outer door 32. To facilitate this connection, the outward ends of base 280 include openings or holes that are configured to receive screws, bolts, or other fasteners that fasten base 280, and thereby handle assembly 276, to outer door 32. However, any other size, shape, design, or configuration is hereby contemplated for use.

In the arrangement shown, as one example, the shaft 282 of knob 278 extends through base 280 and connects to knob 278 at the exterior facing side of base 280 and extend through outer door 32 and connects to latch 284 on the interior facing side of base 280.

Shaft:

In the arrangement shown, as one example, handle assembly 276 includes a shaft 282. Shaft 282 may be formed of any suitable size, shape and design and is configured to facilitate the connection of the components of handle assembly 276 to one another including knob 278, base 280 and latch 284 while facilitating relative rotational movement of these components. In the arrangement shown, as one example, shaft 282 is an elongated threaded shaft or rod, however any other configuration is hereby contemplated for use.

In the arrangement show, as one example, shaft 282 connects at its outward end to knob 278 in a non-rotational manner, meaning that as knob 278 rotates so rotates shaft 282. In the arrangement show, as one example, shaft 282 extends rearward from knob 278 and through base 280 and through outer door 32. Shaft 282 is connected to base 280 in a rotational manner, meaning that shaft 282 may rotate relative to stationary knob 278. In the arrangement shown, as one example, shaft 282 connects adjacent its inward end to latch 284 having arm 286 in a non-rotational manner, meaning that ask knob 278 rotates so rotates shaft 282 and so rotates latch 284 with its outward extending arm 286. In this way, the rotation of knob 278 facilitates the rotation of latch 284 with arm 286.

Latch and Arm: In the arrangement shown, as one example, handle assembly 276 includes a latch 284 and arm 286. Latch 284 may be formed of any suitable size, shape and design and is configured to facilitate latching of handle assembly 276 to crossbar 250 of safety mechanism 36, or more specifically to a slot 272 of protrusion 270 when safety mechanism 36 is in an engaged position.

In the arrangement shown, as one example, latch 284 connects to shaft 282 by an adjustment mechanism 287. Adjustment mechanism 287 may be formed of any suitable size, shape and design and facilitates the lateral adjustment of the position of latch 284 along the length of shaft 282 as well as facilitates the angular adjustment of the position of latch 284 around the exterior diameter of shaft 282 so as to ensure that arm 286 lands in a slot 272 when safety mechanism 36 is in an engaged position and knob 278 of handle assembly 276 is rotated to a latching or locking position when outer door 32 is in a fully closed position. In the arrangement shown, as one example, adjustment mechanism 287 includes a threaded member that engages shaft 282 as well as a locking member that engages shaft 282 and locks adjustment mechanism 287 in place along the length of shaft 282 as well as at an angular position around shaft 282.

In the arrangement show, as one example, latch 284, other than adjustment mechanism 287 is a generally planar member that that shaft 282 extends through. In the arrangement shown, the plan of latch 284 and arm 286 extend outward from shaft 282 in a generally perpendicular manner to the axis of rotation that extends through the center of shaft 282. In the arrangement shown, as one example, arm 286 extends outward from latch 284 and includes a rounded outward end. As such, as shaft 282 is rotated, arm 286 is rotated.

In the arrangement show, as one example, when safety mechanism 36 is in an engaged position, meaning that a handle assembly 30 of inner door 26 engages lever 264 of crossbar 250 when handle assembly 30 is closed thereby forcing crossbar 250 downward from a disengaged position to an engaged position, and outer door 32 is fully closed, handle assembly 276 is used and knob 278 is rotated thereby causing the outward rounded end of arm 286 to rotate into (either from above or below) into one of the slots 272 in protrusion 270 thereby latching or locking outer door 32 in a fully closed position. Once in this latched or locked position the handle assembly 276 may be locked in place using the conventional lock in knob 278. To open outer door 32, the opposite process is performed. Meaning that the knob 278 is unlocked and then once unlocked the knob 278 is rotated thereby causing arm 286 to rotate out of slot 272 thereby allowing outer door 32 to open.

The adjustment mechanism 287 allows for the adjustment of the position of latch 284 along the length and position of shaft 282 thereby allowing the selection of the engagement of the forward slot 272 or rearward slot 272.

However, any other configuration is hereby contemplated for use as latch 284, arm 286 and adjustment mechanism 287.

One of the advantages of the safety mechanism 36 of system 10 presented in FIGS. 28-36 is that the safety mechanism 36 is contained behind the outer door 32 when the outer door 32 is closed. That is, the movable portions of safety mechanism 36 shown in FIGS. 28-36, namely the movable crossbar 250 is positioned exterior to the inner door 26, interior to outer door 32 and within door frame 16. Positioning safety mechanism 36 in this manner essentially makes safety mechanism 36 tamper proof. That is, due to the fact that the safety mechanism 36 that latches the outer door 32 closed is behind outer door 32, the user cannot manually move the safety mechanism to the engaged or locking position while they are closing the outer door 32.

In contrast, due to outer flange 174 of the safety mechanism 36 shown in FIGS. 2-27 being positioned exterior to outer door 32 and to the exterior side of door frame 16, a user can manually hold up the flange 174 of safety mechanism 36 (because the inner door 26 is not closed and locked) as they lock the outer door 32 thereby defeating the purpose of the safety mechanism 36, which is to prevent the outer door 32 from being closed, locked or latched when the inner door 26 is open.

This cannot be done for the safety mechanism 36 of system 10 presented in FIGS. 28-36 as this configuration of the safety mechanism 36 does not have any externally protruding components. As such, this configuration of safety mechanism 36 is tamper proof and truly requires the inner door 26 to be fully closed and latched and locked to close, latch and lock the outer door 32. As such, this configuration of safety mechanism 36 provides an unprecedented level of security and protection as it truly ensures the inner door 26 is fully closed, locked, and latched before the outer door 32 can be closed, locked, and latched.

In Operation:

In operation, the system 10 of FIGS. 28-36 prevents the user from latching the outer door 32 in a closed position when the inner door 26 is in an open and unlatched position.

If the user attempts to close and latch the outer door 32 in a closed position, the user will find that the safety mechanism 36 is in a raised, opened or disengaged position that is out of the reach of the latch 284 or arm 286 of handle assembly 276 of outer door 32. Therefore, the outer door 32 cannot be latched or locked in a closed position until the inner door 26 is fully closed and latched. This prevents a user from closing and latching the outer door 32, forgetting the inner door 26 is open and then filling the grain bin 12, which can damage or destroy the grain bin 12 and/or cause injury or death.

If the user attempts to close and latch the outer door 32, the user is reminded that they must first close and latch the inner door 26 in order to move the safety mechanism to a lowered, engaged, or latching position before the outer door 32 can be latched or locked in a closed position.

To close and latch the inner door 26 the user must close the inner door 26 in the appropriate manner. In the arrangement shown, as one example, the user closes inner door 26 by first closing lower door panel 28L. This is accomplished by grasping crossbar 126 of handle assembly 30 connected to lower door panel 28L and pulling the lower door panel 28L toward door frame 16. As the lower door panel 28L is pulled toward door frame 16 lower door panel 28L rotates upon hinges 112. As the lower door panel 28L nears the fully closed position, the holes 110 in side edges 98 of lower door panel 28 begin to receive the oversized circular posts 86 connected to the interior surface of the overlapped side connectors 22 and flanges 71 of side frame members 64.

Once the lower door panel 28L is near the fully closed position, the crossbar 126 is forced downward. This downward force applied to crossbar 126 causes end brackets 122 to rotate upon the axis of rotation that is formed by axle 124 that extends through the interior end of end brackets 122 and the exterior end of connecting brackets 120.

As the crossbar 126 is lowered, the cam surface 128 of the lower forward side of end brackets 122 engages latching posts 134 positioned on each side frame member 64 of door frame 16. As the crossbar 126 is forced downward, the curved shape of cam surface 128 upon the cylindrical surface of latching posts 134 causes handle assembly 30 to pull lower door panel 28L toward door frame 16. As the crossbar 126 is lowered, latching posts 134 slide along the cam surface 128 of the lower side of end brackets 122 thereby moving from the outward end of the cam surface 128 toward the interior corner 130.

At the point where latching posts 134 are received within interior corner 130, the crossbar 126 of handle assembly 30 is in a fully lowered and fully closed position. At the point where latching posts 134 are received within interior corner 130, lower door panel 28L is fully closed and latched in a closed position.

When lower door panel 28L is in a fully closed position, the exterior facing side of lower lip 102 connected to the interior end of flange 100 connected to the bottom edge 96 of lower door panel 28L is in overlapping condition with the inward end 108 of lower frame member 62. When lower door panel 28L is in a fully closed position, the downward facing side flange 100 connected to the bottom edge 96 of lower door panel 28L is in overlapping condition with the upward facing surface of the interior end of lower frame member 62. When lower door panel 28L is in a fully closed position, the forward facing sides of side edges 98 are in overlapping condition with the rearward facing side of the overlapping portion of flange 71 of side frame members 64 and the interior end of side connectors 22. When lower door panel 28L is in a fully closed position, the holes 110 in side edges 98 of lower door panel 28L fully receive the oversized circular posts 86 connected to the interior surface of the overlapped side connectors 22 and flanges 71 of side frame members 64.

In this position, lower door panel 28L is fully closed and latched in place. In this position, lower door panel 28L transfers hoop stress across the opposing side frame members 64 by way of engagement of holes 110 of lower door panel 28L with posts 86.

Center door panel 28C cannot be closed until lower door panel 28L is closed due to the downward extending lower lip 102 which overlaps with the interior end of flange 100 connected to the top edge 94 of lower door panel 28L.

Once lower door panel 28L is closed, center door panel 28C may be closed in the same manner described herein with respect to lower door panel 28L. When center door panel 28C is in a fully closed position, the exterior facing side of lower lip 102 connected to the interior end of flange 100 connected to the bottom edge 96 of center door panel 28C is in overlapping condition with the interior end of flange 100 connected to the top edge 94 of lower door panel 28L. When center door panel 28C is in a fully closed position, the downward facing side flange 100 connected to the bottom edge 96 of center door panel 28C is in overlapping condition with the upward facing surface of the flange 100 connected to the top edge 94 of lower door panel 28L. When center door panel 28C is in a fully closed position, the forward facing sides of side edges 98 are in overlapping condition with the rearward facing side of the overlapping portion of flange 71 of side frame members 64 and the interior end of side connectors 22. When center door panel 28C is in a fully closed position, the holes 110 in side edges 98 of center door panel 28C fully receive the oversized circular posts 86 connected to the interior surface of the overlapped side connectors 22 and flanges 71 of side frame members 64.

In this position, center door panel 28C is fully closed and latched in place. In this position, center door panel 28C transfers hoop stress across the opposing side frame members 64 by way of engagement of holes 110 of center door panel 28C with posts 86.

Upper door panel 28U cannot be closed until the center door panel 28C is closed due to the downward extending lower lip 102 which overlaps with the interior end of flange 100 connected to the top edge 94 of center door panel 28C.

Once center door panel 28C is closed, upper door panel 28U may be closed in the same manner described herein with respect to lower door panel 28L and center door panel 28C. When upper door panel 28U is in a fully closed position, the exterior facing side of lower lip 102 connected to the interior end of flange 100 connected to the bottom edge 96 of upper door panel 28U is in overlapping condition with the interior end of flange 100 connected to the top edge 94 of center door panel 28C. When upper door panel 28U is in a fully closed position, the downward facing side flange 100 connected to the bottom edge 96 of upper door panel 28U is in overlapping condition with the upward facing surface of the flange 100 connected to the top edge 94 of center door panel 28C. When upper door panel 28U is in a fully closed position, the forward facing sides of side edges 98 are in overlapping condition with the rearward facing side of the overlapping portion of flange 71 of side frame members 64 and the interior end of side connectors 22. When upper door panel 28U is in a fully closed position, the holes 110 in side edges 98 of upper door panel 28U fully receive the oversized circular posts 86 connected to the interior surface of the overlapped side connectors 22 and flanges 71 of side frame members 64.

In addition, when upper door panel 28U is in a fully closed position, the exterior facing side of the upwardly extending upper lip 104 connected to the interior end of flange 100 connected to the top edge 94 of upper door panel 28U is in overlapping condition with the inward end 106 of upper frame member 60.

In this position, upper door panel 28U is fully closed and latched in place. In this position, upper door panel 28U transfers hoop stress across the opposing side frame members 64 by way of engagement of holes 110 of upper door panel 28U with posts 86.

When the handle assembly 30 of upper door panel 28U is lowered and latched, safety mechanism 36 is moved from a raised, disengaged or open position to a lower, engaged or closed position. More specifically, when the handle assembly 30 of upper door panel 28U is lowered and latched, the lower end of end brackets 122 engages the upper surface of lever 264. As the lower end of end brackets 122 engages the upper surface of lever 264 this engagement causes crossbar 250 to move downward, against the force of bias member 274.

As crossbar 250 moves downward, the exterior surface 258 of crossbar 250 slides against the interior facing surface of side frame member 64 of door frame 16 as slots 268 spaced along crossbar 250 slide along fasteners 292. This vertical movement continues until handle assembly 30 of upper door panel 28U is fully closed at which point crossbar 250 is fully lowered or in a fully engaged position.

In a fully lowered or fully engaged position, protrusion 270 of crossbar 250 is aligned with handle assembly 276. As such, once crossbar 250 of safety mechanism 36 is in a fully lowered or fully engaged position, outer door 32 may be latched in place using handle assembly 276.

To do so, outer door 32 is rotated to a fully closed position. Knob 278 of handle assembly 276 is rotated to an opening position, such as that shown in FIG. 35, wherein the arm 286 of latch 284 is pointed in a direction that does not interfere with protrusion 270. This allows clearance for outer door 32 to be fully closed without engagement between arm 286 of latch 284.

Once outer door 32 is fully closed, the plane of latch 284 and arm 286 is aligned with a slot 272 of protrusion 270. Once in this position, knob 278 is rotated to a closed or latching or locking position. As knob 278 is rotated, through the connection of knob 278 to shaft 282, shaft 282 simultaneously rotates. As shaft 282 rotates, shaft 282 rotates within base 280. As knob 278 is rotated, through the connection of shaft 282 to latch 284, latch 284 simultaneously rotates. As latch 284 rotates, so rotates arm 286.

Figure 36:
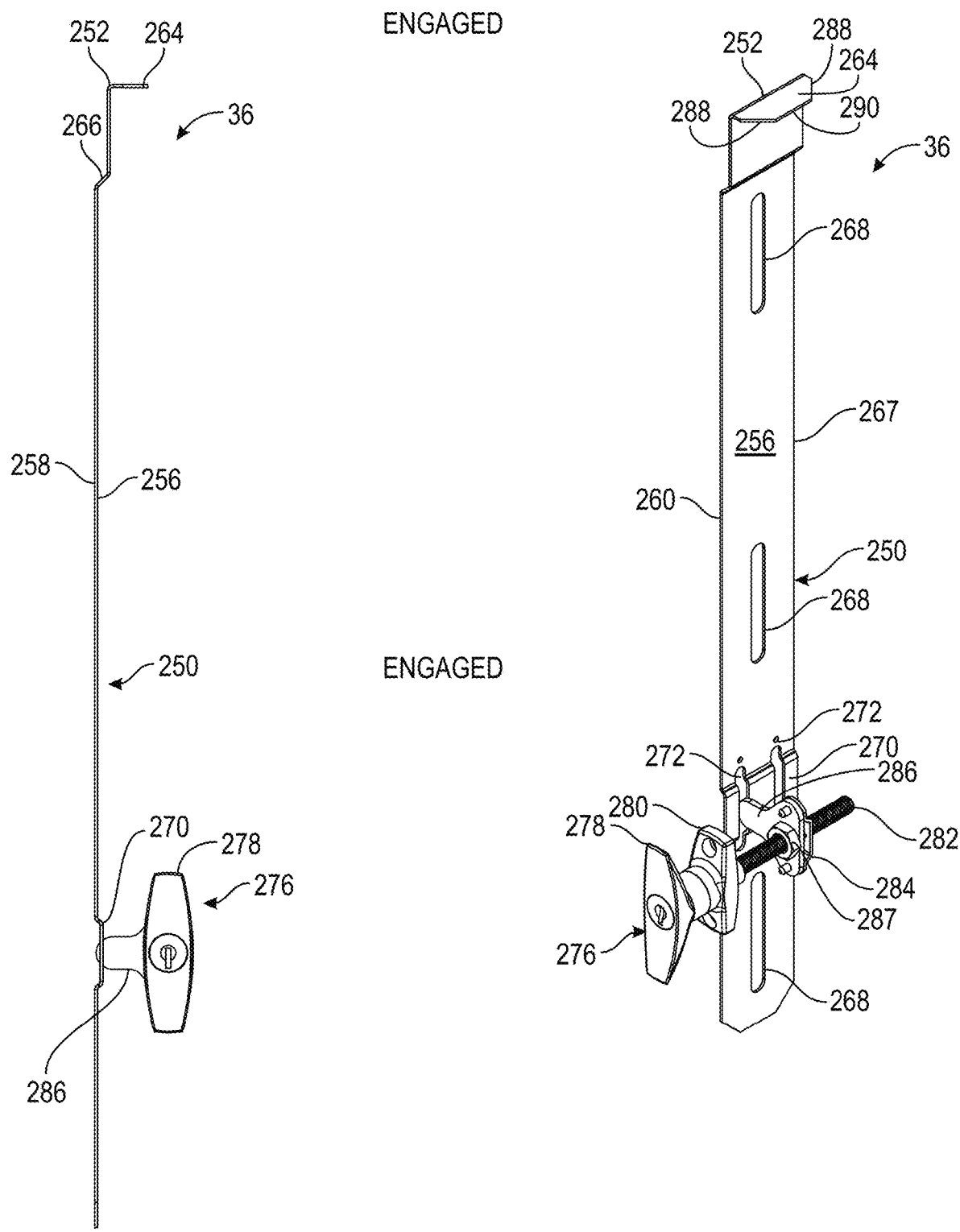
FIG. 36 shows front and front right perspective views of the safety mechanism shown in FIG. 35, consistent with one or more embodiments; the views showing safety mechanism in an engaged position.
Figure 37:
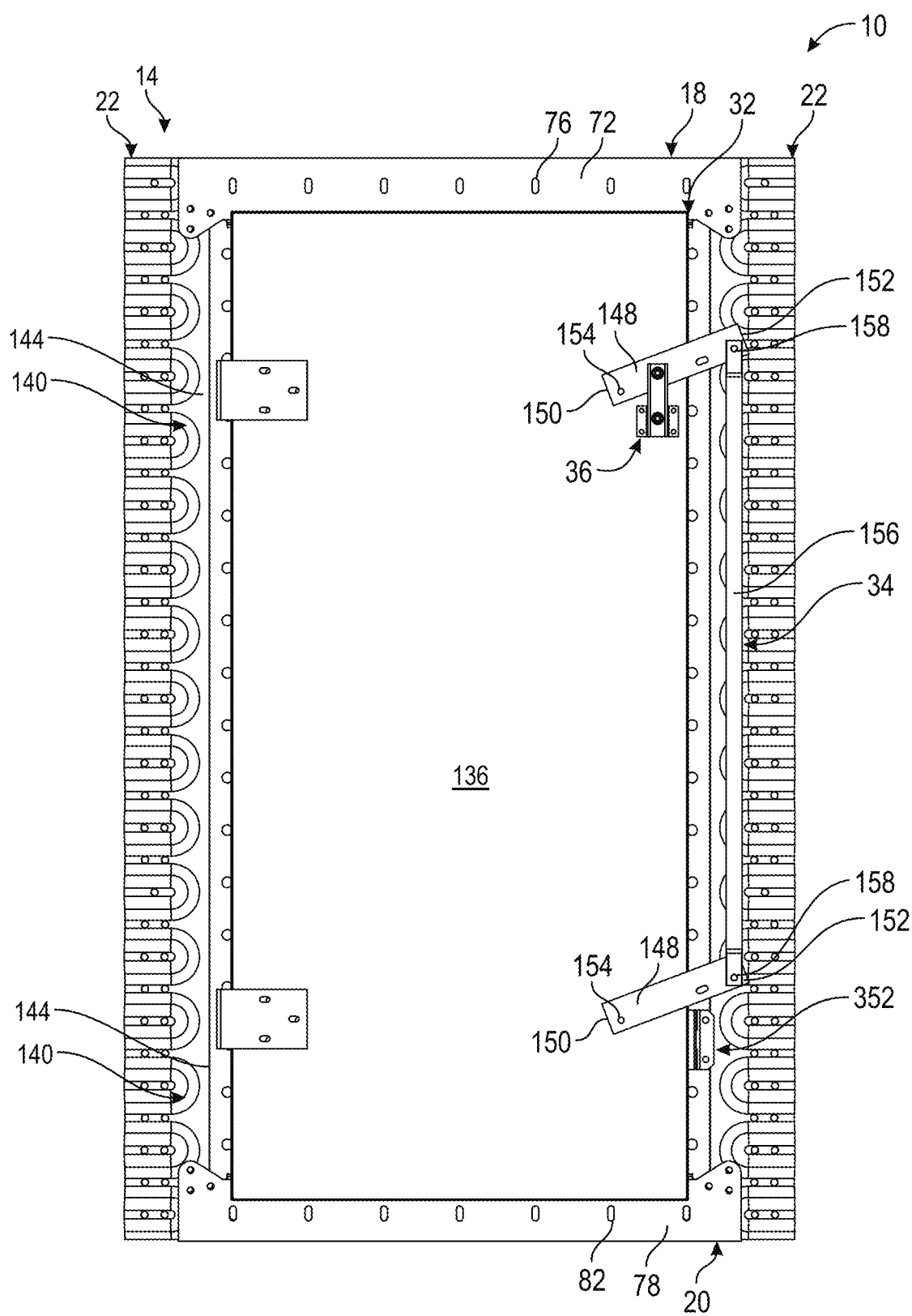
FIG. 37 is a front view of a safety door latch system, consistent with one or more embodiments; the view showing an outer door in the closed positions; the view showing the outer door hinged on the left side; the view showing a safety mechanism in a disengaged position.
Figure 38:
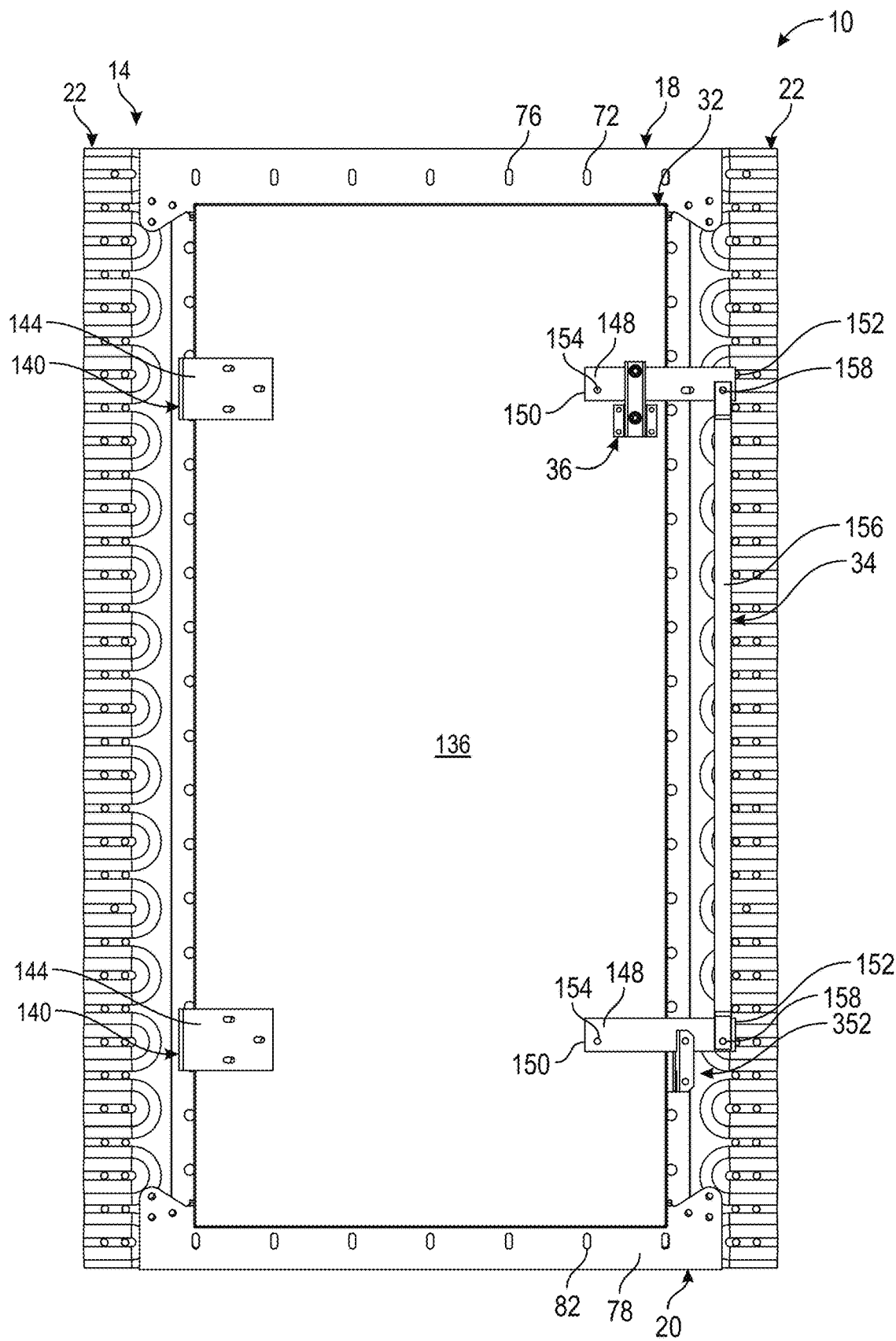
FIG. 38 is a front view of a safety door latch system, consistent with one or more embodiments; the view showing an outer door in the closed positions; the view showing the outer door hinged on the left side; the view showing a safety mechanism in an engaged position.
Figure 39:
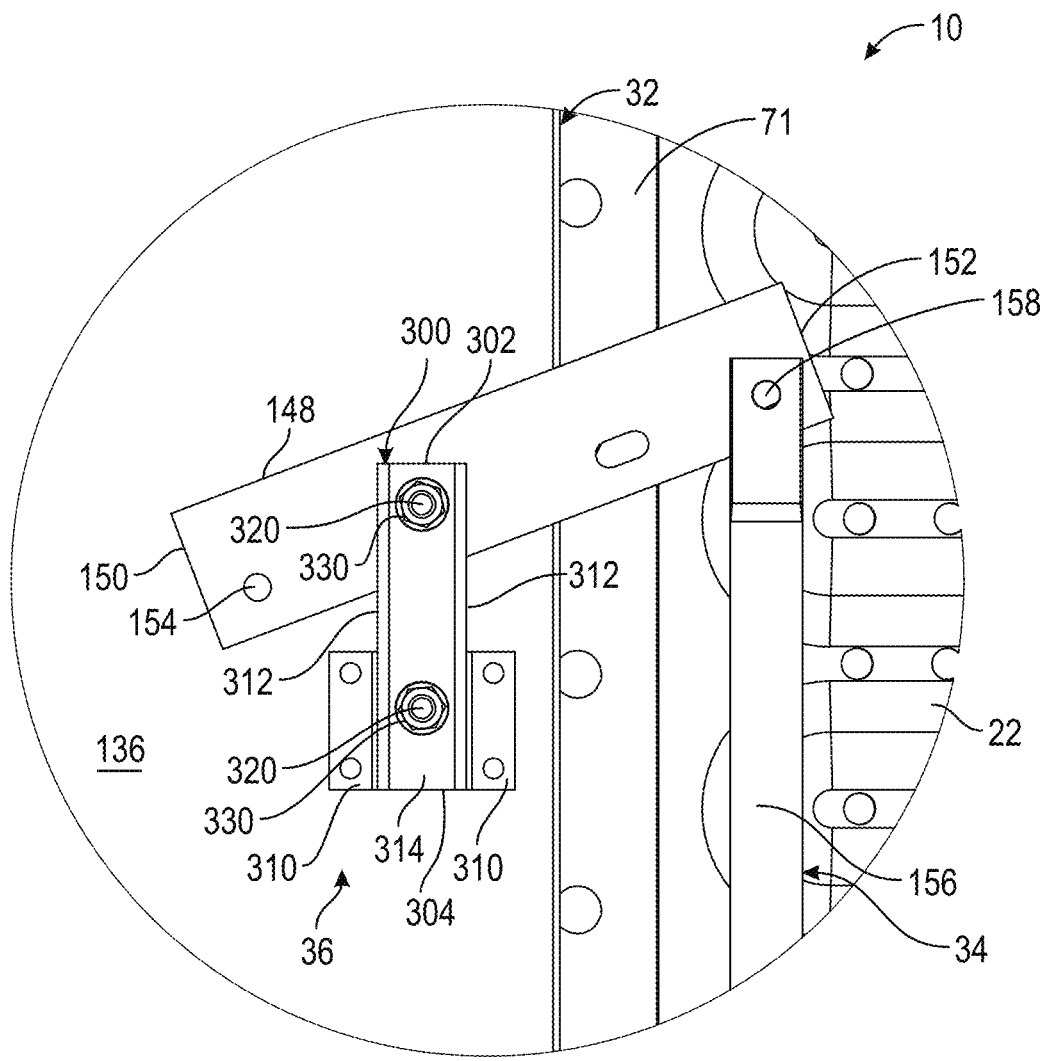
FIG. 39 is a close up front view of an upper end of a handle of the outer door of the safety door latch system shown in FIG. 37, consistent with one or more embodiments.
Figure 40:
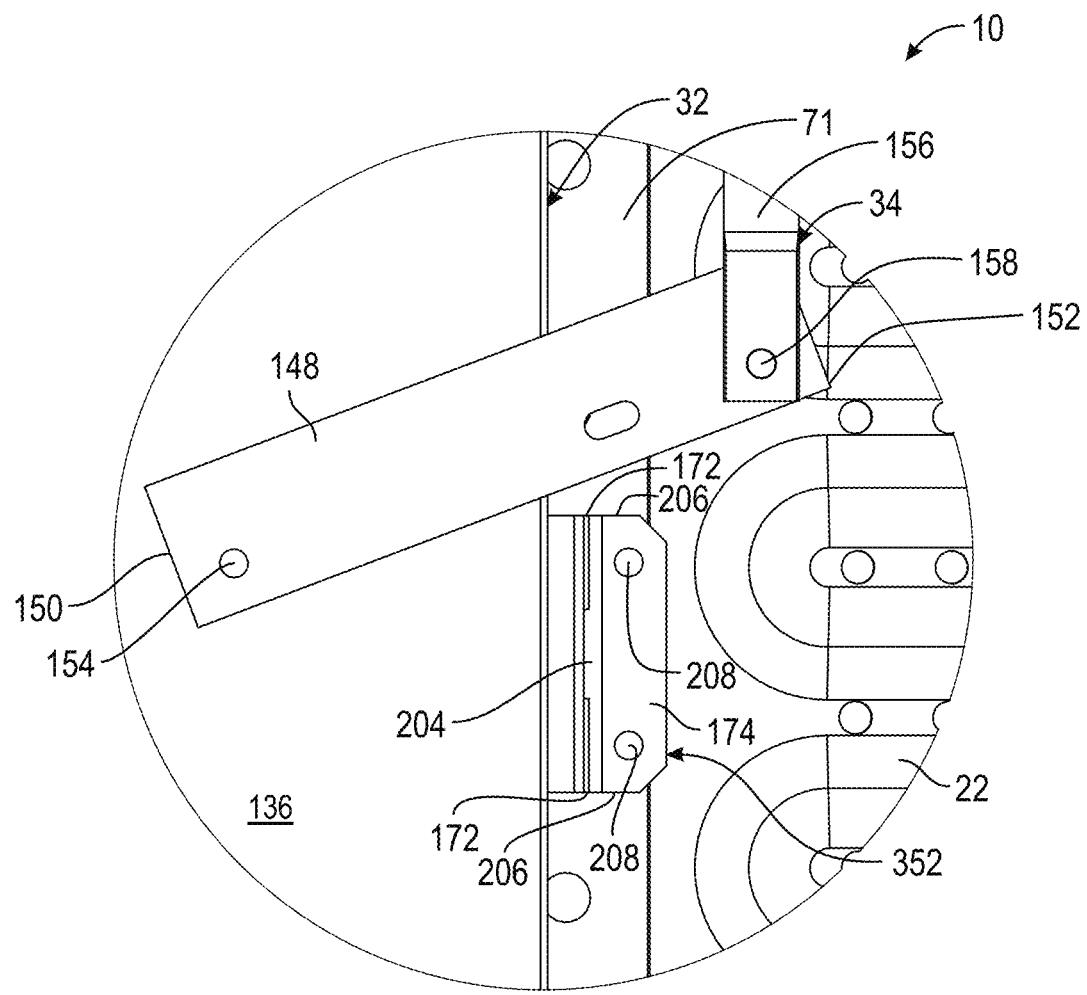
FIG. 40 is a close up front view of a lower end of a handle of the outer door of the safety door latch system shown in FIG. 37, consistent with one or more embodiments.
Figure 41:
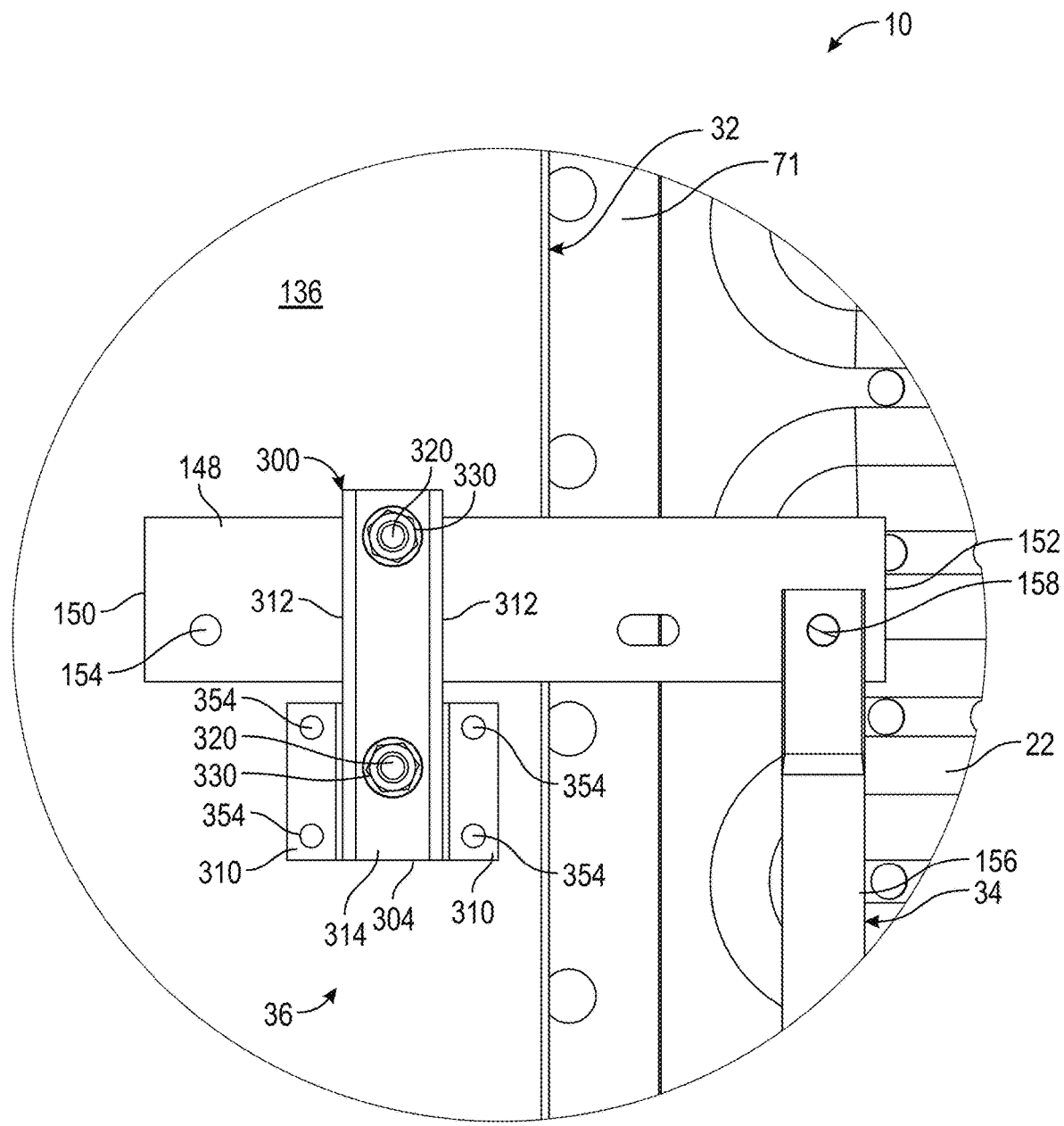
FIG. 41 is a close up front view of an upper end of a handle of the outer door of the safety door latch system shown in FIG. 38, consistent with one or more embodiments.
Figure 42:
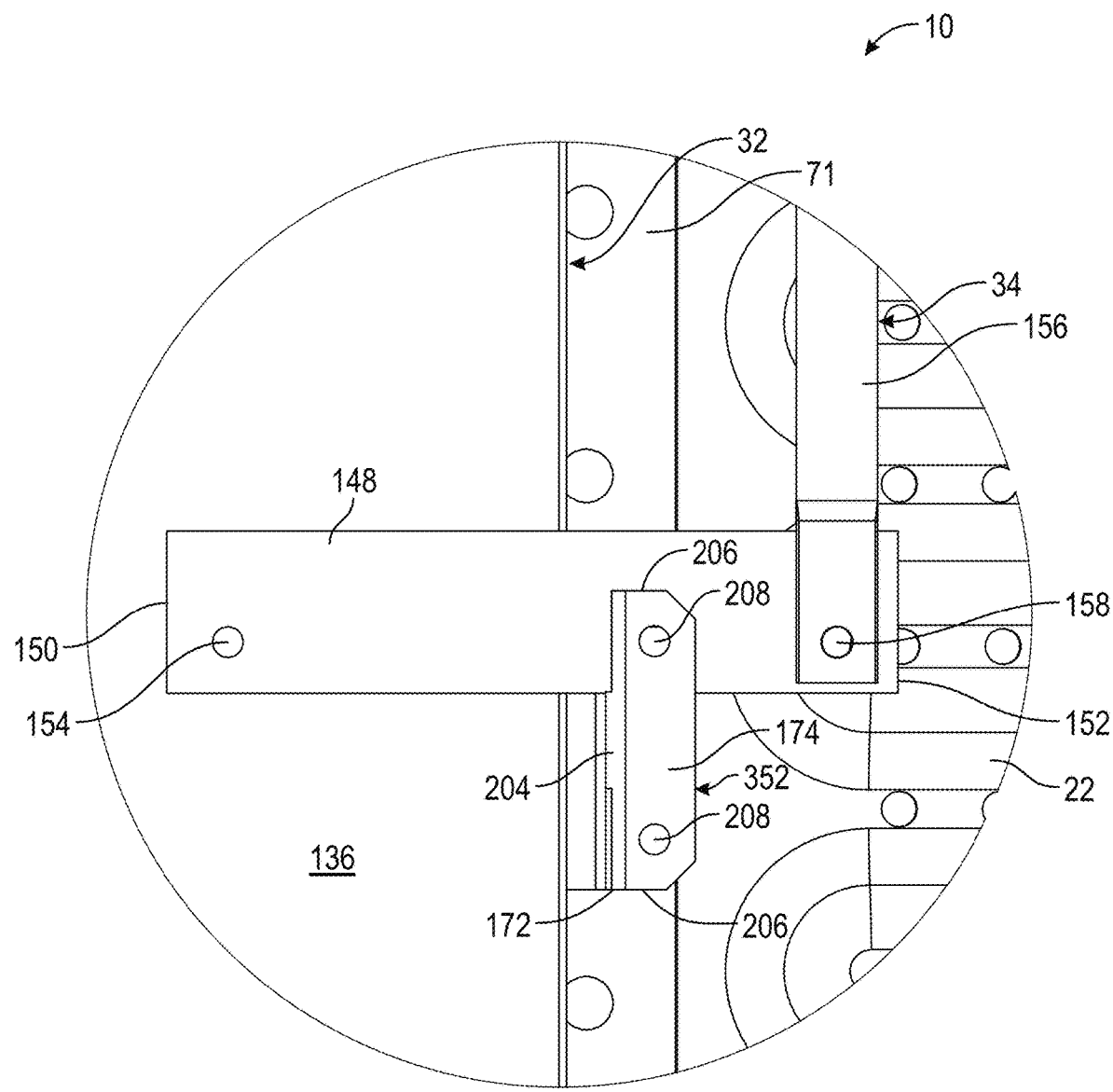
FIG. 42 is a close up front view of a lower end of a handle of the outer door of the safety door latch system shown in FIG. 38, consistent with one or more embodiments.
Figure 43:
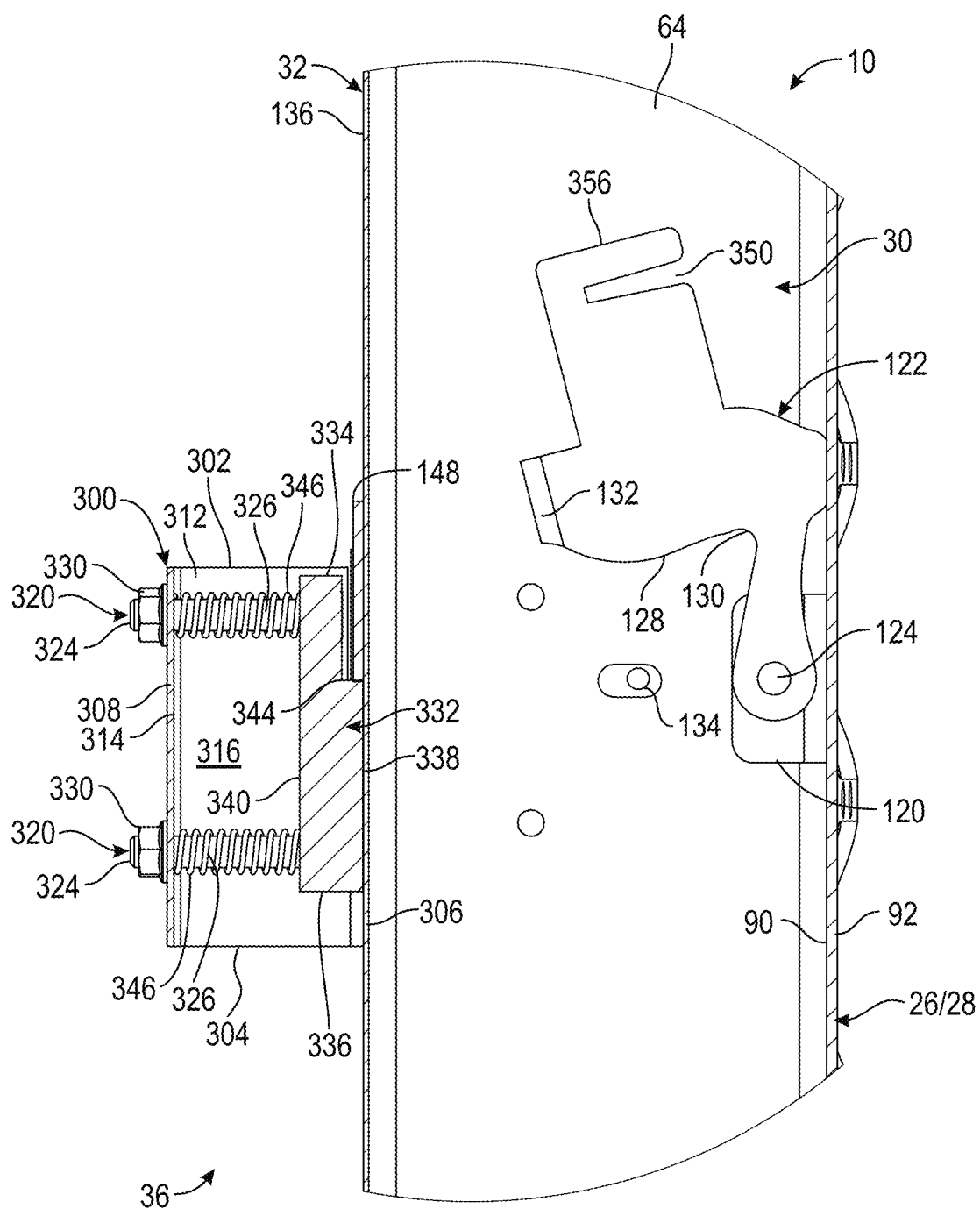
FIG. 43 is a close up cross section side view of a safety door latch, consistent with one or more embodiments; the view showing the safety door latch in a disengaged position.
Figure 44:
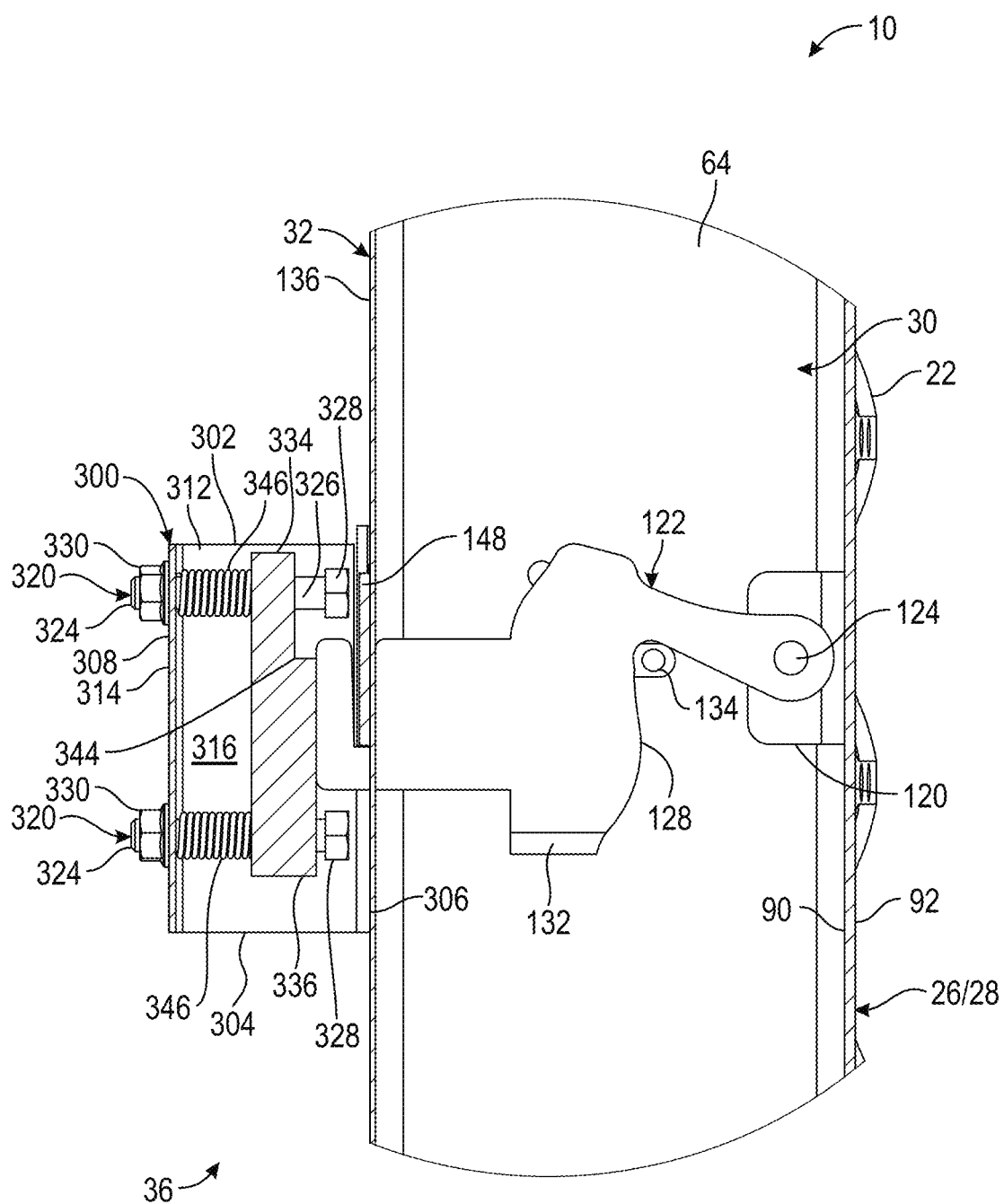
FIG. 44 is a close up cross section side view of the safety door latch shown in FIG. 43, consistent with one or more embodiments; the view showing the safety door latch in an engaged position.
Figure 45:
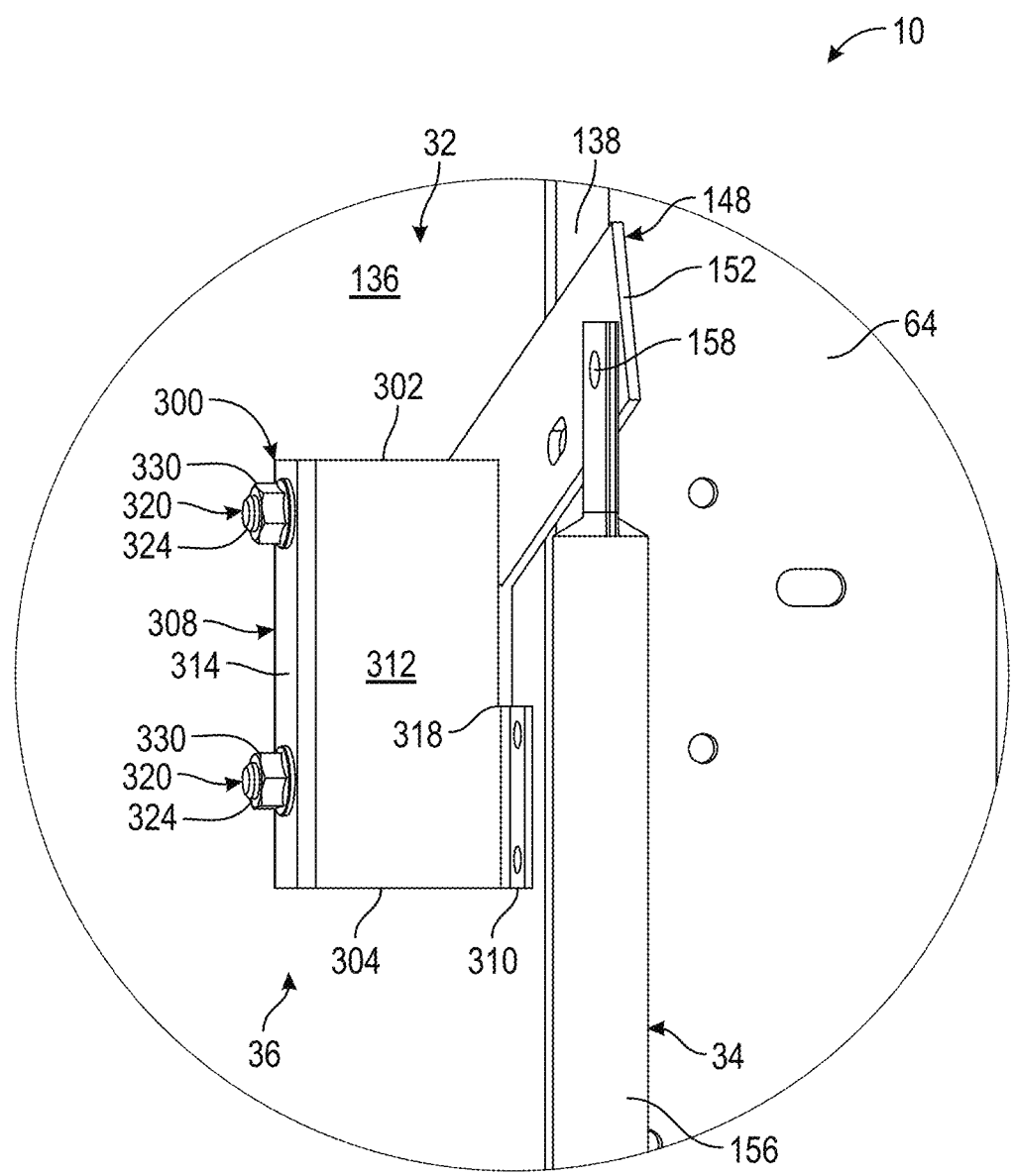
FIG. 45 is a close up slightly forward right side perspective view of an upper end of a handle of an outer door and safety mechanism, consistent with one or more embodiments; the view showing the safety mechanism in a disengaged position.
Figure 46:
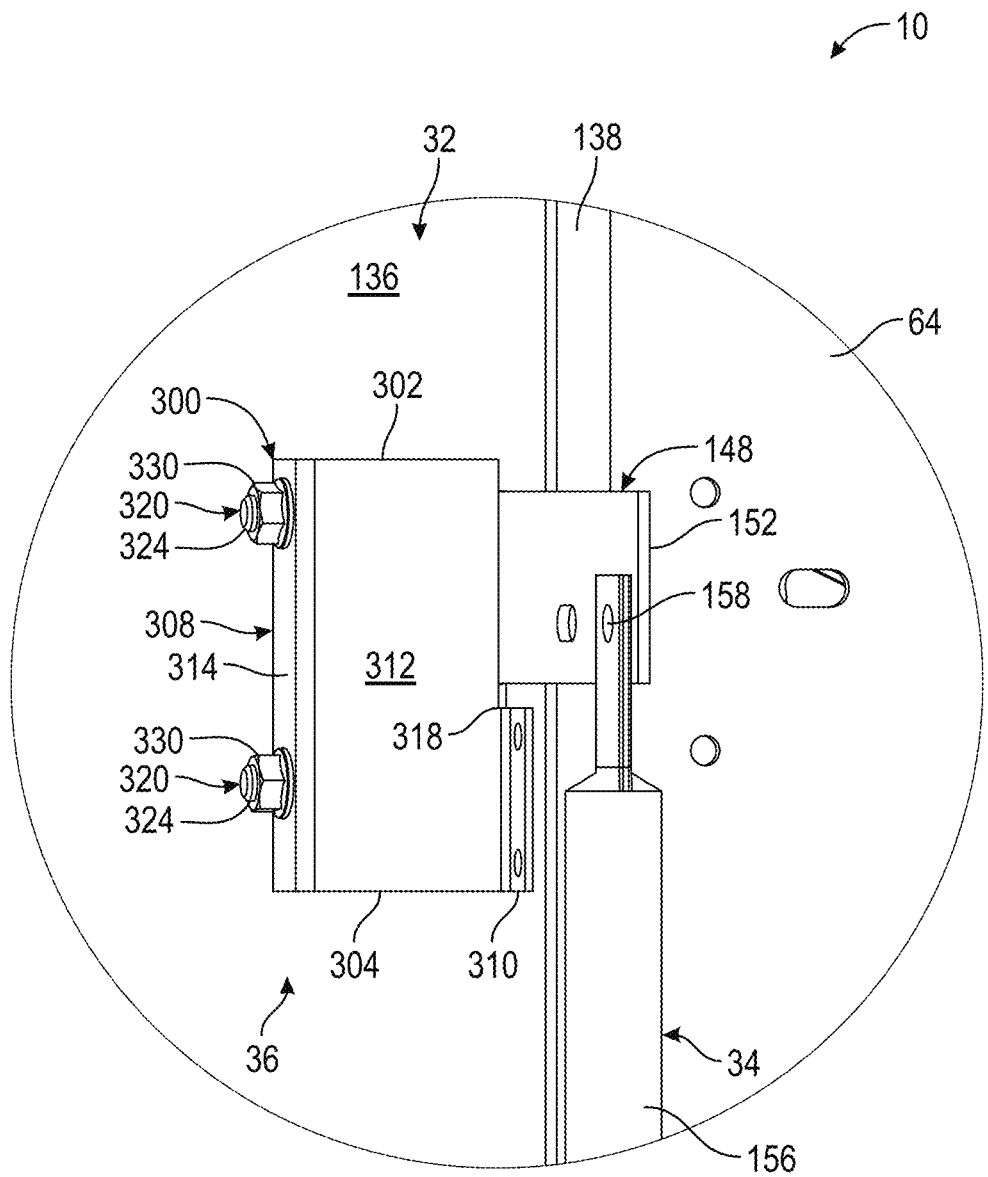
FIG. 46 is a close up slightly forward right side perspective view of an upper end of a handle of an outer door and safety mechanism, consistent with one or more embodiments; the view showing the safety mechanism in an engaged position.

When outer door 32 is in a fully closed position and safety mechanism 36 is in a fully lowered position of fully engaged position, the outward end of arm 286 rotates into one of the slots 272 in protrusion thereby locking outer door 32 in a closed position through the connection between arm 286 and slot 272 of protrusion 270, as is shown in FIG. 36.

In this position, outer door 32 may not be opened by merely pulling handle assembly 276. In contrast, to open outer door 32 from this fully locked or fully latched position, knob 278 of handle assembly 276 must be rotated thereby causing arm 286 to rotate out of slot 272 of protrusion 270 thereby allowing the free opening of outer door 32.

Once the handle assembly 30 of upper door panel 28U is opened, crossbar 250 moves upward, upon the force of bias member 274, thereby moving protrusion 270 upward and out of the reach of latch 284 and arm 286 thereby preventing the locking or latching of outer door 32 in a closed position until the upper door panel 28U is again closed.

Leaking Grain Arrangement:

In an alternative arrangement, safety mechanism 36 may be formed of any other arrangement that identifies to a user that the inner door 26 is not closed. In an alternative arrangement, a hole is placed in lower frame member 62 of door frame 16 in the area positioned between inner door 26 and outer door 32. In this arrangement, if the grain bin 12 is filled when the inner door 26 is open and the outer door 32 is closed, grain will leak out through the hole in the lower frame member 62 thereby informing the user of the dangerous condition that the inner door 26 is open and the outer door 32 is closed. In response to seeing grain leaking out of the hole in lower frame member 62, the user will know not to open the outer door 32. In response to this information the user will know to take corrective actions such as stop the flow of additional grain into grain bin 12 and thereafter drain the grain from the grain bin 12 and close the inner door 26 before refilling the grain bin 12.

Safety Mechanism—Alternative Arrangement:

With reference to FIGS. 37-51 an alternative arrangement of a safety grain bin door latch system 10 is presented. This alternative arrangement presented in FIGS. 37-51 is similar to the safety grain bin door latch system 10 presented in FIGS. 1-27 as well as being similar to the safety grain bin door latch system 10 presented in FIGS. 28-36 and therefore unless specifically stated otherwise herein, the prior teaching and disclosure shown in FIGS. 1-27 as well as in FIGS. 28-36 applies equally to the alternative arrangement shown in FIGS. 37-51. That is, the arrangement shown in FIGS. 37-51 is configured to be used with the same or similar grain bin 12, door assembly 14, door frame 16 and the like with the difference being changes to safety mechanism 36 as is described herein.

In the arrangement shown, as one example, safety grain bin door latch system 10 includes a safety mechanism 36. Safety mechanism 36 may be formed of any suitable size, shape and design and is configured to allow outer door 32 to be locked in a closed position on door frame 16 when the inner door 26 is in a closed and locked position, and, similarly, safety mechanism 36 is configured to prevent outer door 32 from being locked in a closed position on door frame 16 when the inner door 26 is in an open and unlocked position.

In the arrangement shown, as one example, safety mechanism 36 includes a housing 300 having an upper end 302, a lower end 304, a forward side 306, a rearward side 308, and having flanges 310, sidewalls 312 and a rear wall 314 that forms a hollow interior 316 and includes a step 318 at its forward-upper end, among other components and features as is further described herein. In the arrangement shown, as one example, safety mechanism 36 includes guides 320 having a forward end 322, a rearward end 324, a shaft 326, a head 328, and a nut 330, among other components and features as is further described herein. In the arrangement shown, as one example, safety mechanism 36 includes a stop member 332 having an upper end 334, a lower end 336, a forward side 338, a rearward side 340, opposing sidewalls 342, and includes a step 344 at its forward-upper end, among other components and features as is further described herein. In the arrangement shown, as one example, safety mechanism 36 includes bias members 346, a slot 348 in outer door 32, a slot 350 in end bracket 122, and a stationary bracket 352 having slots 172, outer flange 174, corner section 204, ends 206 and holes 208, among other components and features as is further described herein.

Housing 300:

In the arrangement shown, as one example, safety mechanism 36 includes a housing 300. Housing 300 may be formed of any suitable size, shape and design and is configured to allow outer door 32 to be locked in a closed position on door frame 16 when the inner door 26 is in a closed and locked position, and, similarly, to prevent outer door 32 from being locked in a closed position on door frame 16 when the inner door 26 is in an open and unlocked position.

In the arrangement shown, as one example, housing 300 is a generally square or rectangular member that is connected to the exterior surface 136 of outer door 32 and is configured to cover a slot 348 in outer door 32. In the arrangement shown, as one example, housing 300 has an upper end 302, a lower end 304, a forward side 306, and a rearward side 308.

Flanges 310:

In the arrangement shown, as one example, housing 300 has a pair of flanges 310. Flanges 310 may be formed of any suitable size, shape and design and are configured to connect housing 300 to outer door 32 as well as to connect to other components of housing 300 such as sidewalls 312. Flanges 310 define the forward side of the hollow interior 316 of housing 300. In the arrangement shown, as one example, flanges 310 are positioned at the forward side 306 of housing 300 and extend outward therefrom. In the arrangement shown, as one example, flanges 310 are generally flat and planar members that extend outward from the lower exterior sides of sidewalls 312 in generally parallel planar relationship to one another and in approximate parallel planar alignment to the planar exterior surface 136 of outer door 32. In this way, when housing 300 is placed upon the exterior surface 136 of outer door 32, the forward surface of flanges 310 engage the exterior surface 136 of outer door 32 in a generally planar engagement.

Flanges 310 may be connected to outer door 32 by any manner, method or means including screwing, bolting, riveting, welding, crimping, friction-fitting, adhering, or the like or any combination thereof or any other manner, method or means. In the arrangement shown, as one example, flanges 310 include a pair of holes 354 that receive fasteners therein, such as screws, bolts or the like, that facilitate connection of housing 300 to outer door 32.

In the arrangement shown, as one example, the inward edges of flanges 310 connect to the forward edges of sidewalls 312. However, any other size, shape and configuration is hereby contemplated for use as flanges 310.

Sidewalls 312:

In the arrangement shown, as one example, housing 300 has a pair of sidewalls 312. Sidewalls 312 may be formed of any suitable size, shape and design and are configured to connect to flanges 310 at their forward end and connect to rear wall 314 at their rearward end. Sidewalls 312 define the outward sides of the hollow interior 316 of housing 300. In the arrangement shown, as one example, sidewalls 312 are generally flat and planar members that extend rearward from flanges 310 at their forward end to rear wall 314 at their rearward end in generally parallel paced relationship to one another. In the arrangement shown, as one example, sidewalls 312 extend in approximate perpendicular planar alignment to the planes formed by flanges 310. In the arrangement shown, as one example, sidewalls 312 extend in approximate perpendicular planar alignment to the plane formed by exterior surface 136 of outer door 32.

In the arrangement shown, as one example, the rearward edges of sidewalls 312 connect to the outward edges of rear wall 314. However, any other size, shape and configuration is hereby contemplated for use as sidewalls 312.

Rear Wall 314:

In the arrangement shown, as one example, housing 300 has a rear wall 314. Rear wall 314 may be formed of any suitable size, shape and design and is configured to connect opposing sidewalls 312 at their rearward end. Rear wall 314 defines the rearward side of hollow interior 316 of housing 300. In the arrangement shown, as one example, rear wall 314 is a generally flat and planar member that extends from side-to-side between the rearward edges of sidewalls 312. In the arrangement shown, as one example, rear wall 314 extends in approximate perpendicular planar alignment to the planes formed by sidewalls 312. In the arrangement shown, as one example, rear wall 314 extends in approximate parallel spaced planar alignment to the plane formed by flanges 310 as well as the plane formed by exterior surface 136 of outer door 32.

In the arrangement shown, as one example, rear wall 314 includes a pair of holes therein that are configured to receive guides 320 therein. However, any other size, shape and configuration is hereby contemplated for use as rear wall 314.

Hollow Interior 316:

In the arrangement shown, as one example, housing 300 has a hollow interior 316. Hollow interior 316 may be formed of any suitable size, shape and design and is configured to provide space for and hold the internal components of housing 300 such as portions of guides 320, stop member 332, bias members 346 and the like. In the arrangement shown, as one example, hollow interior 316 is a generally square or rectangular space defined by the exterior surface 136 of outer door 32 at its forward side, the interior surfaces of sidewalls 312 at its lateral sides, the forward surface of rear wall 314 at its rearward side, by the upper end 302 of housing 300 at its upper side, and by the lower end 304 of housing 300 at its lower side. However, any other size, shape and configuration is hereby contemplated for use as hollow interior 316.

Step 318:

In the arrangement shown, as one example, housing 300 has step 318. Step 318 may be formed of any suitable size, shape and design and is configured to provide space to receive bracket 148 of handle assembly 34 between housing 300 and exterior surface 136 of outer door 32. In the arrangement shown, as one example, step 318 is a generally square or rectangular shaped notch in sidewalls 312. In the arrangement shown, as one example, step 318 is positioned at the forward side 306 of sidewalls 312 and extends from the upper end 302 of sidewalls 312 downward before terminating at the upper end of flanges 310. In the arrangement shown, as one example, step 318 is approximately the same width as, or slightly wider than, the width of bracket 148 to allow for clearance. Or, said another way, step 318 is wide enough to allow bracket 148 to fit between the exterior surface 136 of outer door 32 and the forward side 306 of sidewalls 312. The lower end of step 318 serves as a stop surface stopping the lowering of bracket 148 into step 318, which coincides with the upper surface of flanges 310. However, any other size, shape and configuration is hereby contemplated for use as step 318.

Guides 320:

In the arrangement shown, as one example, housing 300 includes one or more guides 320. Guides 320 may be formed of any suitable size, shape and design and are configured to connect to housing 300 and provide alignment to and guidance to stop member 332 as stop member 332 reciprocates between a forward most position and a rearward most position within hollow interior 316.

In the arrangement shown, as one example, two guides 320 are shown in use with housing 300. One guide 320 positioned adjacent the upper end 302 of housing 300 and one guide 320 positioned adjacent the lower end 304 of housing 300. However, any other number of guides 320 is hereby contemplated for use. In the arrangement shown, as one example, guides 320 extend forward from rear wall 314 in approximate parallel spaced relation from one another within hollow interior 316.

In the arrangement shown, as one example, guides 320 extend a length from a forward end 322 to a rearward end 324 and include a generally cylindrical shaft 326 having a wider head 328 positioned at their forward end 322 and a threaded section at their rearward end 324 that receives nut 330.

In the arrangement shown, as one example, rearward end 324 of guides 320 include a threaded section that receives nut 330 thereon to facilitate tightening of guide 320 to housing 300. In the arrangement shown, as one example, the rearward end 324 of guides 320 extends through holes in rear wall 314 of housing 300 and nut 330 is placed over rearward end 324 thereby facilitating tightening against rear wall 314. Guides 320 extend forward from the interior surface of rear wall 314 a distance before terminating at head 328. In the arrangement shown, as one example, heads 328 are conventional hex-heads, such as that seen on conventional bolts, however any other configuration is hereby contemplated for use.

In the arrangement shown, as one example, shaft 326 of guides 320 extend through holes in stop member 332. As heads 328 are wider than shaft 326, heads 328 serve as a stop-feature for stop member 332 thereby preventing stop member 332 from sliding off of guides 320. In this way, heads 328 serve as a forward-most point of travel for stop member 332 upon guides 320.

Stop Member 332:

In the arrangement shown, as one example, housing 300 includes stop member 332. Stop member 332 may be formed of any suitable size, shape and design and is configured to fit within hollow interior 316 of housing 300 and is configured to reciprocate between a forward-most position and a rearward-most position as it slides upon shafts 326 of guides 320 and urged by bias members 346. Stop member 332 is configured to allow bracket 148 of handle assembly 34 to be latched in a closed position within the gap formed by step 318 of housing 300 when stop member 332 is in a rearward most position (also known as the "closed position") when handle assembly 30 of inner door 26 is in a closed position. Stop member 332 is configured to stop bracket 148 of handle assembly 34 from being latched in a closed position within the gap formed by step 318 of housing 300 when stop member 332 is in a forward most position (also known as the "open position") when handle assembly 30 of inner door 26 is in an open position.

In the arrangement shown, as one example, stop member 332 is a generally square or rectangular member that fits within hollow interior 316 with generally close or tight tolerances while allowing stop member 332 to slide between a forward-most position and a rearward-most position within hollow interior 316 as it slides upon shafts 326 of guides 320 and urged by bias members 346. These close or tight tolerances between the exterior dimensions of stop member 332 and the interior dimensions of hollow interior 316 provide alignment and guidance and strength to stop member 332 within hollow interior 316 of housing 300.

In the arrangement shown, as one example, stop member 332 has a generally flat and planar upper end 334 that extends in approximate parallel spaced relation to a generally flat and planar lower end 336. In the arrangement shown, as one example, upper end 334 of stop member 332 extends in approximate parallel spaced relation to the upper end 302 of housing 300. In the arrangement shown, as one example, upper end 334 of stop member 332 is recessed below the upper end 302 of housing 300 a distance. In the arrangement shown, as one example, lower end 336 of stop member 332 extends in approximate parallel spaced relation to the lower end 304 of housing 300. In the arrangement shown, as one example, lower end 336 of stop member 332 is recessed or raised above the lower end 304 of housing 300 a distance.

In the arrangement shown, as one example, stop member 332 has a generally flat and planar forward side 338 that extends in approximate parallel spaced relation to a generally flat and planar rearward side 340. In the arrangement shown, as one example, the generally flat and planar upper end 334 and lower end 336 extend in approximate perpendicular planar alignment to the generally flat and planar forward side 338 and rearward side 340. In the arrangement shown, as one example, forward side 338 of stop member 332 extends in approximate parallel spaced relation to the forward side 306 of housing 300. In the arrangement shown, as one example, forward side 338 of stop member 332 extends in approximate parallel spaced relation to the plane formed by the exterior surface 136 of outer door 32. In the arrangement shown, as one example, rearward side 340 of stop member 332 extends in approximate parallel spaced relation to the interior surface of rear wall 314 of housing 300.

In the arrangement shown, as one example, stop member 332 has generally flat and planar sidewalls 342 that extends in approximate parallel spaced relation to one another. In the arrangement shown, as one example, the generally flat and planar sidewalls 342 extend in approximate perpendicular planar alignment to the generally flat and planar upper end 334 and lower end 336. In the arrangement shown, as one example, the generally flat and planar sidewalls 342 extend in approximate perpendicular planar alignment to the generally flat and planar forward side 338 and rearward side 340. In the arrangement shown, as one example, sidewalls 342 extend in approximate parallel spaced relation to the interior surface of sidewalls 312.

In the arrangement shown, as one example, stop member 332 has step 344. Step 344 may be formed of any suitable size, shape and design and is configured to provide space to receive bracket 148 of handle assembly 34 between housing 300 and exterior surface 136 of outer door 32. In the arrangement shown, as one example, step 344 is a generally square or rectangular shaped notch in forward side 338 of stop member 332 that extends from sidewall 342 to sidewall 342. In the arrangement shown, as one example, step 344 is positioned at the forward side 338 stop member 332 and extends from the upper end 334 downward a distance before terminating at a generally perpendicular shelf. In the arrangement shown, as one example, the depth of step 344 is approximately the same width as, or slightly wider than, the width of bracket 148 to allow for clearance. Or, said another way, step 344 is wide enough to allow bracket 148 to fit between the exterior surface 136 of outer door 32 and the forward side 338 of stop member 332. The lower end of step 344 serves as a stop surface stopping the lowering of bracket 148 into step 344 when stop member stop member 332 is in a forward position or open position (when inner door 26 is open).

Figure 47:
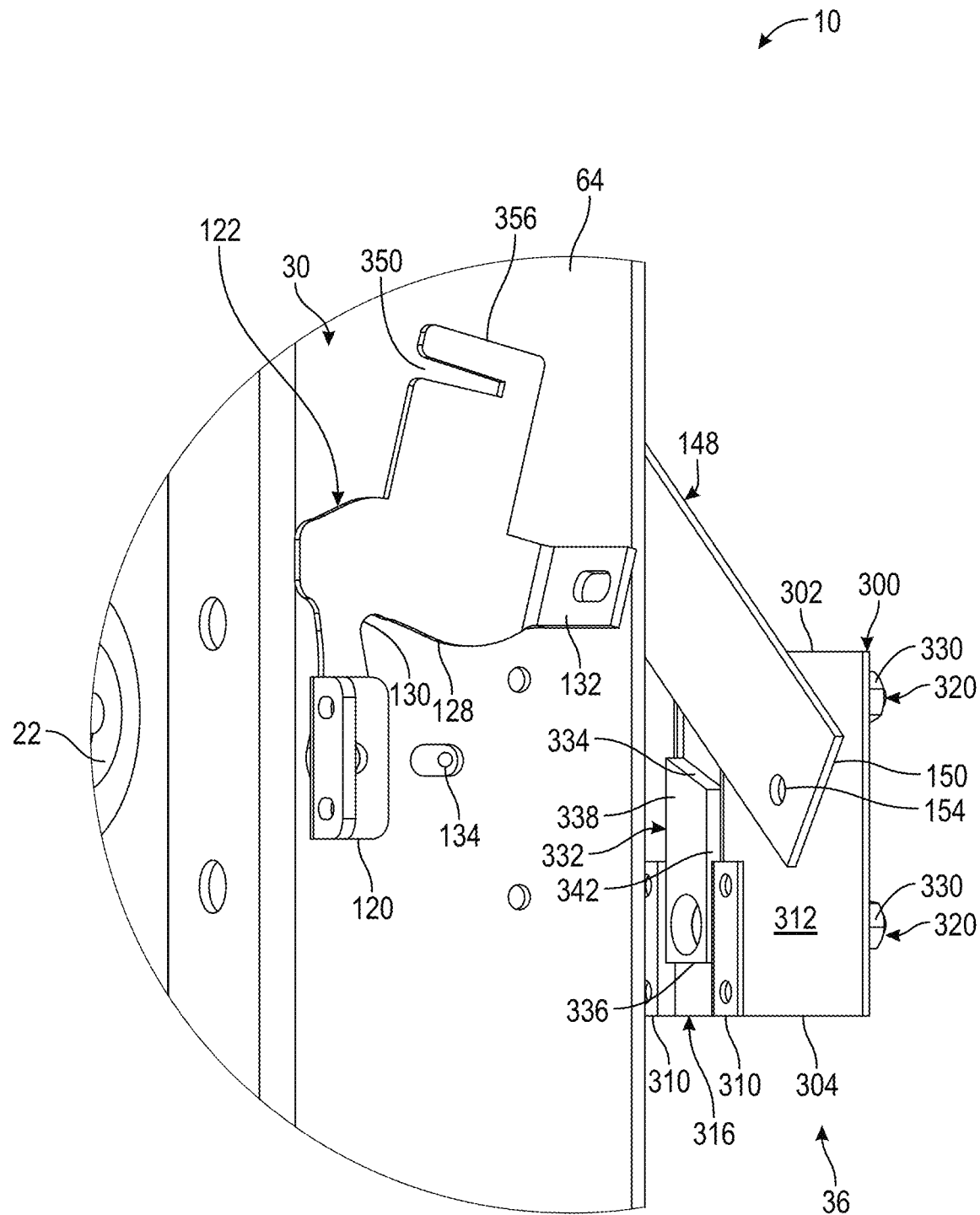
FIG. 47 is a close up cross section side view of a safety mechanism, consistent with one or more embodiments; the view showing the safety mechanism in a disengaged position.
Figure 48:
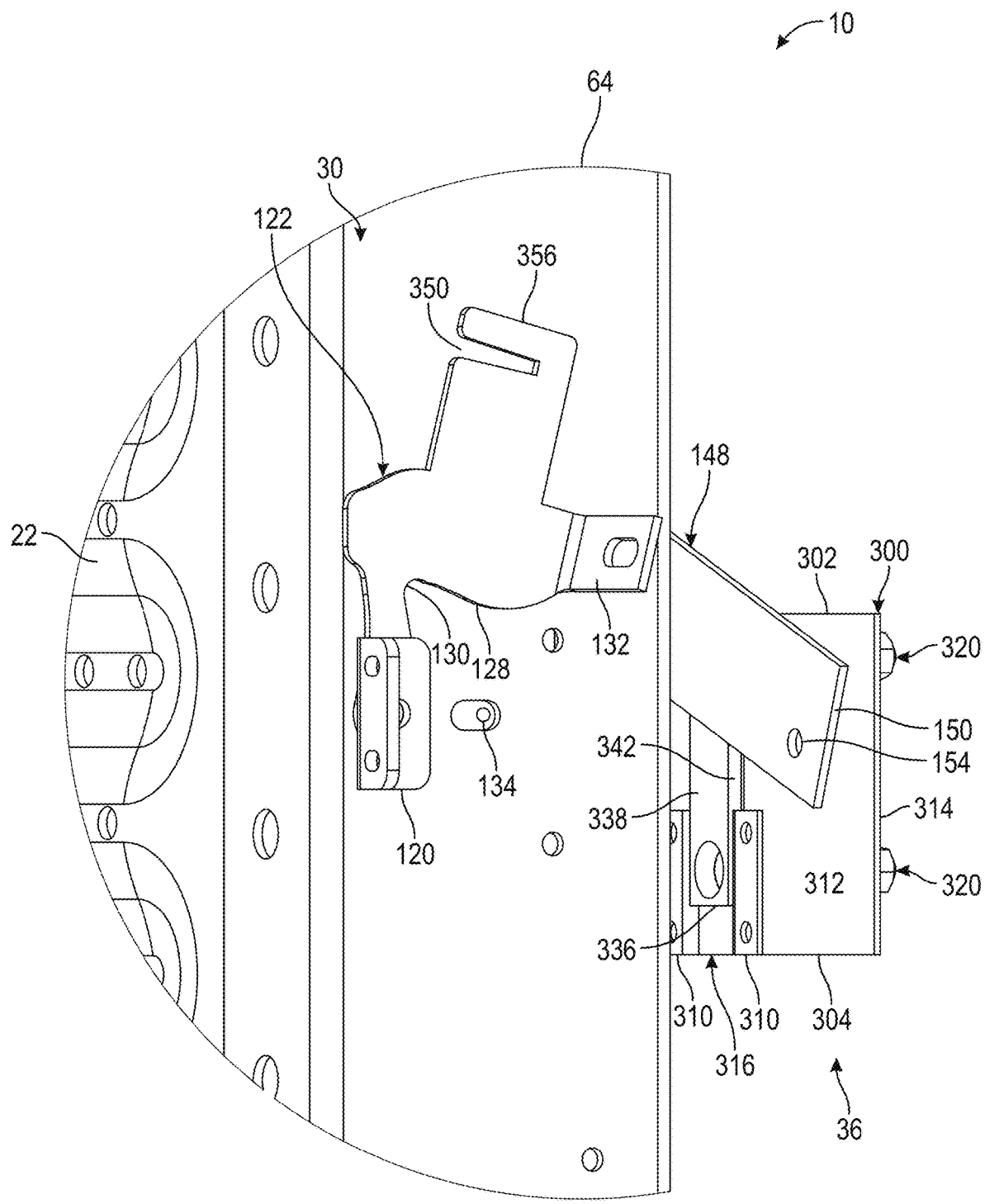
FIG. 48 is a close up cross section side view of a safety mechanism, consistent with one or more embodiments; the view showing the safety mechanism in a disengaged position.
Figure 49:
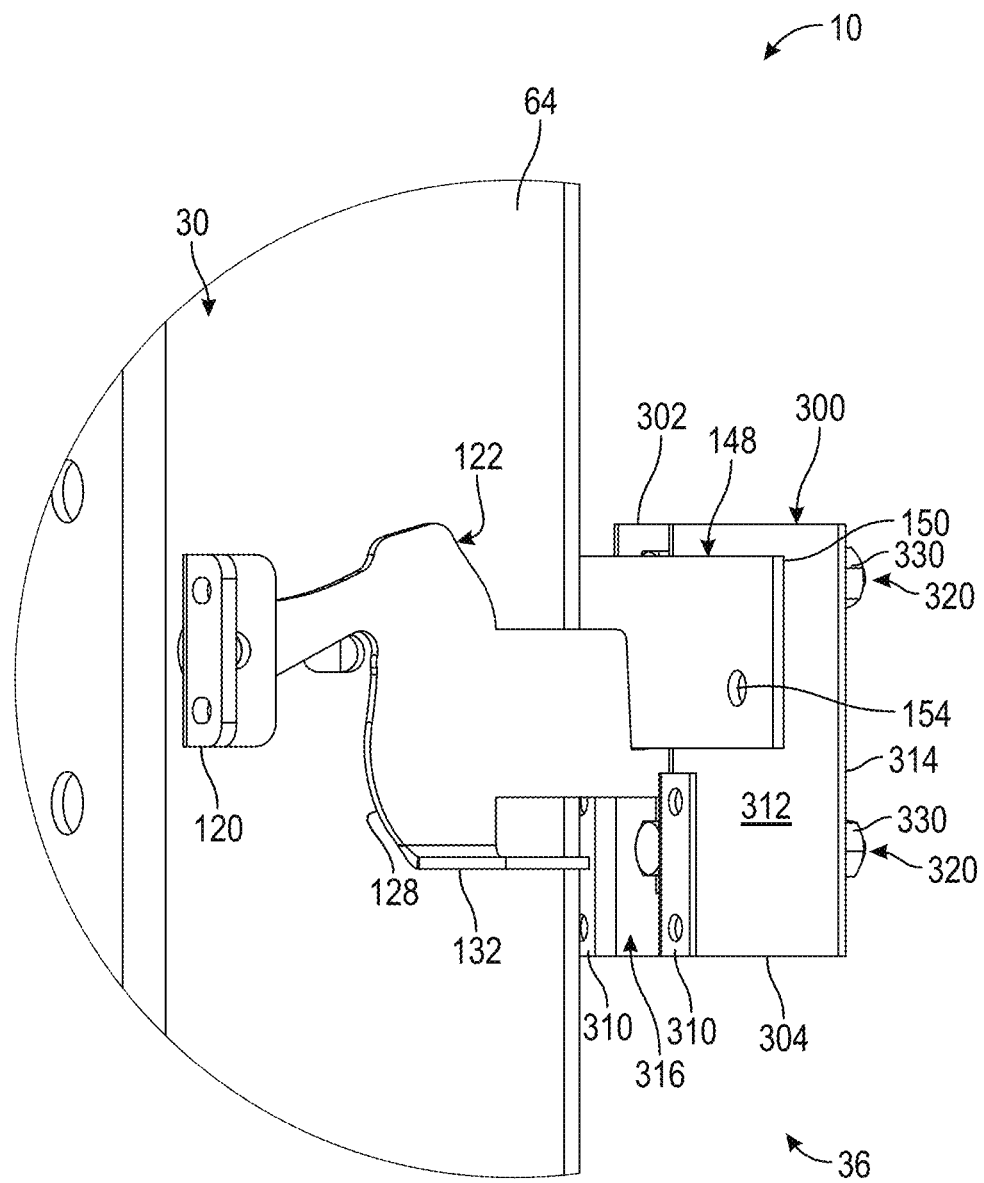
FIG. 49 is a close up cross section side view of a safety mechanism, consistent with one or more embodiments; the view showing the safety mechanism in an engaged position.
Figure 50:
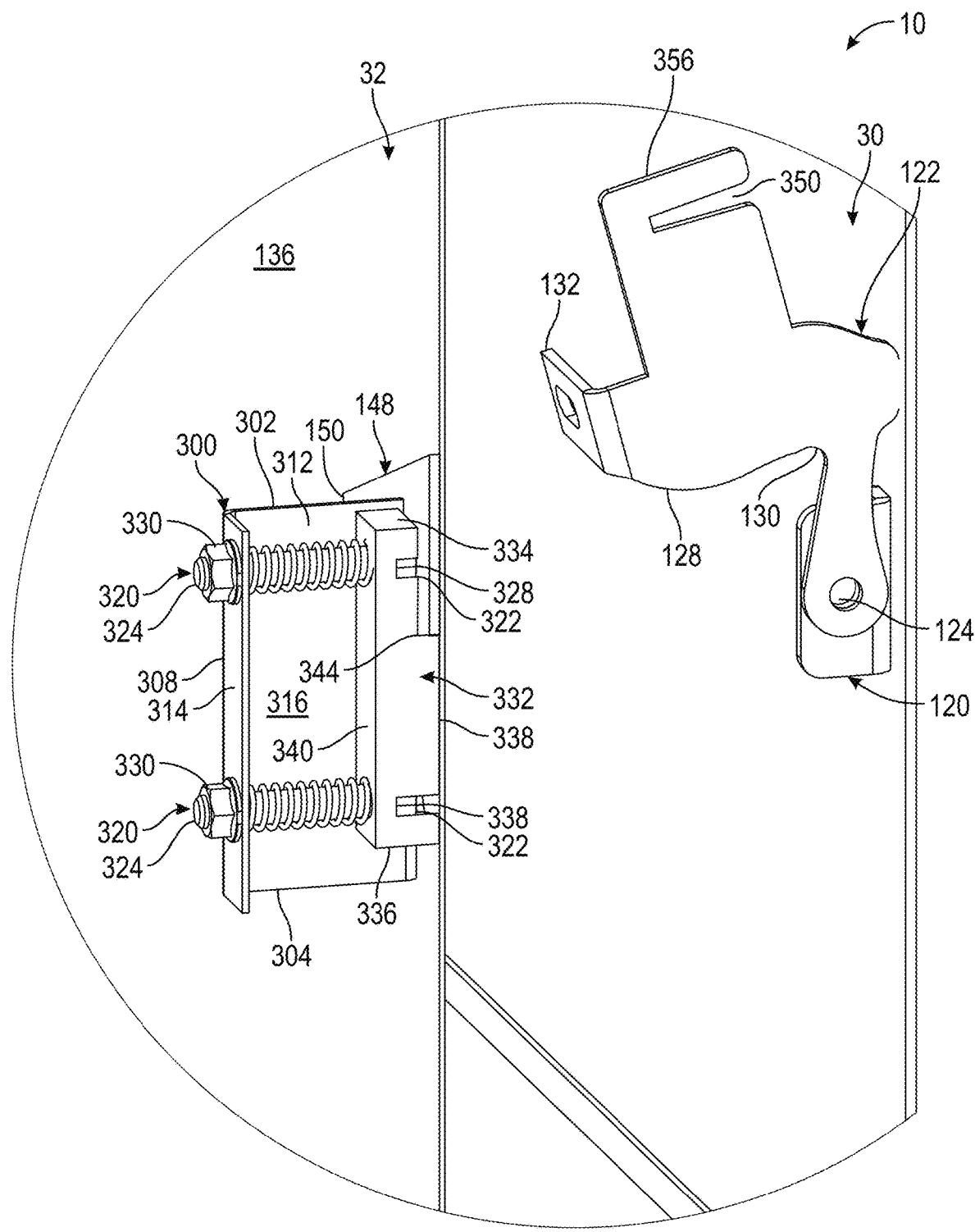
FIG. 50 is a close up cross section side view of a safety mechanism, consistent with one or more embodiments; the view showing the safety mechanism in a disengaged position.
Figure 51:
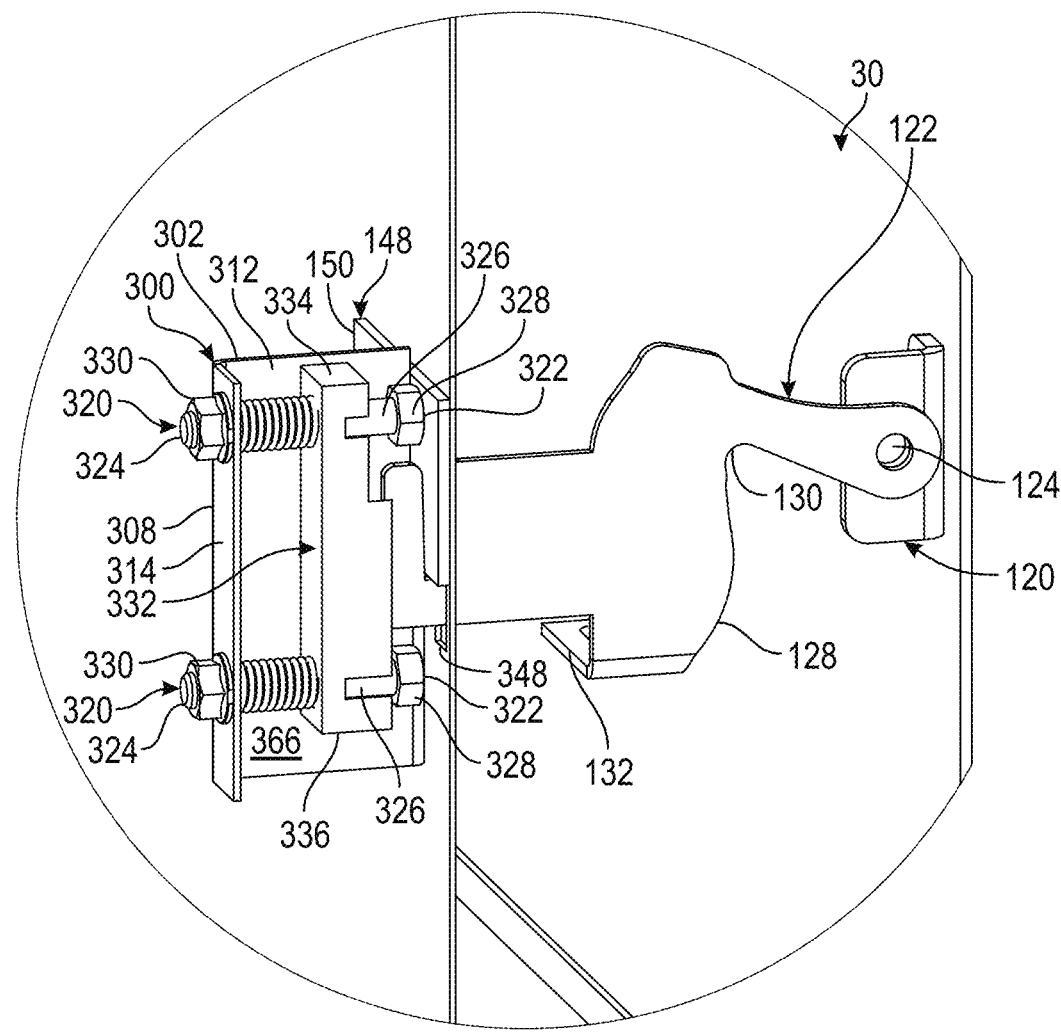
FIG. 51 is a close up cross section side view of a safety mechanism, consistent with one or more embodiments; the view showing the safety mechanism in an engaged position.

Notably, as can be seen in FIGS. 47 and 48, the upper surface or ledge or stop surface of step 344 angles slightly from sidewall 342. This angle of the upper surface of step 344 coincides with the angle of the lower surface of bracket 148 of handle assembly 34 when handle assembly 34 is in a raised and unlocked position. This angled upper surface of step 344 provides maximum surface area of engagement between the upper surface of step 344 and the lower surface of bracket 148 when bracket 148 is lowered into step 318 of housing 300 when stop member 332 is in a forward and open position. In this way, step 344 of stop member 332, and its angled upper surface, provides a secure stop surface thereby preventing bracket 148 and handle assembly 34 from being lowered when stop member 332 is in a fully forward or open position. Notably, while step 344 angles from sidewall 342 to sidewall 342 of stop member 332, step 344 extends approximately perpendicularly or at a right angle from the forward side 338 of stop member 332. However, any other size, shape and configuration is hereby contemplated for use as step 344 and/or stop member 332 for that matter.

In the arrangement shown, as one example, the forward most position of stop member 332 is defined by engagement between the forward side 338 of stop member 332 with the exterior surface 136 of outer door 32. This forward most position of stop member 332 occurs under the forward pressure of bias members 346.

The rearward most position of stop member 332 is defined by full compression of bias members 346 with stop member 332 compressed within hollow interior 316 and towards rear wall 314.

Bias Members 346:

In the arrangement shown, as one example, housing 300 includes bias members 346. Bias members 346 may be formed of any suitable size, shape and design and is configured to urge stop member 332 forward such that its resting position is forward or in the open position thereby preventing the lowering and latching of bracket 148 of handle assembly 34. In the arrangement shown, as one example, a bias member 346 is positioned around the shaft 326 of guides 320 and is formed of a coil spring. In this arrangement, as one example, bias members 346 are compressed between the interior surface of rear wall 314 of housing 300 and the rearward side 340 of stop member 332. In addition, bias member 346 are constrained by being placed around guides 320. In this way, bias members 346 allow stop member 332 to move rearward into hollow interior 316 upon guides 320 when sufficient force is applied to the forward side 338 of stop member 332 that is greater than the forward pressure applied by bias members 346. However, in its natural state, bias members 346 cause the forward side 338 of stop member 332 to engage the exterior surface 136 of outer door 32 thereby stopping bracket 148 of handle assembly 34 from moving past step 344 of stop member 332 (this is shown in FIG. 43, FIG. 45, FIG. 47, FIG. 48, and FIG. 50) thereby preventing latching of bracket 148 of handle assembly 34. When bias members 346 are compressed, stop member 332 retreats or moves rearward within hollow interior 316 of housing 300 thereby allowing the lower surface of bracket 148 of handle assembly 34 to move past step 344 of stop member 332 (this is shown in FIG. 44, FIG. 46, FIG. 49 and FIG. 51) thereby allowing latching of bracket 148 of handle assembly 34.

In the arrangement shown, as one example, rearward movement of stop member 332 is caused by the protrusion of the forward end 356 of end bracket 122 through slot 348 in outer door 32 thereby exposing slot 350 in end bracket 122 thereby allowing latching of bracket 148 of handle assembly 34 into slot 350 in end bracket 122. That is, when outer door 32 is closed upon door frame 16 when handle assembly 30 of upper door panel 28U is in a closed position, the forward end 356 of end bracket 122 protrudes through slot 348 in outer door 32 thereby exposing slot 350 in end bracket 122 on the exterior side of outer door 32. As outer door 32 is closed upon door frame 16, forward end 356 of end bracket 122 passes through slot 348 in outer door 32 and engages the forward side 338 of stop member 332. As outer door 32 continues to be closed, the engagement between forward end 356 of end bracket 122 and the forward side 338 of stop member 332 causes stop member 332 to move rearward within hollow interior 316 as bias members 346 compress. This continues until outer door 32 is fully closed upon door frame 16 at which point the forward end 356 of end brackets 122 protrude past the exterior surface 136 of outer door 32 a distance thereby exposing slot 350 of end bracket 122 that is configured to receive bracket 148 of handle assembly 34 therein, as is further described herein, thereby allowing locking and latching of handle assembly 34.

Slot 348 (of Outer Door 32):

In the arrangement shown, as one example, outer door 32 includes slot 348. Slot 348 may be formed of any suitable size, shape and design and is configured to allow the passage of forward end 356 of end bracket 122 through the skin of outer door 32 when handle assembly 30 of upper door panel 28U is in a closed position. In the arrangement shown, as one example, slot 348 is a generally elongated rectangular hole or opening in outer door 32 that is sized and shaped to be slightly larger than the forward end 356 of end bracket 122 and is positioned to fit around the forward end 356 of end bracket 122 when handle assembly 30 of upper door panel 28U is in a closed position. In the arrangement shown, as one example, slot 348 is sized with close and tight tolerances to forward end 356 of end bracket 122.

In one arrangement, slot 348 is fully covered by forward side 338 of stop member 332 when stop member 332 is in a forward or open position. In an alternative arrangement, in the arrangement shown, as one example, partially covered by forward side 338 of stop member 332 when stop member 332 is in a forward or open position. In this arrangement, when bracket 148 of handle assembly 34 is lowered and in engagement with step 344 of stop member 332 bracket 148 covers the remaining portion of slot 348.

Slot 350 (of End Bracket 122 of Handle Assembly 34):

In the arrangement shown, as one example, forward end 356 of end bracket 122 of handle assembly 30 includes a slot 350 therein. Slot 350 may be formed of any suitable size, shape and design and is configured to receive the lower end of bracket 148 of handle assembly 34. In the arrangement shown, as one example, slot 350 is a generally square or rectangular shaped slot that extends downward from the upper surface of end bracket 122 a distance. Slot 350 is sized and shaped such that all or at least a portion of slot 350 extends past the exterior surface 136 of outer door 32 when handle assembly 30 of upper door panel 28U is in a closed position. This portion of slot 350 is configured to receive bracket 148 of handle assembly 34 therein when handle assembly 34 is in a latched and locked position.

Stationary Bracket 352:

In the arrangement shown, as one example, system 10 includes a stationary bracket 352. That is, in the arrangement shown, as one example, housing 300 is positioned to engage the upper-positioned bracket 148 of handle assembly 34. Housing 300 is configured to stop the upper-positioned bracket 148 from being lowered and latched when handle assembly 30 of upper door panel 28U is in an open position. By housing 300 stopping the upper-positioned bracket 148 from being lowered and latched, housing 300 simultaneously stops lower-positioned bracket 148 from being lowered and subsequently latched.

However, when upper-positioned bracket 148 is allowed to be lowered and latched into slot 350 of forward end 356 of end bracket 122 it is desirable to also and/or simultaneously latch the lower-positioned bracket 148 to provide a more secure closure of outer door 32. Because housing 300 stops the upper-positioned bracket 148 from being lowered when upper door panel 28U is in an open position, a stationary bracket 352 may be used to secure the lower-positioned bracket 148. Or, said another way, there is no need to block the lower-positioned bracket 148 from being lowered when it should not be lowered (because housing 300 already does that). As such a stationary bracket 352 may be used with a slot 172 that is always open may be used.

In the arrangement shown, as one example, stationary bracket 352 protrudes from and/or is secured in a stationary manner to door frame 16 in a position wherein lower-positioned bracket 148 may be secured when handle assembly 34 is moved to a closed or latched position. In the arrangement shown, as one example, stationary bracket 352 is similar to if not identical to the outer flange 174 having a slot 172 therein with corner section 204, ends 206 and holes 208 as is described herein. The difference being that stationary bracket 352, having outer flange 174 having a slot 172 therein with corner section 204, ends 206 and holes 208, is secured in a stationary manner to door frame 16. That is, when handle assembly 34 is lowered and upper positioned bracket 148 is received with step 318 of housing 300 and step 344 of stop member 332, the lower-positioned bracket 148 is simultaneously secured within slot 172 of stationary bracket 352. This secures the lower end of outer door 32 when the upper end of outer door 32 is secured by housing 300. As is previously described herein, holes 208 of outer flange 174 allow for locking of handle assembly 34 in a locked and latched position.

However, any other size, shape and configuration is hereby contemplated for use as stationary bracket 352.

In Operation:

In operation, the system 10 of FIGS. 37-51 prevents the user from latching the outer door 32 in a closed position when the inner door 26 is in an open and unlatched position.

If the user attempts to close and latch the outer door 32 in a closed position, the user will find that the stop member 332 of housing 300 in a forward or open position adjacent the exterior surface 136 of outer door 32. In this position, the lower surface of upper-positioned bracket 148 of handle assembly 34 engages the step 344 of stop member 332 thereby preventing the lowering of bracket 148 of handle assembly 34. This prevents a user from closing and latching the outer door 32, forgetting the inner door 26 is open and then filling the grain bin 12, which can damage or destroy the grain bin 12 and/or cause injury or death.

If the user attempts to close and latch the outer door 32, the user is reminded that they must first close and latch the inner door 26 in order to move the stop member 332 of housing 300 inward so as to allow upper-positioned bracket 148 of handle assembly 34 to be lowered into slot 350 in the forward end 356 of end bracket 122, which simultaneously allows the lower-positioned bracket 148 of handle assembly 34 to be lowered into slot 172 of stationary bracket 352 thereby latching or locking outer door 32 in a closed position only when inner door 26 is also in a closed position.

To close and latch the inner door 26 the user must close the inner door 26 in the appropriate manner as is described herein. When the user closes the upper door panel 28U this causes the forward end 356 of end bracket 122 to face forward, with slot 350 facing upward adjacent the forward end 356 of end bracket 122.

Thereafter, the user may close outer door 32. As the user closes the outer door 32, the forward end 356 of end bracket 122 passes through slot 348 of outer door 32. As the forward end 356 of end bracket 122 passes through slot 348 of outer door 32 the forward end 356 of end bracket 122 engages the forward side 338 of stop member 332 which is forced forward by bias members 346. As the user continues to close outer door 32, if enough force is applied to overcome the force applied by bias members 346, bias members 346 compress and stop member 332 moves rearward within hollow interior 316 of housing 300. As stop member 332 moves rearward as outer door 32 is closed, this exposes slot 350 in end bracket 122. Once outer door 32 is fully closed, causing stop member 332 to move to a fully retracted position or a fully retreated position within hollow interior 316 of housing 300, the lower end of upper-positioned bracket 148 of handle assembly 34 may be lowered within slot 350 of end bracket 122. This is accomplished by pushing inward on outer door 32 (to overcome the bias of bias members 346) while simultaneously pulling downward on crossbar 156 of handle assembly 34.

As crossbar 156 of handle assembly 34 is pulled downward (while outer door 32 is pushed inward), the lower end of upper-positioned bracket 148 is allowed to slide past step 344 of stop member 332 and into the slot 350 in forward end 356 of end bracket 122 thereby securing the upper-positioned bracket 148 in a latched and locked position. Simultaneously, the lower end of lower-positioned bracket 148 is allowed to slide into the slot 172 in the upper side of stationary bracket 352 thereby securing the lower-positioned bracket 148 in a latched and locked position.

To open outer door 32, the user simply raises crossbar 156 which simultaneously causes lower-positioned bracket 148 to slide out of the slot 172 in the upper side of stationary bracket 352, while upper-positioned bracket 148 is allowed to slide out of the slot 350 in forward end 356 of end bracket 122. Once the upper-positioned bracket 148 is allowed to slide out of the slot 350 in forward end 356 of end bracket 122, the spring bias applied by bias members 346 upon stop member 332 automatically pushes stop member 332 forward which has a tendency to push outer door 32 rearward once upper-positioned bracket 148 clears slot 350 in end bracket 122.

In this way, a secure, strong, rigid, and fool-proof safety grain bin door latch system 10 is presented that prevents the closing and latching and locking of outer door 32 unless the inner door 26 is fully and properly closed and latched.

Sensor System:

In an alternative arrangement, a safety grain bin door latch system 10 is presented using sensors 606 (not shown). This alternative arrangement presented is similar to the safety grain bin door latch system 10 is presented previously, and therefore unless specifically stated otherwise herein, the prior teaching and disclosure applies equally to this alternative arrangement using sensors 606. That is, the use of sensors 606 may be used alone and/or in association with the physical and mechanical arrangements shown herein.

In one arrangement, one or more sensors 606 may be associated with grain bin 12. Sensors 606 may be formed of any suitable size, shape and configuration and are configured to sense whether outer door 32 is closed and/or whether inner door 26 is closed. Sensors 606 may include but are not limited to, for example: proximity sensors, a pressure sensors, an optical sensors, a laser sensors, an infrared sensors, a conductivity sensors, a mechanical sensors, a switches, a magnetic sensors, a video sensors, a light sensors, audio sensors, position sensors, temperature sensors, humidity sensors, moisture sensors, chemical sensors, or any other form of a sensor or sensing device.

In one arrangement, one or more sensors 606 are associated with inner door 26. This sensor(s) 606 is configured to sense whether inner door 26 is closed. Or more specifically, this sensor(s) 606 is configured to sense whether the upper door panel 28U is closed, meaning that the entire inner door 26 is closed. In one arrangement, this sensor(s) 606 is positioned between the door frame 16 and upper panel 28U and senses when upper panel 28U is closed. In one arrangement, this sensor(s) 606 is positioned adjacent door frame 16 and upper panel 28U and senses when upper panel 28U is closed. In one arrangement, this sensor(s) 606 is positioned adjacent handle assembly 30 of inner door 26 (or more specifically in one arrangement, handle assembly 30 of upper panel 28U of inner door 26) and senses when upper panel 28U is closed by handle assembly 30 being closed. In one arrangement, one or more sensors 606 are associated with outer door 32. This sensor(s) 606 is configured to sense whether outer door 32 is closed. Or this sensor(s) 606 is configured to sense whether handle assembly 34 of outer door 32 is closed, meaning that the outer door 32 is closed. In one arrangement, this sensor(s) 606 is positioned between the door frame 16 and outer door 32 and senses when outer door 32 is closed. In one arrangement, this sensor(s) 606 is positioned adjacent door frame 16 and outer door 32 and senses when outer door 32 is closed. In one arrangement, this sensor(s) 606 is positioned adjacent handle assembly 34 of outer door 32 and senses when outer door 32 is closed by handle assembly 34 being closed.

In one arrangement, sensor(s) 606 associated with inner door 26 are electrically connected to a control system 600. In this arrangement, control system 600 is aware of whether inner door 26 is open, and when open, control system 600 locks out and/or prevents the powering of various systems that allow grain bin 12 to be filled such as augers, legs, air systems, valves, gates, spouts, etc., or any other filling device or any combination thereof. That is, when sensor(s) 606 associated with inner door 26 indicate to control system 600 that inner door 26 is open, control system 600 prevents the filling of grain bin 12.

In one arrangement, sensor(s) 606 associated with outer door 32 and inner door 26 are electrically connected to a control system 600. In this arrangement, control system 600 is aware of whether outer door 32 and inner door 26 are open. In one arrangement, when inner door 26 is open, control system 600 locks out and/or prevents the powering of various systems that allow grain bin 12 to be filled such as augers, legs, air systems, valves, gates, spouts, etc., or any other filling device or any combination thereof. That is, when sensor(s) 606 associated with inner door 26 indicate to control system 600 that inner door 26 is open, control system 600 prevents the filling of grain bin 12.

Alternatively, in one arrangement, when outer door 32 is closed and inner door 26 is open, control system 600 locks out and/or prevents the powering of various systems that allow grain bin 12 to be filled such as augers, legs, air systems, valves, gates, spouts, etc., or any other filling device or any combination thereof. That is, when sensor(s) 606 associated with outer door 32 and inner door 26 indicate to control system 600 that outer door 32 is closed and inner door 26 is open, control system 600 prevents the filling of grain bin 12.

This arrangement, with sensor(s) 606 and control system 600 prevent the filling of grain bin 12 when inner door 26 is open. This arrangement may be used in a stand-alone manner, meaning without the mechanical arrangements presented here that prevent closing of the outer door 32 when inner door 26 is open. Alternatively, this arrangement may be used in association with the mechanical arrangements presented here that prevent closing of the outer door 32 when inner door 26 is open.

Alternatively, and/or in addition to cutting power or otherwise stopping the filling of grain bin 12 when inner door 26 is open, control system 600 may power a light or flashing light associated with grain bin 12 indicating to the user that the inner door 26 is open. Alternatively, and/or in addition, control system 600 may send a fault or danger or other alarm to a display associated with grain bin 12 (such as a touch screen or monitor used to initiate filling of grain bin 12) indicating to the user that inner door 26 is open. Alternatively, and/or in addition, control system 600 may send a fault or danger or other alarm to an associated handheld device (such as a cell phone) of a user or users associated with grain bin 12 indicating to the user(s) that inner door 26 is open and/or indicating that grain bin 12 is being filled while inner door 26 is open and/or that grain bin 12 is being filled when inner door 26 is open and outer door 32 is closed (which is a dangerous condition).

It is hereby contemplated that sensor(s) 606 may be used in these and any other manners to prevent the filling of grain bin 12 while inner door 26 is open, or at a minimum to indicate to the user that the grain bin 12 is being filled when inner door 26 is open.

Notably, it is to be understood that some grain bins 12 have multiple door assemblies 14, and the teachings presented herein may be used with some or all of these door assemblies 14.

Safety Mechanism—Alternative Arrangement:

With reference to FIGS. 52-61 an alternative arrangement of a safety grain bin door latch system 10 is presented. This alternative arrangement presented in FIGS. 52-61 is similar to the safety grain bin door latch system 10 presented in FIGS. 1-27 as well as being similar to the safety grain bin door latch system 10 presented in FIGS. 28-36 as well as being similar to the safety grain bin door latch system 10 presented in FIGS. 37-51 and therefore unless specifically stated otherwise herein, the prior teaching and disclosure shown in FIGS. 1-27 as well as shown in FIGS. 28-36 as well as shown in FIGS. 37-51 applies equally to the alternative arrangement shown in FIGS. 52-61. That is, the arrangement shown in FIGS. 52-61 is configured to be used with the same or similar grain bin 12, door assembly 14, door frame 16 and the like with the difference being changes to safety mechanism 36 as is described herein.

In the arrangement shown, as one example, safety grain bin door latch system 10 presented in FIGS. 52-61 includes a safety mechanism 36. Safety mechanism 36 may be formed of any suitable size, shape and design and is configured to allow outer door 32 to be fully locked in a closed position on door frame 16 when the inner door 26 is in a fully closed and locked position, and, safety mechanism 36 is configured to prevent outer door 32 from being locked in a closed position on door frame 16 when the inner door 26 is in an fully open and unlocked position, and, safety mechanism 36 is configured to prevent outer door 32 from being fully locked in a fully closed position on door frame 16 when the inner door 26 is in a partially closed position.

In the arrangement shown, as one example, safety grain bin door latch system 10 presented in FIGS. 52-61 includes slots 348 in outer door 32 that are associated with end bracket 122 of upper door panel 28U and lower door panel 28L that receive forward end 356 of end brackets 122 when handle assemblies 30 are in a fully closed and locked position such that forward end 356 of end bracket 122 extends through slot 348 thereby exposing slot 350 of end bracket 122 on the exterior side 136 of outer door 32 such that bracket 148 of handle assembly 34 is able to be received within slot 350 of end bracket 122.

The configuration presented in FIGS. 52-61 is essentially the same configuration as that presented with respect to FIGS. 37-51 without the use of housing 300.

In this arrangement of safety grain bin door latch system 10 has a slot 348 placed in outer door 32 at the location of end bracket 122 of upper door panel 28U and lower door panel 28L on the side opposite hinges 140.

In this arrangement, when handle assembly 30 of lower door panel 28L is in a closed, latched, and locked position, forward end 356 of end bracket 122 protrudes through the lower-positioned slot 348 when outer door 32 is fully closed. When outer door 32 is fully closed, enough of forward end 356 protrudes through the lower positioned slot 348 that slot 350 in the upper side of forward end 356 of end bracket 122 is exposed past the exterior surface 136 of outer door 32 such that when handle assembly 34 is lowered, the lower edge of the lower-positioned bracket 148 is received within slot 350 of the lower positioned end bracket 122, thereby locking or latching the lower end of outer door 32 in a closed position.

In this arrangement, when handle assembly 30 of upper door panel 28U is in a closed, latched, and locked position, forward end 356 of end bracket 122 protrudes through the upper-positioned slot 348 when outer door 32 is fully closed. When outer door 32 is fully closed, enough of forward end 356 of end bracket 122 protrudes through the upper positioned slot 348 that slot 350 in the upper side of forward end 356 of end bracket 122 is exposed past the exterior surface 136 of outer door 32 such that when handle assembly 34 is lowered, the lower edge of the upper positioned bracket 148 is received within slot 350 of the upper positioned end bracket 122 thereby locking or latching the upper end of outer door 32 in a closed position.

Notably, safety grain bin door latch system 10 presented in FIGS. 52-61 does not include housing 300, or another mechanism or means that is configured to stop handle assembly 34 from being lowered, latched or locked when only a portion of inner door 26 is closed (such as lower door panel 28L or lower door panel 28L as well as center door panel 28C, but not upper door panel 28U). That is, in the arrangement shown, as one example, safety grain bin door latch system 10 presented in FIGS. 52-61 allows for outer door 32 to be latched at its lower end in slot 350 of the forward end 356 of end bracket 122 of the lower-positioned handle assembly 30 of lower door panel 28L when handle assembly 30 of lower door panel 28L is fully closed and locked. In this arrangement, the lower end of outer door 32 may be latched in place by sliding the lower edge of bracket 148 at the lower end of handle assembly 34 of outer door 32 within slot 350 of forward end 356 of end bracket 122 associated with lower door panel 28L. These locks and/or latches the lower end of outer door 32 in place in a tight and secure manner against the lower end of door frame 16.

However, in this position, the upper end of outer door 32 is loose. That is, the upper end of outer door 32 is not secured against door frame 16 in the same manner as the lower end of outer door 32. This is because the upper door panel 28U is not fully locked and latched and therefore the forward end 356 of end bracket 122 of upper door panel 28U does not protrude through the upper-positioned slot 348 in outer door 32. As such, slot 350 in forward end 356 of end bracket 122 of upper door panel 28U is not accessible for latching by the upper bracket 148 of handle assembly 34 of outer door 32.

In this arrangement, a user can easily detect that the upper end of outer door 32 is not affixed to door frame 16 as the upper end of outer door 32 will wobble and in some cases bang against door frame 16 in the wind. In addition, the user can easily visually detect that the upper end of outer door is not affixed to door frame 16 as the forward end 356 of end bracket 122 of upper door panel 28U does not protrude through the upper-positioned slot 348 in outer door 32. In this way, it is easily visually detected as well as mechanically detected that upper door panel 28U is not fully latched and locked even when outer door 32 is closed.

This arrangement allows the user to partially close inner door 26 (which in the arrangement shown, as one example, could be closing either lower door panel 28L or lower door panel 28L and center door panel 28C) which may be desirable in some circumstances, while also allowing outer door 32 to be partially secured in a closed position. However, when doing so, the system 10 provides both a visual indication that the inner door 26 is not fully closed as well as a mechanical indication that the inner door 26 is not fully closed.

Figure 52:
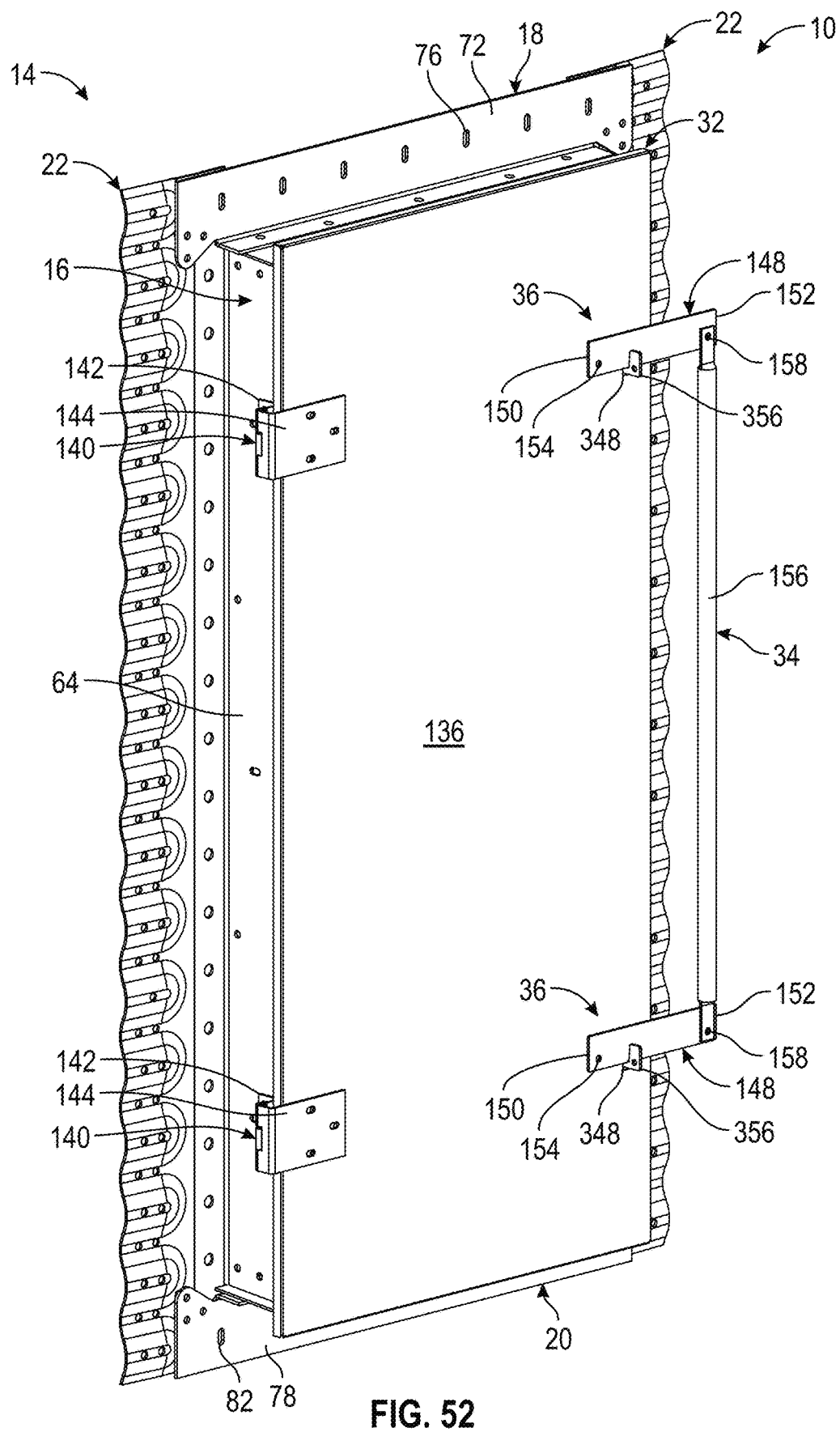
FIG. 52 is a front left perspective view of a safety door latch system, consistent with one or more embodiments; the view showing an outer door in a closed position; the view showing safety mechanism of the system in an engaged position.

With reference to FIG. 52, outer door 32 is shown in a fully locked and latched configuration. This figure shows forward end 356 of end bracket 122 of lower door panel 28L protruding through the lower-positioned slot 348 in outer door 32 and the lower-positioned bracket 148 of handle assembly 34 of outer door 32 held within slot 350 of the forward end 356 of end bracket 122 of lower door panel 28L. This figure shows forward end 356 of end bracket 122 of upper door panel 28U protruding through the upper-positioned slot 348 in outer door 32 and the upper-positioned bracket 148 of handle assembly 34 of outer door 32 held within slot 350 of the forward end 356 of end bracket 122 of upper door panel 28U. In this way, the upper end and lower end of outer door 32, opposite hinges 140, is tightly secured in place against door frame 16. This fully locked position is visually verifiable by looking at the forward end 356 of end bracket 122 of upper door panel 28U and lower door panel 28L protruding through slots 348 in outer door 32, and seeing the brackets 148 held within the slots 350 of the forward ends 356 of end brackets 122. This fully locked position is also mechanically or physically verifiable by grasping handle assembly 34 of outer door 32 and shaking it or pulling it away from door frame 16 which reveals that the upper end and lower end of outer door 32 is secured in place on door frame 16.

Figure 53:
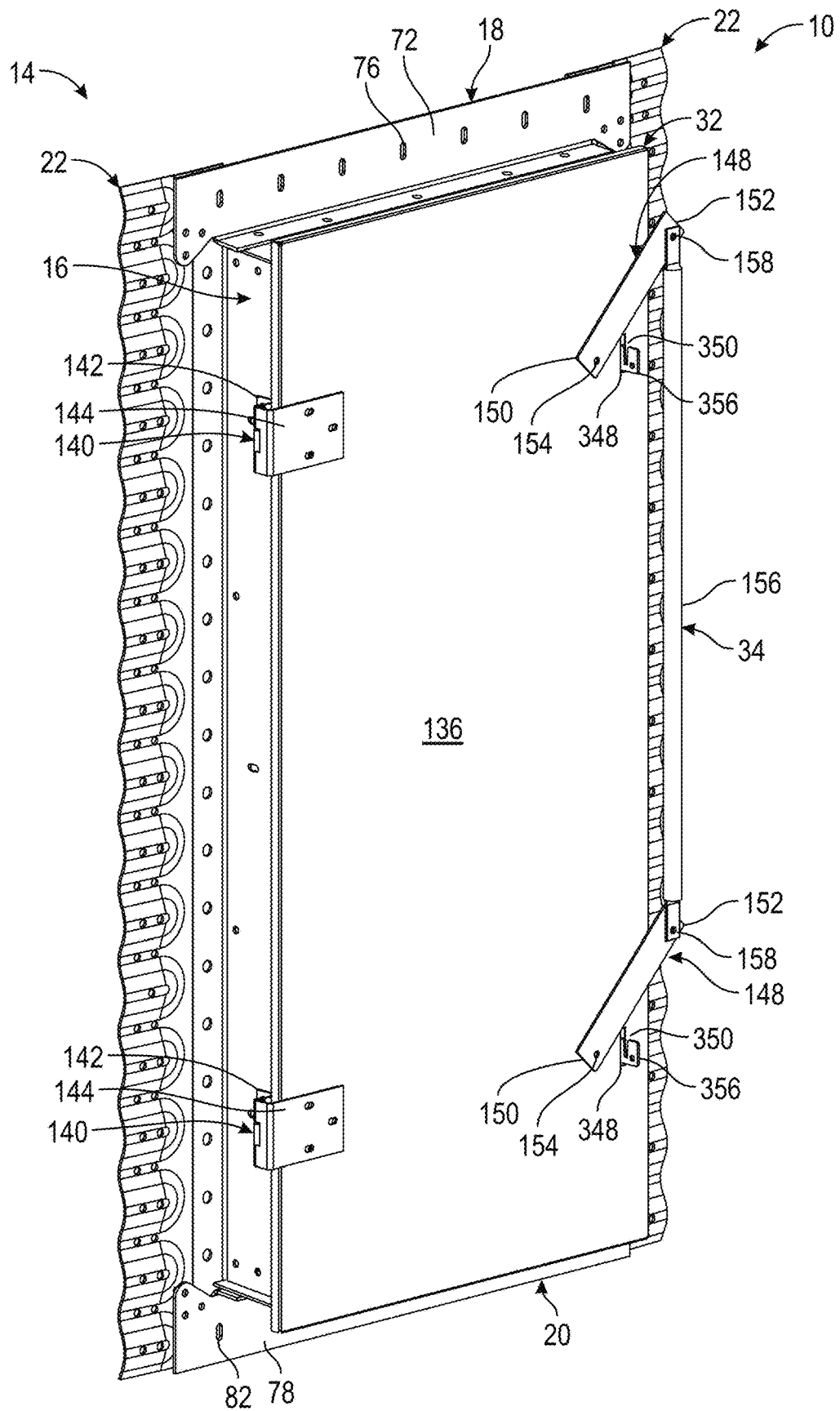
FIG. 53 is a front left perspective view of a safety door latch system, consistent with one or more embodiments; the view showing an outer door in a closed position; the view showing safety mechanism of the system in a disengaged position.

With reference to FIG. 53, outer door 32 is shown in a fully closed position but not locked and latched. This figure shows forward end 356 of end bracket 122 of lower door panel 28L protruding through the lower-positioned slot 348 in outer door 32. This figure shows forward end 356 of end bracket 122 of upper door panel 28U protruding through the upper-positioned slot 348 in outer door 32. However, this figure shows handle assembly 34 of outer door 32 in a raised position. That is, brackets 148 of handle assembly 34 are raised above slots 350 in the forward end 356 of end brackets 122. As such, outer door 32 is not latched or locked in place on door frame 16. However, in this position all that needs to be done to latch and lock outer door 32 on inner door 26 is to pull handle assembly 34 downward until brackets 148 are received within slots 350.

Figure 54:
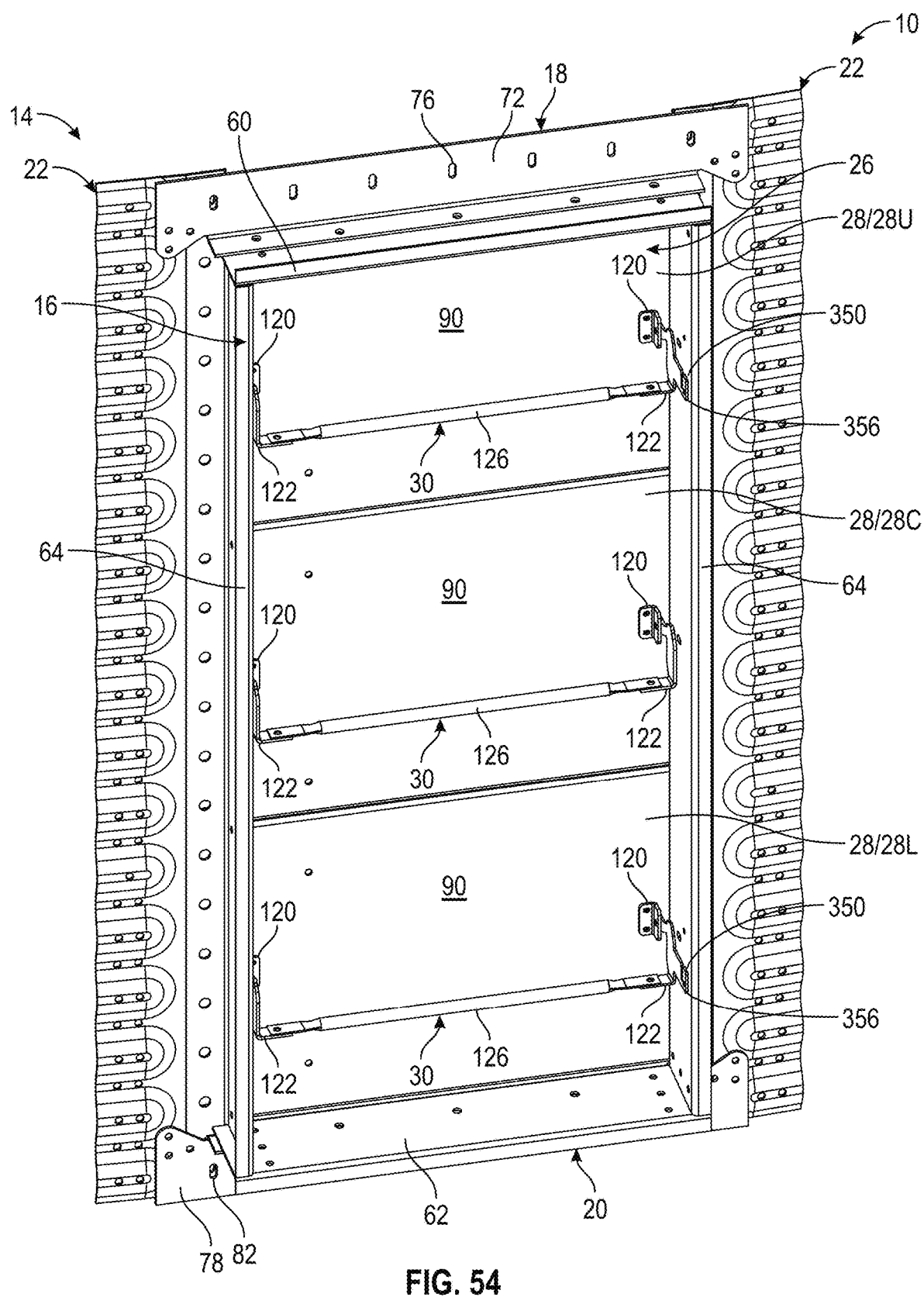
FIG. 54 is a front left perspective view of a safety door latch system, consistent with one or more embodiments; the view showing panels of an inner door in a closed position and outer door omitted.

With reference to FIG. 54, the outer door 32 is removed. This view shows all three panels, lower door panel 28L, center door panel 28C and upper door panel 28U in a closed and locked and latched configuration. This view shows that center door panel 28C does not have the protruding forward end 356 and slot 350 as does lower door panel 28L and upper door panel 28U. However, it is hereby contemplated that in one arrangement, center door panel 28C includes a protruding forward end 356 and slot 350, in the same manner as lower door panel 28L and upper door panel 28U, that aligns with a slot 348 in outer door 32 and receives an aligned center bracket 148 of handle assembly 34.

Figure 55:
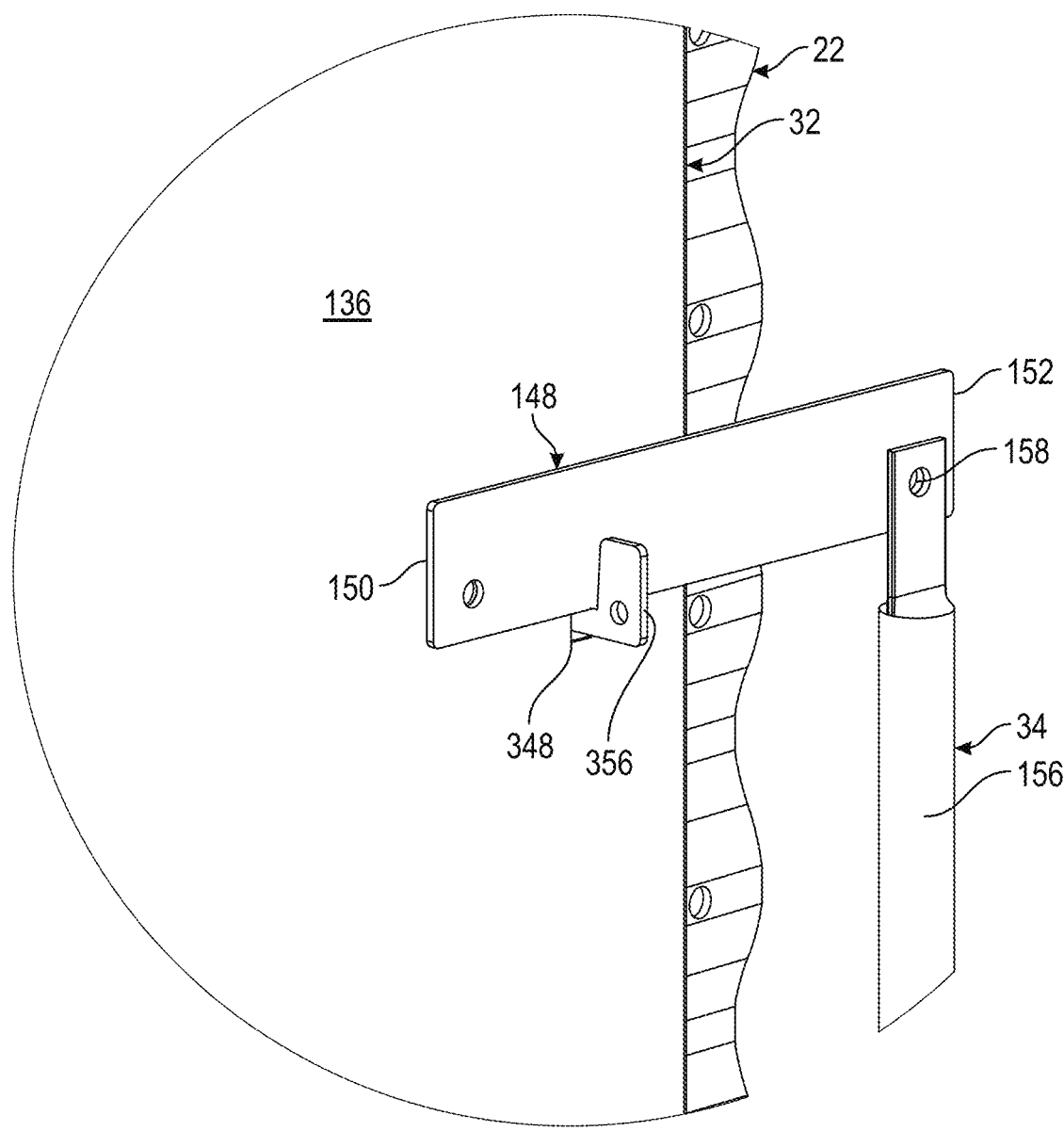
FIG. 55 is a close up front left perspective view of an upper end of a handle of the outer door of the safety door latch system shown in FIG. 38, consistent with one or more embodiments; the view showing safety mechanism in an engaged position.

With reference to FIG. 55, a close up view the upper end of outer door 32 is shown in a fully locked and latched configuration. This figure shows forward end 356 of end bracket 122 of upper door panel 28U protruding through the upper-positioned slot 348 in outer door 32 and the upper-positioned bracket 148 of handle assembly 34 of outer door 32 held within slot 350 of the forward end 356 of end bracket 122 of upper door panel 28U.

Figure 56:
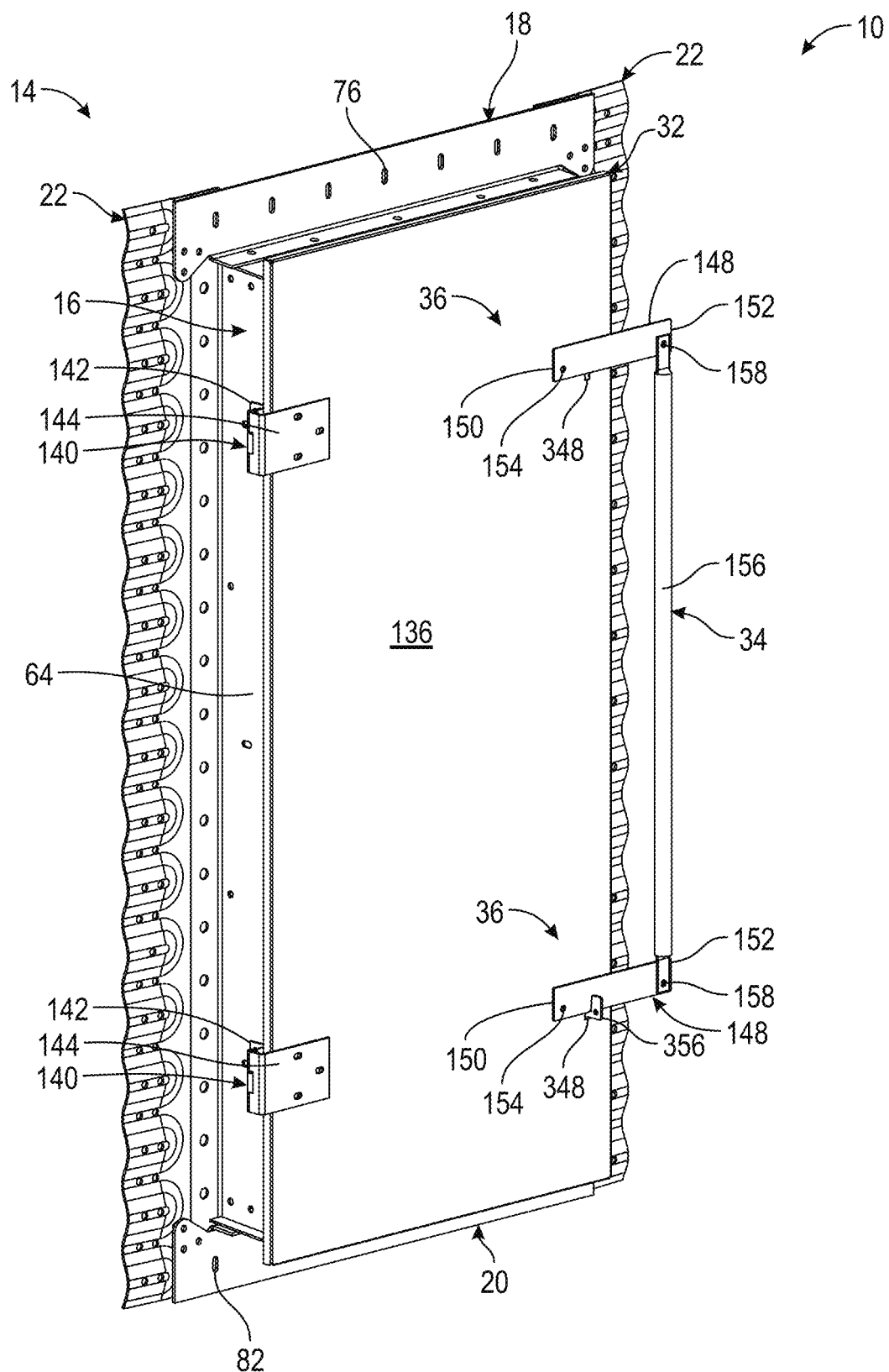
FIG. 56 is a front left perspective view of a safety door latch system, consistent with one or more embodiments; the view showing an outer door in a closed position; the view showing safety mechanism of the system in an engaged position.

With reference to FIG. 56, outer door 32 is shown in a partially locked and latched configuration. This figure shows forward end 356 of end bracket 122 of lower door panel 28L protruding through the lower-positioned slot 348 in outer door 32 and the lower-positioned bracket 148 of handle assembly 34 of outer door 32 held within slot 350 of the forward end 356 of end bracket 122 of lower door panel 28L. This figure shows forward end 356 of end bracket 122 of upper door panel 28U not protruding through the upper-positioned slot 348 in outer door 32. As such, the upper-positioned bracket 148 of handle assembly 34 of outer door 32 is not held within slot 350 of the forward end 356 of end bracket 122 of upper door panel 28U. In this way, the lower end of outer door 32, opposite hinges 140, is tightly secured in place against door frame 16. However, the upper end of outer door 32, opposite hinges 140, is not tightly secured in place against door frame 16. This partially locked position is visually verifiable by looking at the slots 348 in outer door 32 and seeing forward end 356 of end bracket 122 of lower door panel 28L protruding through the lower-positioned slot 348 in outer door 32 while simultaneously the forward end 356 of end bracket 122 of upper door panel 28U does not protrude through the upper-positioned slot 348 in outer door 32. This partially locked position is also mechanically or physically verifiable by grasping handle assembly 34 of outer door 32 and shaking it or pulling it away from door frame 16 which reveals that the lower end of outer door 32 is secured in place on door frame 16 while the upper end of outer door 32 is loose and unsecured.

Figure 57:
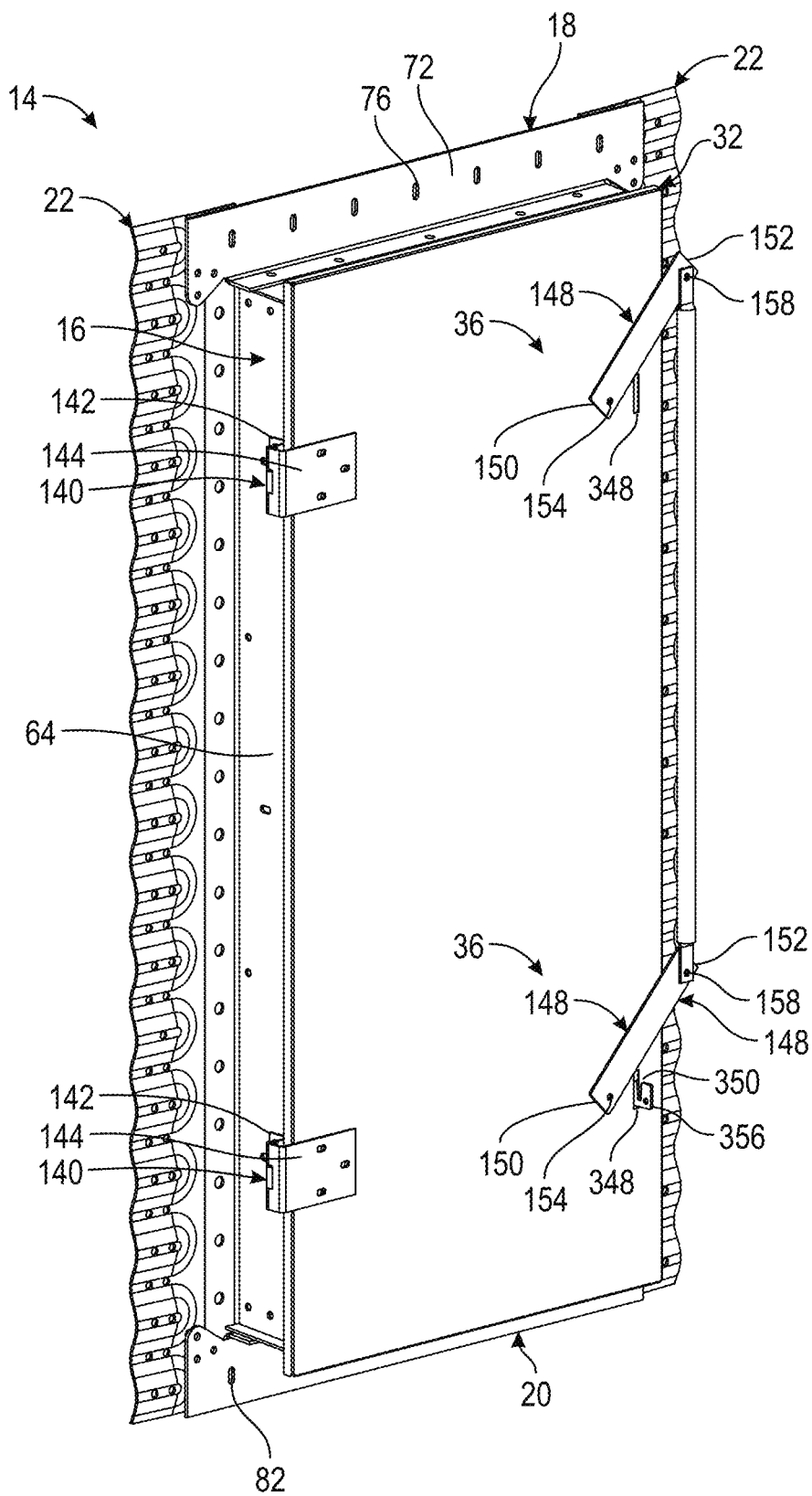
FIG. 57 is a front left perspective view of a safety door latch system, consistent with one or more embodiments; the view showing an outer door in a closed position; the view showing safety mechanism of the system in a disengaged position.

With reference to FIG. 57, outer door 32 is shown in a fully closed position but not locked and latched. This figure shows forward end 356 of end bracket 122 of lower door panel 28L protruding through the lower-positioned slot 348 in outer door 32. This figure shows forward end 356 of end bracket 122 of upper door panel 28U not protruding through the upper-positioned slot 348 in outer door 32. This figure shows handle assembly 34 of outer door 32 in a raised position. That is, brackets 148 of handle assembly 34 are raised above slots 348 in the outer door 32. As such, outer door 32 is not latched or locked in place on door frame 16. However, in this position all that needs to be done to partially latch and lock the lower end of outer door 32 on inner door 26 is to pull handle assembly 34 downward until the lower-positioned bracket 148 is received within slot 350 of the forward end 356 of end bracket 122 of the lower door panel 28L.

Figure 58:
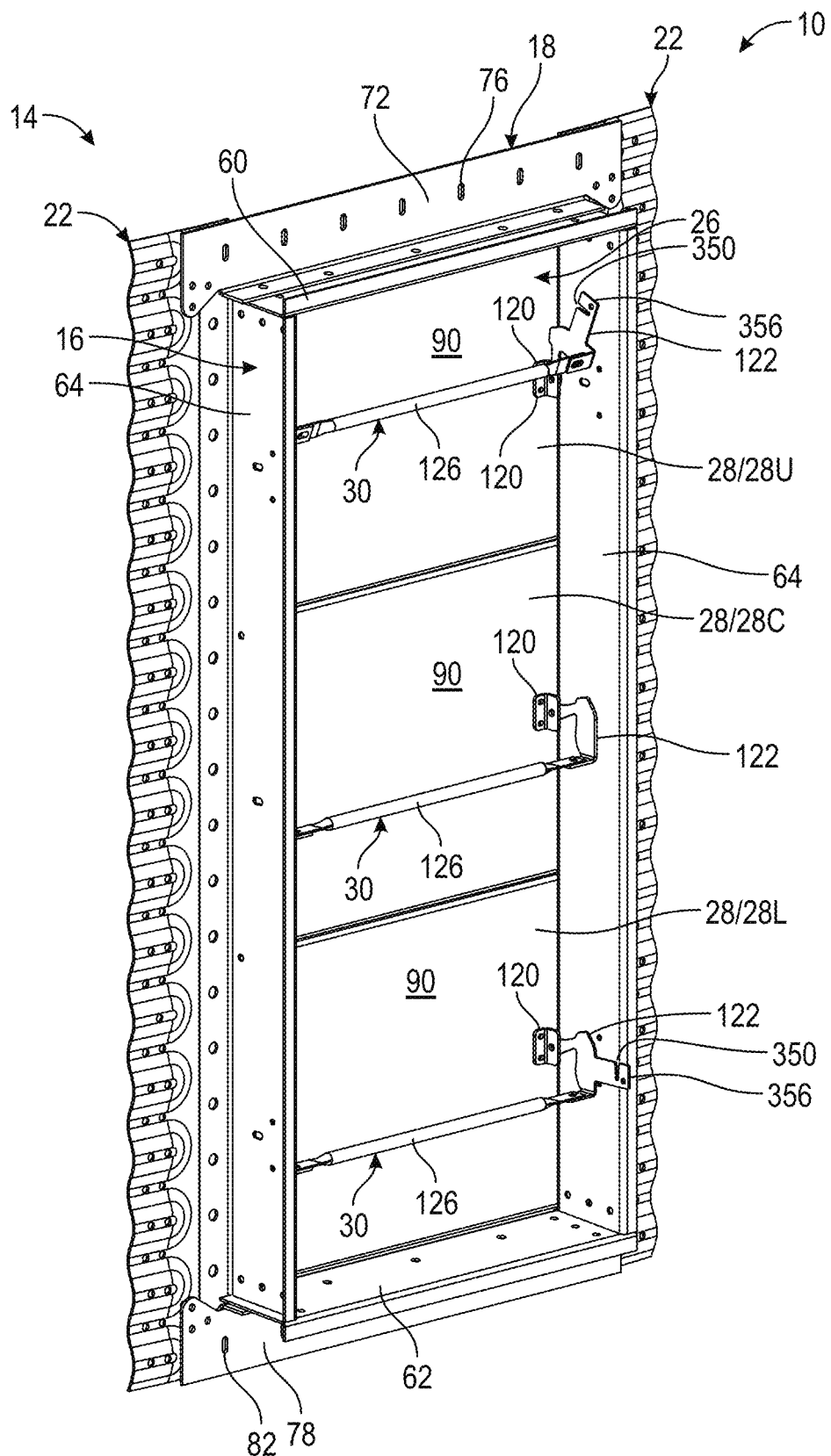
FIG. 58 is a front left perspective view of a safety door latch system, consistent with one or more embodiments; the view showing panels of an inner door in a closed position and outer door omitted; the view showing safety mechanism of the system in an engaged position.

With reference to FIG. 58, the outer door 32 is removed. This view shows all three panels, lower door panel 28L, center door panel 28C and upper door panel 28U in a closed configuration, with lower door panel 28L and center door panel 28C latched and locked in place, while upper door panel 28U is not latched and locked in place. Instead, handle assembly 30 of upper door panel 28U is in a raised position, which causes the forward end 356 of end bracket 122 to not protrude through slot 348 in outer door 32 when outer door 32 is closed. This view shows that center door panel 28C does not have the protruding forward end 356 and slot 350 as does lower door panel 28L and upper door panel 28U. However, it is hereby contemplated that in one arrangement, center door panel 28C includes a protruding forward end 356 and slot 350, in the same manner as lower door panel 28L and upper door panel 28U, that aligns with a slot 348 in outer door 32 and receives an aligned center bracket 148 of handle assembly 34.

Figure 59:
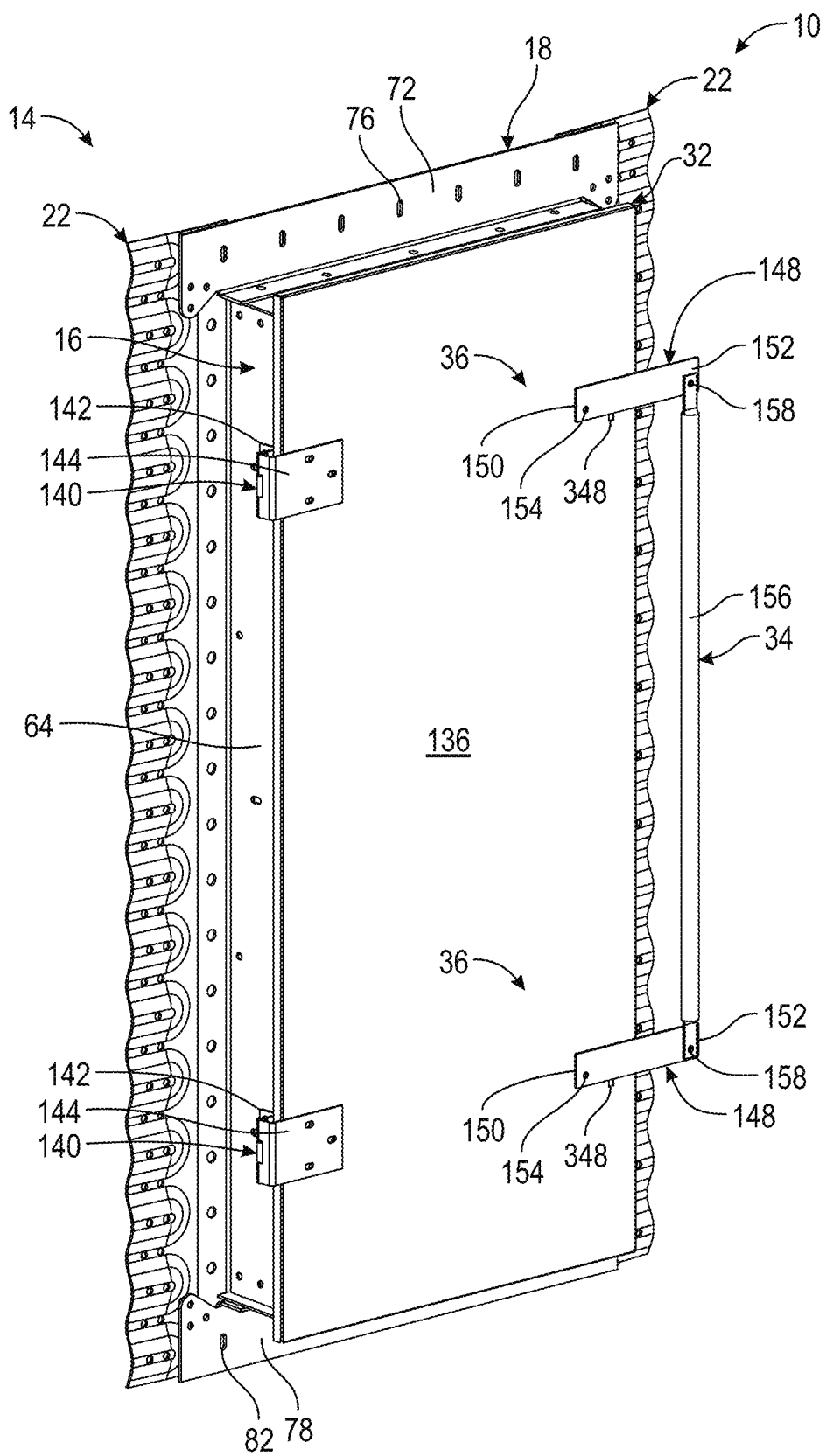
FIG. 59 is a front left perspective view of a safety door latch system, consistent with one or more embodiments; the view showing outer door in a closed position; the view showing safety mechanism of the system in a disengaged position with handle of outer door lowered.

With reference to FIG. 59, outer door 32 is shown in a closed but un-locked and un-latched configuration. This figure shows forward end 356 of end bracket 122 of lower door panel 28L and upper door panel 28U not protruding through the slots 348 in outer door 32. This figure shows the handle assembly 34 of outer door 32 in a lowered position. However, as the forward end 356 of end bracket 122 of lower door panel 28L and upper door panel 28U are not protruding through the slots 348 in outer door 32, brackets 148 of handle assembly 34 are not locked or latched. As such, outer door 32 is unsecured or fully un-latched or un-locked to inner door 26.

Figure 60:
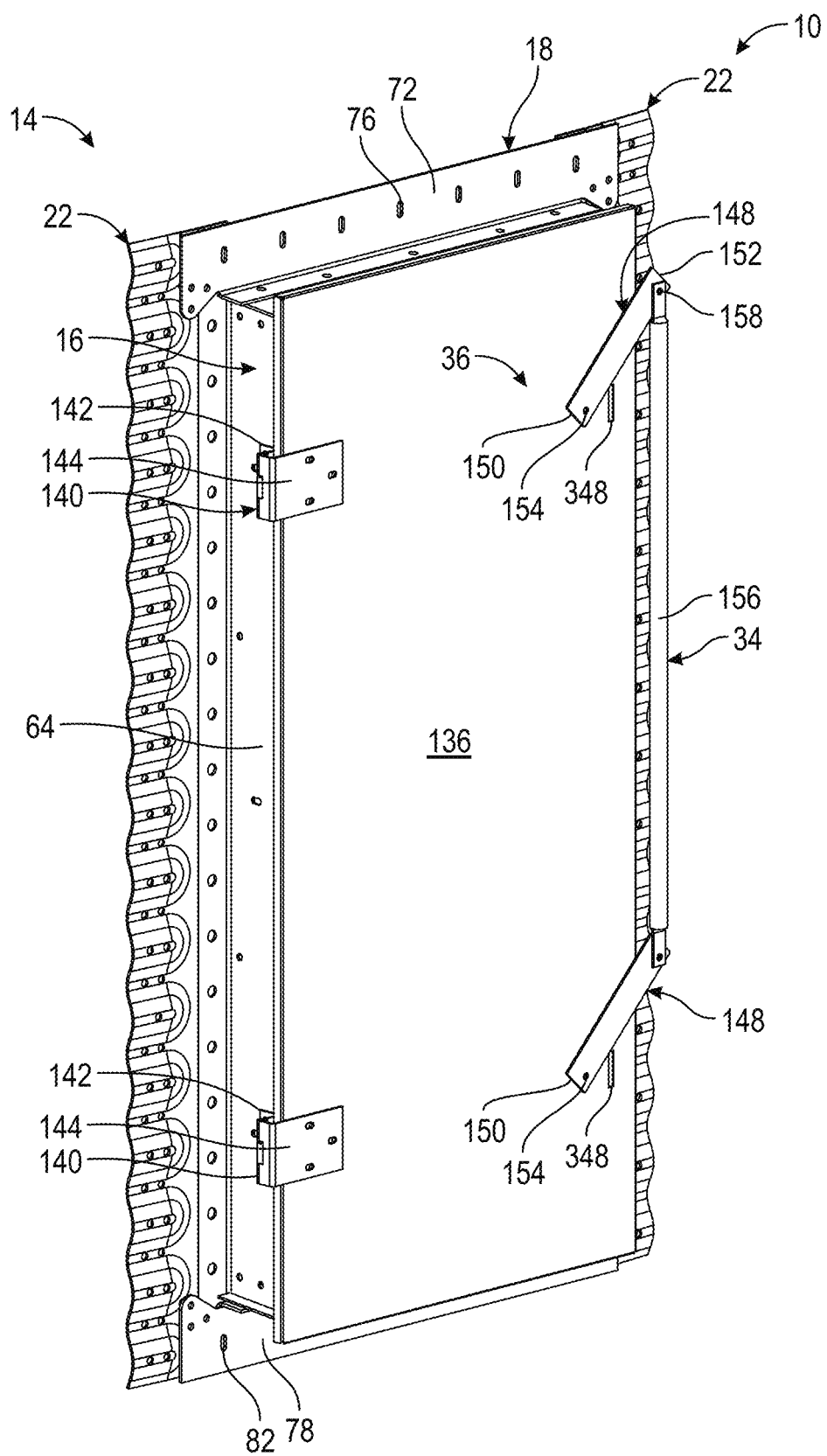
FIG. 60 is a front left perspective view of a safety door latch system, consistent with one or more embodiments; the view showing outer door in a closed position; the view showing safety mechanism of the system in a disengaged position with handle lowered of outer door raised.

With reference to FIG. 60, the handle assembly 34 of outer door 32 is shown in a fully raised position as compared to the fully lowered position shown in FIG. 59.

Figure 61:
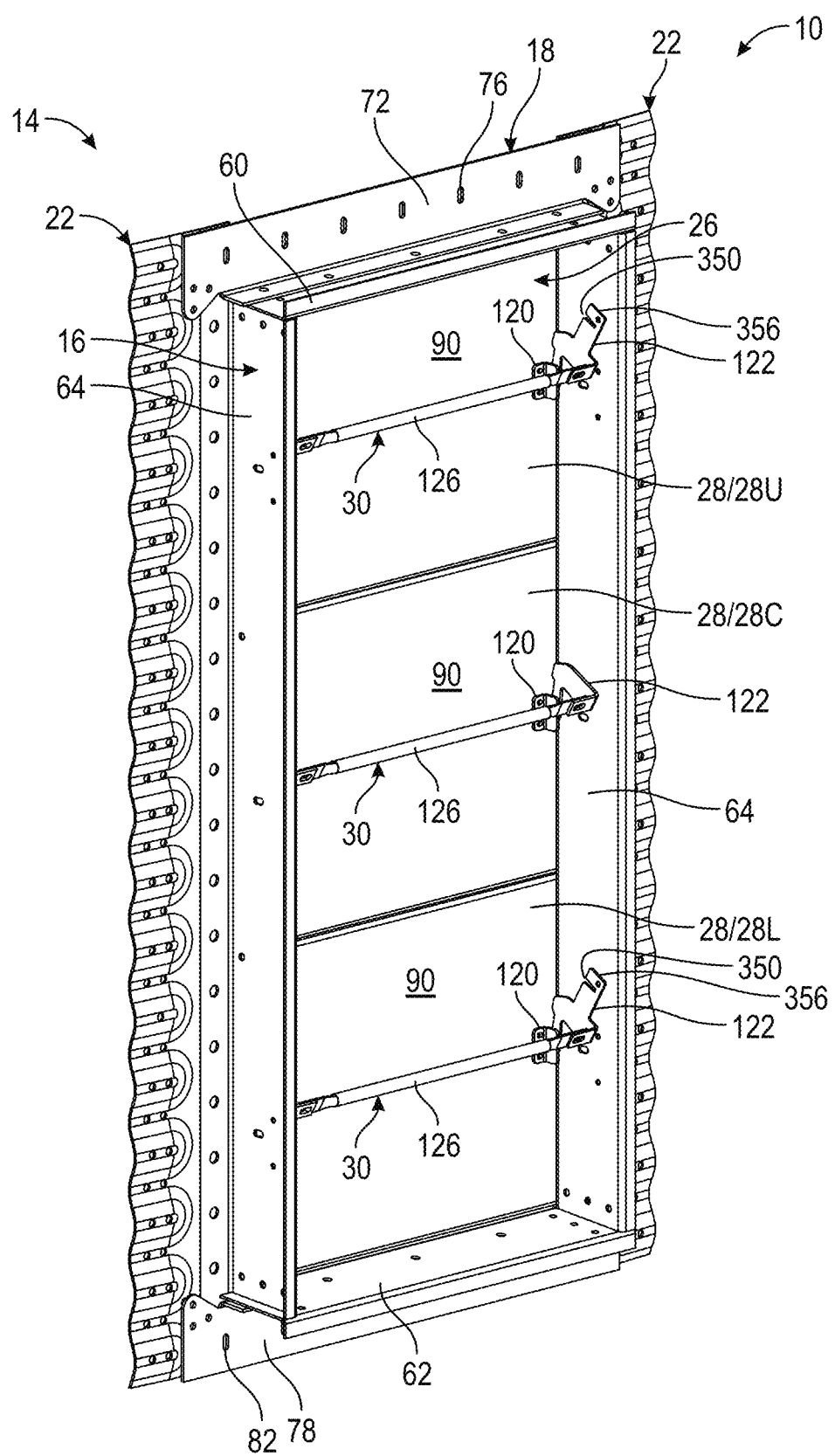
FIG. 61 is a front left perspective view of a safety door latch system, consistent with one or more embodiments; the view showing panels of an inner door in a closed position and outer door omitted; the view showing safety mechanism of the system in a disengaged position.

With reference to FIG. 61, the outer door 32 of FIGS. 59 and 60 is removed. This view shows all three panels, lower door panel 28L, center door panel 28C and upper door panel 28U in a closed configuration but also not latched and locked in place. Instead, handle assembly 30 of lower door panel 28L, center door panel 28C and upper door panel 28U is in a raised position, which causes the forward end 356 of end brackets 122 of lower door panel 28L and upper door panel 28U to not protrude through slot 348 in outer door 32 when outer door 32 is closed. This view shows that center door panel 28C does not have the protruding forward end 356 and slot 350 as does lower door panel 28L and upper door panel 28U. However, it is hereby contemplated that in one arrangement, center door panel 28C includes a protruding forward end 356 and slot 350, in the same manner as lower door panel 28L and upper door panel 28U, that aligns with a slot 348 in outer door 32 and receives an aligned center bracket 148 of handle assembly 34.

As such, the configuration presented in FIGS. 52-61 allows for outer door 32 to be fully latched and locked in place on door frame 16 and inner door 26, partially latched and locked in place on door frame 16 and inner door 26, and un-latched and un-locked on door frame 16 and inner door 26.

In one arrangement, the sizing and spacing of door frame 16 and inner door 26 and end brackets 122 is such that when brackets 148 are lowered into slots 350 of forward end 356 of end brackets 122 a friction fit arrangement is facilitated. That is, as the brackets 148 of handle assembly 34 are lowered, the size, shape and configuration of parts causes a secure, tight, and frictional fit that helps to hold outer door 32 in a closed position and prevents outer door 32 from rattling.

Figure 62:
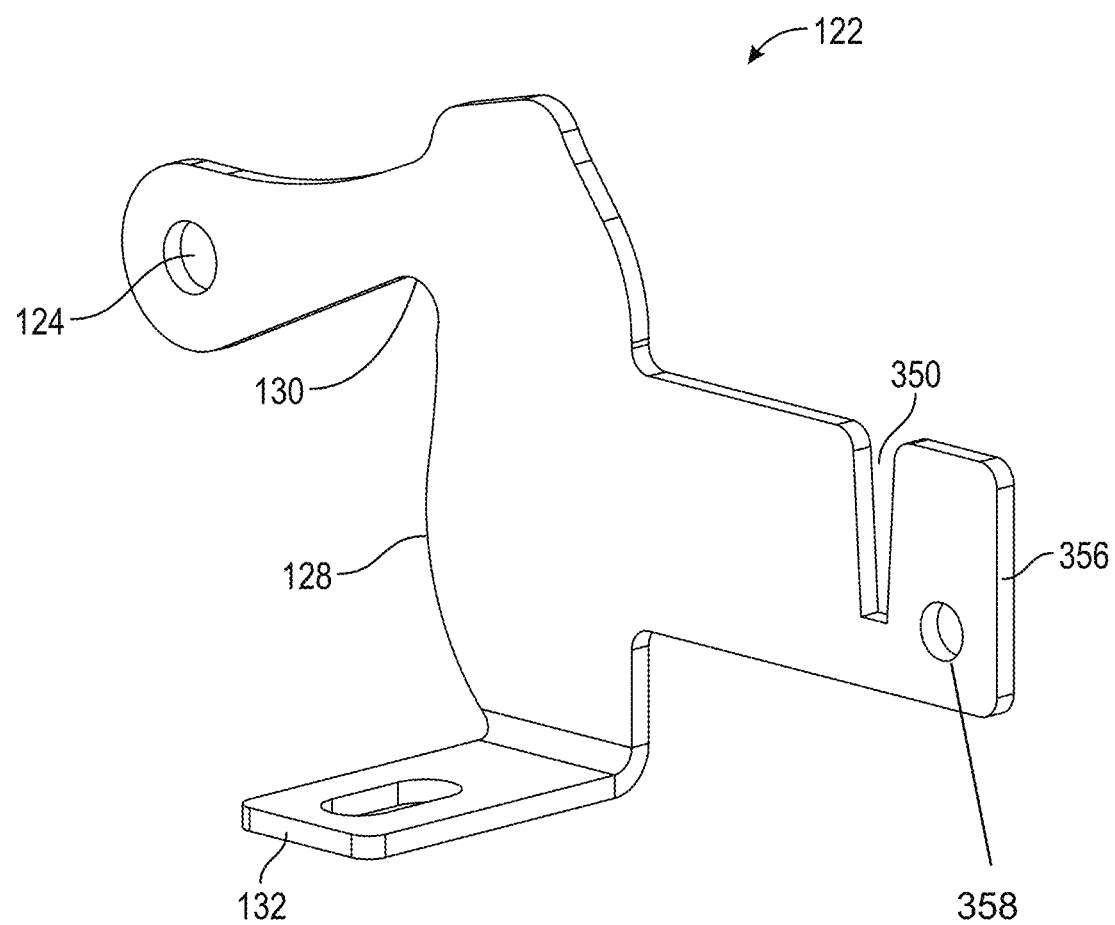
FIG. 62 shows a perspective view of an end bracket of a handle assembly of an inner door of a safety door latch system, consistent with one or more embodiments.
Figure 63:
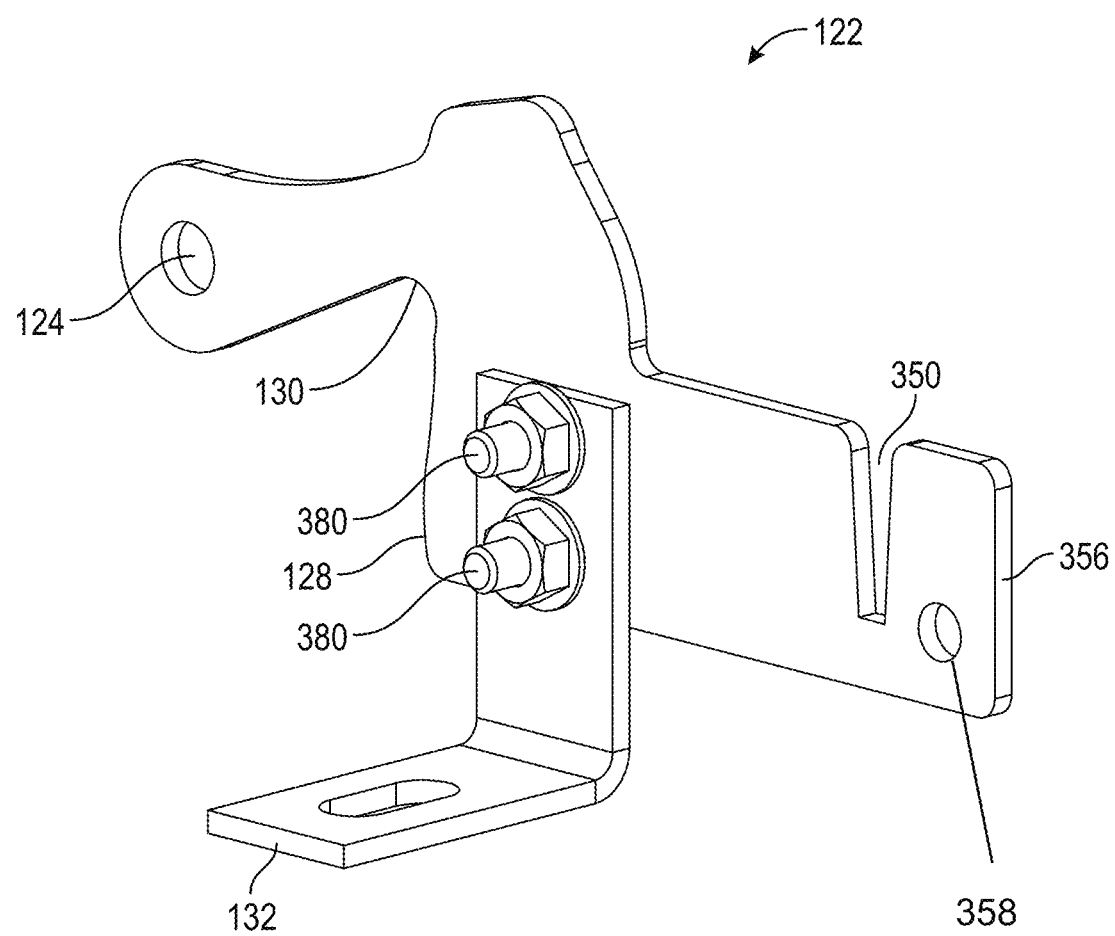
FIG. 63 shows a perspective view of an end bracket of a handle assembly of an inner door of a safety door latch system, consistent with one or more embodiments.
Figure 64:
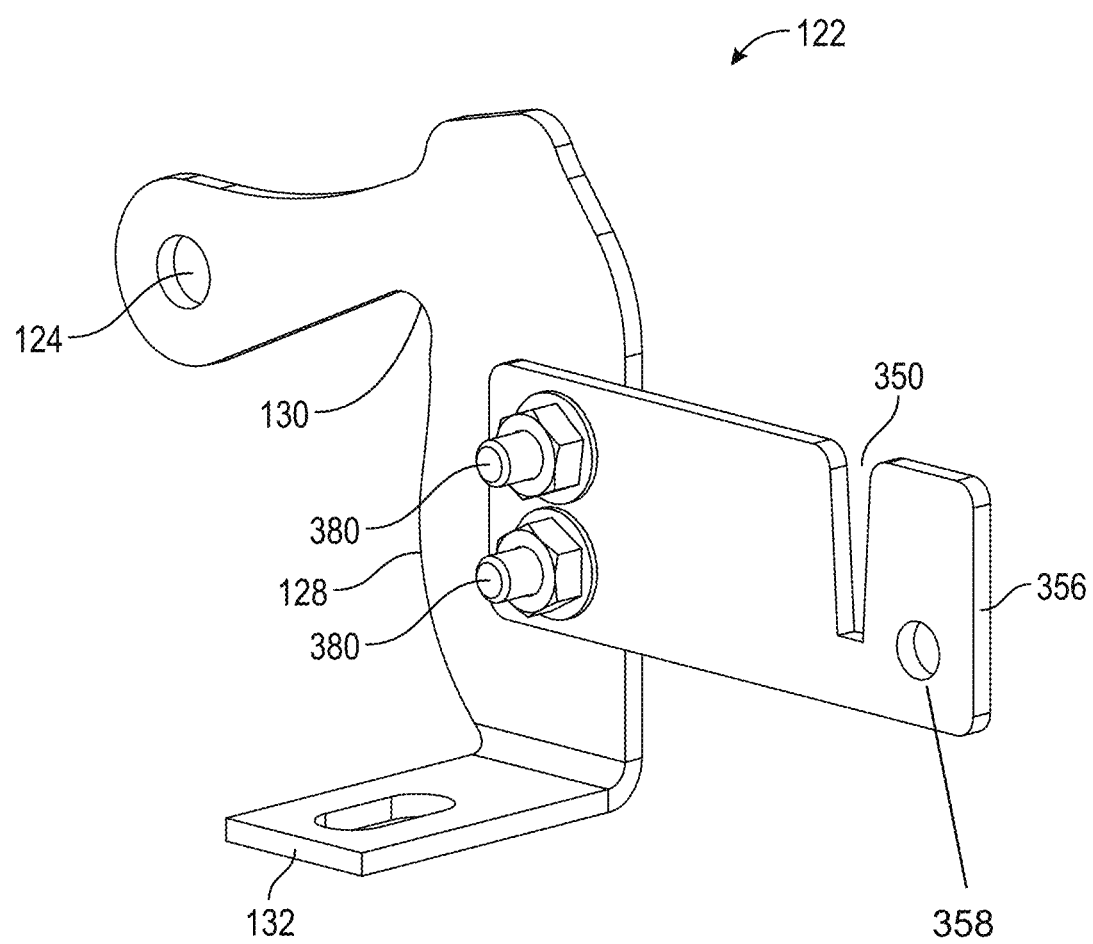
FIG. 64 shows a perspective view of an end bracket of a handle assembly of an inner door of a safety door latch system, consistent with one or more embodiments.
Figure 65:
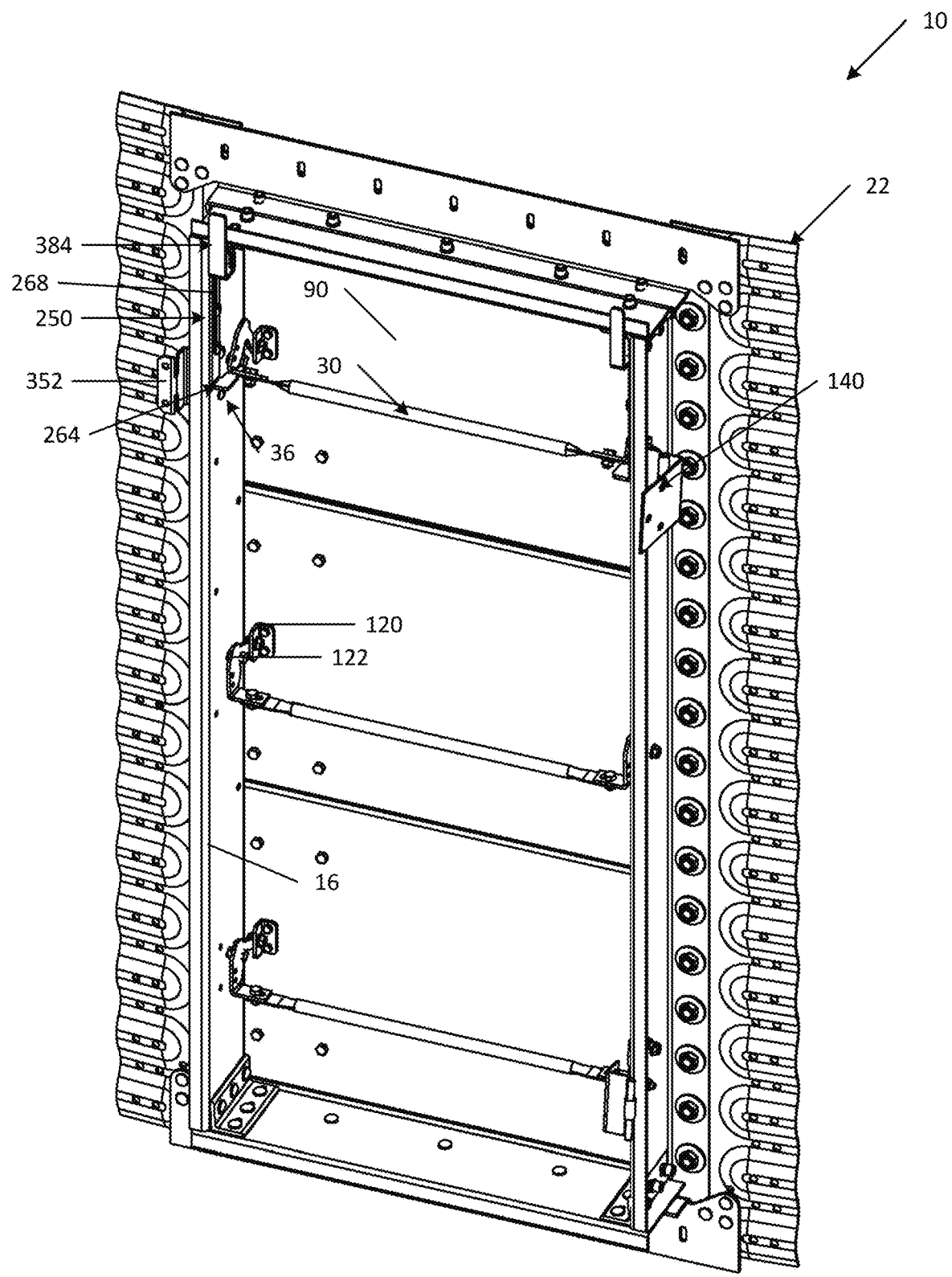
FIG. 65 is a front right perspective view of a safety door latch system, consistent with one or more embodiments; the view showing panels of an inner door in a closed position and outer door omitted; the view showing safety mechanism of the system in an engaged position to prevent outer door from closing.
Figure 66:
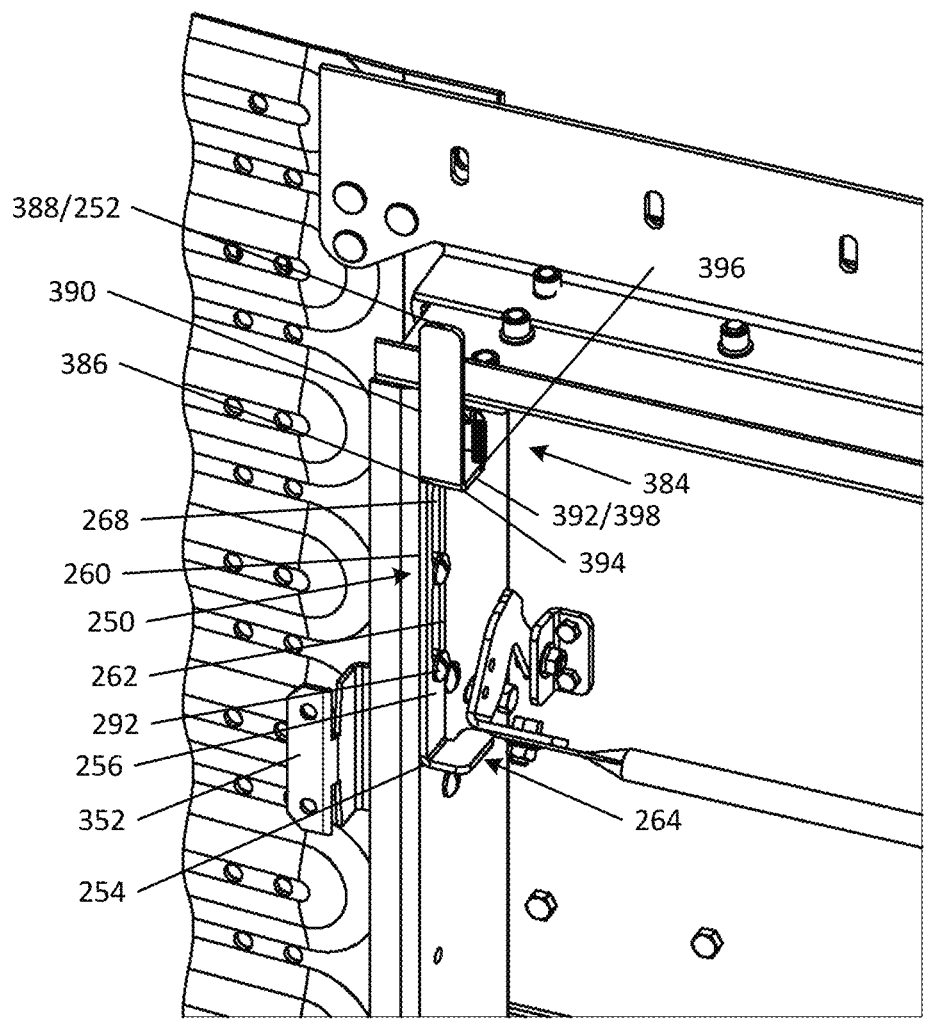
FIG. 66 is a close up view of the safety mechanism of the system shown in FIG. 65, consistent with one or more embodiments.
Figure 67:
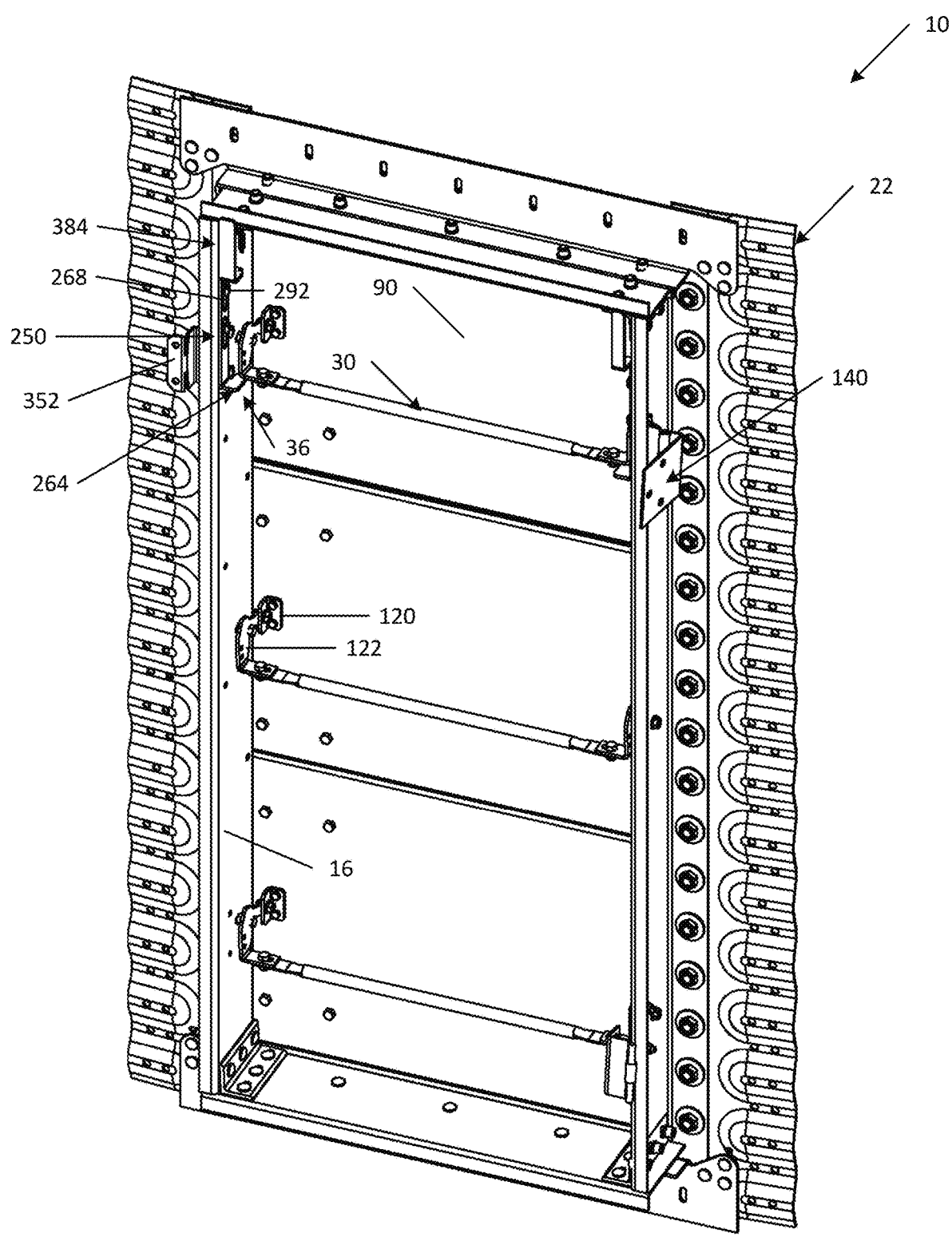
FIG. 67 is a front right perspective view of a safety door latch system, consistent with one or more embodiments; the view showing panels of an inner door in a closed position and outer door omitted; the view showing safety mechanism of the system in a disengaged position.
Figure 68:
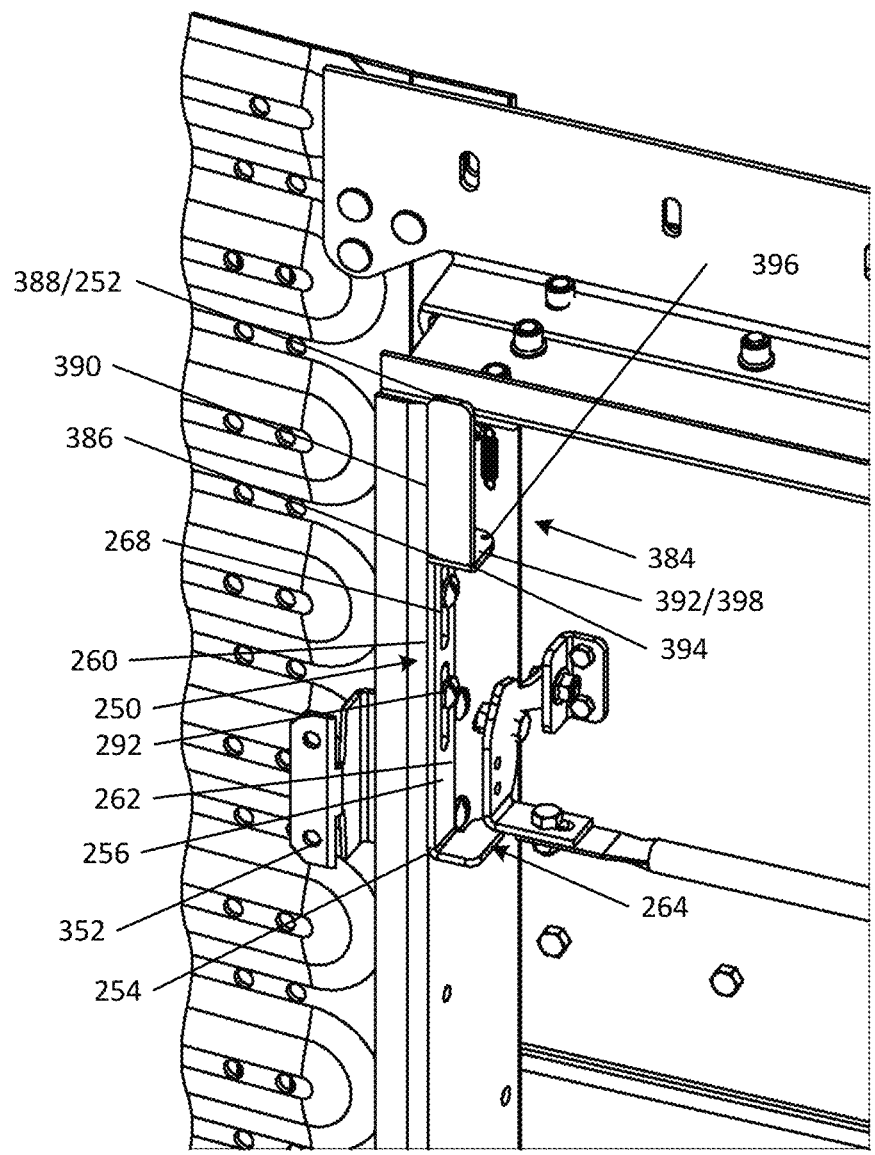
FIG. 68 is a close up view of the safety mechanism of the system shown in FIG. 67, consistent with one or more embodiments.
Figure 69:
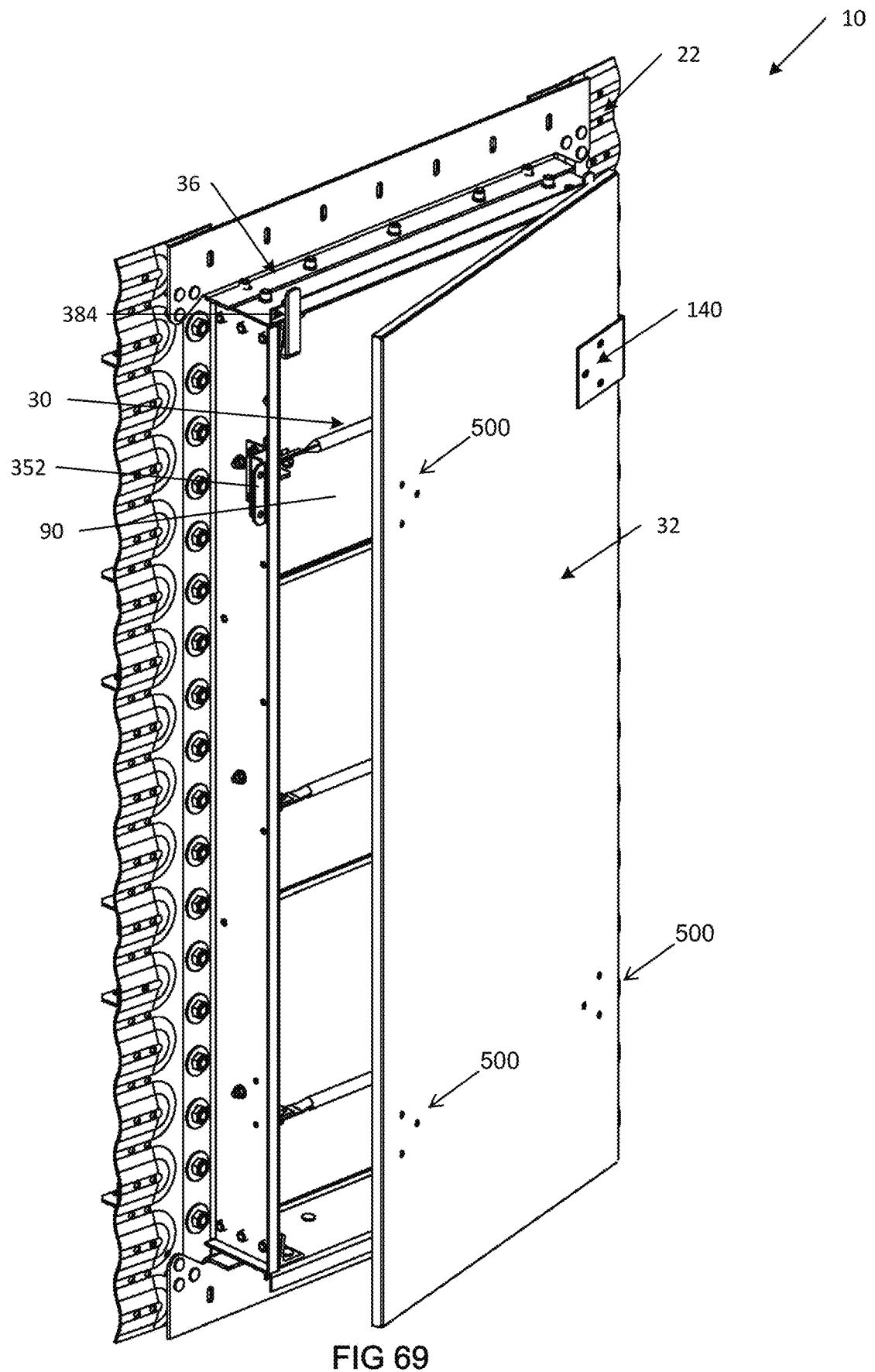
FIG. 69 is a front left perspective view of a safety door latch system, consistent with one or more embodiments; the view showing panels of an inner door in a closed position and outer door partially open; the view showing safety mechanism of the system in an engaged position to prevent outer door from closing.
Figure 70:
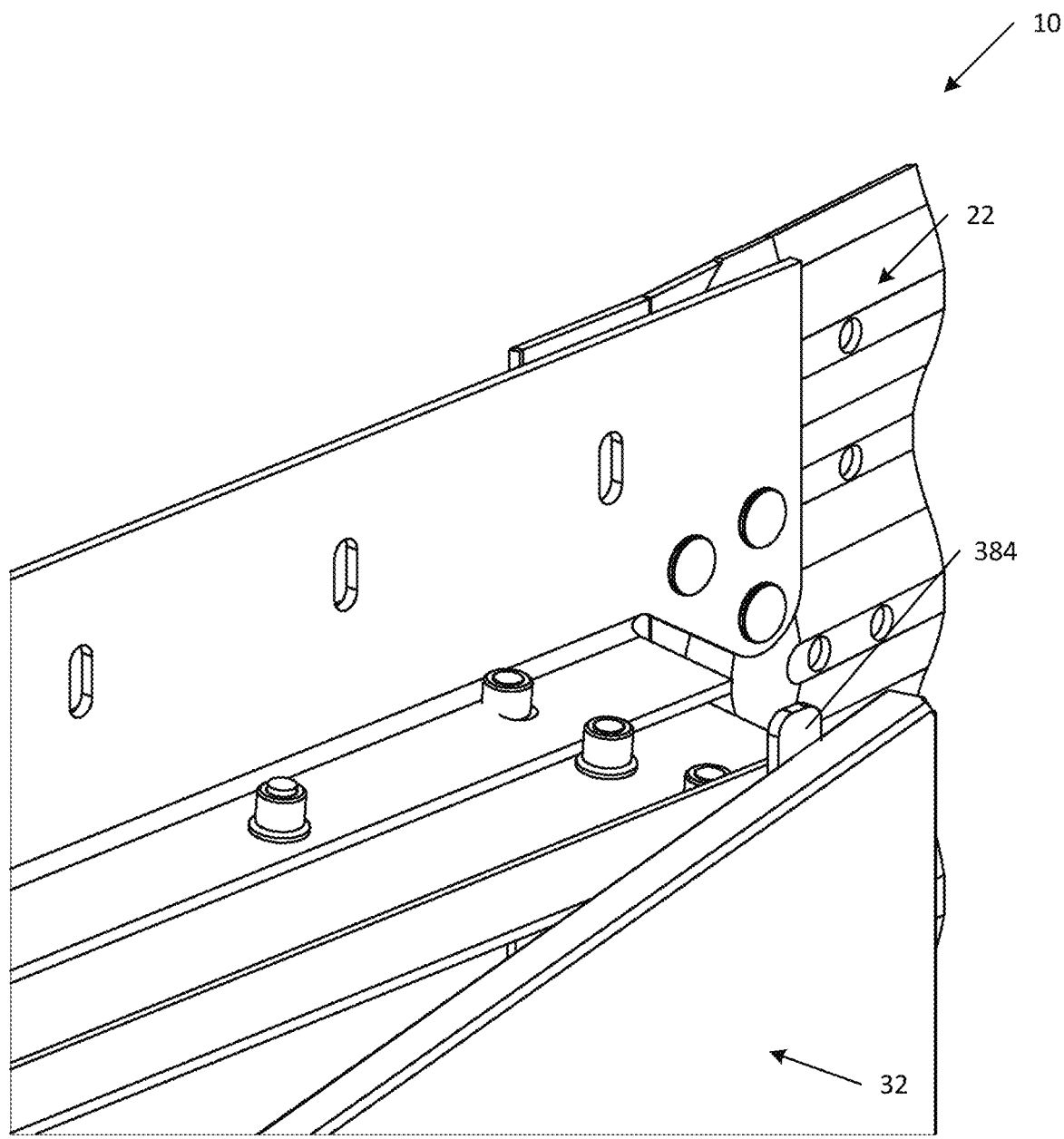
FIG. 70 is a close up view of the safety mechanism of the system shown in FIG. 69, consistent with one or more embodiments.

End Bracket 122 Configurations:

With reference to FIGS. 62, 63 and 64 three potential configurations of end bracket 122 are presented.

End bracket 122 is formed of any suitable size, shape and design and is configured to facilitate latching of panels 28 of inner door 26 in a closed position on door frame 16 as well as facilitate latching of outer door 32 to inner door 26 and/or door frame 16.

With reference to FIG. 62 a one-piece monolithic end bracket 122 is presented. This one-piece end bracket 122 is formed of a single piece of planar metal that is cut to form the exterior peripheral edge and shape of the end bracket 122 including the rearward extending arm that receives axle 124, the interior corner 130, the cam surface 128, the protruding forward end 356 with slot 350 therein, as well as tab 132. Then, tab 132 is bent out of plane with the rest of end bracket 122. This forms a rigid and strong component. However, tab 132 must be bent in the proper direction, either left or right, depending on which side of inner door 26 end bracket 122 is to be used. As such, this bending causes the formation of left parts and right parts.

With reference to FIG. 63, as one example, to avoid having dedicated left-parts and dedicated right-parts, tab 132 is formed of a separate piece that is connected to end bracket 122 by one or more fasteners 380. In the arrangement shown, as one example, tab 132 is formed of a ninety-degree bracket-shaped member wherein one end of the bracket forms tab 132 whereas the opposite end of the bracket is connected to the other portion of end bracket 122 by passing fasteners 380 through end bracket 122 as well as tab 132 and tightening the two components together to form the combined part. This configuration provides the benefit that left-parts and right-parts may be formed by choosing which side to attach tab 132 to. This saves cost by reducing the number of parts. This configuration also increases flexibility by providing the ability to place tab 132 on either side of end bracket 122.

With reference to FIG. 64 a similar arrangement is presented with forward end 356 and slot 350 being attachable to end bracket 122 by fasteners 380. This allows, end bracket 122 for center door panel 28C and end bracket 122 for lower door panel 28L and upper door panel 28U to be the same, with the addition of forward end 356 and slot 350 being attachable to end bracket 122 by fasteners 380.

Locking Hole 358:

In the arrangement shown, as one example, a hole 358 is positioned in the forward end 356 of end bracket 122. Hole 358 is formed of any suitable size, shape and design and is configured to receive a lock, such as a conventional pad lock or any other locking member) there through so as to allow a user to lock outer door 32 in a closed position upon inner door 26. This is particularly seen in FIGS. 62, 63 and 64.

That is, once inner door 26 is closed, and outer door 32 is closed upon inner door 26, the forward end 356 of end brackets 122 protrude through the slots 348 in outer door 32. As such, hole 358 in the forward end 356 of end bracket 122 is positioned on the outside of outer door 32 when outer door 32 is closed upon inner door 26.

Placing a lock through hole 358 prevents the unintentional opening of outer door 32, and thereby prevents the unintentional opening of inner door 26, which prevents the unintentional filling of grain bin 12 when inner door 26 is open. As such, positioning hole 358 in forward end 356 of end bracket 122 provides an additional level of safety and security to the system 10.

Any other configuration or arrangement is hereby contemplated for use to facilitate locking of outer door 32 upon inner door 26.

Figure 85:
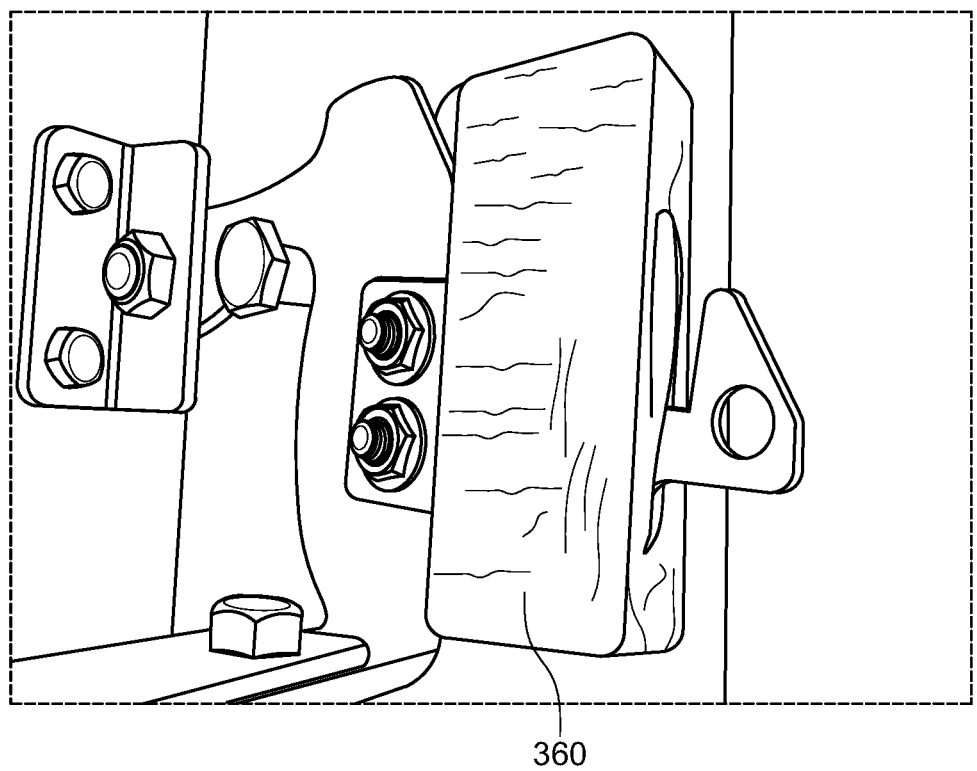
FIG. 85 is close up lower left perspective view of a seal positioned around the forward end of end bracket, consistent with one or more embodiments.
Figure 86:
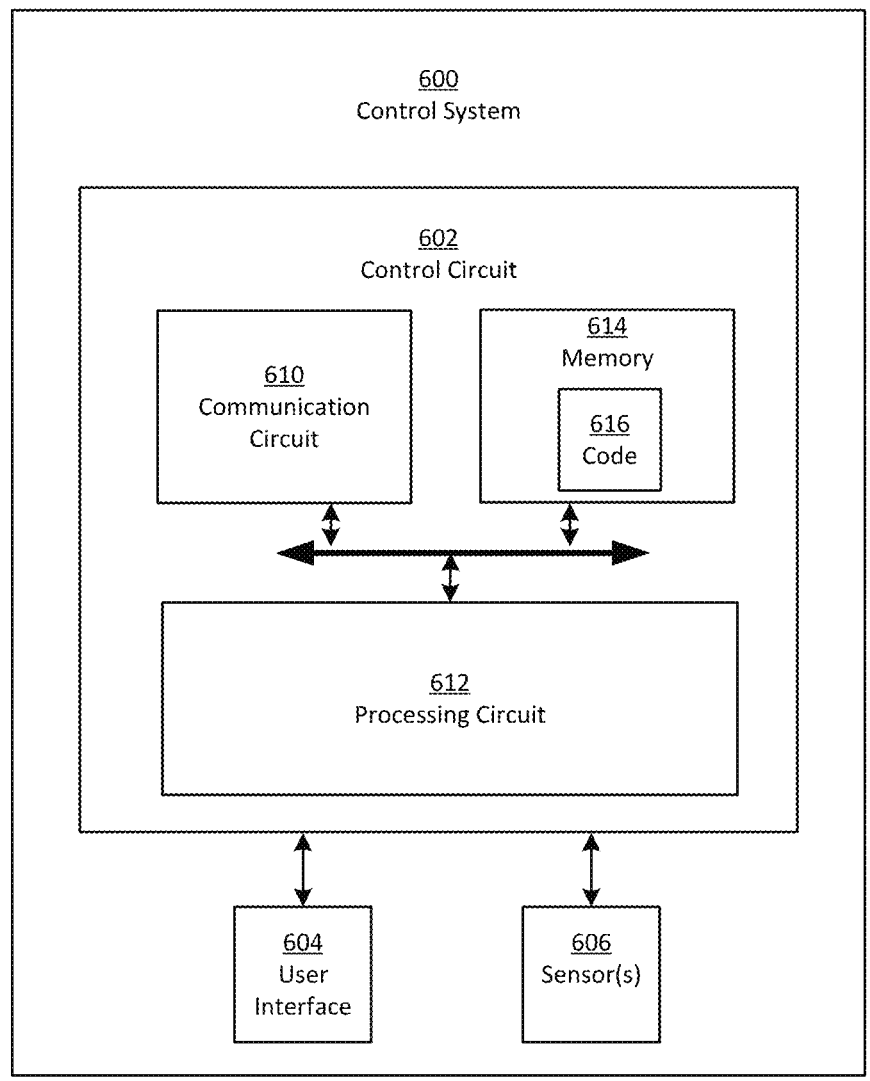
FIG. 86 shows a block diagram of an example control system, in accordance with one or more embodiments.

Sealing Member 360:

In the arrangement shown, as one example, with reference to FIG. 85, a sealing member 360 is positioned on, over or at the forward end 356 of end bracket 122. Sealing member 360 is formed of any suitable size, shape and design and is configured to seal the opening around the forward end 356 of end bracket 122 once the forward end 356 of end bracket 122 extends through slot 348 of outer door 32. In the arrangement shown, as one example, sealing member 360 is formed of a piece of flexible and compressible foam, however any other form of a sealing member is hereby contemplated for use such as rubber, plastic, flexible fingers, woolpile, felt, canvas, fabric, or any other sealing mechanism or system or any combination thereof. In the arrangement shown, as one example, sealing member 360 is a generally rectangular shaped block of flexible and compressible material positioned around the forward end 356 of end bracket 122 rearward of slot 350, however any other shape or configuration is hereby contemplated for use.

In the arrangement shown, as one example, as inner door 26 is closed upon outer door 32 the forward facing surface of sealing member 360 engages the interior surface of outer door 32 around the area of slot 348 of outer door 32. This engagement seals the opening that is formed by slot 348 in outer door and thereby seals the hollow interior between outer door 32 and inner door 26. This prevents insects, water, and contaminants from entering the hollow interior between outer door 32 and inner door 26 thereby keeping the system 10 cleaner, reducing wear and tear, and extending its useful life.

Alternatively, sealing member 360 may be positioned on the interior surface of outer door 32 at or around the area of slot 348 and/or on the exterior surface of outer door 32 at or around the area of slot 348. Any other configuration is hereby contemplated for use.

Safety Mechanism—Alternative Arrangement:

With reference to FIGS. 65-70, an alternative arrangement of a safety grain bin door latch system 10 is presented. This alternative arrangement presented in FIGS. 65-70 is similar to the safety grain bin door latch systems 10 presented in FIGS. 1-64 and therefore unless specifically stated otherwise herein, the prior teaching and disclosure shown in FIGS. 1-64 applies equally to the alternative arrangement shown in FIGS. 65-70. That is, the arrangement shown in FIGS. 54-70 is configured to be used with the same or similar grain bin 12, door assembly 14, door frame 16 and the like with the difference being changes to safety mechanism 36 as is described herein.

In the arrangement shown, as one example, safety grain bin door latch system 10 includes a safety mechanism 36. Safety mechanism 36 may be formed of any suitable size, shape and design and is configured to permit outer door 32 to be closed when the inner door 26 is in a closed and locked position, and, similarly, safety mechanism 36 is configured to prevent outer door 32 from being closed when the inner door 26 is in an open and unlocked position.

In the arrangement shown, as one example, safety mechanism 36 includes a crossbar 250 having an upper end 252, a lower end 254, an interior surface 256, an exterior surface 258, a forward side 260, a rearward side 262, a lever 264, a flange 392, a door stop member 384, a plurality of slots 268, a protrusion 270 having a plurality of slots 272, and a bias member 274 (not shown in the figures), among other components and features as is further described herein.

Crossbar: In the arrangement shown, as one example, safety mechanism 36 includes a crossbar 250. Crossbar 250 may be formed of any suitable size, shape and design and is configured to allow outer door 32 to be closed on door frame 16 when the inner door 26 is in a closed and locked position, and, similarly, to prevent outer door 32 from being closed on door frame 16 when the inner door 26 is in an open and unlocked position.

In the arrangement shown, as one example, crossbar 250 is a generally flat and elongated generally rectangular bar or member that extends an elongated length between an upper end 252 and a lower end 254, and extends a width between an interior surface 256 and an exterior surface 258, and extends a depth between a forward side 260 and a rearward side 262, among other features. However, any other shape is hereby contemplated for use. In the arrangement shown, as one example, when viewed from the forward side 260 or rearward side 262, crossbar 250 is a generally flat and straight and planar member other than the deviations out of plane formed by lever 264, flange 392, and door stop member 384. In the arrangement shown, as one example, when viewed from the interior side 256 or exterior side 258, the forward edge and rearward edge of crossbar 250 extend in a straight and flat manner and extend in approximate parallel spaced relation to one another.

In one arrangement, crossbar 250 is formed of a single planar piece of material that is bent to form the features of lever 264, flange 392, and door stop member 384 and is cut or punched to form the features of slots 268. However, any other configuration and manufacturing method is hereby contemplated for use.

In the arrangement shown, as one example, crossbar 250 extends a length from upper end 252 to lower end 254 in a generally flat, straight, and planar manner. In the arrangement shown, as one example, crossbar 250 extends from forward side 260 to rearward side 262 in a generally flat, straight, and planar manner. That is, the forward edge formed by forward side 260 and the rearward edge formed by rearward side 262 of crossbar 250 are generally straight and extend in approximate parallel spaced relation to one another.

Lever:

In the arrangement shown, as one example, crossbar 250 includes a lever 264. Lever 264 is formed of any suitable size, shape and design and is configured to be engaged by a handle assembly 30 of a panel 28 (or more specifically in the arrangement shown, as one example, upper door panel 28U) of inner door 26 as the inner door 26 is closed and locked. This engagement between lever 264 and handle assembly 30 of inner door 26 causes the crossbar 250 to move from a disengaged position to an engaged position.

In the arrangement shown, as one example, lever 264 is positioned at the lower end 254 of crossbar 250 and extends inward from the interior surface 256 of crossbar 250 a distance. In the arrangement shown, as one example, lever 264 is itself generally flat and planar in shape. In the arrangement shown, as one example the plane formed by lever 264 extends at an approximate perpendicular alignment to the plane formed by the length of the main body of crossbar 250 between the upper end 252 and lower end 254.

In the arrangement shown, as one example, the upper surface of lever 264 is generally planar in shape and provides an extended surface area for a portion of handle assembly 30, such as end bracket 122, to engage lever 264 thereby moving lever 264 and the entire crossbar 250 between a disengaged position and an engaged position.

In the arrangement shown, as one example, the forward side and rearward side corners 288 of lever 264 are cut or chamfered so as to remove any sharp corners that could cause a safety issue.

In the arrangement shown, as one example, lever 264 connects at its exterior end to the lower end 254 of crossbar 250. In the arrangement shown, as one example, lever 264 extends inward a distance from the lower end 254 of crossbar 250 before terminating at free and unconnected end. However, any other configuration is hereby contemplated for use.

In the arrangement shown, as one example, lever 264 is formed out of the material that forms crossbar 250 by bending. However, lever 264 may be formed by any other manner, method or means, such as by welding lever 264 to crossbar 250, screwing or bolting or fastening or otherwise affixing lever 264 to crossbar 250, by machining, by casting, by molding, or by any other manner, method or means.

Flange:

In the arrangement shown, as one example, crossbar 250 includes a flange 392. Flange 392 is formed of any suitable size, shape and design and is configured to connect door stop member 384 to upper end 252 of crossbar 250. In the arrangement shown, flange 392 has a generally planar shape extending between opposing sides 398 from a forward end 394 to a rearward end 396. In this example arrangement, one side 399 flange 392 is connected to upper end 252 of crossbar 250. In this example arrangement, forward end 394 of flange 392 is connected to a lower end 386 of door stop member 384.

In the arrangement shown, as one example, flange 392 is formed out of the material that forms crossbar 250 by bending. However, flange 392 may be formed by any other manner, method or means, such as by welding flange 392 on top of crossbar 250, screwing or bolting or fastening or otherwise affixing flange 392 on top of crossbar 250, by machining, by casting, by molding, or by any other manner, method or means.

Door Stop Member:

In the arrangement shown, as one example, crossbar 250 includes a door stop member 384. Door stop member 384 is formed of any suitable size, shape and design and is configured to prevent outer door 32 from closing when crossbar 250 is in the disengaged position. Conversely, door stop member 384 is configured to permit outer door 32 to close when lever 264 is engaged by a handle assembly 30 of a panel 28 thereby causing crossbar 250 to move to the engaged position.

In the arrangement shown, as one example, door stop member 384 has a generally planar shape extending between opposing sides 390 from a lower end 386 to an upper end 388. In this example arrangement, lower end 386 of door stop member 384 is connected to forward end 394 of flange 392. In this example arrangement, door stop member 384 extends upward from flange 392 beyond upper frame member 60 when crossbar 250 is in the disengaged position. In this position, door stop member 384 prevents outer door 32 from closing. When crossbar 250 is in the engaged position, upper end 388 of door stop member 384 is lowered below upper frame member 60 such that outer door 32 is permitted move to a closed position.

In the arrangement shown, as one example, flange 392 is formed out of the material that forms crossbar 250 and flange 392 by bending. However, door stop member 384 may be formed by any other manner, method or means, such as by welding door stop member 384 on top of flange 392, screwing or bolting or fastening or otherwise affixing door stop member 384 to flange 392 by machining, by casting, by molding, or by any other manner, method or means.

Slots:

In the arrangement shown, as one example, crossbar 250 includes a plurality of slots 268. Slots 268 are formed of any suitable size, shape and design and are configured to facilitate connection of crossbar 250 to the inward facing surface of a side frame member 64 of door frame 16 while allowing for functional vertical movement of safety mechanism 36. That is, in the arrangement shown, as one example, slots 268 facilitate the attachment of crossbar 250 to door frame 16, provide alignment of crossbar 250 to door frame 16 and facilitate sliding vertical movement of crossbar 250 relative to door frame 16.

In the arrangement shown, as one example, slots 268 are generally elongated openings with straight sides and rounded upper and lower ends that are positioned in the approximate forward side 260-to-rearward side 262 middle of crossbar 250. In the arrangement shown, as one example, the vertical length of slots 268 extend in approximate alignment to the vertical length of crossbar 250.

In the arrangement shown, as one example, two slots 268 are shown in use with crossbar 250, one slot 268 positioned adjacent the upper end 252 of crossbar 250 and one slot 268 positioned adjacent the lower end 254 of crossbar 250. However, any other number of slots is hereby contemplated for use such as one, two, three, four, five, six, seven, eight, nine or ten or more.

In the arrangement shown, as one example, slots 268 receive a fastener 292 therein. Fasteners 292 are formed of any size, shape and design and are configured to attach crossbar 250 to door frame 16 while facilitating vertical sliding movement of crossbar 250. Said another way, fasteners 292 are formed of any member that fastens safety mechanism 36 to side frame member 64 of door frame 16 while allowing for vertical movement of safety mechanism 36 between the disengaged position and the engaged position. Fasteners 292 may be formed of one or more screws, bolts, shafts, brackets, pins, protrusions, rails, groves or any other feature or any other member, or combination thereof.

In the arrangement shown, as one example, a single fastener 292 is used for each slot 268. In the arrangement shown, as one example, fastener 292 is a screw, bolt, pin or shaft that includes a wider head positioned on the interior surface 256 side of crossbar 250 and includes a narrower shaft that extends through slot 268 before connecting to side frame member 64 on the exterior surface 258 side of crossbar 250. In the arrangement shown, as one example, fastener 292 is a screw or bolt having a head on the interior surface 256 side of crossbar 250 with the shaft extending through the slot 268 that is threaded into the side frame member 64 or into a threaded nut or other threaded member adjacent side frame member 64.

In the arrangement shown, as one example, when fasteners 292 engage the upper edge of slots 268, crossbar 250 of safety mechanism 36 is in a fully lowered or fully depressed position. In the arrangement shown, as one example, when fasteners 292 engage the lower edge of slots 268, crossbar 250 of safety mechanism 36 is in a fully raised position.

Bias Member:

In the arrangement shown, as one example, safety mechanism 36 is shown in a disengaged position when safety mechanism 36 is in a raised position. In the arrangement shown, as one example, safety mechanism 36 is shown, in an engaged position when safety mechanism 36 is in a lowered position.

To facilitate safety mechanism 36 to naturally move to a raised position when safety mechanism 36 is not engaged by handle assembly 30 of inner door 26, which is opposite the natural pull of gravity, bias member 274 is used. Bias member 274 is formed of any suitable size, shape and design and is configured to provide a bias or force that naturally moves safety mechanism 36 toward the disengaged position. That is, in the arrangement shown, as one example, bias member 274 is configured force safety mechanism 36 upward and toward the disengaged position when crossbar 250 is not engaged by handle assembly 30 of inner door 26. In addition, in the arrangement shown, as one example, bias member 274 is also configured to allow crossbar 250 to move downward, against the force or bias provided by bias member 274, when crossbar 250 is engaged by handle assembly 30 of inner door 26 and sufficient force is applied that is greater than the force provided by bias member 274.

Bias member 274 may be formed of a spring member which pushes or pulls or applies a force to the safety mechanism 36 to move it to the disengaged position. Bias member 274 may be a weighted system that pushes or pulls safety mechanism 36 upward, such as through a pulley system or lever system or weighted arrangement or the like. Any other form of a bias member 274 is hereby contemplated for use which pushes or pulls or applies a force to the safety mechanism 36 to move it to the disengaged position.

It is to be noted, that while in the arrangement shown, the safety mechanism 36 naturally moves upward to the disengaged position then it is forced downward to the engaged position by engagement of handle assembly 30 of inner door 26. However, it is to be understood that the opposite arrangement is hereby contemplated for use wherein the safety mechanism 36 naturally moves downward to the disengaged position then it is forced upward to the engaged position when it is engaged by handle assembly 30 of inner door 26. This opposite arrangement harnesses the natural pull of gravity and may eliminate the need for a bias member 274 and therefor may be more efficient as it may eliminate a part (bias member 274). However, in either arrangement, the use of bias member 274 may be used to help facilitate proper functioning.

In the arrangement shown, as one example, while the safety mechanism 36 is shown at the top of the inner door 26, it is hereby contemplated that safety mechanism 36 may alternatively or additionally placed at the bottom of the inner door 26. Notably, in the arrangement shown, as one example, a safety mechanism 36 is shown at each outward side of inner door 26. However, it is hereby contemplated that only a single safety mechanism 36 may be utilized at only one side of inner door 26.

Stationary Bracket:

In the arrangement shown, as one example, system 10 includes a stationary bracket 352. Stationary bracket 352 may be formed of any suitable size, shape and design and is configured to secure the outer door 32 when the outer door 32 is closed and handle assembly 34 is moved to a closed or latched position In the arrangement shown, as one example, stationary bracket 352 protrudes from and/or is secured in a stationary manner to door frame 16 in a position wherein a bracket 148 of handle assembly 34 may be secured when handle assembly 34 is moved to a closed or latched position. In the arrangement shown, as one example, stationary bracket 352 is similar to if not identical to the outer flange 174 having a slot 172 therein with corner section 204, ends 206 and holes 208 as is described herein. The difference being that stationary bracket 352, having outer flange 174 having a slot 172 therein with corner section 204, ends 206 and holes 208, is secured in a stationary manner to door frame 16. This secures the outer door 32 when the outer door 32 is closed and handle assembly 34 is moved to a closed or latched position. However, any other size, shape and configuration is hereby contemplated for use as stationary bracket 352. However outer door 32 cannot be latched to stationary bracket 352 due to interference with safety mechanism 36 when safety mechanism 36 is in a disengaged position.

In Operation:

In operation, the system 10 of FIGS. 65-70 prevents the user from latching the outer door 32 in a closed position when the inner door 26 is in an open and unlatched position. If the user attempts to close outer door 32 when inner door 26 is in an open and unlatched position, the user will find that the safety mechanism 36 is in a raised, opened or disengaged position, where door stop member 384 prevents outer door 32 from being able to be closed. That is, if the user attempts to close outer door 32, door stop member 384 gets between upper frame member 60 of door frame 16 and outer door 32 thereby preventing outer door 32 from being closed thereby preventing outer door 32 from being latched in a closed position. Therefore, the outer door 32 cannot be closed, latched or locked in a closed position until the inner door 26 is fully closed and latched thereby pressing safety mechanism 36 downward and moving the door stop member 384 out of the way thereby allowing outer door 32 to be closed. This prevents a user from closing and latching the outer door 32, forgetting the inner door 26 is open and then filling the grain bin 12, which can damage or destroy the grain bin 12 and/or cause injury or death.

If the user attempts to close the outer door 32, the user is reminded that they must first close and latch the inner door 26 in order to move the safety mechanism to a lowered, engaged, or latching position before the outer door 32 can be moved to a closed position.

To close and latch the inner door 26 the user must close the inner door 26 in the appropriate manner. In the arrangement shown, as one example, the user closes inner door 26 by first closing lower door panel 28L. This is accomplished by grasping crossbar 126 of handle assembly 30 connected to lower door panel 28L and pulling the lower door panel 28L toward door frame 16. As the lower door panel 28L is pulled toward door frame 16 lower door panel 28L rotates upon hinges 112. As the lower door panel 28L nears the fully closed position, the holes 110 in side edges 98 of lower door panel 28 begin to receive the oversized circular posts 86 connected to the interior surface of the overlapped side connectors 22 and flanges 71 of side frame members 64. This process is repeated for the center door panel 28C and the upper door panel 28U.

Once the upper door panel 28U is near the fully closed position, the crossbar 126 is forced downward. As crossbar 126 is moved downward, crossbar engages lever 264 of crossbar 250 thereby causing crossbar 250 to move to the engaged position. When crossbar 250 is in the engaged position, upper end 388 of door stop member 384 is lowered below upper frame member 60 such that outer door 32 is permitted move to a closed position.

Once outer door 32 is fully closed, the plane of bracket 148 is aligned with a slot 172 in stationary bracket 352. Once in this position, crossbar 156 of handle assembly 34 may be lowered to secure the bracket 148 in a latched and locked position. As crossbar 156 of handle assembly 34 is pulled downward (while outer door 32 is pushed inward), the lower end of bracket 148 slides into the slot 172 of stationary bracket 352 thereby securing the bracket 148 and outer door 32 in a latched and locked position.

To open outer door 32, the user simply raises crossbar 156 of handle assembly 34 which causes bracket 148 to slide out of the slot 172 in the upper side of stationary bracket 352. Once the bracket 148 is removed from slot 172, outer door 32 is permitted to open.

Figure 71:
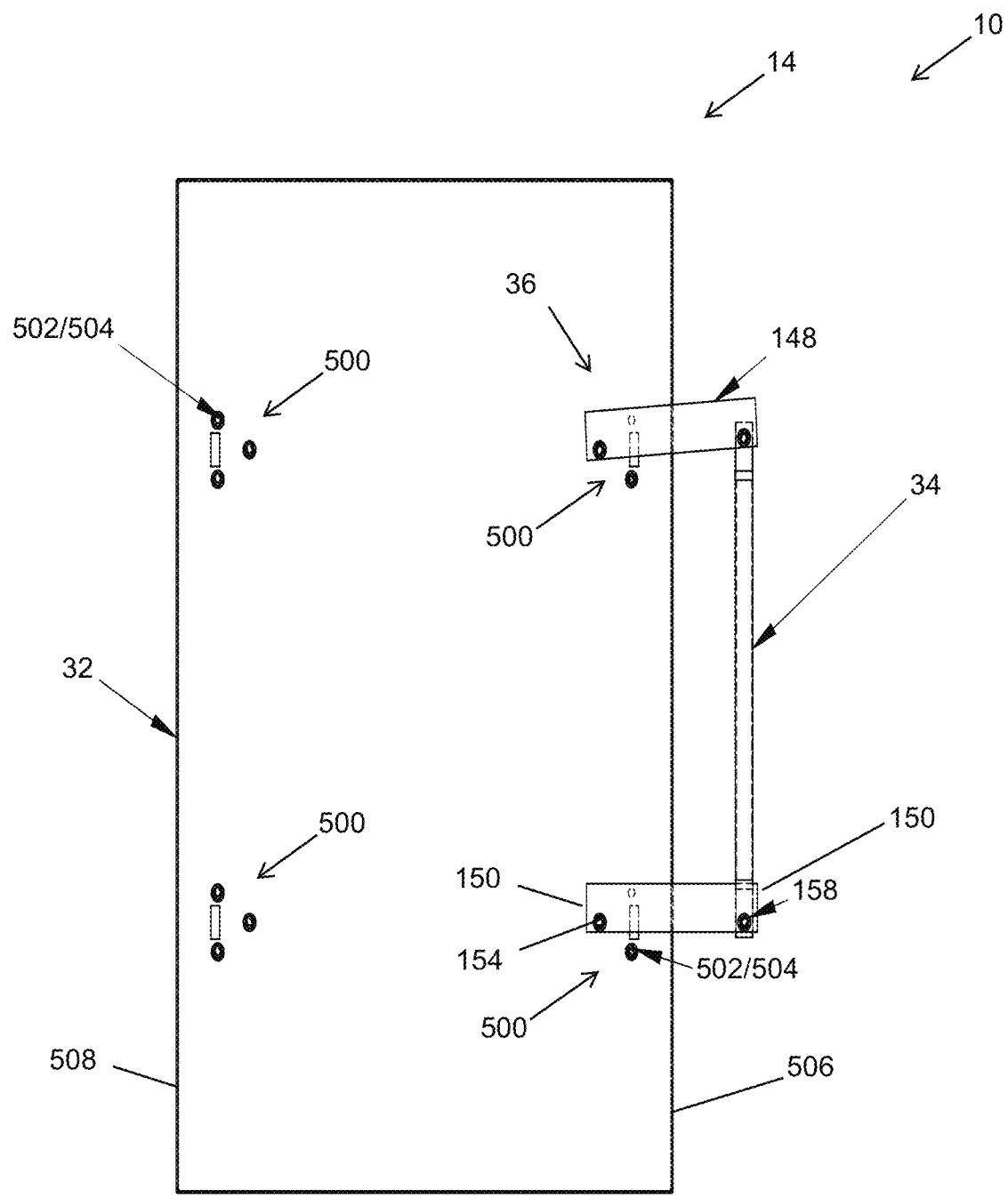
FIG. 71 is a front view of a safety door latch system, consistent with one or more embodiments; the view showing an outer door having connector assemblies configured to facilitate placement of hinges and handle assembly on either side of the outer door.
Figure 72:
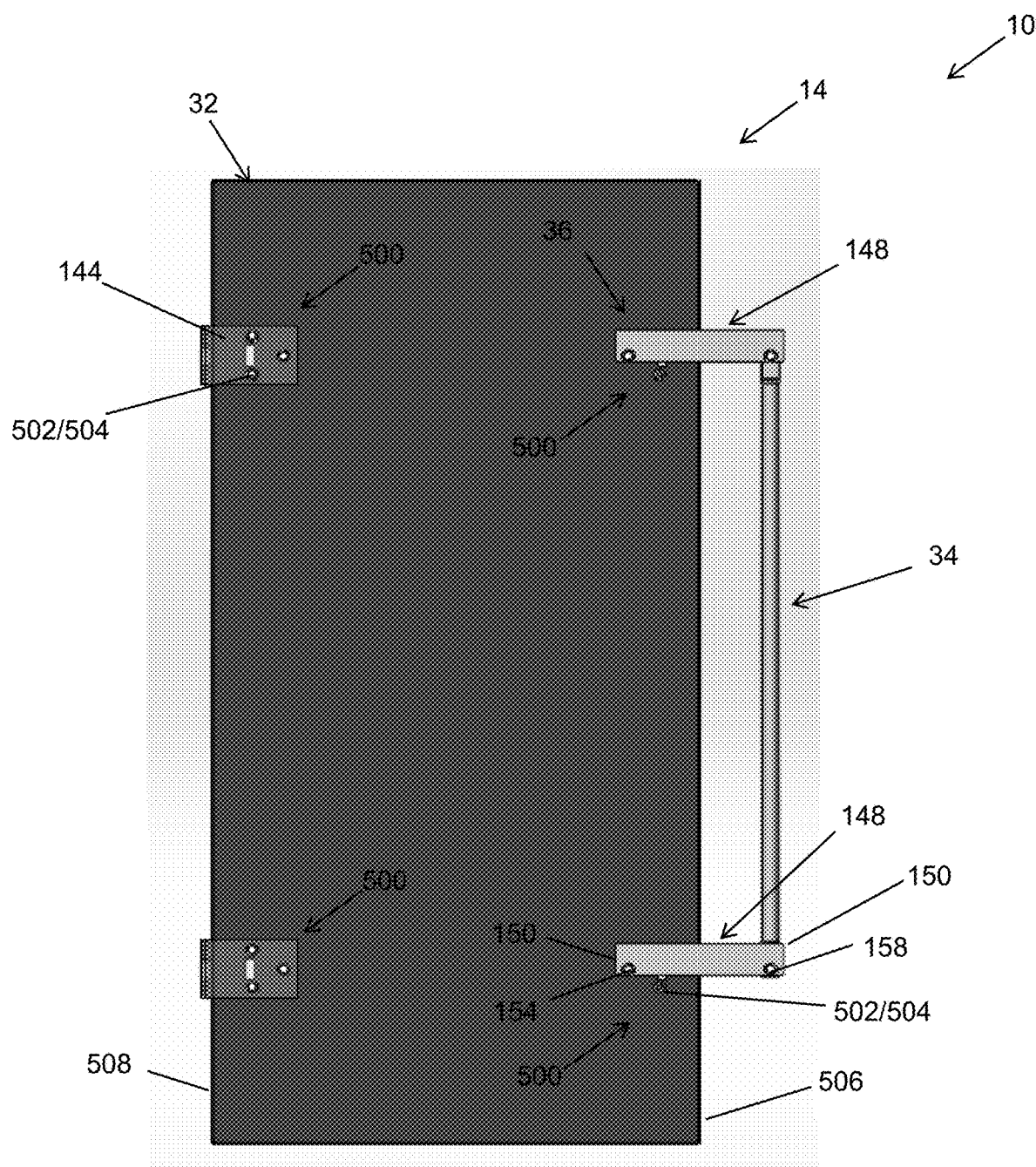
FIG. 72 is a front view of a safety door latch system, consistent with one or more embodiments; the view showing an outer door having connector assemblies configured to facilitate placement of hinges and handle assembly on either side of the outer door.
Figure 73:
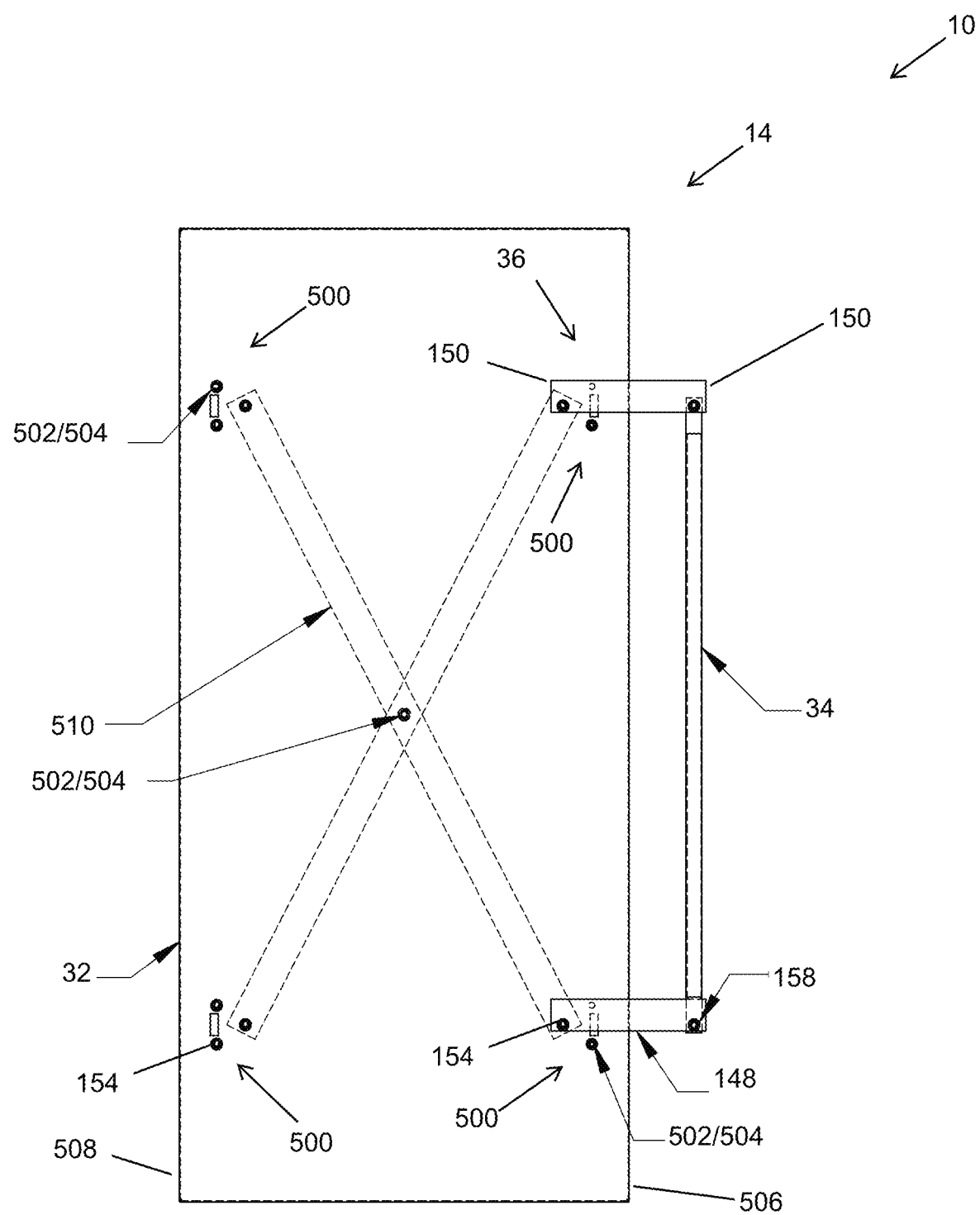
FIG. 73 is a front view of a safety door latch system, consistent with one or more embodiments; the view showing an outer door having connector assemblies configured to facilitate placement of hinges and handle assembly on either side of the outer door.
Figure 74:
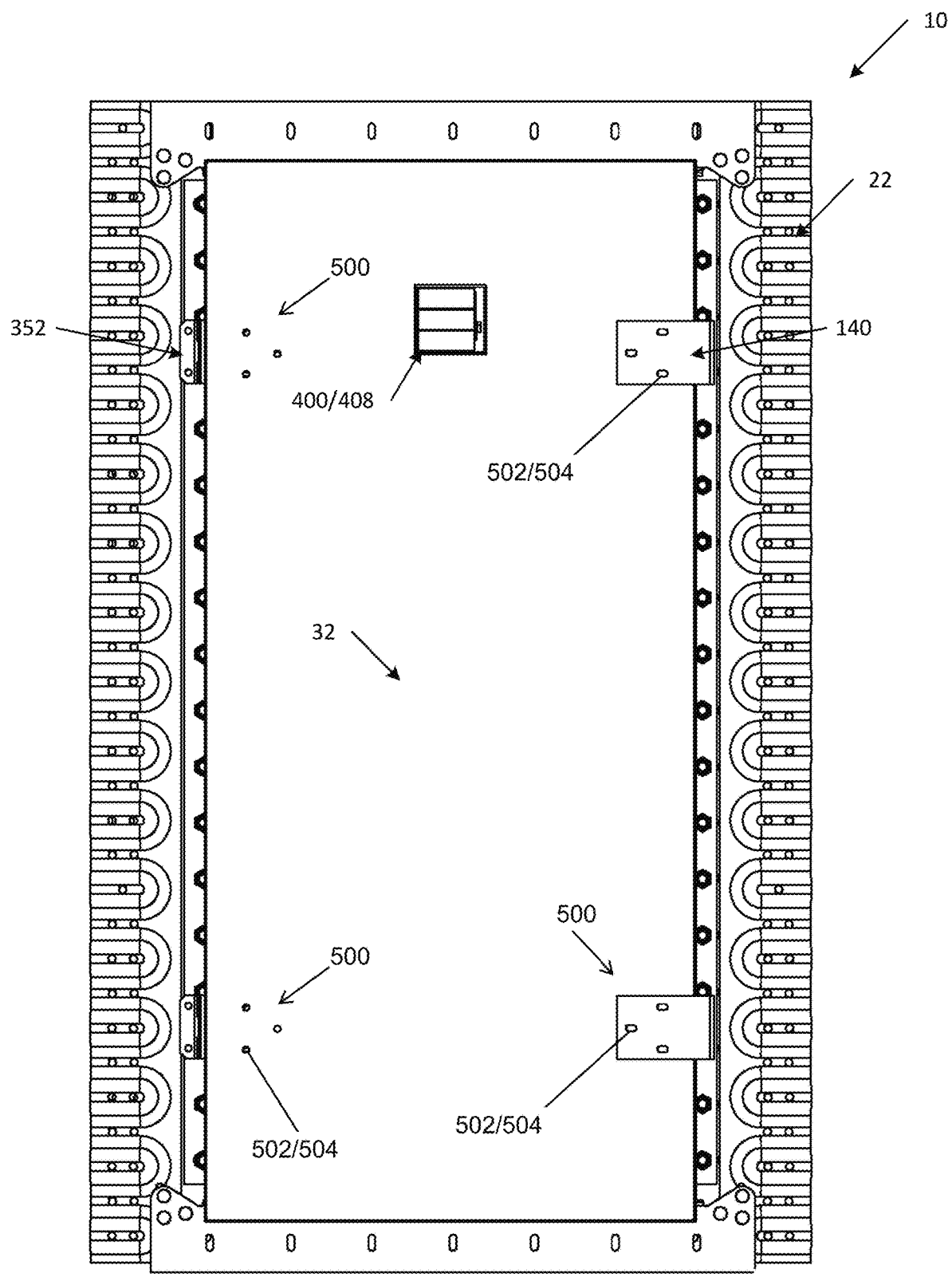
FIG. 74 is a front view of a safety door latch system, consistent with one or more embodiments; the view showing a visual warning system visible in a window of outer door.
Figure 75:
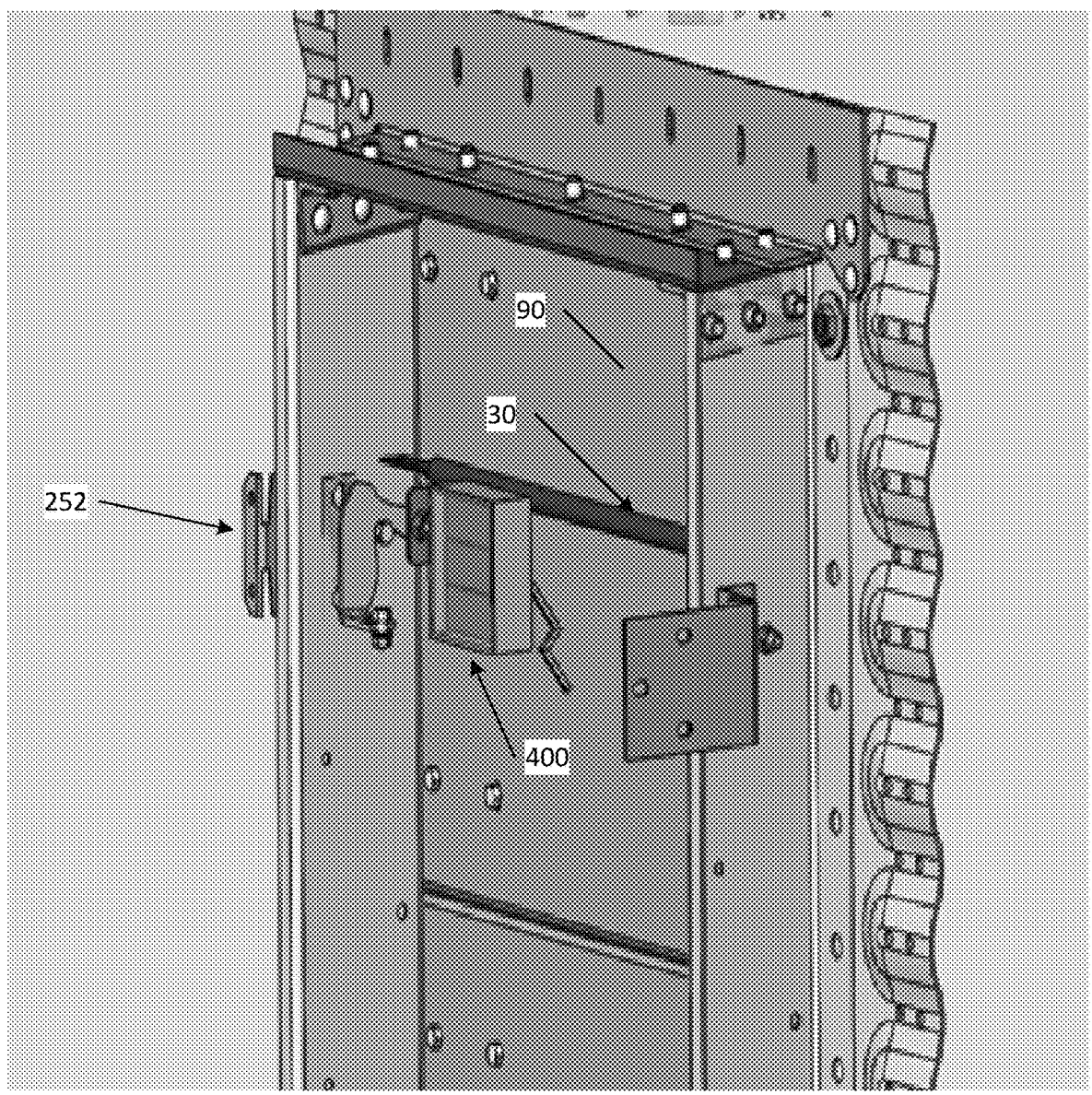
FIG. 75 is a partial front view of a safety door latch system with visual warning system, consistent with one or more embodiments; the view showing outer door omitted; the view showing the visual warning system in a hazard indication position.
Figure 76:
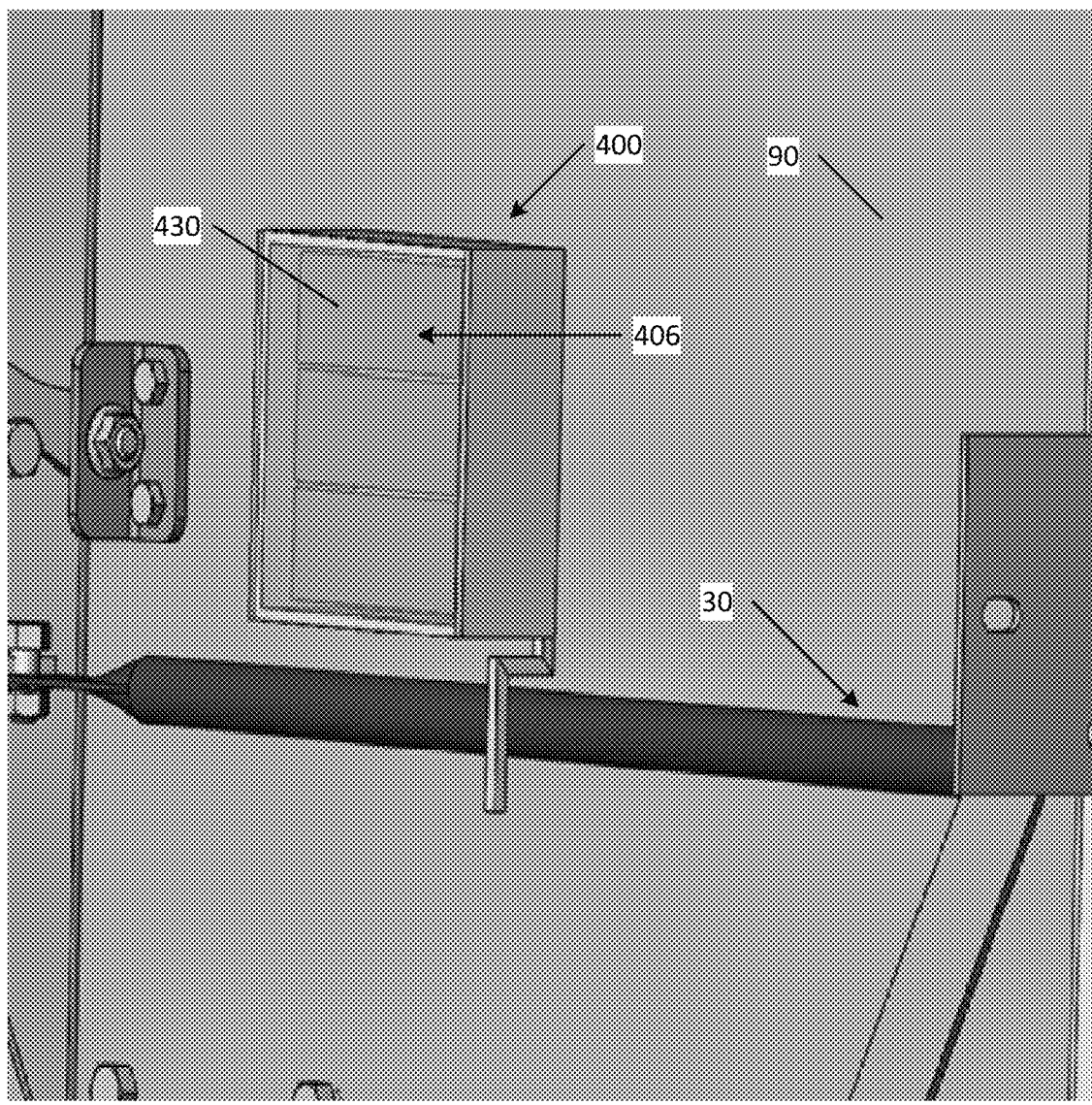
FIG. 76 is a partial front view of a safety door latch system with visual warning system, consistent with one or more embodiments; the view showing outer door omitted; the view showing the visual warning system in a safe indication position.
Figure 77:
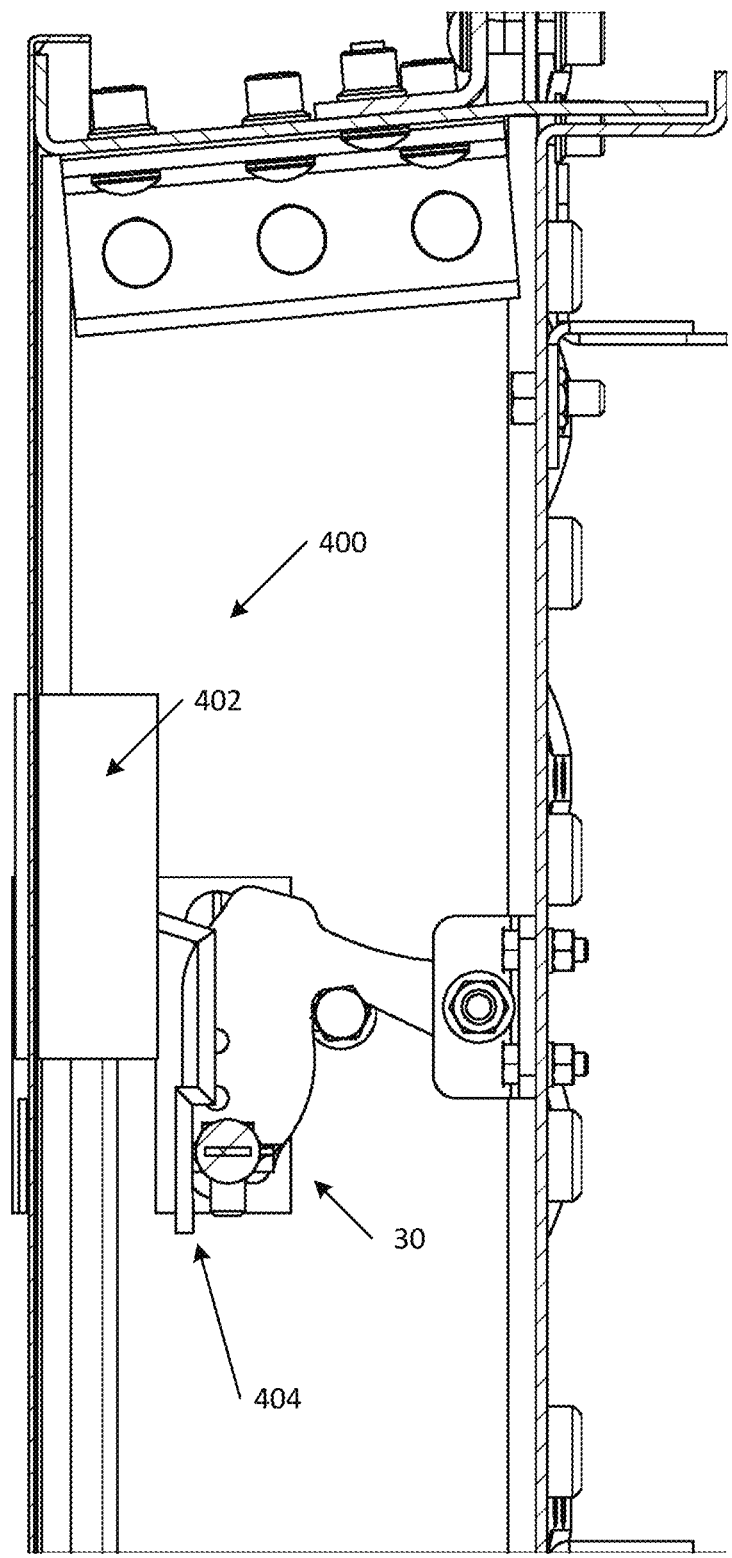
FIG. 77 is cross section side view of a safety door latch system with visual warning system, consistent with one or more embodiments; the view showing the visual warning system in a safe indication position.
Figure 78:
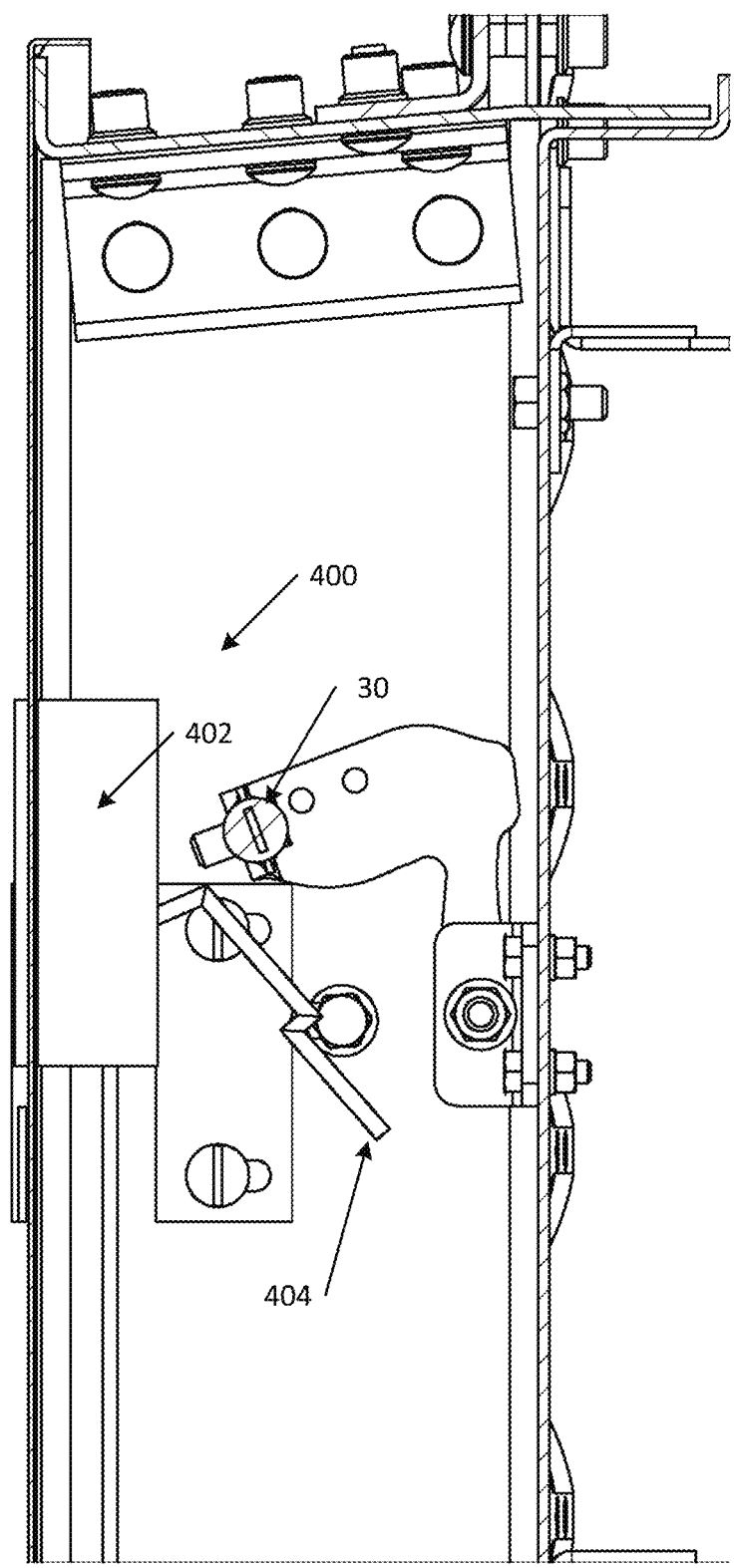
FIG. 78 is cross section side view of a safety door latch system with visual warning system, consistent with one or more embodiments; the view showing the visual warning system in a hazard indication position.
Figure 79:
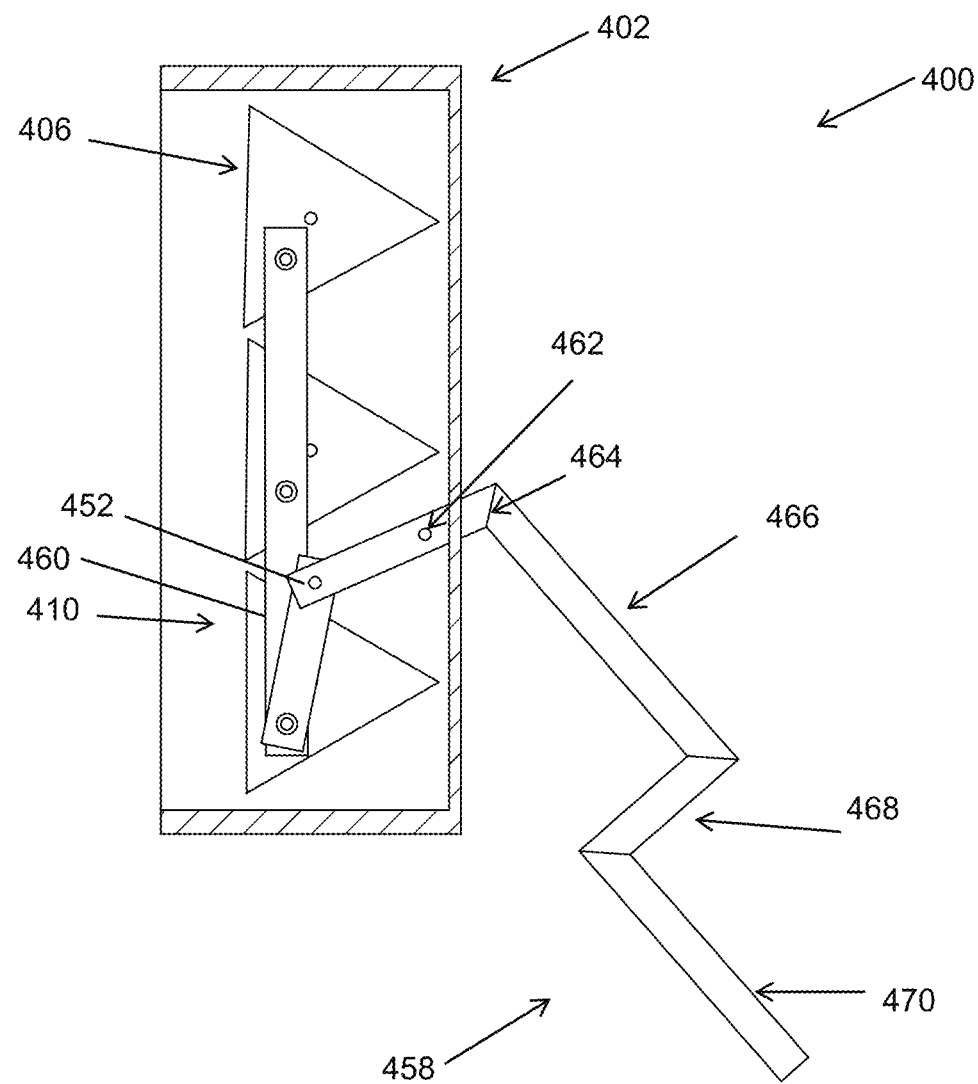
FIG. 79 is cross section side view of a visual warning system, consistent with one or more embodiments; the view showing visual the warning system in a hazard indication position.
Figure 80:
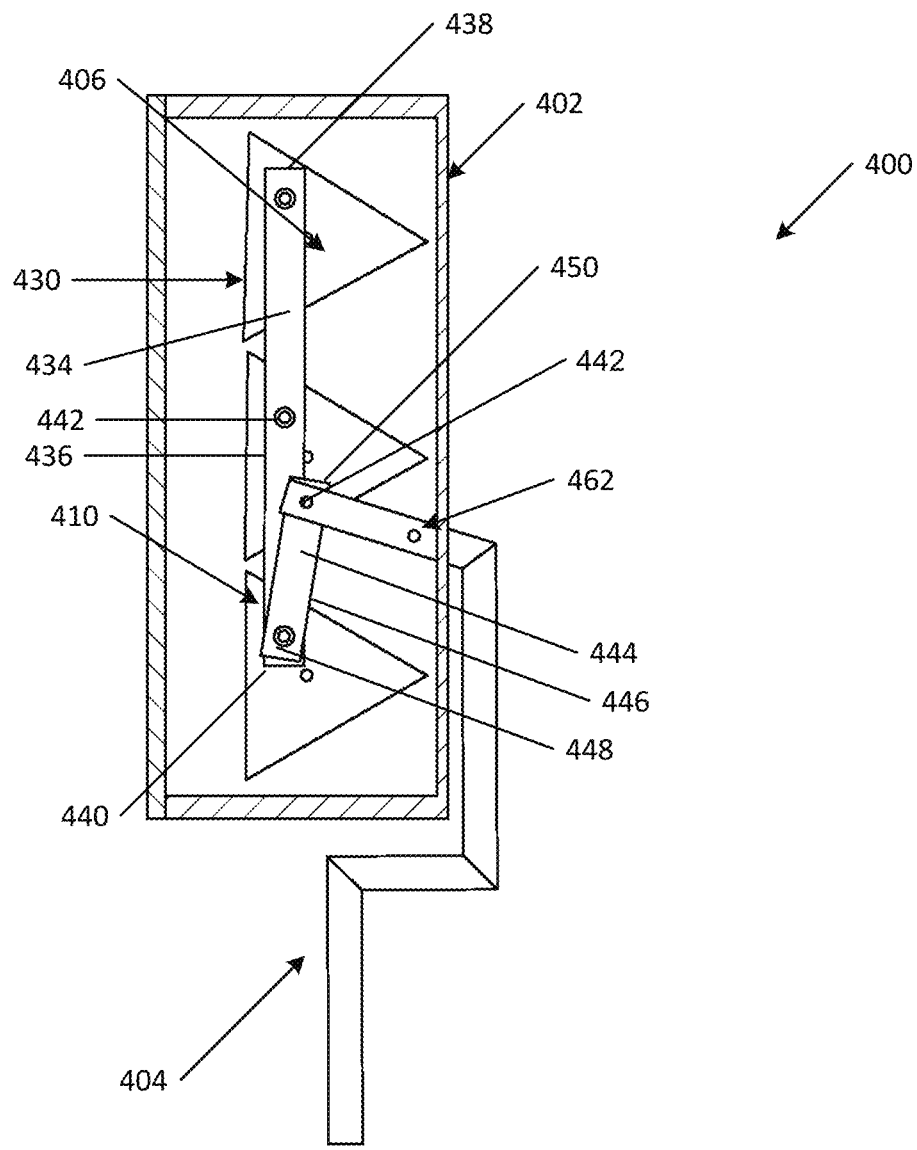
FIG. 80 is cross section side view of a visual warning system, consistent with one or more embodiments; the view showing the visual warning system in a safe indication position.
Figure 81:
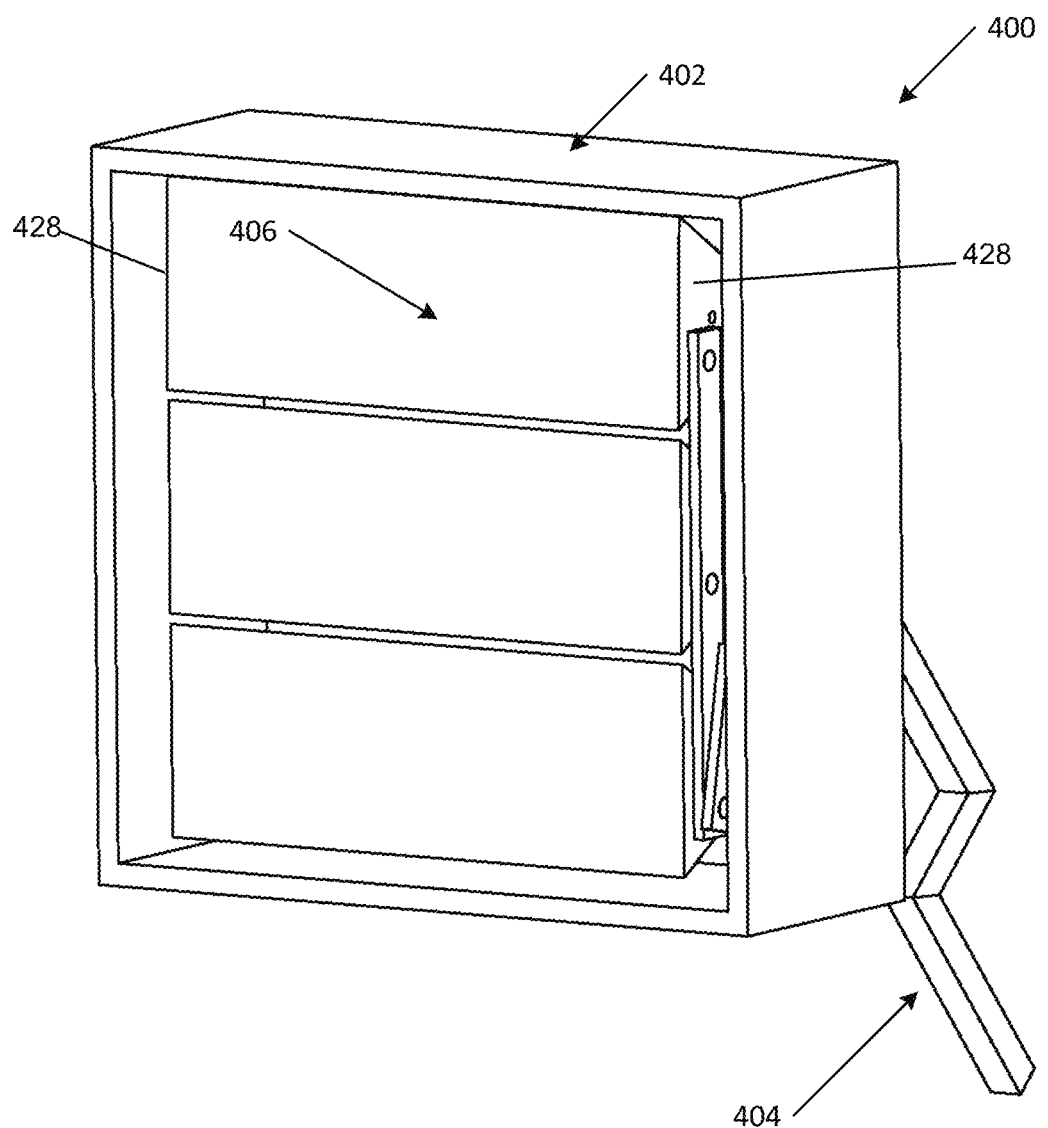
FIG. 81 is a front right perspective view of a visual warning system, consistent with one or more embodiments; the view showing the visual warning system in a hazard indication position.

In this way, a secure, strong, rigid, and fool-proof safety grain bin door latch system 10 is presented that prevents the closing and latching and locking of outer door 32 unless the inner door 26 is fully and properly closed and latched.
Reversibility Outer Door 32—Alternative Arrangement:

With reference to FIGS. 71-73, an alternative arrangement of a safety grain bin door latch system 10 is presented. This alternative arrangement presented in FIGS. 71-73 is similar to the safety grain bin door latch systems 10 presented in FIGS. 1-70 and therefore unless specifically stated otherwise herein, the prior teaching and disclosure shown in FIGS. 1-70 applies equally to the alternative arrangement shown in FIGS. 71-73. That is, the arrangement shown in FIGS. 71-73 is configured to be used with the same or similar grain bin 12, door assembly 14, door frame 16 and the like with an outer door 32 having hinges 140 and handle assembly 34.

For various reasons, in some grain bin applications, it may be desirable to have hinges 140 of outer door 32 on a left side of outer door 32 and in some other grain bin applications, it may be desirable to have hinges 140 on a right side of outer door 32. Some grain bin doors are configured to be reversable by rotating an assembled door, with hinges and handle attached, 180 degrees. However, rotating of the door can create difficulties. For example, outer door 32 may include warning labels to draw attention to the inherent dangers of grain bins. When outer door 32 rotated, such warning labels would be upside down and difficult to read. As another example, in one or more arrangements outer door 32 may have visual warning system 400 positioned at eye level where it is most likely to be seen. When outer door 32 is rotated, visual warning system 400 would be positioned far below eye level where warning indicators may go unnoticed.
Connector Assemblies 500:

In one or more arrangements, hinges 140 and handle assembly 34 are configured to be mounted outer door 32 using connector assemblies that permit hinges 140 and handle assembly 34 to be connected to and moved between either side of outer door 32. Connector assemblies 500 are formed of any suitable, size, shape, or design and are configured to facilitate connecting of hinges 140 and handle assembly 34 to be connected to and moved between either side of outer door 32. In the arrangement shown, as one example, connector assemblies 500 include sets of fastener holes 502 and fasteners 504. In this example arrangement, fastener holes 502 are positioned symmetrically on each side of outer door 32, thereby permitting hinges 140 and handle assembly 34 to be connected either side of outer door 32 by rotating the hinges 140 and handle assembly 34 180 degrees. However, the embodiments are not so limited. Rather, it is contemplated that in one or more arrangements connector assemblies 32 may connect hinges 140 and handle assembly 34 to outer door 32 using various means and methods known in the art including but not limited to, for example, adhesive bonding, chemical bonding, welding, and/or mechanical attachment means such as frictional fitting, screws, bolts, threading, interlocks, clips, pins, or other means or method for connecting object.

In the arrangement shown, as one example, each connector assembly 500 includes three fastener holes 502 positioned in a triangular arrangement having a pair of vertically aligned fastener holes 502 in an outer position and an inner fastener holes 502 positioned vertically between the pair at an inner position. However, embodiments are not so limited. Rather, it is contemplated that connector assemblies 500 may include more or fewer fastener holes 502 and/or may be positioned in any arrangement so long as fastener holes 502 of connector assemblies 500 on right side 506 of the outer door 32 are vertically symmetric to fastener holes 502 of connector assemblies 500 on left side 508 of the outer door 32 (e.g., as shown in FIGS. 71-73).

In one or more arrangements, connector assemblies 500 may be used to operably connect various components to outer door 32 in addition to hinges 140 and handle assembly 34. For example, in the arrangement shown in FIG. 73, connector assemblies 500 are configured to operably connect a pair of cross braces 510 to a back side of outer door 32. Cross braces 510 provide structural reinforcement outer door 32. In this example arrangement, a fastener 504 of each connector assemblies 500 extend through a hole in an end of one of the cross braces 510 to secure the cross brace 510 to outer door 32.
Visual Warning System—Alternative Arrangement:

With reference to FIGS. 74-82, an alternative arrangement of a safety grain bin door latch system 10 is presented having a visual warning system 400. This alternative arrangement presented in FIGS. 74-82 is similar to the safety grain bin door latch systems 10 presented in FIGS. 1-73 and therefore unless specifically stated otherwise herein, the prior teaching and disclosure shown in FIGS. 1-73 applies equally to the alternative arrangement shown in FIGS. 74-82. That is, the arrangement shown in FIGS. 1-73 is configured to be used with the same or similar grain bin 12, door assembly 14, door frame 16 and the like with the difference being the addition of visual warning system 400 as is described herein.
Visual Warning System:

In the arrangement shown, as one example, safety grain bin door latch system 10 includes a visual warning system 400. Visual warning system 400 is formed of any suitable size, shape and design and is configured to provide a visual indication whether inner door 26 is closed and latched when outer door 32 is in a closed position. In the arrangement shown, as one example, visual warning system 400 includes an enclosure 402, a lever 404, one or more indicators 406, a window 408 in outer door 32, and a linkage assembly 410 among other components.

Enclosure:

Enclosure 402 is formed of any suitable size, shape and design and is configured to hold other components of visual warning system 400 in positions for operation. In the arrangement shown, as one example, enclosure 402 has a back 414, a top 418, a bottom 420, and opposing sides 416. In this example arrangement, back 414, a top 418, a bottom 420, and opposing sides 416 form a box having an open front. In this example arrangement, back 414 has a generally planar shape extending between sides 416 and between top 418 and bottom 420. In this example arrangement, top 418 and bottom 420 are also generally planar shaped and extend between sides 416 from back 414 to a front edge 422. In this example arrangement, sides are also generally planar shaped and extend between top 418 and bottom 420 from back 414 to front edge 422. In this example arrangement, back 414 also includes an opening 426 for lever 404 to pass through. However, any other size, shape and configuration is hereby contemplated for use as enclosure 402.

Indicators:

Indicators 406 are formed of any suitable size, shape and design and are configured to have a plurality surfaces for display of different statuses in a window 408 in outer door 32. In the arrangement shown, indicators 406 have an elongated shape having generally planar side surfaces 430 extending a length between opposing ends 428. In this example arrangement, side surfaces 430 extend in parallel to an axis in which the indicator 406 rotates. In this example arrangement, indicators 406 include three side surfaces 430. However, indicators 406 having any number of side surfaces 430 are contemplated for use in visual warning system 400.

In this example arrangement, indicators 406 are rotated to face a first set of side surfaces 430 forward for display of a first status. In this example arrangement, indicators 406 are rotated to face a second set of side surfaces 430 forward for display of a second status. As an illustrative example, the first set of side surfaces 430 may be painted green to indicates that inner door 26 is in a closed and latched position. Conversely, the second set of side surfaces 430 may be painted red to indicate that the inner door 26 is in an open or unlatched position. Any other configuration is hereby contemplated for use.

Linkage Assembly:

Linkage assembly 410 is formed of any suitable size, shape and design and is configured to connect indicators 406 together to facilitate rotation of indicators 406 and alignment of side surfaces 430. In the arrangement shown, as one example, linkage assembly 410 includes a first link member 434 having a generally planar shape extending between opposing sides 436 from an upper end 438 to a lower end 440. In this example arrangement, link member 434 include holes 442 to facilitate connection with indicators 406 and with a second link member 444, for example, by fasteners (not shown). In this example arrangement fasteners may be any type of connector including but not limited to, screws, bolts, pins rivets, shafts, and/or any other connection means.

In the arrangement shown, link member 434 is connected to lever 404 by link member 434. In this example arrangement, link member 444 having a generally planar shape extending between opposing sides 446 from a forward end 448 to a rearward end 450. In this example arrangement, link member 444 include holes 452 to facilitate connection with link member 434 at forward end 448 and facilitate connection with lever 404 at rearward end 450 for example, by fasteners (not shown).

Lever:

Lever 404 is formed of any suitable size, shape and design and is configured to engage handle assembly 30, when outer door 32 is closed and handle assembly 30 is in a closed and latched position, and thereby move link member 434 of linkage assembly 410 upward to a safe indication position, where indicators 406 are rotated to face a first set of side surfaces 430 forward. When outer door 32 is open or and handle assembly 30 is in a closed and latched position, link member 434 is moved downward to a hazard indication position, by a biasing member 424, where indicators 406 are rotated to face a second set of side surfaces 430 forward and lever 404 is moved outward.

In the arrangement shown, lever 404 includes an interior portion 456 and an exterior portion 458. In this example arrangement, interior portion 456 has an elongated shape extending forward from a pivot 462, where interior portion 456 is pivotally connected to enclosure 402, to a forward end 460, where lever 404 is connected to link member 444 of linkage assembly 410. In this example arrangement, lever 404 also extends rearward from pivot 462 through opening 426 in enclosure 402 to a rearward end 464.

In the arrangement shown, exterior portion 458 includes an upper section 466 connected to and extending downward from rearward end 464 of interior portion 456, when lever 404 is engaged with handle assembly 30. In this example arrangement, exterior portion 458 includes a center section 468 connected to a lower end of upper section 466 at a right angle. In this example arrangement, exterior portion 458 includes a lower section 470 connected to center section 468 at a right angle. When panels 28 of inner door 26 are in closed position with handle assembly 30 in a latched position, lower section 470 of exterior portion 458 of lever 404 is positioned to engage with handle assembly 30 when outer door 32 is closed.

Bias Member:

Bias member 424 (not shown) is formed of any suitable size, shape and design and is configured to operably connect with linkage assembly 410 and/or lever 404 to move link member 434 of linkage assembly 410 downward and the lower end of lever 404 rearward to the hazard indication position when lever 404 does not engage handle assembly 30. In one example arrangement bias member 424 may be a weighted system that pulls link member 434 of linkage assembly 410 downward, such as through a pulley system or lever system or weighted arrangement or the like. In another example arrangement, bias member 424 may be a spring that pulls link member 434 of linkage assembly 410 downward. Any other form of a bias member 274 is hereby contemplated for use which pushes or pulls or applies a force to the link member 434 of linkage assembly 410 to move it to the hazard indication position.

Window:

Window 408 in outer door 32 is formed of any suitable size, shape and design and is configured to provide a view of indicators 406 when outer door 32 is closed. In the arrangement shown, as one example, window 408 is a rectangular shaped opening having a size approximately equal to the size of indicators 406. In this example arrangement, enclosure 402 of visual warning system 400 is attached to an interior side of outer door 32 with indicators 406 positioned behind window 408. Window 408 serves to allow viewing of indicators 406 as well as to enclose and protect the components of visual warning system 400 from dirt, water, debris, bugs and other elements that could negatively affect the operation of visual warning system 400.

In Operation:

As an illustrative example, in one or more embodiments, visual warning system 400 is configured to display a red indicator when an associated panel 28 of inner door 26 is not closed or handle assembly 30 of inner door 26 is not in a latched position. In this example, visual warning system 400 is configured to display a green indicator when panels 28 of inner door 26 are closed and handle assembly 30 is in a latched position.

When panel 28 of inner door 26 is not closed or handle assembly 30 is not in a latched position, lever 404 does not engage handle assembly 30. In this situation, bias member 424 moves lever 404 rearward from enclosure 402 and moves link member 434 of linkage assembly 410 to the hazard indication position. Movement of link member 434 to the hazard indication position rotates indicators 406 to display red colored side surfaces 430 of indicators 406 in window 408 of outer door 32.

When lever 404 engages handle assembly 30 with sufficient force to counter bias member 424, lever 404 is moved forward toward enclosure 402 and link member 434 of linkage assembly 410 is moved to a safe indication position. Movement of link member 434 to the safe indication position rotates indicators 406 to display green colored side surfaces 430 of indicators 406 in window 408 of outer door 32.

In this manner, a user is notified whether inner door 26 is in a closed and latched position when outer door 32 is closed. Such notification assists to prevent the user from forgetting inner door 26 is open and then filling the grain bin 12, which can damage or destroy the grain bin 12 and/or cause injury or death. One of the benefits of visual warning system 400 is that it does not require power. That is, visual warning system 400 is purely mechanical in nature. This causes visual warning system 400 to have an extended useful life and it prevents failure due to power loss (such as batteries dying or the line-power going out).

Figure 82:
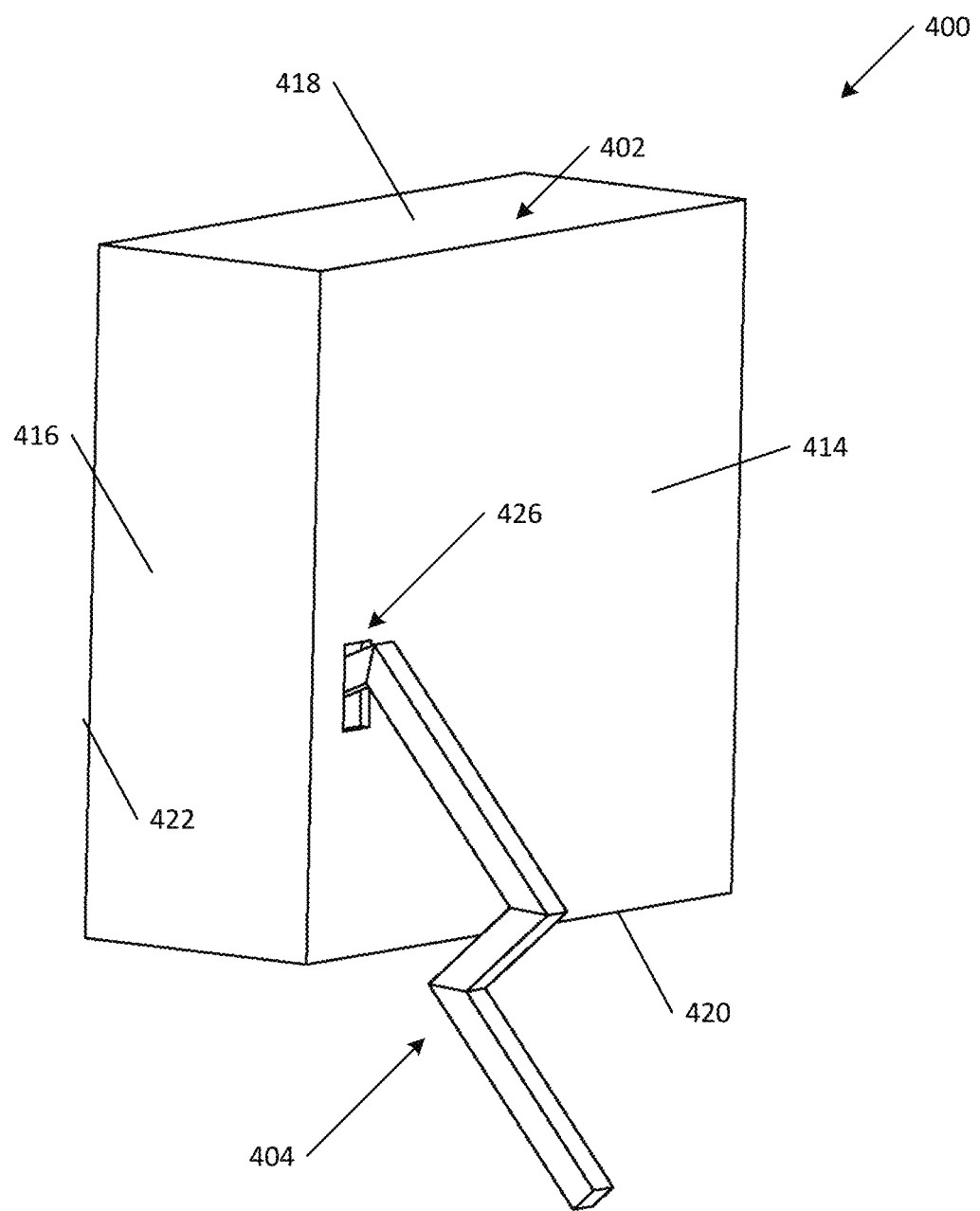
FIG. 82 is a back right perspective view of a visual warning system, consistent with one or more embodiments; the view showing the visual warning system in a hazard indication position.
Figure 83:
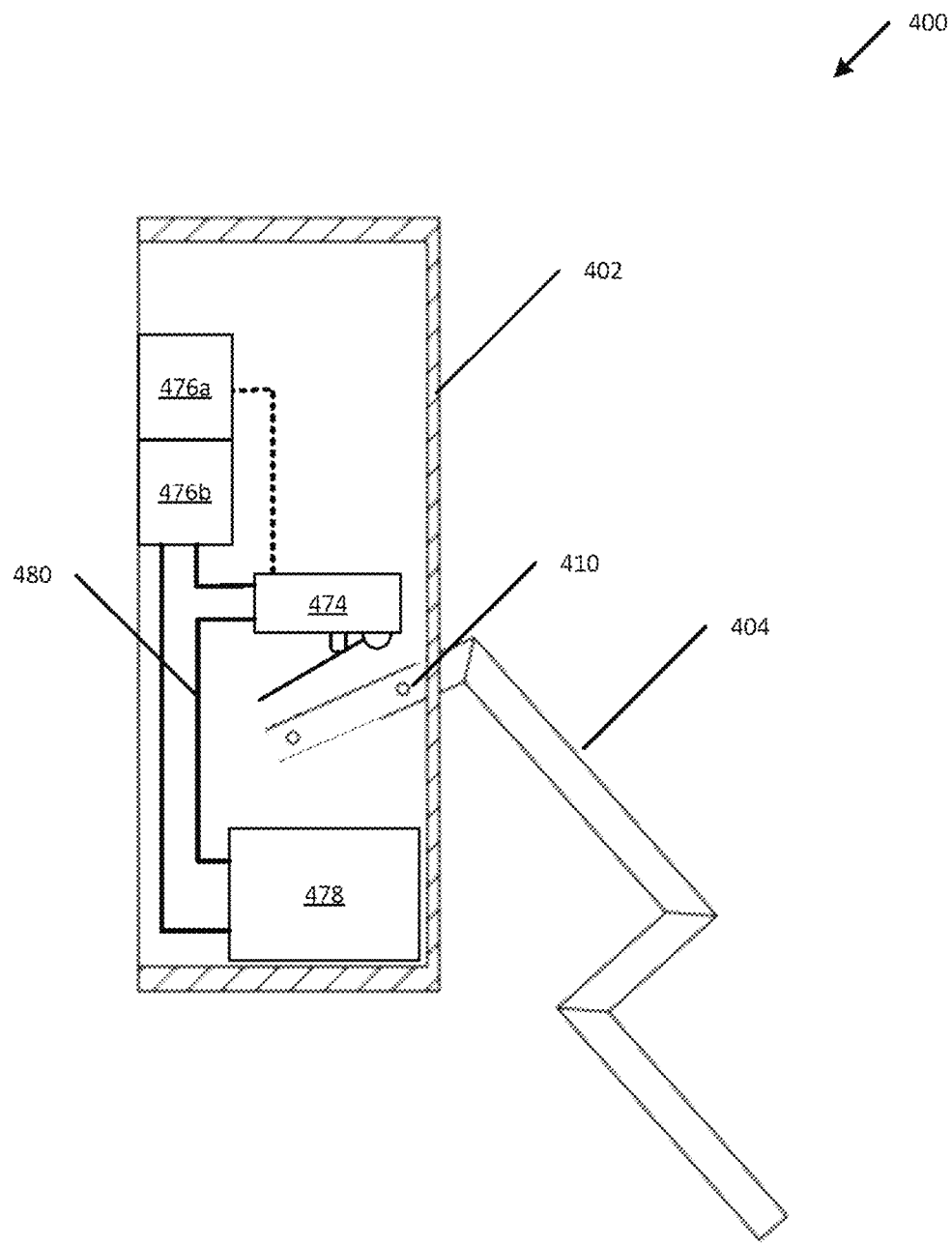
FIG. 83 is cross section side view of a visual warning system, consistent with one or more embodiments; the view showing the visual warning system in a hazard indication position.
Figure 84:
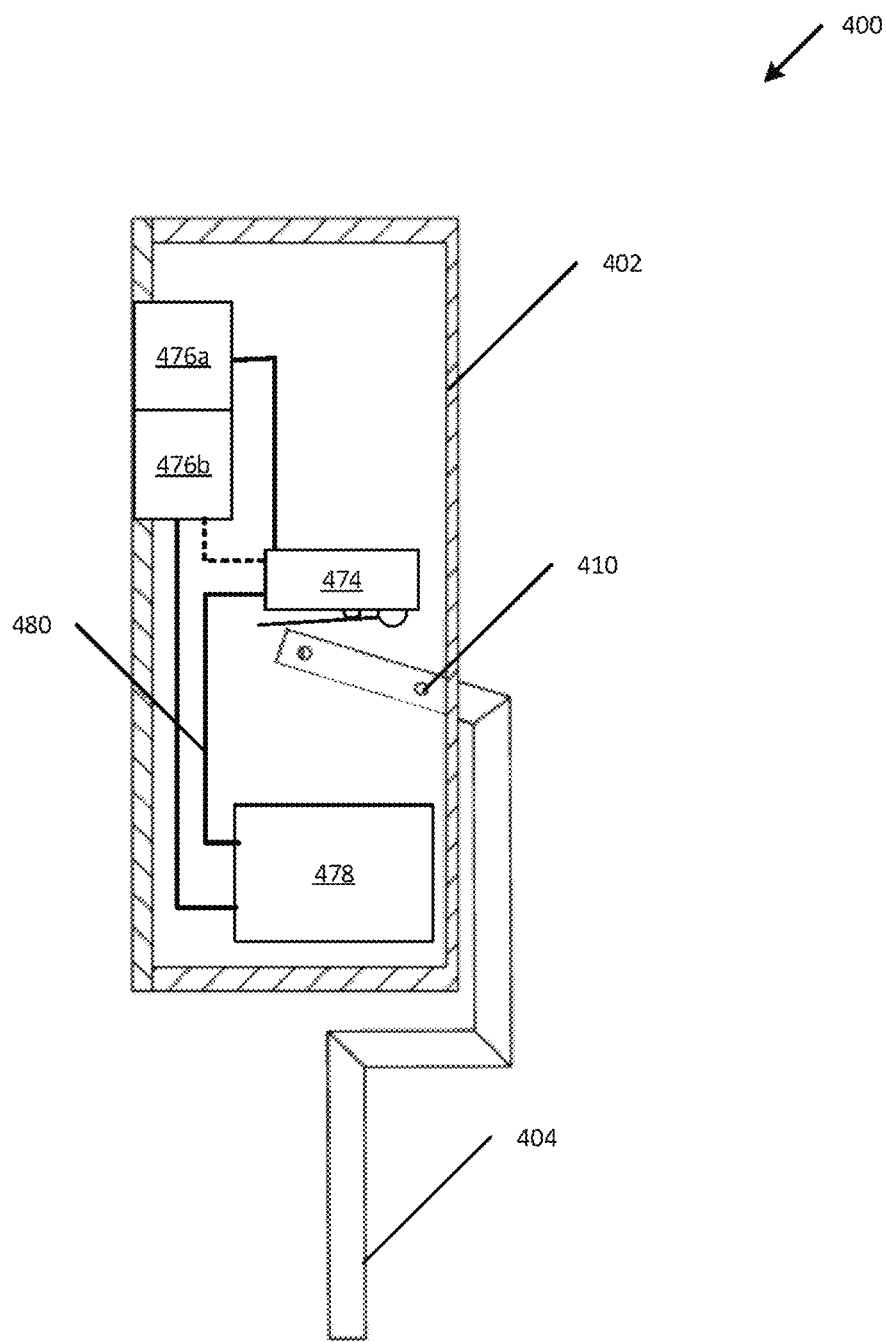
FIG. 84 is cross section side view of a visual warning system, consistent with one or more embodiments; the view showing the visual warning system in a safe indication position.

Visual Warning System—Alternative Arrangement:

With reference to FIGS. 83-84, an alternative arrangement of visual warning system 400. This alternative arrangement presented in FIGS. 83-84 is similar to the visual warning system 400 presented in FIGS. 74-82 and therefore unless specifically stated otherwise herein, the prior teaching and disclosure shown in FIGS. 74-82 applies equally to the alternative arrangement shown in FIGS. 83-84. That is, the arrangement shown in FIGS. 1-82 is configured to be used with the same or similar grain bin 12, door assembly 14, door frame 16 and the like with the difference being the addition of alternative visual warning system 400 as is described herein.

Visual Warning System:

In the arrangement shown, as one example, safety grain bin door latch system 10 includes a visual warning system 400. The visual warning system 400 shown in FIGS. 83-84 is similar to system 10 shown in FIGS. 74-82 but provides a visual indication using electronics in lieu of indicators 406 and linkage assembly 410.

Visual warning system 400 is formed of any suitable size, shape and design and is configured to provide a visual indication whether inner door 26 is closed and latched when outer door 32 is in a closed position. In the arrangement shown, as one example, visual warning system 400 includes an enclosure 402, a lever 404, a power supply 478, a switch 474, one or more electronic indicators 476, one or more circuits 480, a window 408 in outer door 32, among other components.

Electronic Indicators: Electronic indicators 476 are formed of any suitable size, shape and design and are configured to display at least two different visual indications in response to electronic signals. In various implementations, electronic indicators 476 may be various indicators including but not limited to for example, lights, light emitting diodes (LEDs), liquid crystal displays, electronic flags, and/or any other electronic display. In the arrangement shown, electronic indicators 476 includes two electronic indicators 476a and 476b. In this example arrangement, visual warning system 400 is configured to enable display of electronic indicators of 476a when switch 474 is depressed and display of electronic indicator 476b when switch 474 is released.

Switch and Circuits:

Switch 474 and Circuits 480 are formed of any suitable size, shape and design and are configured and arranged with other components of visual warning system 400 to cause electronic indicators 476 to provide a first visual indication when switch 474 is depressed and provide a second visual indication when switch 474 is released. In this example arrangement, switch 474 is a double throw switch. In this example arrangement, switch 474 is connected to power supply 478 and to electronic indicators 476 by circuits 480. Circuits 480 and switch 474 are arranged to complete a first circuit between power supply 478 and electronic indicator 476a when switch 474 is depressed and complete a second circuit between power supply 478 and electronic indicator 476b when switch 474 is depressed.

In Operation:

As an illustrative example, in one or more embodiments, visual warning system 400 includes a red LED and a green LED as electronic indicators 476. In this example, visual warning system 400 is configured to light the red LED when either a panel 28 of inner door 26 is not closed or handle assembly 30 of inner door 26 is not in a latched position. In this example, visual warning system 400 is configured to light the green LED when panels 28 of inner door 26 are closed and handle assembly 30 is in a latched position.

When panel 28 of inner door 26 is not closed or handle assembly 30 is not in a latched position, lever 404 does not engage handle assembly 30. In this situation, bias member 424 moves lever 404 rearward from enclosure 402. When lever 404 is moved rearward, switch 474 is released. In this position, switch 474 completes a first circuit to light the red LED and breaks a second circuit which turns off the green LED.

When lever 404 engages handle assembly 30 with sufficient force to counter bias member 424, lever 404 is moved forward toward enclosure 402. When lever 404 is moved forward, switch 474 is depressed by lever 404. In this position, switch 474 break the first circuit to turn off the red LED and completes the second circuit to turn on the green LED.

In this manner, a user is notified whether inner door 26 is in a closed and latched position when outer door 32 is closed. Such notification assists to prevent the user from forgetting inner door 26 is open and then filling the grain bin 12, which can damage or destroy the grain bin 12 and/or cause injury or death. Additionally, as either the red LED or green LED is lit at a given time, the user is also notified if power supply used to power the visual warning system 400 is disconnected or dead (e.g. when neither LED is lit).

While visual warning system 400 is primarily shown and described with reference to implementations that change visual indications in response to lever 404, embodiments are not so limited. Rather, visual warning system 400 may be implemented with a control circuit (e.g., control system 600) configured to update visual indications displayed in response to various wired or wireless sensors. Such sensors may include but are not limited to, for example, safety interlock switches, magnetic switches, proximity sensors, and/or any other type of sensor.

Control System 600:

In one or more arrangements, system 10 includes a control system 600. Control system 600 is formed of any suitable any suitable size, shape, and design and is configured to control operation of, for example, electronic indicators 476a and 476b), other components of system 10, and/or other devices and/or systems communicatively connected to control system 600 to facilitate automated operation in response to signals of sensors 606 and/or input from user interface 604. In the arrangement shown, as one example, control system 600 includes a control circuit 602, user interface 604, and/or sensors 606, among other components.

Control Circuit 602:

Control circuit 602 is formed of any suitable size, shape, design and is configured to control operation of, for example, electronic indicators 476a and 476b), other components of system 10, and/or other devices and/or systems communicatively connected to control system 600 to facilitate automated operation in response to signals of sensors 606 and/or input from user interface 604. In the arrangement shown, as one example implementation, control circuit 602 includes a communication circuit 610, a processing circuit 612, and a memory 614 having software code 616 or instructions that facilitates the operation of system 10.

Processing circuit 612 may be any computing device that receives and processes information and outputs commands according to software code 616 stored in memory 614. For example, in some various arrangements, processing circuit 612 may be discreet logic circuits or programmable logic circuits configured for implementing these operations/activities, as shown in the figures and/or described in the specification. In certain arrangements, such a programmable circuit may include one or more programmable integrated circuits (e.g., field programmable gate arrays and/or programmable ICs). Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of software code stored in and accessible from memory 614. Memory 614 may be any form of information on storage such as flash memory, ram memory, dram memory, a hard drive, or any other form of memory.

Processing circuit 612 and memory 614 may be formed of a single combined unit. Alternatively, processing circuit 612 and memory 614 may be formed of separate but electrically connected components. Alternatively, processing circuit 612 and memory 614 may each be formed of multiple separate but communicatively connected components.

Software code 616 is any form of instructions or rules that direct processing circuit 612 how to receive, interpret and respond to information to operate as described herein. Software code 616 or instructions is stored in memory 614 and accessible to processing circuit 612. As an illustrative example, in one or more arrangements, software code 616 or instructions may configure processing circuit 612 control circuit 602 to monitor sensors 606 and perform various preprogramed actions in response to signals from sensors 606 satisfying one or more trigger conditions.

As some illustrative examples, some actions that may be initiated by control circuit 602 in response to signals from sensors 606 and/or user input from user interface 604 include but are not limited to, for example, controlling electronic indicators 476a/476b to indicate whether inner door 26 is opened or closed, opening and/or closing individual or multiple roof vents of grain bin 12, controlling augers and conveyors of loading and/or unloading systems, controlling grain dryers, controlling environmental control systems (e.g., temperature control systems, air circulation systems, fumigation systems, and/or preservative application systems), and/or sending notifications to users (e.g., emails, SMS, push notifications, automated phone call, social media messaging, and/or any other type of messaging). However, the embodiments are not so limited.

Communication circuit 610 is formed of any suitable size, shape, design, technology, and in any arrangement and is configured to facilitate communication with devices to be controlled, monitored, and/or alerted by control system 600. In one or more arrangements, as one example, communication circuit 610 is a includes a transmitter (for one-way communication) or transceiver (for two-way communication). In various arrangements, communication circuit 610 may be configured to communicate with various components of system 10 using various wired and/or wireless communication technologies and protocols over various networks and/or mediums including but not limited to, for example, Serial Data Interface 12 (SDI-12), UART, Serial Peripheral Interface, PCI/PCIe, Serial ATA, ARM Advanced Microcontroller Bus Architecture (AMBA), USB, Firewire, RFID, Near Field Communication (NFC), infrared and optical communication, 802.3/Ethernet, 802.11/WIFI, Wi-Max, Bluetooth, Bluetooth low energy, UltraWideband (UWB), 802.15.4/ZigBee, ZWave, GSM/EDGE, UMTS/HSPA+/HSDPA, CDMA, LTE, FM/VHF/UHF networks, and/or any other communication protocol, technology or network.

Sensors 606:

Sensors 606 are formed of any suitable size, shape, design, technology, and in any arrangement configured to measure environmental conditions that may affect storage of contents of grain bin 12. In some various arrangements, sensors 606 may include but are not limited to, for example, proximity sensors, a pressure sensors, an optical sensors, a laser sensors, an infrared sensors, a conductivity sensors, a mechanical sensors, a switches, a magnetic sensors, a video sensors, a light sensors, audio sensors, position sensors, temperature sensors, humidity sensors, moisture sensors, chemical sensors, or any other form of a sensor or sensing device. In some arrangements, sensors 606 may be formed along with control circuit 602 as a single combined unit. Alternatively, in some arrangement sensors 606 and control circuit 602 may be communicatively connected by communication circuit 610.

User Interface 604:

User Interface is formed of any suitable size, shape, design, technology, and in any arrangement and is configured to facilitate user control and/or adjustment of various components of system 10. In one or more arrangements, as one example, user interface 604 includes a set of inputs (not shown). Inputs are formed of any suitable size, shape, and design and are configured to facilitate user input of data and/or control commands. In various different arrangements, inputs may include various types of controls including but not limited to, for example, buttons, switches, dials, knobs, a keyboard, a mouse, a touch pad, a touchscreen, a joystick, a roller ball, or any other form of user input. Optionally, in one or more arrangements, user interface includes a display (e.g., electronic indicators 476a, 476b). Display is formed of any suitable size, shape, design, technology, and in any arrangement and is configured to facilitate display information of settings, sensor readings, time elapsed, and/or other information pertaining to proper storage of contents of grain bin 12. In one or more arrangements, display may include, for example, LED lights, meters, gauges, screen or monitor of a computing device, tablet, and/or smartphone. Additionally or alternatively, in one or more arrangements, the inputs and/or display may be implemented on a separate device that is communicatively connected to control circuit 602. For example, in one or more arrangements, operation of control circuit 602 may customized using a smartphone or other computing device that is communicatively connected to the control circuit 602 (e.g., via Bluetooth, WIFI, and/or the internet). From the above discussion it will be appreciated that the safety grain bin door latch system presented herein improves upon the state of the art. More specifically, and without limitation, it will be appreciated that the safety grain bin door latch system presented herein: improves safety; reduces injury or death; that prevents the closing of an outer door skin when the inner door is not closed; that prevents the closing of an outer door skin when the inner door is not latched; is relatively inexpensive; is easy to install; can be used with practically any grain bin; can be used with practically any grain bin door; has a long useful life; is durable; has a robust design; is high quality; can be installed using conventional equipment and tools; can be installed as OEM (original Equipment Manufacturer); can be retroactively installed; is easy to use; does not require additional steps to open the grain bin door; does not require additional steps to close the grain bin door; is a passive safety mechanism; saves grain; saves grain bins from being damaged; provides a safety check mechanism for grain bin doors; stops a user from forgetting to close an inner door of a grain bin before filling the grain bin, among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A safety grain bin door system for a grain bin having a sidewall the system, comprising:
   a door frame connected to the sidewall;
   the door frame having an upper frame member, a lower frame member and opposing side frame members;
   an inner door;
   the inner door connected to the door frame;
   wherein the inner door moves between an open position and a closed position;
   the inner door configured to transmit hoop stress across the opposing side frame members;
   an outer door;
   wherein the outer door moves between an open position and a closed position;
   a safety mechanism;
   wherein the safety mechanism includes a light;
   wherein the safety mechanism is configured to provide a visual indication that the inner door is in the open position when the inner door is in the open position and the outer door is in the closed position;
   wherein the light is visible from an exterior of the grain bin while the outer door is in the closed position.

2. The system of claim 1, wherein the safety mechanism is configured to turn the light on when the inner door is in the open position and the outer door is in the closed position;
   wherein the safety mechanism is configured to turn the light off when the inner door is in the closed position;
   wherein the light is visible from an exterior of the grain bin while the outer door is in the closed position.

3. The system of claim 1, wherein the safety mechanism is configured to turn the light off when the inner door is in the open position and the outer door is in the closed position;
   wherein the safety mechanism is configured to turn the light on when the inner door is in the closed position;
   wherein the light is visible from an exterior of the grain bin while the outer door is in the closed position.

4. A safety grain bin door system for a grain bin having a sidewall the system, comprising:
   a door frame connected to the sidewall;
   the door frame having an upper frame member, a lower frame member and opposing side frame members;
   an inner door;
   the inner door connected to the door frame;
   wherein the inner door moves between an open position and a closed position;
   the inner door configured to transmit hoop stress across the opposing side frame members;
   an outer door;
   a pair of hinges connecting the outer door to the door frame;
   wherein the outer door includes a handle assembly;
   wherein the outer door includes a first set of connection assemblies positioned on a left side of the outer door;
   wherein the outer door includes a second set of connection assemblies positioned on a right side of the outer door;
   wherein the pair of hinges and the handle assembly are configured to be connectable to the outer door by the first set of connection assemblies and are configured to be connectable to the outer door by the second set of connection assemblies, thereby permitting hinges and handle assembly to be connected to either the right side or the left side of the outer door;
   wherein the outer door moves between an open position and a closed position; a safety mechanism;
   wherein the safety mechanism provides a visual indication that the inner door is in the open position when the inner door is in the open position and the outer door is in the closed position;
   wherein the visual indication the safety mechanism provides that the inner door is in the open position is a first color; and
   wherein the visual indication the safety mechanism provides that the inner door is in the closed position is a second color that is different from the first color.

5. A safety grain bin door system for a grain bin having a sidewall the system, comprising:
   a door frame connected to the sidewall;
   the door frame having an upper frame member, a lower frame member and opposing side frame members;
   an inner door;
   the inner door connected to the door frame;
   wherein the inner door moves between an open position and a closed position;

the inner door configured to transmit hoop stress across the opposing side frame members;

an outer door;

a pair of hinges connecting the outer door to the door frame;

wherein the outer door includes a handle assembly;

wherein the outer door includes a first set of connection assemblies positioned on a left side of the outer door;

wherein the outer door includes a second set of connection assemblies positioned on a right side of the outer door;

wherein the pair of hinges and the handle assembly are configured to be connectable to the outer door by the first set of connection assemblies and are configured to be connectable to the outer door by the second set of connection assemblies, thereby permitting hinges and handle assembly to be connected to either the right side or the left side of the outer door;

wherein the outer door moves between an open position and a closed position;

a safety mechanism;

wherein the safety mechanism prevents latching of the outer door in a closed position when the inner door is in the open position;

wherein the safety mechanism includes a lever;

wherein a portion of the inner door engages the lever when the inner door is in the closed position such that when the inner door is in the closed position the inner door engages the safety mechanism to move the safety mechanism to a position wherein the outer door may latch in the closed position.

6. The system of claim 5, wherein the first set of connection assemblies are vertically symmetric to the second set of connection assemblies.

7. The system of claim 5, wherein the first set of connection assemblies include a first set of fastener holes;

wherein the second set of connection assemblies include a second set of fastener holes;

wherein the first set of fastener holes are vertically symmetric to the second set of fastener holes.

8. The system of claim 5, wherein the first set of connection assemblies include a first set of fastener holes positioned in a first triangular arrangement;

wherein the second set of connection assemblies include a second set of fastener holes positioned in a second triangular arrangement;

wherein the first triangular arrangement is vertically symmetric to the second triangular arrangement.

9. The system of claim 5, wherein the handle assembly is configured to latch the outer door when the outer door is in the closed position.

10. The system of claim 5, further comprising a safety mechanism;

wherein the safety mechanism prevents latching of the outer door in the closed position when the inner door is in the open position;

wherein the safety mechanism is operably connected to the door frame.

11. The system of claim 5, further comprising a safety mechanism;

wherein the safety mechanism prevents latching of the outer door in the closed position when the inner door is in the open position;

wherein the safety mechanism is operably connected to the outer door.

12. The system of claim 5, further comprising a safety mechanism;

wherein the safety mechanism prevents latching of the outer door in the closed position when the inner door is in the open position;

wherein the safety mechanism is operably connected to the inner door.

13. The system of claim 5, further comprising a safety mechanism;

wherein the safety mechanism prevents latching of the outer door in the closed position when the inner door is in the open position;

wherein the safety mechanism facilitates latching of the outer door in the closed position when the inner door is in the closed position.

14. The system of claim 5, further comprising a safety mechanism;

wherein the safety mechanism prevents latching of the outer door in the closed position when the inner door is in the open position;

wherein the safety mechanism includes a lever that engages a portion of the inner door when the inner door is in the closed position.

15. The system of claim 5, further comprising a safety mechanism;

wherein the safety mechanism prevents latching of the outer door in the closed position when the inner door is in the open position;

wherein the safety mechanism includes a lever that engages a portion of the inner door when the inner door is in the closed position such that when the inner door is in the open position the lever of the safety mechanism is not engaged with the inner door and the safety mechanism remains in a position wherein the outer door may not latch in the closed position.

16. The system of claim 5, further comprising a safety mechanism;

wherein the safety mechanism prevents latching of the outer door in the closed position when the inner door is in the open position;

wherein the safety mechanism includes a slot that receives a portion of the outer door when the outer door is in the closed position and the inner door is in the closed position.

17. The system of claim 5, further comprising a safety mechanism;

wherein the safety mechanism prevents latching of the outer door in the closed position when the inner door is in the open position;

wherein the safety mechanism includes a bias member that maintains the safety mechanism in an open position when the inner door is in the open position.

18. The system of claim 5, further comprising a safety mechanism;

wherein the safety mechanism prevents latching of the outer door in the closed position when the inner door is in the open position;

wherein the safety mechanism moves between an open position, when the inner door is open, and a closed position, when the inner door is closed.

19. The system of claim 5, further comprising a safety mechanism;

wherein the safety mechanism provides a visual indication that the inner door is in the open position when the inner door is in the open position and the outer door is in the closed position;

wherein the visual indication is visible from an exterior of the grain bin while the outer door is in the closed position;

wherein the safety mechanism is operably connected to the door frame.

20. The system of claim 5, further comprising a safety mechanism;
  wherein the safety mechanism provides a visual indication that the inner door is in the open position when the inner door is in the open position and the outer door is in the closed position;
  wherein the visual indication is visible from an exterior of the grain bin while the outer door is in the closed position;
  wherein the safety mechanism includes a lever that engages a portion of the inner door when the inner door is in the closed position;
  wherein actuation of the lever by engagement with the portion of the door causes the safety mechanism to remove the visual indication that the inner door is in the open position when the inner door is in the open position and the outer door is in the closed position.

21. The system of claim 5, further comprising a safety mechanism;
  wherein the safety mechanism provides a visual indication that the inner door is in the open position when the inner door is in the open position and the outer door is in the closed position;
  wherein the visual indication is visible from an exterior of the grain bin while the outer door is in the closed position;
  wherein the safety mechanism includes a bias member that maintains the safety mechanism in a position to provide the visual indication when the inner door is in the open position.

22. The system of claim 5, further comprising a safety mechanism;
  wherein the safety mechanism provides a visual indication that the inner door is in the open position when the inner door is in the open position and the outer door is in the closed position;
  wherein the visual indication is visible from an exterior of the grain bin while the outer door is in the closed position;
  wherein the safety mechanism moves between an open position, when the inner door is open, and a closed position, when the inner door is closed.

23. The system of claim 5, further comprising a pair of cross braces;
  wherein the pair of cross braces are connected to the left side of the outer door by the first set of connection assemblies;
  wherein the pair of cross braces are connected to the right side of the outer door by the second set of connection assemblies.

24. A safety grain bin door system for a grain bin having a sidewall the system, comprising:
  a door frame connected to the sidewall;
  the door frame having an upper frame member, a lower frame member and opposing side frame members;
  an inner door;
  the inner door connected to the door frame;
  wherein the inner door moves between an open position and a closed position;
  the inner door configured to transmit hoop stress across the opposing side frame members;
  an outer door;
  a pair of hinges connecting the outer door to the door frame;
  wherein the outer door moves between an open position and a closed position;
  wherein the outer door includes a handle assembly configured to latch outer door in the closed position of the outer door;
  wherein the handle assembly is connected to a left side of the outer door by a first set of connection assemblies;
  wherein the pair of hinges are connected to a right side of the outer door by a second set of connection assemblies;
  wherein the first set of connection assemblies and the second set of connection assemblies are configured to permit the handle assembly to be moved to the right side of the outer door and permit the pair of hinges to be moved to the left side of the outer door;
  a safety mechanism;
  the safety mechanism configured to mechanically prevent latching of the outer door when the inner door is in the open position and provide a visual indication that the inner door is in the open position when the inner door is in the open position and the outer door is in the closed position;
  wherein the visual indication is visible from an exterior of the grain bin while the outer door is in the closed position;
  wherein the safety mechanism is operably connected to the door frame.

25. The system of claim 24, wherein the first set of connection assemblies are vertically symmetric to the second set of connection assemblies.

26. The system of claim 24, wherein the first set of connection assemblies include a first set of fastener holes;
  wherein the second set of connection assemblies include a second set of fastener holes;
  wherein the first set of fastener holes are vertically symmetric to the second set of fastener holes.

27. The system of claim 24, wherein the first set of connection assemblies include a first set of fastener holes positioned in a first triangular arrangement;
  wherein the second set of connection assemblies include a second set of fastener holes positioned in a second triangular arrangement;
  wherein the first triangular arrangement is vertically symmetric to the second triangular arrangement.

28. A safety grain bin door system for a grain bin having a sidewall the system, comprising:
  a door frame connected to the sidewall;
  the door frame having an upper frame member, a lower frame member and opposing side frame members;
  an inner door;
  the inner door connected to the door frame;
  wherein the inner door moves between an open position and a closed position;
  the inner door configured to transmit hoop stress across the opposing side frame members;
  an outer door;
  a pair of hinges connecting the outer door to the door frame;
  wherein the outer door includes a handle assembly;
  wherein the outer door includes a first set of connection assemblies positioned on a left side of the outer door;
  wherein the outer door includes a second set of connection assemblies positioned on a right side of the outer door;
  wherein the pair of hinges and the handle assembly are configured to be connectable to the outer door by the first set of connection assemblies and are configured to be connectable to the outer door by the second set of connection assemblies, thereby permitting hinges and handle assembly to be connected to either the right side or the left side of the outer door;

wherein the outer door moves between an open position and a closed position;

a first safety mechanism;

the first safety mechanism configured to mechanically prevent latching of the outer door when inner door is in the open position;

a second safety mechanism;

the second safety mechanism configured to provide a visual indication that the inner door is in the open position when the inner door is in the open position and the outer door is in the closed position;

wherein the visual indication is visible from an exterior of the grain bin while the outer door is in the closed position.

29. The system of claim 28, wherein the first set of connection assemblies are vertically symmetric to the second set of connection assemblies.

30. The system of claim 28, wherein the first set of connection assemblies include a first set of fastener holes;

wherein the second set of connection assemblies include a second set of fastener holes;

wherein the first set of fastener holes are vertically symmetric to the second set of fastener holes.

31. The system of claim 28, wherein the first set of connection assemblies include a first set of fastener holes positioned in a first triangular arrangement;

wherein the second set of connection assemblies include a second set of fastener holes positioned in a second triangular arrangement;

wherein the first triangular arrangement is vertically symmetric to the second triangular arrangement.

32. The system of claim 28, wherein the handle assembly is configured to latch the outer door when the outer door is in the closed position.

* * * * *